US012627532B1

(12) United States Patent
Li et al.

(10) Patent No.: US 12,627,532 B1
(45) Date of Patent: May 12, 2026

(54) TECHNIQUES TO PERFORM CHANNEL ESTIMATION

(71) Applicant: NVIDIA Corporation, Santa Clara, CA (US)

(72) Inventors: Shaoran Li, Blacksburg, VA (US); Yan Huang, Santa Clara, CA (US); James Hansen Delfeld, Austin, TX (US); Christopher Hans Dick, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/685,602

(22) Filed: Mar. 3, 2022

(51) Int. Cl.
*H04L 25/02* (2006.01)

(52) U.S. Cl.
CPC ...... *H04L 25/0222* (2013.01); *H04L 25/0254* (2013.01)

(58) Field of Classification Search
CPC .................. H04L 25/0222; H04L 25/0254
See application file for complete search history.

(56) References Cited

U.S. PATENT DOCUMENTS

| | | | |
|---|---|---|---|
| 9,729,290 B2 | 8/2017 | Noh et al. | |
| 11,811,527 B2 | 11/2023 | Olivés et al. | |
| 2019/0306923 A1* | 10/2019 | Xiong ................. | H04J 13/0062 |
| 2020/0068617 A1* | 2/2020 | Yoon ................... | H04W 74/006 |
| 2020/0267774 A1* | 8/2020 | Vos ................... | H04W 74/0833 |
| 2021/0185515 A1 | 6/2021 | Bao et al. | |
| 2022/0279535 A1* | 9/2022 | Tsui ........................ | H04B 7/043 |

| | | |
|---|---|---|
| 2023/0344675 A1 | 10/2023 | Ait Aoudia et al. |
| 2023/0354434 A1 | 11/2023 | Dayi et al. |
| 2024/0056142 A1 | 2/2024 | Wang et al. |
| 2025/0126652 A1 | 4/2025 | Kaya et al. |

OTHER PUBLICATIONS

ETSI TS 138 211 V16.6.0 "5G; NR; Physical Channels and Modulation," Aug. 2021, 138 pages.
IEEE "IEEE Standard for Floating-Point Arithmetic", Microprocessor Standards Committee of the IEEE Computer Society, IEEE Std 754-2008, dated Jun. 12, 2008.
Kim et al., "Performance comparison of DTX detection schemes for 5G NR PUCCH," IEEE, Oct. 21, 2020, 4 pages.
Society of Automotive Engineers On-Road Automated Vehicle Standards Committee "Taxonomy and Definitions for Terms Related to Driving Automation Systems for On-Road Motor Vehicles", Standard No. J3016-201806, dated Jun. 15, 2018.
Society of Automotive Engineers On-Road Automated Vehicle Standards Committee, "Taxonomy and Definitions for Terms Related to Driving Automation Systems for On-Road Motor Vehicles," Standard No. J3016-201609, issued Jan. 2014, revised Sep. 2016, 30 pages.
Wikipedia, "IEEE 802.11," Wikipedia the Free Encyclopedia, https://en.wikipedia.org/wiki/IEEE_802.11, most recent edit Sep. 20, 2020 [retrieved Sep. 22, 2020], 15 pages.

* cited by examiner

*Primary Examiner* — Natasha W Cosme
(74) *Attorney, Agent, or Firm* — Davis Wright Tremaine LLP

(57) ABSTRACT

Apparatuses, systems, and techniques to perform channel estimation. In at least one embodiment, a processor includes one or more circuits to perform channel estimation corresponding to one or more wireless signals without using a reference signal.

36 Claims, 64 Drawing Sheets

300—

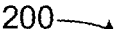
200 ⟶
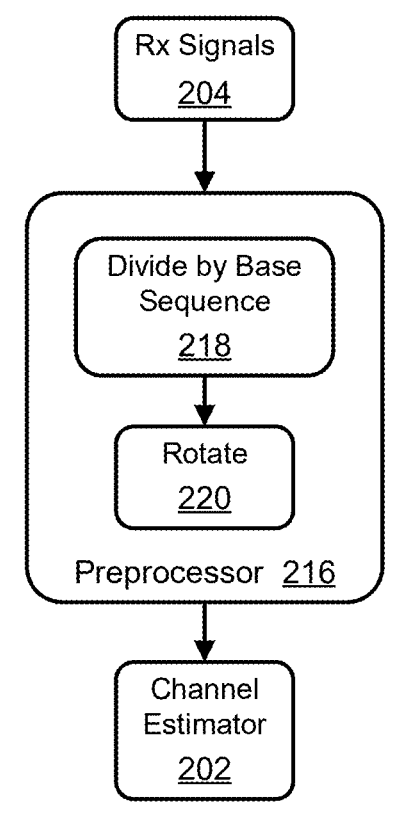
Rx Signals
204
Divide by Base
Sequence
218
Rotate
220
Preprocessor   216
Channel
Estimator
202
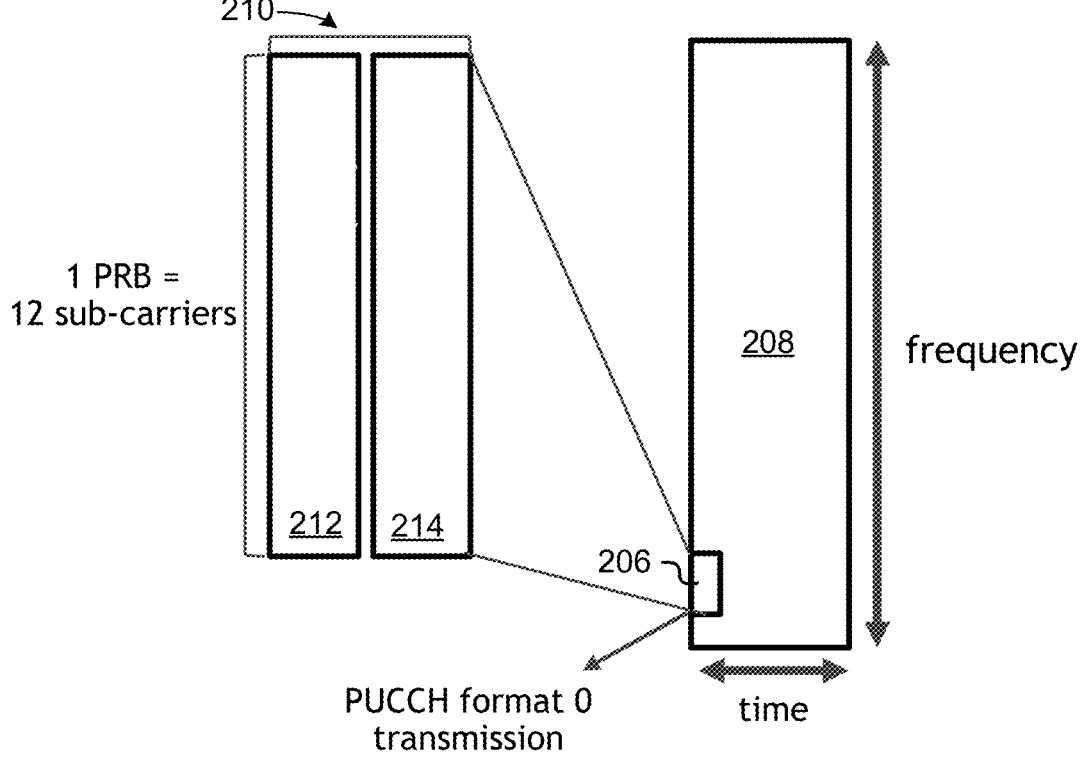
210 ⟶
1 PRB =
12 sub-carriers
212    214
208
frequency
206
PUCCH format 0
transmission
time
FIG. 2

DATA CENTER
1100

APPLICATION LAYER <u>1140</u>

APPLICATION(s) <u>1142</u>

SOFTWARE LAYER <u>1130</u>

SOFTWARE <u>1132</u>

FRAMEWORK LAYER <u>1120</u>

JOB SCHEDULER <u>1132</u>

CONFIGURATION MANAGER <u>1134</u>

DISTRIBUTED FILE SYSTEM <u>1138</u>

RESOURCE MANAGER <u>1136</u>

DATA CENTER INFRASTRUCTURE LAYER <u>1110</u>

RESOURCE ORCHESTRATOR <u>1112</u>

GROUPED COMPUTING RESOURCES <u>1114</u>

NODE C.R. <u>1116(1)</u>

NODE C.R. <u>1116(2)</u>

NODE C.R. <u>1116(N)</u>

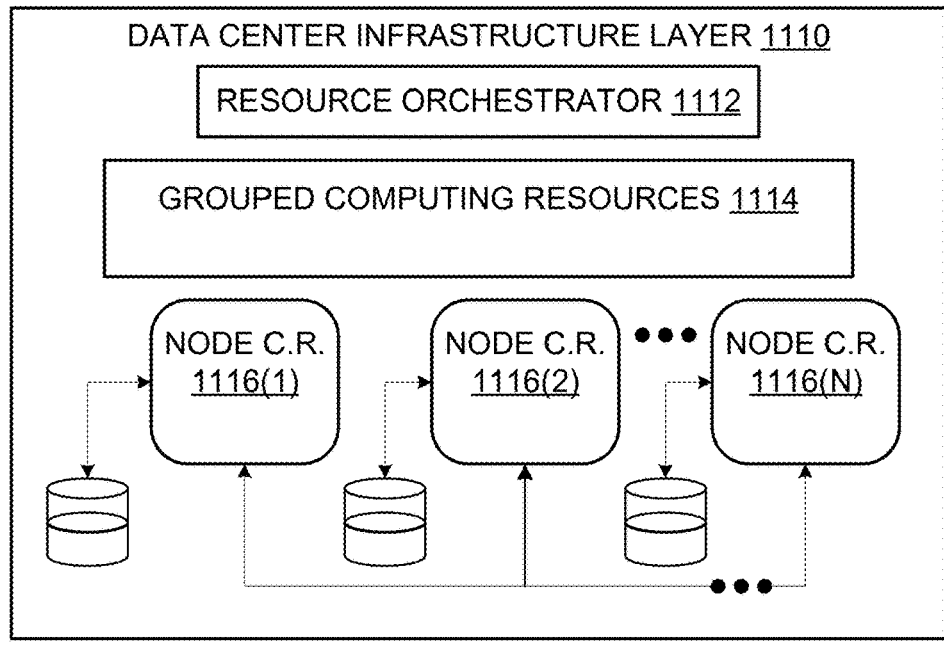

FIG. 11

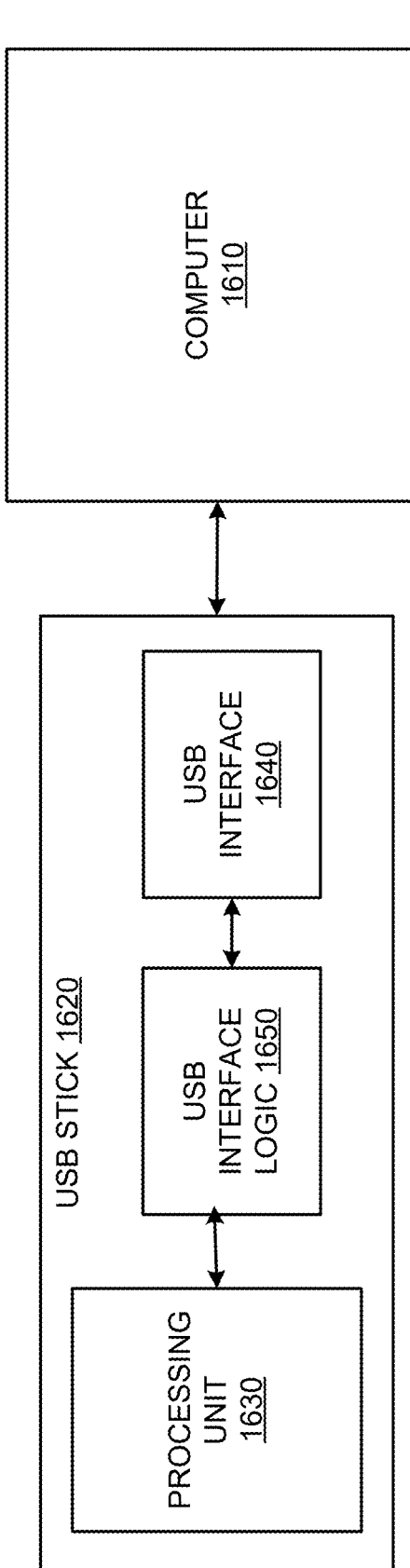
FIG. 16

GRAPHICS
PROCESSOR
1910
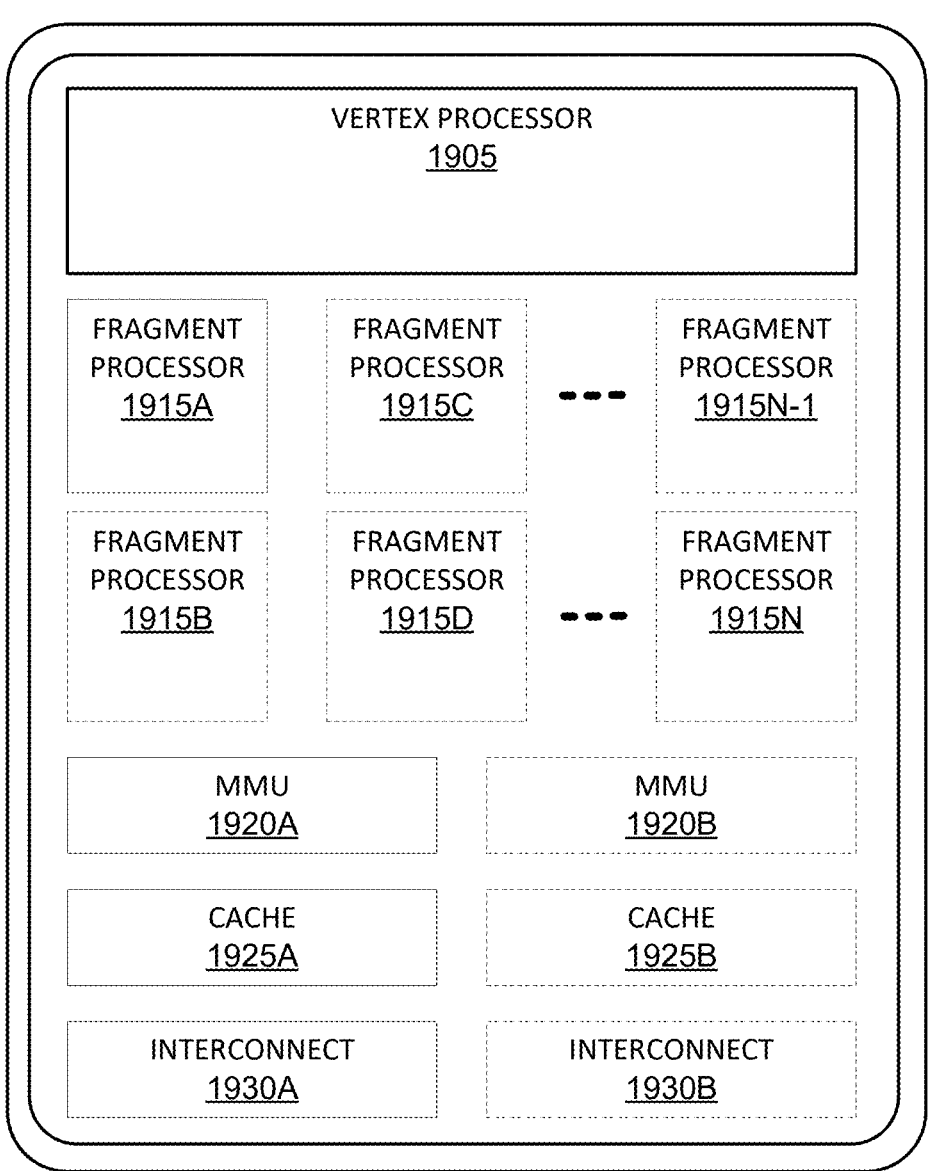
FIG. 19A

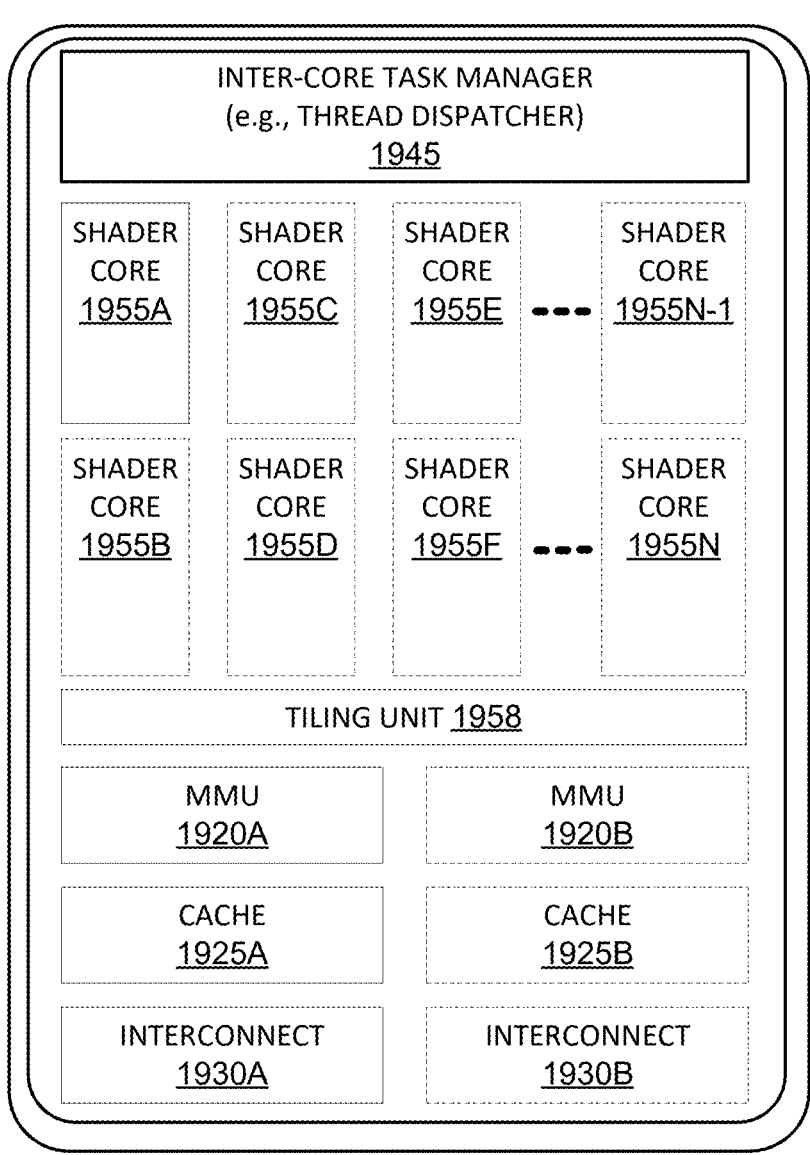
FIG. 19B

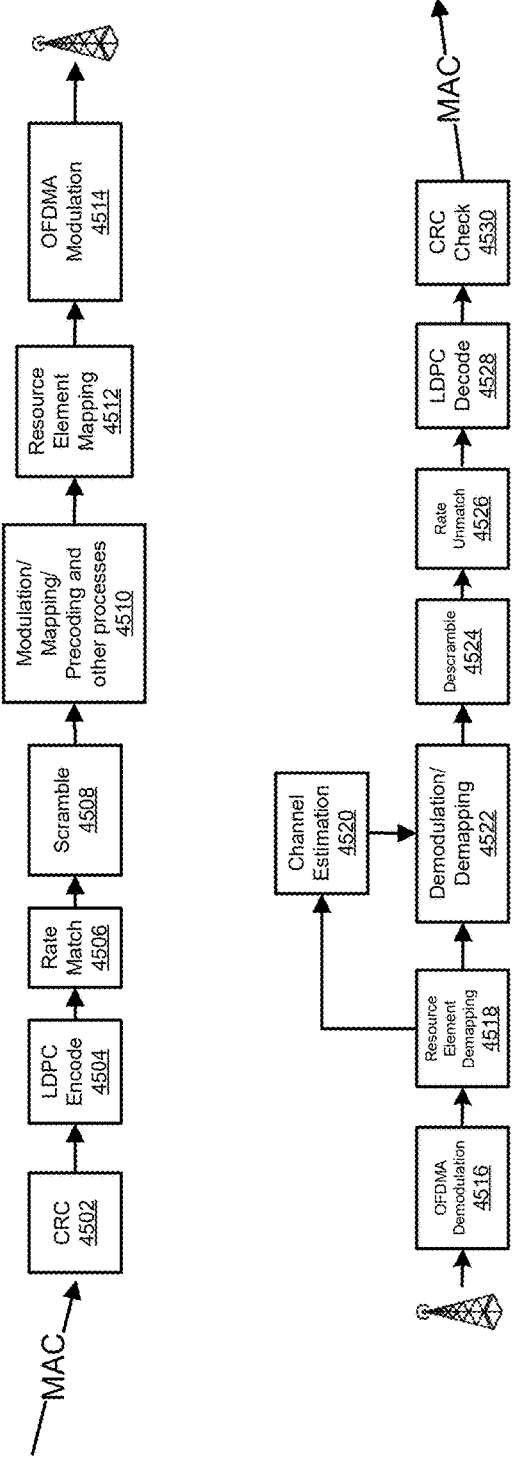
FIG. 45

4600

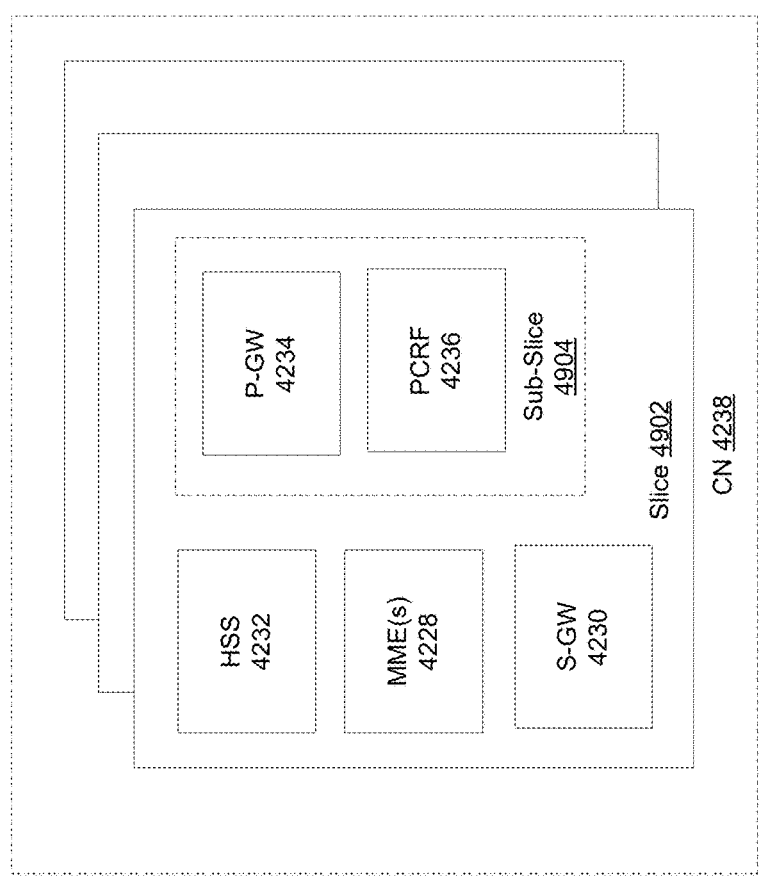
FIG. 49

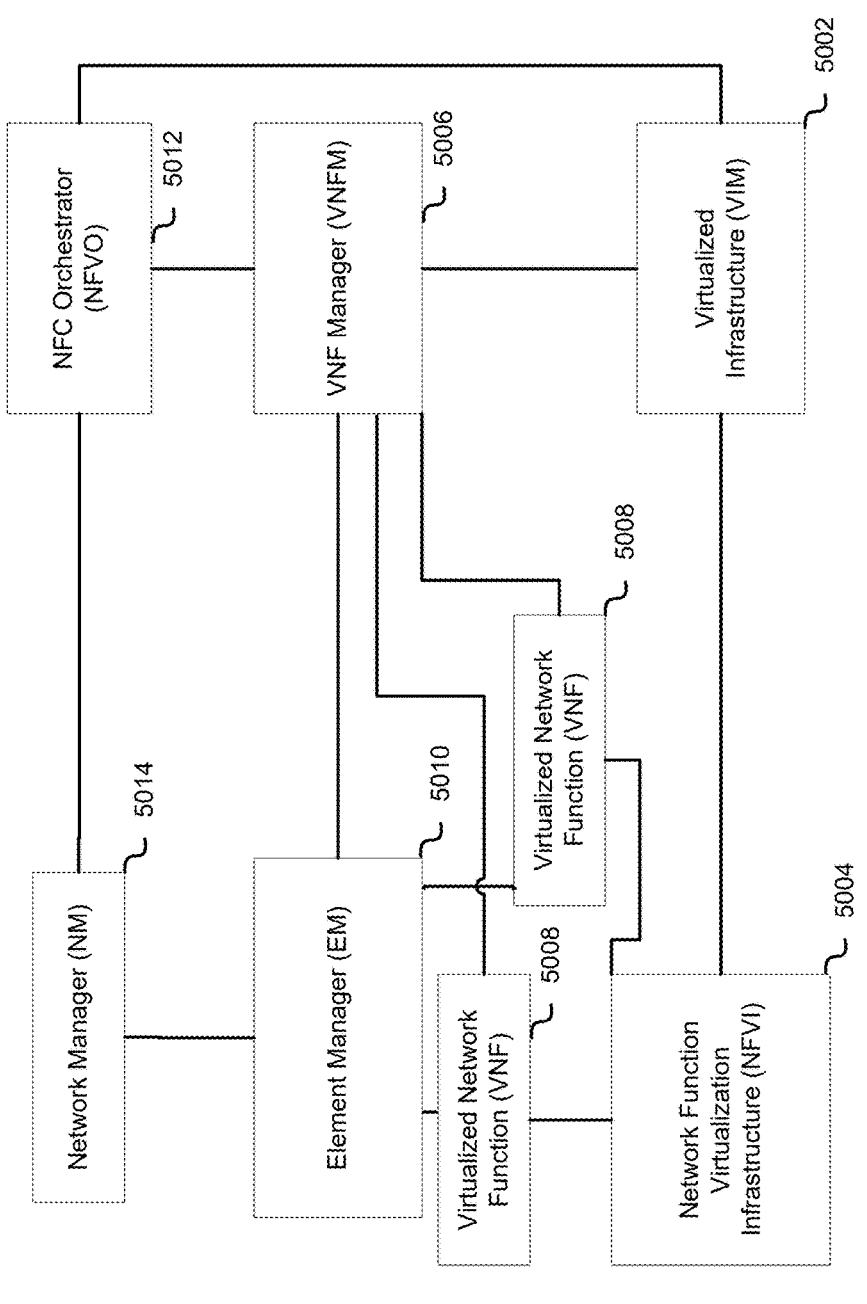
FIG. 50

TECHNIQUES TO PERFORM CHANNEL ESTIMATION

FIELD OF INVENTION

At least one embodiment pertains to processing resources used to perform channel estimation and signal detection for wireless communications signals. For example, at least one embodiment pertains to parallel processors or computing systems that use one or more neural networks to detect received signals according to various novel techniques described herein.

BACKGROUND

Processing wireless communications signals and data can use significant computing resources and time. Approaches to detecting wireless communications signals and data can be improved.

BRIEF DESCRIPTION OF THE DRAWINGS

FIG. 2 is a block diagram that illustrates a system to perform channel estimation, according to at least one embodiment;

FIG. 11 illustrates an example data center system, according to at least one embodiment;

FIG. 16 illustrates a computer system, according to at least one embodiment;

FIGS. 19A and 19B illustrate exemplary integrated circuits and associated graphics processors, according to at least one embodiment;

FIG. 24 illustrates a graphics processor, according to at least one embodiment;

FIG. 45 illustrates an example of an uplink channel, according to at least one embodiment;

FIG. 49 illustrates components of a core network, according to at least one embodiment; and FIG. 50 illustrates components of a system to support network function virtualization (NFV), according to at least one embodiment.

DETAILED DESCRIPTION

In the following description, numerous specific details are set forth to provide a more thorough understanding of at least one embodiment. However, it will be apparent to one skilled in the art that the inventive concepts may be practiced without one or more of these specific details.

Figure 1:
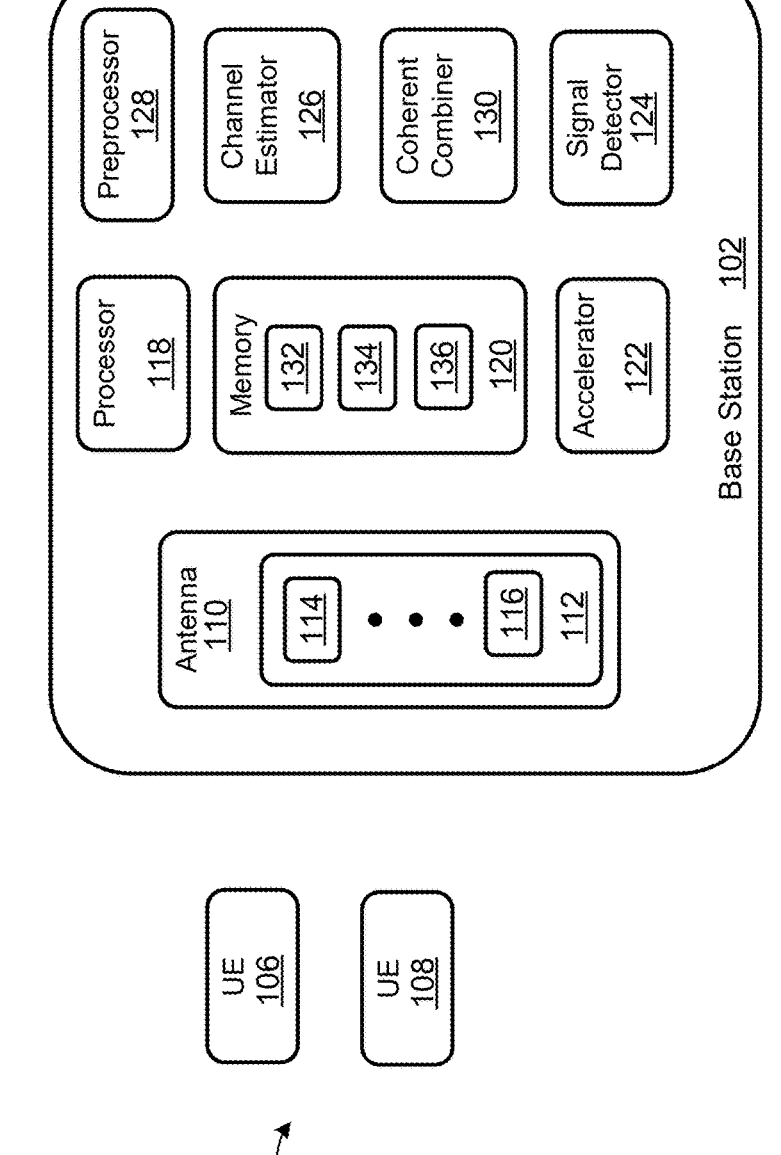
FIG. 1 is a block diagram that illustrates a system, according to at least one embodiment.

FIG. 1 is a block diagram that illustrates a system 100, according to at least one embodiment. In at least one embodiment, system 100 includes a base station 102 in wireless radio signal communication with a set of user equipment devices (UEs) 104. In at least one embodiment, base station 102 is to perform channel estimation corresponding to one or more signals received from one or more UEs without a corresponding reference signal. In at least one embodiment, base station 102 is to perform coherent signal combining corresponding to one or more signals received from one or more UEs without a corresponding reference signal. In at least one embodiment, base station 102 is to perform signal detection (e.g., determining a cyclic shift corresponding to a received signal) corresponding to one or more signals received from one or more UEs without a corresponding reference signal. In at least one embodiment, base station 102 is a Third Generation Partnership Project (3GPP) Fifth Generation (5G) New Radio (NR) gNodeB (gNB). In at least one embodiment, set of UEs 104 includes a first UE 106 and a second UE 108. In at least one embodiment, at least one component of base station 102 is included in a virtual radio access network (vRAN).

In at least one embodiment, base station 102 includes an antenna 110 to receive signals from UEs in set of UEs 104. In at least one embodiment, antenna 110 is also used to transmit signals to UEs in set of UEs 104. In at least one embodiment, antenna 110 is a multi-element antenna. In at least one embodiment, antenna 110 includes a set of antenna elements 112. In at least one embodiment, antenna elements in set of antenna elements 112 are referred to as antennas. In at least one embodiment, set of antenna elements 112 includes a first antenna 114 and a second antenna 116. In at least one embodiment, set of antenna elements 112 includes a number of antennas that is a power of two (e.g., two, four, eight, or sixteen antennas), or some other suitable number of antennas. In at least one embodiment, signals transmitted by UEs in set of UEs 104 are to be received using multiple antennas in set of antenna elements 112.

In at least one embodiment, base station 102 includes a processor 118. In at least one embodiment, base station 102 includes a memory 120. In at least one embodiment, base station 102 includes an accelerator 122. In at least one embodiment, accelerator 122 includes one or more graphics processing units (GPUs). In at least one embodiment, accelerator 122 includes one or more parallel processing devices (PPUs), application specific integrated circuits (ASICs), field programmable gate arrays (FPGAs), and/or some other suitable accelerator. In at least one embodiment, base station 102 includes a different number of processors (e.g., more than one processor 118), a different number of memories (e.g., more than one memory 120), and/or a different number of accelerators (e.g., more than one accelerator 122). In at least one embodiment, processor 118 is a central processing unit (CPU).

In at least one embodiment, base station 102 includes a signal detector 124. In at least one embodiment, signal detector 124 is to detect signals received from UEs in set of UEs 104 that do not have corresponding reference signals (e.g., that do not have corresponding demodulation reference signals (DMRS)). In at least one embodiment, reference signals are referred to as pilot signals. In at least one embodiment, performing signal detection of a signal without a corresponding reference or pilot signal is referred to as blind signal detection. In at least one embodiment, signal detector 124 is to perform signal detection of 5G NR physical uplink control channel (PUCCH) signals (e.g., PUCCH Format 0 signals). In at least one embodiment, signal detector 124 is to perform signal detection of physical random access channel (PRACH) signals.

In at least one embodiment, base station 102 includes a channel estimator 126. In at least one embodiment, channel estimator 126 is to perform channel estimation corresponding to signals received from UEs in set of UEs 104 that do not have corresponding reference signals (e.g., that do not have corresponding demodulation reference signals (DMRS)). In at least one embodiment, channel estimator 126 is to perform channel estimation corresponding to 5G NR PUCCH signals (e.g., PUCCH Format 0 signals). In at least one embodiment, channel estimator 126 is to perform channel estimation corresponding to physical random access channel (PRACH) signals. In at least one embodiment, signal detector 124 is to detect one or more signals based, at least in part, on channel estimation performed by channel estimator 126.

In at least one embodiment, 5G NR PUCCH signals are used to transport uplink control information (UCI) from user terminals (e.g., UEs in set of UEs 104) to a gNB (e.g., base station 102). In at least one embodiment, UCI includes Hybrid Automatic Repeat Request (HARQ) ACK/NACK, scheduling request (SR), and/or channel state information (CSI). In at least one embodiment, signal detector 124 is used to detect PUCCH format 0 signals, which have a length in Orthogonal Frequency Division Multiplexing (OFDM) symbols of one or two, each of which represents less than or equal to two bits. In at least one embodiment, each PUCCH format represents a combination of parameters such as time duration, frequency bandwidth, number of UCI bits, and physical signal processing steps corresponding to a PUCCH transmission. In a least one embodiment, PUCCH format 0 (PF0) is used to transport UCI with HARQ-ACK and/or SR information. In at least one embodiment, HARQ-ACK indicates if a user successfully decoded last packet(s). In at least one embodiment, SR indicates if a user has data to transmit. In at least one embodiment, UCI of PF0 can be HARQ-ACK only, SR-only, or multiplexed HARQ-ACK and SR on same resource. In at least one embodiment, UCI of PF0 includes at most 2 information bits and uses one physical resource block (PRB). In at least one embodiment, a different number of information bits and/or a different number of PRBs is used. In at least one embodiment, a PF0 transmitter (e.g., a UE in set of UEs 104) transmits a low peak-to-average-power ratio (PAPR) sequence of length twelve in each OFDM symbol (e.g., on twelve sub-carriers). In at least one embodiment, a different length and/or a different number of sub-carriers is used. In at least one embodiment, UCI information is delivered by transmitting different sequences (e.g., with different cyclic shifts). In at least one embodiment, when multiple PUCCHs are multiplexed on same resource, each PUCCH is assigned to a different initial cyclic shift value. In at least one embodiment, a receiver (e.g., a gNB such as base station 102) detects transmitted UCI information, and detects a discontinuous transmission (DTX) status of each PUCCH.

In at least one embodiment, base station 102 includes a preprocessor 128. In at least one embodiment preprocessor 128 is to perform preprocessing to generate one or more values to be used by one or more of channel estimator 126 and/or signal detector 124. In at least one embodiment, preprocessing includes one or more of dividing by a base sequence or rotating a sequence (e.g., as described with respect to preprocessor 216 of FIG. 2). In at least one embodiment, preprocessing includes one or more of identifying a set of sequences, performing a correlation, performing a summation, or performing an inner product calculation (e.g., as described with respect to one or more of preprocessing 502 of FIG. 5 and/or preprocessing 702 of FIG. 7). In at least one embodiment, preprocessing includes some other suitable preprocessing operation and/or technique.

In at least one embodiment, base station 102 includes a coherent combiner 130. In at least one embodiment, coherent combiner 130 is to coherently combine signals received across antennas in set of antenna elements 112. In at least one embodiment, coherent combiner 130 is to perform coherent combination of signals based, at least in part, on one or more channel estimates generated by channel estimator 126. In at least one embodiment, signal detector 124 is to perform signal detection based, at least in part, on coherently combined signals from coherent combiner 130.

In at least one embodiment, one or more of signal detector 124, channel estimator 126, preprocessor 128, and/or coherent combiner 130 includes logic (e.g., any combination of software logic, hardware logic, and/or firmware logic) to provide functionality or operations described herein, where logic may be collectively or individually embodied as circuitry that forms part of a larger system, for example, an integrated circuit (IC), system-on-chip (SoC), or one or more processors (e.g., CPU, GPU). In at least one embodiment, one or more aspects of logic is a set of instructions and/or computer program that runs on, is performed by, and/or is executed by a processor (e.g., one or more CPUs and/or GPUs). In at least one embodiment, instructions are stored in memory 120, which if performed by processor 118 and/or accelerator 122, are to cause processor 118 and/or accelerator 122 to perform one or more aspects of signal detector 124, channel estimator 126, preprocessor 128, and/or coherent combiner 130. In at least one embodiment, one or more circuits of a processor (e.g., processor 118 and/or accelerator 122) running one or more aspects of signal detector 124, channel estimator 126, preprocessor 128, and/or coherent combiner 130 perform one or more aspects of base station 102. In at least one embodiment, processor 118 and/or accelerator 122 perform one or more aspects of object signal detector 124, channel estimator 126, preprocessor 128, and/or coherent combiner 130, at least in part, by performing a set of instructions (e.g., from a non-transitory machine-readable medium). In at least one embodiment, performing a set of instructions includes executing set of instructions.

In at least one embodiment, there are up to twelve possible sequences in each PF0 transmission. In at least one embodiment, base station 102 includes a representation and/or indication of these possible sequences (e.g., in memory 120). In a least one embodiment, base station 102 is to estimate a channel using each possible sequence (e.g., using channel estimator 126) and is to perform coherent combining with estimated channels (e.g., using coherent combiner 130). In at least one embodiment, all data points in PF0 signals are from a unit circle and have a magnitude of one. In at least one embodiment, these data points take a form of $e^{j\theta}$ and a difference between data points is only in phase (e.g., 0), which can be compensated by linear rotation. In at least one embodiment, this linear rotation is used to facilitate channel estimation. In at least one embodiment, in PF0 detection, base station 102 only detects DTX or cyclic shift (e.g. m_cs) value instead of decoding all transmitted symbols.

In at least one embodiment, one or more base sequences 132 are to be stored in memory 120 In at least one embodiment one or more base sequences 132 are stored in relation to UEs in set of UEs 104, such that base station 102 is to use a base sequence associated with a particular UE when performing preprocessing, channel estimation, coherent combination, and/or signal detection of signals that do not have an associated reference signal. In at least one embodiment, one or more sets of cyclic shifts 134 are to be stored in memory 120. In at least one embodiment, cyclic shifts in set of cyclic shifts 134 are stored in relation to particular types of signals to which they can be applied (e.g., PF0, PRACH, and/or other suitable signal types). In at least one embodiment, base station 102 is to use sets of cyclic shifts from one or more sets of cyclic shifts 134 when performing preprocessing, channel estimation, coherent combination, and/or signal detection of particular signal types that do not have an associated reference signal. In at least one embodiment, one or more mappings 136 of cyclic shifts to signal information are to be stored in memory 120. In at least one embodiment, mappings in one or more mappings 136 include one or more cyclic shift to UCI mappings. In at least one embodiment, base station 102 is to identify UCI based, at least in part, on mapping a cyclic shift identified by signal detector 124 to UCI using a mapping of one or mappings 136. In at least one embodiment, base station 102 is to identify an appropriate mapping from one or more mappings 136 to use based, at least in part, on higher-level signal information (e.g., signal information that indicates a type of information and/or a number of bits represented by a signal). In at least one embodiment, mappings of one or more mappings 136 are stored in a look-up table, a set of key-value pairs, a hash relationship, and/or any other suitable data structure. In at least one embodiment, mappings of one or more mappings 136 are one-to-one relationships. In at least one embodiment, mappings of one or more mappings 136 are referred to in some other suitable manner (e.g., UCI associated with cyclic shift values, UCI associated with signal characteristics, and/or some other suitable manner).

Figure 6:
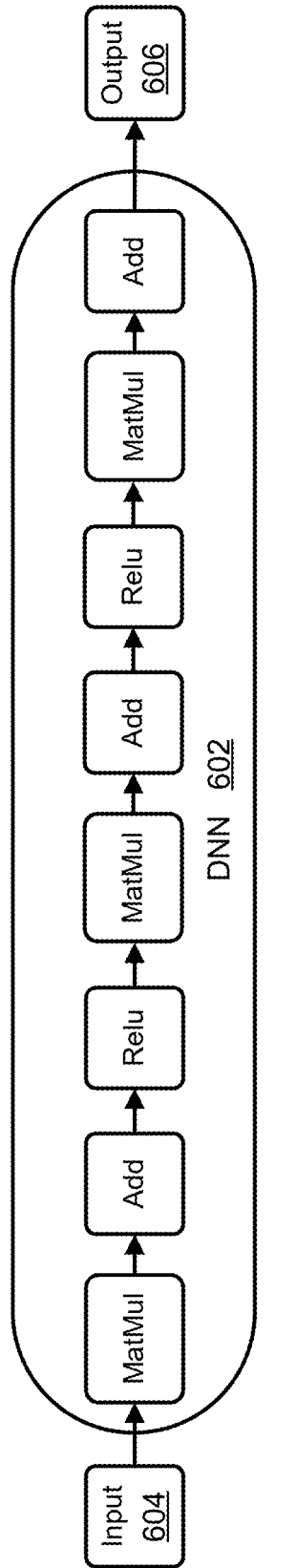
FIG. 6 is a block diagram that illustrates a deep neural network operation, according to at least one embodiment.
Figure 8:
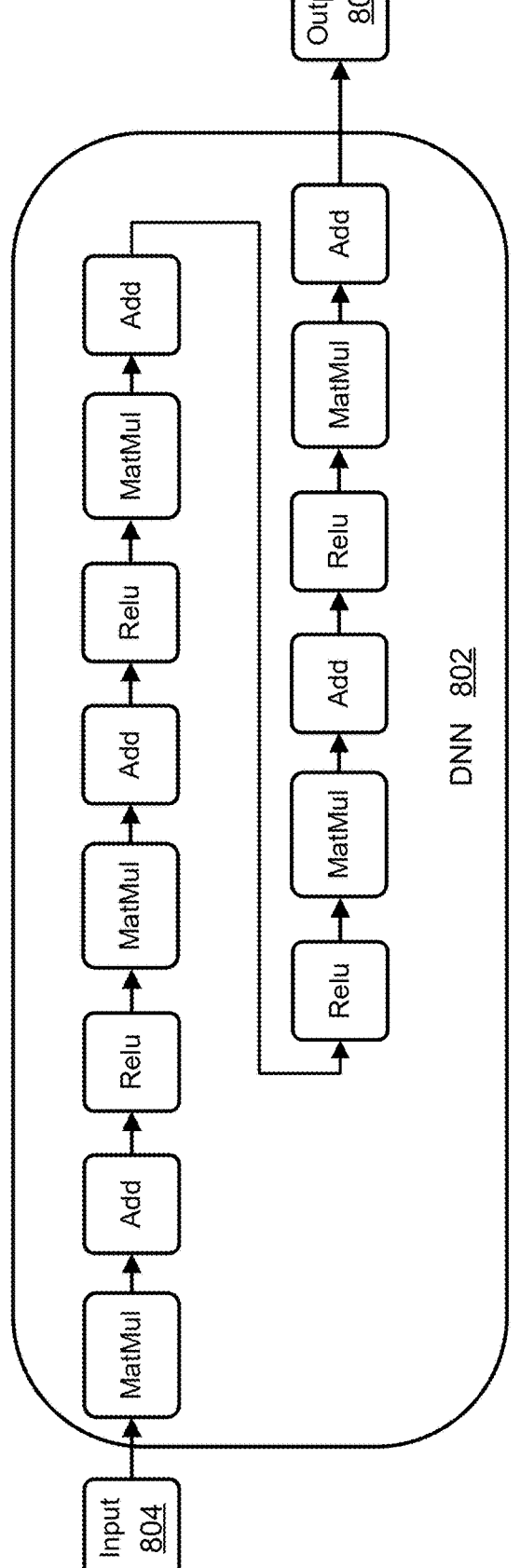
FIG. 8 is a block diagram that illustrates a deep neural network operation, according to at least one embodiment.

In at least one embodiment, signal detector 124 is to use one or more neural networks (e.g., DNN 602 of FIG. 6 or DNN 802 of FIG. 8). In at least one embodiment, signal detector 124 is to use one or more neural networks based, at least in part, on one or more values generated by preprocessor 128 without channel estimation (e.g., by channel estimator 126) or coherent combining (e.g., by coherent combiner 130). In at last one embodiment, signal detector 124 is to use one or more neural networks based, at least in part, on one or more values generated by preprocessor 128 after one or more or channel estimation (e.g., by channel estimator 126) and/or coherent combining (e.g., by coherent combiner 130). In at least one embodiment, signal detector 124 is to use a technique not based on one or more neural networks (e.g., using a threshold-based approach) based, at least in part, on preprocessing (e.g., by preprocessor 128), channel estimation (e.g., by channel estimator 126), and coherent combining (e.g., by coherent combiner 130).

In at least one embodiment, a signal received without a corresponding reference signal (e.g., from a UE in set of UEs 104) is a type of signal that has a different number of possibilities than twelve (e.g., less than twelve or more than twelve possible cyclic shifts of a base sequence). In at least one embodiment, although signal has a first number of possible sequences (e.g., a first set of N cyclic shifts that can be applied to a base sequence), base station 102 is to use signal information (e.g., higher level information that indicates a number of bits carried by signal and/or a type of information carried by signal) to use a second set of M cyclic shifts based on higher level information, where M is a subset of N. In at least one embodiment, for example, N corresponds to set of twelve m_cs values that can be applied, but higher level information indicates that only eight, or alternatively a different number such as four, of those twelve m_cs values are possibilities corresponding to a particular signal (e.g., M is a set of cyclic shifts corresponding to those eight possibilities). In at least one embodiment, where M is less than N, base station 102 is to use set of M cyclic shifts rather than N cyclic shifts. In at least one embodiment, where M is less than N, base station 102 is to use set of N cyclic shifts, even though N includes cyclic shifts that will not be used. In at least one embodiment, where M is less than N, wase station 102 is to use all of M cyclic shifts, and a subset of cyclic shifts present in N, but not in M.

FIG. 2 is a block diagram that illustrates a system 200 to perform channel estimation, according to at least one embodiment. In at least one embodiment system 200 includes a channel estimator 202 that is to perform channel estimation corresponding to one or more received signals 204. In at least one embodiment, channel estimator 202 is, includes, or is a part of, channel estimator 126 of FIG. 1. In at least one embodiment, one or more received signals 204 include one or more received PUCCH format 0 transmissions 206, shown in relation to a resource grid 208. In at least one embodiment, PUCCH format 0 transmissions 206 each include a set of symbols 210, shown as a first symbol 212 and a second symbol 214. In at least one embodiment, set of symbols 210 includes one or two symbols (e.g., some transmissions include first symbol 212 but not second symbol 214). In at least one embodiment symbols in set of symbols 210 include one physical resource block (PRB) that uses twelve sub-carriers.

In at least one embodiment, one or more received signals 204 include a received (Rx) signal on a sub-carrier n and Orthogonal Frequency Division Multiplexing (OFDM) symbol l, represented by:

$$y_l(n) = H \cdot r_{u,v}^{\alpha_{l},0}(n) + z,$$

$$r_{u,v}^{\alpha_{l},0}(n) = e^{j\alpha_l n} \cdot \bar{r}_{u,v}(n),$$

where $n = 0, \ldots, 11$ is an index of sub-carrier. In at least one embodiment, PUCCH format 0 occupies a single PRB. In at least one embodiment, $l = 0, 1$ is an index of OFDM symbol. In at least one embodiment, PUCCH format 0 can have one or two symbols. In at least one embodiment, an Rx signal $y_i(n)$ is of size $N_r \times 1$, where $N_r$ is a number of Rx antennas (e.g., number of antennas in set of antenna elements 112 of FIG. 1). In at least one embodiment, $\bar{r}_{u,v}(n)$, $n = 0, \ldots, 11$ is a base sequence. In at least one embodiment, a base station (e.g., base station 102 of FIG. 1, such as a gNB) stores a representation of base sequence in association with an identifier of UEs (e.g., as a part of stored one or more base sequences 132 of FIG. 1), so base station can use correct base sequence of Rx signals from different UEs. In at least one embodiment, $\alpha_l$ is a cyclic shift applied by a transmitting UE to base sequence on OFDM symbol l. In at least one embodiment, H is a channel vector of size $N_r \times 1$. In at least one embodiment, H does not vary significantly across sub-carriers and symbols, and is not defined with indices n, l. In at least one embodiment, z is a vector of additive white Gaussian noise (AWGN) of size $N_r \times 1$. In at least one embodiment first symbol 212 includes a sequence $$r_{(u,v)}^{(\alpha_0,0)}$$

and second symbol 214 includes a sequence $$r_{(u,v)}^{(\alpha_0,0)}.$$

In at least one embodiment, a preprocessor 216 is to preprocess one or more received signals 204. In at least one embodiment, preprocessor 216 is, includes, or is a part of preprocessor 128 of FIG. 1. In at least one embodiment, received signals 204 are received from UE devices in set of UEs 104 of FIG. 1 using antenna 110. In at least one embodiment, processor 118 and/or accelerator 122 of FIG. 1 are to perform one or more aspects of preprocessor 216 and/or channel estimator 202. In at least one embodiment, preprocessor 216 is to divide a received signal by a base sequence, shown at a block 218, and is to perform a rotation, shown at a block 220. In at least one embodiment, dividing a received signal by a base sequence at block 218 is represented by:

$$y_l(n) = H \cdot r_{u,v}^{\alpha_{l},0}(n) + z = H \cdot e^{j\alpha_l n} \cdot \bar{r}_{u,v}(n) + z,$$

$$y_l(n) \cdot \bar{r}_{u,v}^*(n) = H \cdot e^{j\alpha_l n} + z \cdot \bar{r}_{u,v}^*(n), \text{ where } \bar{r}_{u,v}(n) \cdot \bar{r}_{u,v}^*(n) = 1.$$

In at least one embodiment, performing a rotation at block 220 includes rotating output of block 218 to a particular cyclic shift value (e.g., m_cs=0).

In at least one embodiment, performing a rotation at block 220 is represented by:

$$y_l(n) \cdot \bar{r}_{u,v}^*(n) \cdot e^{-j\beta_l(i)n} \cdot e^{j\beta_l(0)n} = H \cdot e^{j\alpha_l n} \cdot e^{-j\beta_l(i)n} \cdot e^{j\beta_l(0)n} + \tilde{z},$$

where $\tilde{z} = z \cdot \bar{r}_{u,v}^*(n) \cdot e^{-j\beta_l(i)n} \cdot e^{j\beta_l(0)n}$ (still being AWGN noise), $\beta_0(0)$, $\beta_1(0)$ are cyclic shifts corresponding to $m_{cs}$=0. In at least one embodiment, if $m_{cs}$=i is ground-truth, then $\beta_l(i)$=$\alpha_l$ and $H \cdot e^{j\alpha_l n} \cdot e^{-j\beta_l(i)n} \cdot e^{j\beta_l(0)n} + \tilde{z} = H \cdot e^{j\beta_l(0)n} + \tilde{z}$. In at least one embodiment, channel estimator 202 is to perform channel estimation based, at least in part, on one or more values generated by performing a rotation at block 220.

In at least one embodiment, one or more components of base station 102 of FIG. 1 are to perform channel estimation and coherent detection corresponding to 5G NR PUCCH Format 0 (PF0) transmission. In at least one embodiment, detecting UI transmitted from UEs based, at least in part, on channel estimation and coherent detection provides advantages over legacy approaches that use noncoherent detection by providing more accurate detection results and more robust detection in some wireless transmission environments, which enables a more efficient use of wireless spectrum. In at least one embodiment, noncoherent detection means that no channel knowledge is involved. In at least one embodiment, in PF0, a low PAPR sequence is transmitted by UEs, which is defined by a base sequence and a cyclic shift. In at least one embodiment, with respect to PF0, there are 30 possible base sequences in total and 12 possible cyclic shift values. In at least one embodiment, base sequence of a PF0 transmission is selected based, at least in part, on system parameters such as cell ID or hopping ID and a time slot index, which is known (e.g., stored in association with an identifier of transmitting UE) to gNB. In at least one embodiment, cyclic shift value is a function of a parameter m_cs (0, 1, . . . , 11), where value of m_cs depends on UCI information transported by PF0 transmission. In at least one embodiment, a mapping from UCI to m_cs is a one-to-one mapping and vice-versa. In at least one embodiment, if a PF0 transmission transports a single HARQ bit without SR, then m_cs is 0 and 6 when HARQ bit is 0 and 1, respectively. In at least one embodiment, if a PF0 multiplexes a single HARQ bit with positive SR, then m_cs is 3 and 9 when HARQ bit is 0 and 1, respectively. In at least one embodiment, a UE may be in a status of DTX, meaning that no PUCCH signal is transmitted. In at least one embodiment, gNB (e.g., one or more components of base station 102 of FIG. 1) is to first identify whether UE is in DTX before extracting transmitted UCI. In at least one embodiment, if UE is not in DTX, one or more components of base station 102 of FIG. 1 are to extract UCI from PF0 signal. In at least one embodiment, extract UCI means determine a cyclic shift value (e.g., m_cs value) that has been applied to a known base sequence.

In at least one embodiment, coherent detection of PF0 transmissions is to use channel coefficients estimated by channel estimator 126 of FIG. 1 and/or channel estimator 202. In at least one embodiment, signal detection of PF0 transmissions is to use properties of PF0 signals where structure of PF0 is that it has 12 possible sequences (e.g., 12 possible m_cs values), and all possible sequences are known (e.g., stored in memory such as memory 120 of FIG. 1) to gNB. In at least one embodiment, channel estimation is to be performed assuming a specific m_cs (e.g., one specific possible sequence), and perform coherent detection with estimated channel coefficients. In at least one embodiment, channel estimation using one specific m_cs favors a detection probability of that m_cs. In at least one embodiment, signal detection is based, at least in part, on a best-case of all possible m_cs values to perform PF0 detection.

In at least one embodiment, channel estimation and coherent combining are to be performed with respect to each m_cs. In at least one embodiment, a channel estimator (e.g., channel estimator 126 of FIG. 1 and/or channel estimator 202) estimates channel coefficients using an assumption that sequence with a m_cs is input signal. In at least one embodiment, channel estimation is to be performed based, at least in part, on one or more of a least square (LS), minimum mean square error (MMSE), and/or DNN-based technique. In at least one embodiment, channel estimation is to be performed using some other suitable technique. In at least one embodiment, received signals are to be coherently combined across antennas to generate a combined signal. In at least one embodiment, coherent combination is to use one or more of maximum ratio combining (MRC), zero-forcing (ZF), MMSE detection, and/or some other suitable coherent combination technique. In at least one embodiment, with 12 possible m_cs values, this results in 12 combined signals. In at least one embodiment, a detection algorithm is to take coherently combined signals as input, and is to output a vector of detection results of either DTX or a detected m_cs if not in DTX. In at least one embodiment, detection results (e.g., m_cs values) are to be translated to UCI from a one-to-one mapping. In at least one embodiment, detection algorithm is DNN-based. In at least one embodiment, detection algorithm is threshold-based. In at least one embodiment, detection algorithm is to use some other suitable technique that takes coherently combined signals as input. In at least one embodiment, PF0 detection of a particular signal is complete after translation to UCI or determination UE is in DTX status.

In at least one embodiment, one or more components of a base station (e.g., base station 102 of FIG. 1) are to decode a wireless signal (e.g., a PF0 transmission or PRACH transmission) by performing channel estimation of a received signal based on every possible value signal can encode. In at least one embodiment, there is a finite and manageable number of possible signals that can be transmitted (e.g., in 5G NR, there are 12 possible values of PUCCH format 0 signals). In at least one embodiment, performing channel estimation using each possible signal can be parallelized so that it can be performed quickly. In at least one embodiment, performing channel estimation enables coherent detection to be performed, which provides more robust and accurate detection results than some legacy techniques that do not perform channel estimation or coherent detection.

In at least one embodiment, performing coherent detection (e.g., based on using coherently combined signals using signal detector 124 of FIG. 1) provides better performance than some legacy noncoherent approaches. In at least one embodiment, performing coherent detection is to use additional and available information to improve system performance (e.g., in channel estimation) in comparison to legacy noncoherent approaches that do not. In at least one embodiment, performing coherent detection provides better performance than some legacy noncoherent detection approaches because coherent detection can increase signal-to-noise ratio (SNR) by aligning intended signals and suppressing noise. In at least one embodiment, although coherent detection has a higher complexity than some legacy noncoherent approaches, operations of technique can be parallelized (e.g., using a GPU, FPGA, and/or some other suitable accelerator) such that additional complexity is acceptable with respect to operating performance (e.g., processing time, throughput, latency, or some other suitable performance metric).

In at least one embodiment, a processor (e.g., processor 118 and/or accelerator 122 of FIG. 1) includes one or more circuits to perform channel estimation corresponding to one or more wireless signals without using a reference signal. In at least one embodiment, one or more circuits are to perform channel estimation without reference signal based, at least in part, on multiple different possibilities of information encoded by one or more wireless signals. In at least one embodiment, one or more circuits are to perform coherent combination corresponding to a first wireless signal of one or more wireless signals received by multiple antennas based, at least in part, on channel estimation. In at least one embodiment, one or more circuits are to perform coherent combination corresponding to a first wireless signal of one or more wireless signals received by multiple antennas based, at least in part, on channel estimation, and one or more circuits are to identify a cyclic shift based, at least in part, on coherent combination. In at least one embodiment one or more circuits are to perform channel estimation based, at least in part, on one or more neural networks. In at least one embodiment, one or more circuits are to identify a cyclic shift value of a received first wireless signal of one or more wireless signals transmitted by a user equipment device based, at least in part, on a base sequence corresponding to user equipment device. In at least one embodiment, one or more circuits are to perform coherent combination corresponding to a first wireless signal received by multiple antennas based, at least in part, on channel estimation, are to identify a cyclic shift of a base sequence based, at least in part, on coherent combination, and are to identify one or more values based, at least in part, on cyclic shift. In at least one embodiment, one or more circuits are to identify information corresponding to a PUCCH format zero signal or a PRACH signal received from a UE device based, at least in part, on channel estimation.

In at least one embodiment, a system includes one or more processors (e.g., processor 118 and/or accelerator 122 of FIG. 1) to perform channel estimation corresponding to one or more wireless signals without using a reference signal to generate one or more estimated channel value, and one or more memories (e.g., memory 120 of FIG. 1) to store one or more estimated channel values (e.g., coefficients). In at least one embodiment, one or more processors are to perform channel estimation without using reference signal based, at least in part, on multiple different possibilities of information encoded by one or more wireless signals. In at least one embodiment, one or more processors are to perform coherent combination corresponding to a first wireless signal of one or more wireless signals received by multiple antennas based, at least in part, on channel estimation. In at least one embodiment, one or more processors are to perform channel estimation based, at least in part, on one or more neural networks. In at least one embodiment, one or more processors are to identify a cyclic shift value of a received first wireless signal of one or more wireless signals based, at least in part, on a base sequence and channel estimation. In at least one embodiment, one or more processors are to perform coherent combination corresponding to a first wireless signal of one or more wireless signals received by multiple antennas based, at least in part, on channel estimation and one or more of maximum ratio combining, zero-forcing, and minimum mean square error detection. In at least one embodiment, one or more processors are to identify uplink control information corresponding to a received first wireless signal of one or more wireless signals transmitted by a UE device based, at least in part, on channel estimation.

In at least one embodiment, a machine-readable medium (e.g., a non-transitory computer-readable medium) includes instructions stored thereon, which if performed by one or more processors (e.g., processor 118 and/or accelerator 122 of FIG. 1) cause one or more processors to at least perform channel estimation corresponding to one or more wireless signals without using a reference signal. In at least one embodiment, instructions, which if performed by one or more processors, cause one or more processors to perform channel estimation without reference signal based, at least in part, on multiple different possibilities of information encoded by one or more wireless signals. In at least one embodiment, instructions, which if performed by one or more processors, cause one or more processors to perform coherent combination corresponding to a first wireless signal of one or more wireless signals received by multiple antennas based, at least in part, on channel estimation. In at least one embodiment, instructions, which if performed by one or more processors, cause one or more processors to perform channel estimation based, at least in part, on one or more of performing one or more least square (LS) calculations and performing one or more minimum mean square error calculations (MMSE). In at least one embodiment, instructions, which if performed by one or more processors, cause one or more processors to identify a cyclic shift value of a received wireless first signal of one or more wireless signals based, at least in part, on channel estimation. In at least one embodiment, instructions, which if performed by one or more processors, cause one or more processors to perform coherent combination based, at least in part, on channel estimation, identify a cyclic shift value based, at least in part, on coherent combination, and identify one or more uplink control information (UCI) values based, at least in part, on cyclic shift value. In at least one embodiment, instructions, which if performed by one or more processors, cause one or more processors to identify one or more information values corresponding to a received first wireless signal of one or more wireless signals transmitted by a UE device based, at least in part, on channel estimation and an information type value.

In at least one embodiment, a wireless ratio network base station (e.g., base station 102 of FIG. 1) includes one or more circuits (e.g., of processor 118 and/or accelerator 122 of FIG. 1) to perform channel estimation corresponding to one or more wireless signals received from one or more UE devices without using a reference signal. In at least one embodiment, wireless radio network base station is a gNodeB. In at least one embodiment, one or more circuits are part of one or more GPUs, one or more ASICs, and/or one or more FPGAs. In at least one embodiment, one or more circuits are to perform channel estimation without reference signal based, at least in part, on multiple different possibilities of information encoded by one or more wireless signals. In at least one embodiment, one or more circuits are to perform coherent combination corresponding to a first wireless signal of one or more wireless signals received by multiple antennas based, at least in part, on channel estimation. In at least one embodiment, one or more circuits are to perform coherent combination based, at least in part, on channel estimation, identify a cyclic shift value based, at least in part, on coherent combination, and identify one or more 5G NR uplink control information values based, at least in part, on cyclic shift value. In at least one embodiment, one or more circuits are to perform channel estimation based, at least in part, on a base sequence and a plurality of possible cyclic shift values.

Figure 3:
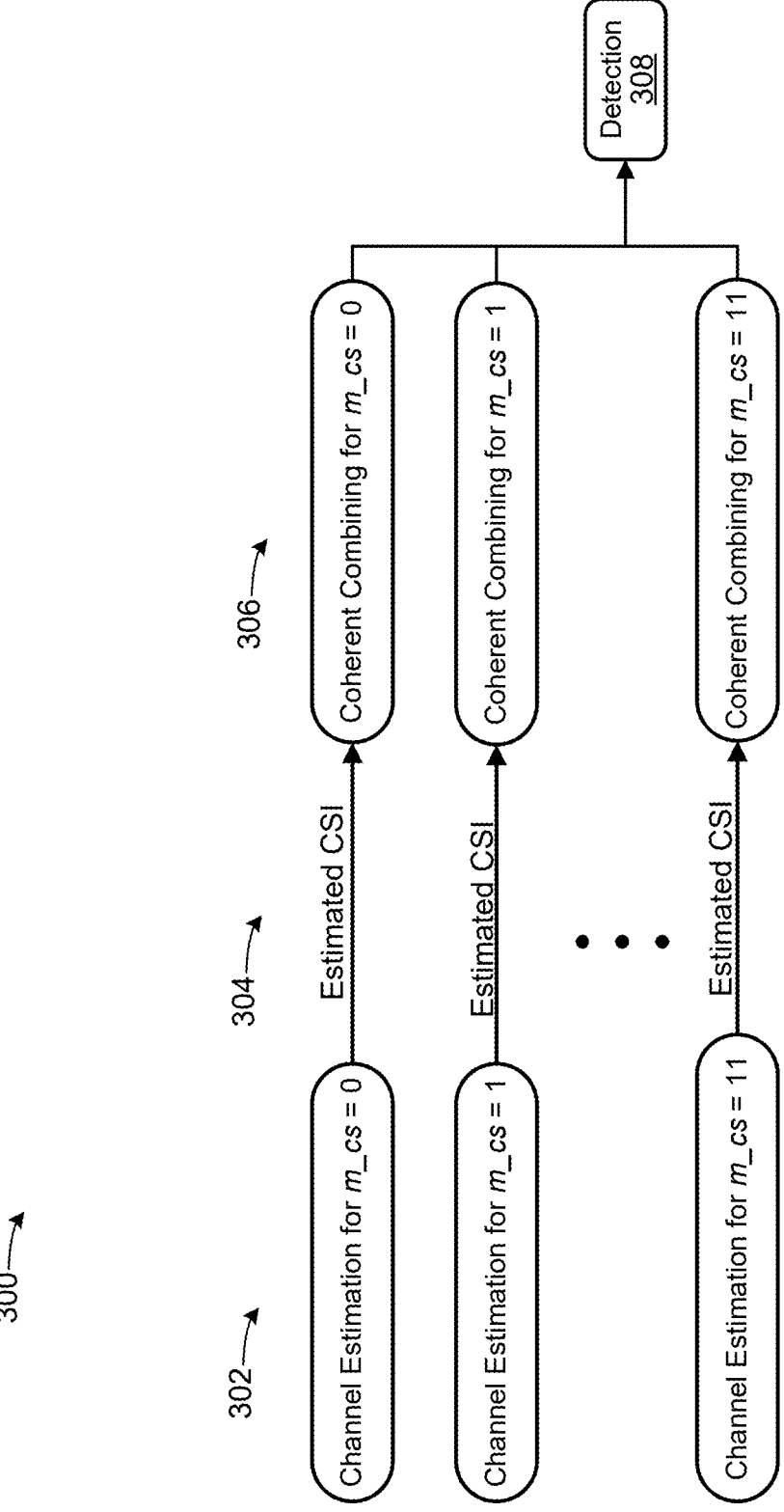
FIG. 3 is a block diagram that illustrates coherent signal detection, according to at least one embodiment.

FIG. 3 is a block diagram that illustrates coherent signal detection 300, according to at least one embodiment. In at least one embodiment, coherent signal detection 300 includes channel estimation 302. In at least one embodiment, channel estimation 302 is to be performed based, at least in part, on multiple cyclic shift values (e.g., twelve m_cs values indexed 0 to 11). In at least one embodiment, a different number of cyclic shift values are to be used, corresponding to a number of possible cyclic shift values of a received signal and/or higher level information that indicates a type of information and/or number of bits carried by received signal. In at least one embodiment, channel estimator 126 of FIG. 1 and/or channel estimator 202 of FIG. 2 are to perform channel estimation 302. In at least one embodiment, with respect to each cyclic value, channel estimation is to be performed using multiple signals from multiple antennas (e.g., a particular PF0 signal received on multiple antennas in set of antenna elements 112, where multiple signals refers to set of signals from multiple antennas corresponding to particular received PF0 signal) such as by using multiple layers. In at least one embodiment, channel estimation 302 generates estimated channel state information (CSI) 304. In at least one embodiment, channel estimation 302 is to be performed based, at least in part, on one or more of a least square (LS), minimum mean square error (MMSE), and/or DNN-based technique. In at least one embodiment, channel estimation 302 is to be performed using some other suitable technique. In at least one embodiment, in relation to a specific m_cs, input sequence is fixed, which serves in effect in place of a reference signal, though no actual reference signal (e.g., DMRS) is used. In at least one embodiment, channel estimation 302 is DNN-based, and uses one DNN. In at least one embodiment, DNN-based channel estimation includes preprocessing (e.g., division by base sequence and rotation to be performed by preprocessor 216 of FIG. 2).

In at least one embodiment, coherent signal detection 300 includes coherent combining 306. In at least one embodiment, coherent combiner 130 of FIG. 1 is to perform coherent combining 306. In at least one embodiment, coherent combining 306 is based, at least in part, on estimated CSI 304. In at least one embodiment, channel estimation 302 and coherent combining 306 are to be performed for each m_cs. In at least one embodiment coherent combining 306 uses one or more of MMSE detection, maximum ratio combining (MRC), and/or some other suitable technique. In at least one embodiment, channel estimation 302 is to be performed in parallel for multiple m_cs values (e.g., using accelerator 122 of FIG. 1). In at least one embodiment coherent combining 306 is to be performed in parallel for multiple m_cs values.

In at least one embodiment, coherent signal detection 300 includes detection 308. In at least one embodiment, signal detector 124 of FIG. 1 is to perform detection 308. In at least one embodiment, detection 308 is based, at least in part, on one or more output values of coherent combining 306. In at least one embodiment, detection 308 is to use a detection algorithm (e.g., a DNN or threshold-based algorithm). In at least one embodiment, detection algorithm is to use coherently combined signals as input and generate detection results (e.g., DTX or m_cs as output. In at least one embodiment, detection algorithm can be but is not limited to a DNN or threshold-based algorithm. In at least one embodiment, channel estimation 302 and coherent combining 306 regarding a specific m_cs favors a detection of that m_cs, such that coherent signal detection 300 derives a best case for all m_cs values, and then performs detection 308.

Figure 4:
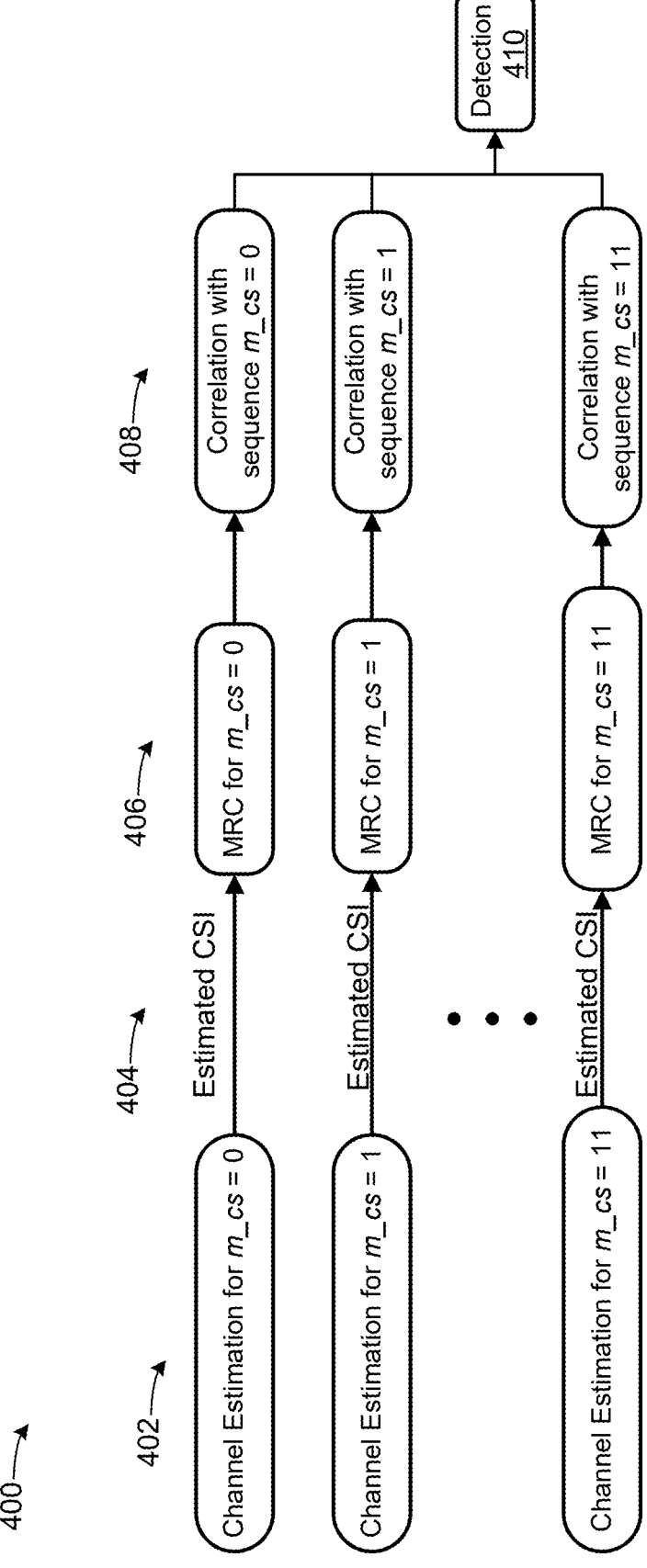
FIG. 4 is a block diagram that illustrates signal detection using maximum ratio combining, according to at least one embodiment.

FIG. 4 is a block diagram that illustrates signal detection 400 using maximum ratio combining (MRC), according to at least one embodiment. In at least one embodiment, signal detection 400 includes channel estimation 402. In at least one embodiment, channel estimator 126 of FIG. 1 and/or channel estimator 202 of FIG. 2 is to perform channel estimation 402. In at least one embodiment, channel estimation 402 is to be performed for multiple cyclic shift values (e.g., twelve m_cs values indexed 0 to 11). In at least one embodiment, a different number of cyclic shift values are to be used, corresponding to a number of possible cyclic shift values of a received signal and/or higher level information that indicates a type of information and/or number of bits carried by received signal. In at least one embodiment, for each cyclic value, channel estimation is to be performed for multiple signals from multiple antennas (e.g., antennas in set of antenna elements 112) such as by using multiple layers. In at least one embodiment, channel estimation 402 generates estimated channel state information (CSI) 404. In at least one embodiment, channel estimation 402 is MMSE or DNN-based. In at least one embodiment DNN-based channel estimation includes preprocessing (e.g., dividing by base sequence and rotating to m_cs=0, to be performed by preprocessor 216 of FIG. 2). In at least one embodiment, with respect to channel estimation 402 where an i-th channel estimation branch, i=0, . . . , 11, a gNB (e.g., base station 102 of FIG. 1) is to perform one or more operations using an assumption that cyclic shifts $\beta_0(i)$, $\beta_1(i)$ corresponding to $m_{cs}=i$ were applied by transmitting UE (e.g., to one or two PUCCH format 0 symbols). In at least one embodiment, DNN-based channel estimation at channel estimation 402 is to use a DNN that is to use a set of inputs represented as:

$$H + \hat{z}(n = 0)$$

$$H \cdot e^{j\alpha_l} \cdot e^{-j\beta_l(0)} \cdot e^{j\beta_l(0)} + \hat{z}(n = 1)$$

$$\cdots$$

$$H \cdot e^{j\alpha_l n} \cdot e^{-j\beta_l(i)n} \cdot e^{j\beta_l(0)n} + \hat{z}(n)$$

$$\cdots$$

$$H \cdot e^{j11\alpha_l} \cdot e^{-j11\beta_l(0)} \cdot e^{j11\beta_l(0)} + \hat{z}(n = 11)$$

where n refers to indices from 0 to 11 for a set of 12 inputs. In at least one embodiment, an output of DNN (e.g., estimated CSI 404) used for DNN-based channel estimation at channel estimation 402 is represented as a channel estimate $\hat{}$. In at least one embodiment, $\hat{}$ is different for each branch i, but index i is omitted here for clarity. In at least one embodiment, DNN used for DNN-based channel estimation at channel estimation 402 is a fully connected DNN.

In at least one embodiment, signal detection 400 includes MRC 406. In at least one embodiment, MRC 406 is based, at least in part, on estimated CSI 404. In at least one embodiment, MRC 406 is referred to as coherent combining. In at least one embodiment, coherent combiner 130 of FIG. 1 is to perform MRC 406. In at least one embodiment, an output of MRC 406 is a 12×1 column vector for a given m_cs. In at least one embodiment, with respect to an i-th branch (e.g., i=0, . . . , 11) of signal detection 400, estimated channel vector is $\hat{}$. In at least one embodiment, MRC 406 is to apply a conjugate of $\hat{}$ to Rx signals represented as $$y_l(n) = H \cdot r_{u,v}^{\alpha_l,0}(n) + z, \; n = 0, \ldots, 11, l = 0, 1:$$

$$\hat{H}^* \cdot y_l(n)/N_r = \hat{H}^* \cdot H \cdot r_{u,v}^{\alpha_l,0}(n)/N_r + \hat{H}^* \cdot z/N_r$$

where $\hat{}^*$ is a row vector of size $1 \times N_r$, $\hat{}^* \cdot H$ is vector inner product. In at least one embodiment, $\hat{}^* \cdot H/N_r$ is close to 1 (e.g., assuming channel gain is included in z).

In at least one embodiment signal detection 400 includes correlation 408. In at least one embodiment, signal detector 124 and/or some other component of base station 102 of FIG. 1 is to perform correlation 408. In at least one embodiment, correlation 408 includes calculating correlation under each m_cs. In at least one embodiment, correlation 408 is based, at least in part, on one or more output values of MRC 406. In at least one embodiment, correlation 408 includes correlation with a set of sequences (e.g., using twelve sequences with cyclic shift values m_cs of 0 to 11). In at least one embodiment, correlation 408 is part of a detection algorithm. In at least one embodiment, with respect to an i-th branch (e.g., i=0, ..., 11) of signal detection 400, correlation 408 is to compute a correlation of Rx signal with sequence corresponding to $m_{cs}$=i. In at least one embodiment, correlation is represented as:

$$\hat{H}^* \cdot y_1(n) \cdot r_{u,v}^{\beta_1(i),0^*}(n)/N_r = \hat{H}^* \cdot H \cdot r_{u,v}^{\alpha_1,0}(n) \cdot r_{u,v}^{\beta_1(i),0^*}/N_r + \hat{H}^* \cdot z \cdot r_{u,v}^{\beta_1(i),0^*}/N_r$$

where $$r_{u,v}^{\alpha_l,0}(n) \cdot r_{u,v}^{\beta_l(i),0^*}$$

has a largest amplitude 1 if $m_{cs}$=i is ground truth (e.g., $\beta_l(i)=\alpha_l$). In at least one embodiment, correlation value (e.g., a complex number) computed by each branch i=0, ..., 11, is to be used as an input to a detector (e.g., a DNN).

In at least one embodiment, signal detection 400 includes detection 410. In at least one embodiment, signal detector 124 of FIG. 1 is to perform detection 410. In at least one embodiment, detection 410 is based, at least in part, on one or more output values of correlation 408 (e.g., correlation value computed by each branch i). In at least one embodiment, detection 410 includes correlation 408. In at least one embodiment detection 410 is to use one or more neural networks. In at least one embodiment, detection 410 is to use a DNN to perform final detection.

Figure 5:
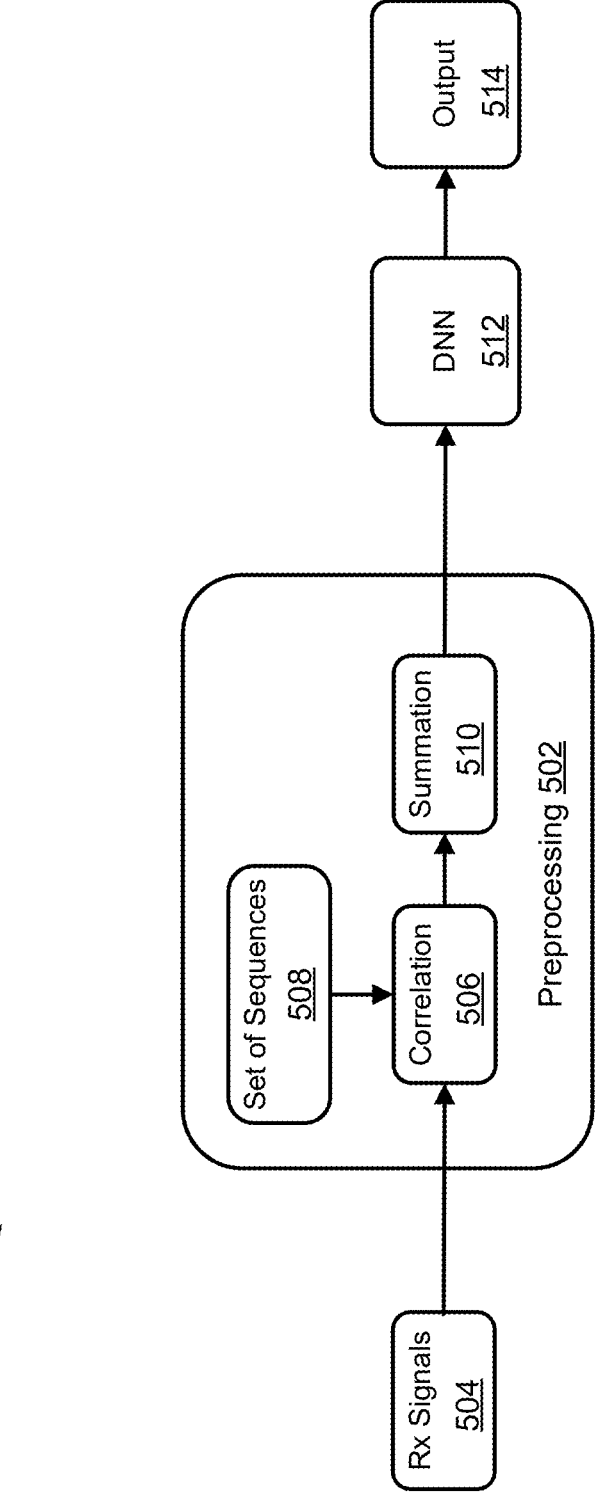
FIG. 5 is a block diagram that illustrates signal detection using a neural network, according to at least one embodiment.

FIG. 5 is a block diagram that illustrates signal detection 500 using a neural network, according to at least one embodiment. In at least one embodiment, signal detection 500 includes preprocessing 502 to preprocess one or more Rx signals 504. In at least one embodiment, preprocessing 502 includes correlation 506 that is to calculate correlations using one or more Rx signals 504 and a set of sequences 508 (e.g., sequences with m_cs=0, 1, ..., 11). In at least one embodiment, preprocessing 502 includes summation 510 that is to sum output values from correlation 506 over antennas (e.g., antennas in set of antenna elements 112 of FIG. 1) and OFDM symbols. In at least one embodiment, summation 510 is to generate a set of correlations for set of sequences 508 (e.g., twelve correlations for m_cs= 0, 1, ..., 11).

In at least one embodiment, signal detection 500 uses a DNN 512 to generate an output 514 based, at least in part, on set of correlations from summation 510. In at least one embodiment, output 514 indicates a DTX status and/or m_cs value. In at least one embodiment, m_cs value from output 514 is to be translated to corresponding UCI (e.g., using a lookup and/or mapping operation based on a mapping of one or more mappings 136 of FIG. 1).

FIG. 6 is a block diagram that illustrates a deep neural network (DNN) operation 600, according to at least one embodiment. In at least one embodiment, DNN operation 600 uses a DNN 602. In at least one embodiment, DNN 602 is, and/or is included in DNN 512 of FIG. 5. In at least one embodiment, DNN 602 is a fully-connected DNN. In at least one embodiment, DNN 602 is to be used as a nonlinear function approximator. In at least one embodiment, DNN 602 includes a series of matrix multiplication (MatMul), addition (Add), and activation (e.g., Rectified Linear Unit (Relu)) operations.

In at least one embodiment, DNN 602 includes MatMul, Add, and Relu operations in an order MatMul, Add, Relu, Matmul, Add, Relu, MatMul, Add, as shown, where an output of a preceding operation is to be used as an input to a following operation. In at least one embodiment, DNN 602 is to use an input 604 to generate an output 606. In at least one embodiment, a structure of DNN 602 includes one or more input nodes, not shown for clarity, that correspond to input 604 and/or one or more output nodes, not shown for clarity, that correspond to output 606. In at least one embodiment, input 604 includes correlations between Rx signals and sequences (e.g., between Rx signals and base sequences shifted by all possible m_cs values). In at least one embodiment, output 606 includes a set of classes (e.g., 13 classes that include DTX+12 m_cs values). In at least one embodiment, an input to first MatMul of DNN 602 has a shape of batch_size×32×12. In at least one embodiment, a structure of DNN 602 assumes a batch_size=32. In at least one embodiment, an output from final Add of DNN 602 has a shape of batch_size×32×13. In at least one embodiment, DNN 602, when performed by a GPU (e.g., a Quadro RTX 3000), generates results (e.g., performs inferencing) with a mean running time of 0.036 ms, with standard deviation 0.006 ms for 32×32×12 input size, which is quickly enough to be used in a 5G signal processing pipeline. In at least one embodiment, DNN 602 is structured differently (e.g., has a different number of layers, one or more other types of operations, a different input and/or output structure, uses a different activation function, and/or has one or more other differences).

Figure 7:
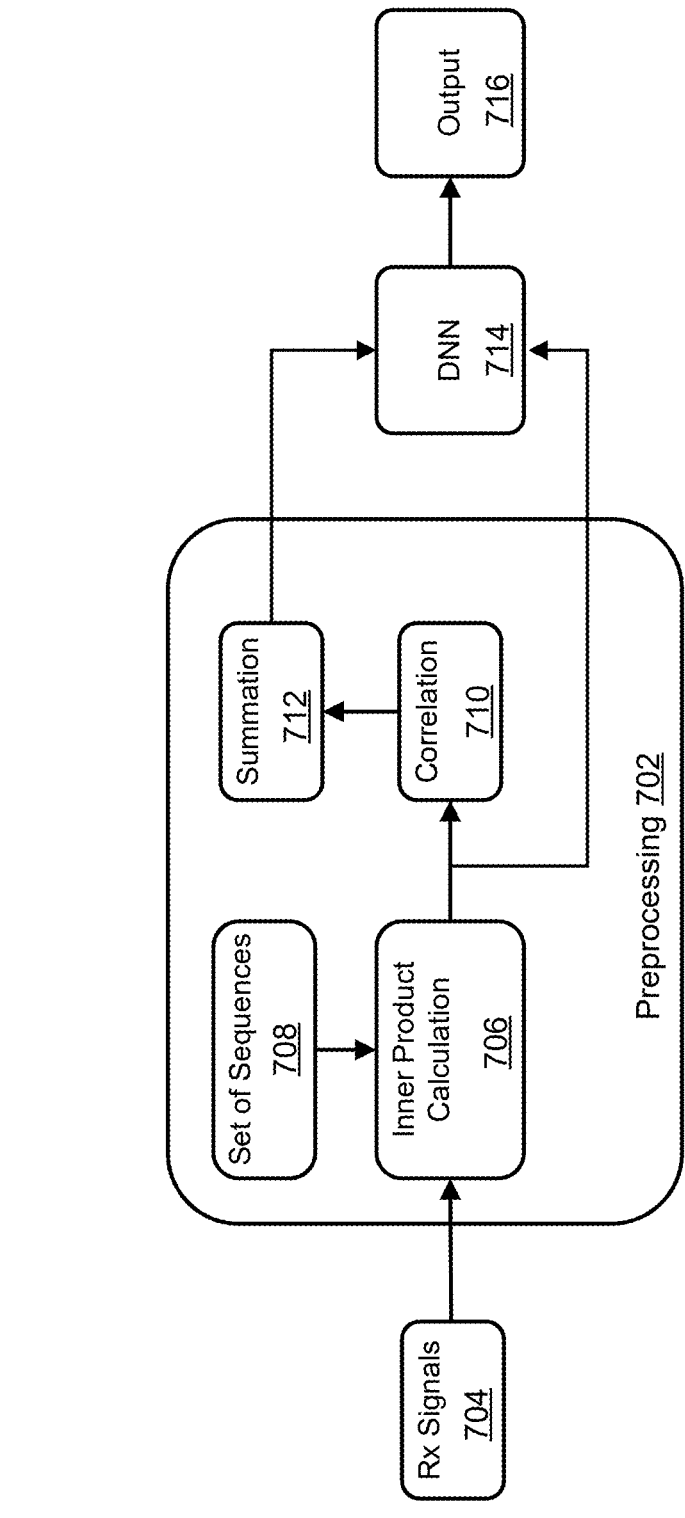
FIG. 7 is a block diagram that illustrates signal detection using a neural network, according to at least one embodiment.

FIG. 7 is a block diagram that illustrates signal detection 700 using a neural network, according to at least one embodiment. In at least one embodiment, signal detection 700 includes preprocessing 702 to preprocess one or more Rx signals 704. In at least one embodiment, preprocessing 702 includes inner product calculation 706 that is to calculate inner products using one or more Rx signals 704 and a set of sequences 708 (e.g., sequences with m_cs=0, 1, ..., 11). In at least one embodiment, inner product calculation 706 is to generate a set of inner products (e.g., twelve $N_r$ inner products for m_cs=0, 1, ..., 11 where $N_r$ is number of Rx antennas). In at least one embodiment, preprocessing 702 includes correlation 710 that is to calculate correlations using values generated by inner product calculation 706. In at least one embodiment, preprocessing 702 includes summation 712 that is to sum output values from correlation 710 over antennas (e.g., antennas in set of antenna elements 112 of FIG. 1) and OFDM symbols. In at least one embodiment, summation 712 is to generate a set of summed correlations for set of sequences 708 (e.g., twelve correlations for m_cs=0, 1, . . . , 11).

In at least one embodiment, signal detection 700 uses a DNN 714 to generate an output 716 based, at least in part, on set of inner products from inner product calculation 706 and set of summed correlations from summation 712. In at least one embodiment, output 716 indicates a DTX status and/or m_cs value. In at least one embodiment, m_cs value from output 716 is to be translated to corresponding UCI (e.g., using a lookup and/or mapping operation based, at least in part, on a mapping of one or more mappings 136 of FIG. 1). In at least one embodiment, DNN 714 is based, at least in part, on using additional signal information (e.g. with respect to phase) in comparison to DNN 512 of FIG. 5.

FIG. 8 is a block diagram that illustrates a deep neural network (DNN) operation 800, according to at least one embodiment. In at least one embodiment, DNN operation 800 uses a DNN 802. In at least one embodiment, DNN 802 is, and/or is included in DNN 714 of FIG. 7. In at least one embodiment, DNN 802 is a fully-connected DNN. In at least one embodiment, DNN 802 is to be used as a nonlinear function approximator. In at least one embodiment, DNN 802 includes a series of MatMul, Add, and activation (e.g., Relu) operations. In at least one embodiment, DNN 802 includes MatMul, Add, and Relu operations in an order MatMul, Add, Relu, Matmul, Add, Relu, MatMul, Add, Relu, MatMul, Add, Relu, MatMul, Add, as shown, where an output of a preceding operation is to be used as an input to a following operation.

In at least one embodiment, DNN 802 is to use an input 804 to generate an output 806. In at least one embodiment, input 804 includes a set of inner products (e.g., from inner product calculation 706 of FIG. 7) and a square root of correlations between Rx signals and sequences with all m_cs (e.g., from summation 712 of FIG. 7). In at least one embodiment, input dimension is 12×(1+2 $N_r$) where $N_r$ is number of Rx antennas (e.g., in set of antenna elements 112 of FIG. 1). In at least one embodiment output 806 includes a set of classes (e.g., 13 classes with DTX+12 m_cs values). In at least one embodiment, an input to first MatMul of DNN 802 has a shape of batch_size×32×12. In at least one embodiment, a structure of DNN 802 assumes a batch_size=32. In at least one embodiment, an output from final Add of DNN 802 has a shape of batch_size×32×13. In at least one embodiment, DNN 802, when performed by a GPU (e.g., a Quadro RTX 3000), generates results (e.g., performs inferencing) with a mean running time of 0.063 ms, with standard deviation 0.017 ms for 32×32×12 input size, which is quickly enough to be used in a 5G signal processing pipeline. In at least one embodiment, DNN 802 is structured differently (e.g., has a different number of layers, one or more other types of operations, a different input and/or output structure, uses a different activation function, and/or has one or more other differences).

In at least one embodiment, signal detector 124 of FIG. 1 is and/or includes one or more of DNN 512 of FIG. 5, DNN 602 of FIG. 6, DNN 714 of FIG. 7, or DNN 802 of FIG. 8. In at least one embodiment, signal detector 124 is to detect UCI information (e.g., transported in a PF0 transmission). In at least one embodiment, signal detector 124 uses a nonlinear function approximator (NFA) (e.g., a DNN or other suitable nonlinear function approximator) that has been trained and/or optimized by machine learning to determine DTX status and/or UCI information in a PF0 transmission. In at least one embodiment, technique includes training a machine learning model (e.g., a DNN) to infer a correct signal from multiple possibilities of what signal can be. In at least one embodiment, to do this, channel estimation is performed for each possible value signal can be, and results are combined and input into machine learning model. In at least one embodiment, machine learning model outputs information that identifies correct signal. In at least one embodiment, alternatively, machine learning model can be trained based on multiple possibilities of what signal can be without first performing channel estimation. In at least one embodiment, NFA is trained and optimized based, at least in part, on a set of PF0 transmission samples collected in a 5G system, where each sample is a pair that includes a PF0 received signal and a ground-truth DTX status or UCI information. In at least one embodiment, training is performed based, at least in part, on a supervised learning framework using collected PF0 samples. In at least one embodiment, training objective is to minimize error between NFA's output and ground-truth results. In at least one embodiment, NFA used to perform signal detection is referred to as a trained and/or learned NFA. In at least one embodiment, a detection algorithm that includes a preprocessing module, learned NFA, and a mapping function (e.g., to map m_cs values to UCI) is used by a 5G gNB receiver to detect each received PF0 transmission. In at least one embodiment, a preprocessing module takes as input a received PF0 signal and outputs correlations/inner products (e.g., in amplitudes or both real and imaginary parts) between all possible low-PAPR sequences (e.g., twelve shifted base sequences) and received PF0 signal. In at least one embodiment, a NFA (e.g., a DNN such as DNN 512 of FIG. 5, DNN 602 of FIG. 6, DNN 714 of FIG. 7, or DNN 802 of FIG. 8) takes as input computed correlation coefficients and outputs a vector of detection results. In at least one embodiment, output vector includes an entry that indicates DTX result and multiple entries each indicating a specific cyclic shift (e.g., m_cs value). In at least one embodiment, a mapping function maps output vector of NFA to final PF0 detection result (e.g., DTX or UCI information bit(s)).

In at least one embodiment, using a NFA (e.g., a DNN such as DNN 512 of FIG. 5, DNN 602 of FIG. 6, DNN 714 of FIG. 7, or DNN 802 of FIG. 8) to perform signal detection provides advantages over some legacy techniques that use a constant threshold value in threshold-based detection. In at least one embodiment, using a NFA is not restricted to a threshold-type function form. In at least one embodiment, an NFA such as a DNN offers a strong universal function capability that is used to learn an unknown nonlinear function to perform PF0 detection. In at least one embodiment, using an NFA such as a DNN provides advantages over legacy techniques that use constant threshold values because in some cases a small variation of threshold may lead to a significant increase of detection failure rates. In at least one embodiment, using an NFA such as a DNN provides advantages over constant threshold-based approaches because threshold is usually a function of estimated signal-to-noise ratio (SNR), such that an error in SNR estimation will also affect PF0 performance. In at least one embodiment, using an NFA such as a DNN provides advantages over constant threshold-based approaches because it is difficult to determine an optimal threshold setting for every possible network operation scenario such that a threshold optimized for one scenario may perform poorly for a different scenario (e.g., a threshold optimal for Additive White Gaussian Noise (AWGN) channels may not be able to meet detection failure rate requirements under fading channels). In at least one embodiment, using an NFA such as a DNN provides advantages over constant threshold-based approaches because threshold-based approach is not robust against interference effects caused by either multiplexing of multiple UCIs over same PF0, or PF0 transmissions from neighboring cell (e.g., due to imperfect orthogonality among different low-PAPR sequences).

In at least one embodiment, a processor (e.g., processor 118 and/or accelerator 122 of FIG. 1) includes one or more circuits to cause channel estimation of one or more radio signals without a corresponding reference signal to be performed based, at least in part, on a plurality of possible values of one or more radio signals. In at least one embodiment, channel estimation refers to generating channel values and/or coefficients. In at least one embodiment, channel estimation of one or more radio signals refers to channel estimation corresponding to an operating environment, where channel estimation is to be applied to one or more radio signals (e.g., a radio signal such as a PF0 signal received without a corresponding reference signal). In at least one embodiment, one or more circuits are to use one or more neural networks to decode a first radio signal of one or more radio signals based, at least in part, on multiple different possibilities of information encoded by first radio signal. In at least one embodiment, one or more circuits are to use one or more neural networks to identify a cyclic shift value of a received first radio signal of one or more radio signals based, at least in part, on plurality of values. In at least one embodiment, one or more circuits are to use one or more neural networks to identify whether a UE device is in a discontinuous transmission status based, at least in part, on plurality of possible values. In at least one embodiment, one or more circuits are to calculate a plurality of inner product values based, at least in part, on a received first radio signal of one or more radio signals and plurality of possible values. In at least one embodiment, one or more circuits are to calculate a plurality of correlation values based, at least in part, on plurality of inner product values, and are to use one or more neural networks to identify a cyclic shift value of received first radio signal based, at least in part, on plurality of inner product values and plurality of correlation values. In at least one embodiment, one or more circuits are to perform coherent combination corresponding to a first radio signal of one or more radio signals received by multiple antennas based, at least in part, on channel estimation, and are to use one or more neural networks to decode first radio signal of one or more radio signals based, at least in part, on coherent combination. In at least one embodiment, one or more circuits are to cause channel estimation to be performed using a first one or more neural networks, and one or more circuits are to cause signal detection to be performed using a second one or more neural networks based, at least in part, on channel estimation. In at least one embodiment, one or more circuits are to use one or more neural networks to identify a cyclic shift value of a received first radio signal of one or more radio signals based, at least in part, on plurality of possible values, and one or more circuits are to identify uplink control information based, at least in part, on cyclic shift value and an uplink control information type value.

In at least one embodiment, a system includes one or more processors (e.g., processor 118 and/or accelerator 122 of FIG. 1) to cause channel estimation of one or more radio signals without a corresponding reference signal to be performed based, at least in part, on a plurality of possible values of one or more radio signals. In at least one embodiment, system includes one or more memories to store plurality of possible values. In at least one embodiment, one or more processors are to use one or more neural networks to decode a first radio signal of one or more radio signals based, at least in part, on multiple different possibilities of information encoded by first radio signal. In at least one embodiment, one or more processors are to use one or more neural networks to identify a cyclic shift value of a received first radio signal of one or more radio signals based, at least in part, on plurality of possible values. In at least one embodiment, one or more processors are to use one or more neural networks to identify a cyclic shift value of a received first radio signal of one or more radio signals transmitted by a UE device based, at least in part on plurality of possible values. In at least one embodiment, one or more processors are to use one or more neural networks to identify whether a user equipment device is in a discontinuous transmission status and identify a cyclic shift value of a received first radio signal of one or more radio signals transmitted by UE device if it is not in a discontinuous transmission status. In at least one embodiment, one or more processors are to cause channel estimation to be performed using a first one or more neural networks, and one or more processors are to identify a cyclic shift value using a second one or more neural networks based, at least in part, on channel estimation.

In at least one embodiment, a machine-readable medium (e.g., a non-transitory computer-readable medium) includes instructions stored thereon, which if performed by one or more processors (e.g., processor 118 and/or accelerator 122 of FIG. 1) cause one or more processors to at least cause channel estimation of one or more radio signals without a corresponding reference signal to be performed based, at least in part, on a plurality of possible values of one or more radio signals. In at least one embodiment, instructions, which if performed by one or more processors, are to cause one or more processors to use one or more neural networks to decode a first radio signal based, at least in part, on multiple different possibilities of information encoded by first radio signal. In at least one embodiment, instructions, which if performed by one or more processors, are to cause one or more processors to use one or more neural networks to identify a cyclic shift value corresponding to a received first radio signal of one or more radio signals based, at least in part, on plurality of possible values. In at least one embodiment, instructions, which if performed by one or more processors, are to cause one or more processors to perform coherent combination based, at least in part, on channel estimation, and to use one or more neural networks to perform signal detection based, at least in part on coherent combination. In at least one embodiment, instructions, which if performed by one or more processors, are to cause one or more processors to use one or more neural networks to identify a cyclic shift value of a received first radio signal of one or more radio signals based, at least in part, on plurality of possible values, and to identify UCI based, at least in part, on cyclic shift value. In at least one embodiment, instructions, which if performed by one or more processors, are to cause one or more processors to use one or more neural networks to perform signal detection corresponding to a first radio signal of one or more radio signals received at a base station from a UE device based, at least in part, on channel estimation.

In at least one embodiment, a wireless radio network base station (e.g., base station 102 of FIG. 1) includes one or more circuits (e.g., of processor 118 and/or accelerator 122 of FIG. 1) to perform channel estimation of one or more radio signals received from one or more UE devices without a corresponding reference signal based, at least in part, on a plurality of possible values of one or more radio signals. In at least one embodiment, one or more radio signals are one or more of physical uplink control channel (PUCCH) signals and physical random access channel (PRACH) signals. In at least one embodiment, one or more circuits are to identify a cyclic shift value of a received first radio signal of one or more radio signals. In at least one embodiment, one or more circuits are to use one or more neural networks to identify whether a UE device is in a discontinuous transmission status based, at least in part, on plurality of possible values. In at least one embodiment, one or more circuits are part of one or more of a graphics processing unit, an application specific integrated circuit, or a field programmable gate array. In at least one embodiment, wireless radio network base station is a gNodeB (gNB).

Figure 9:
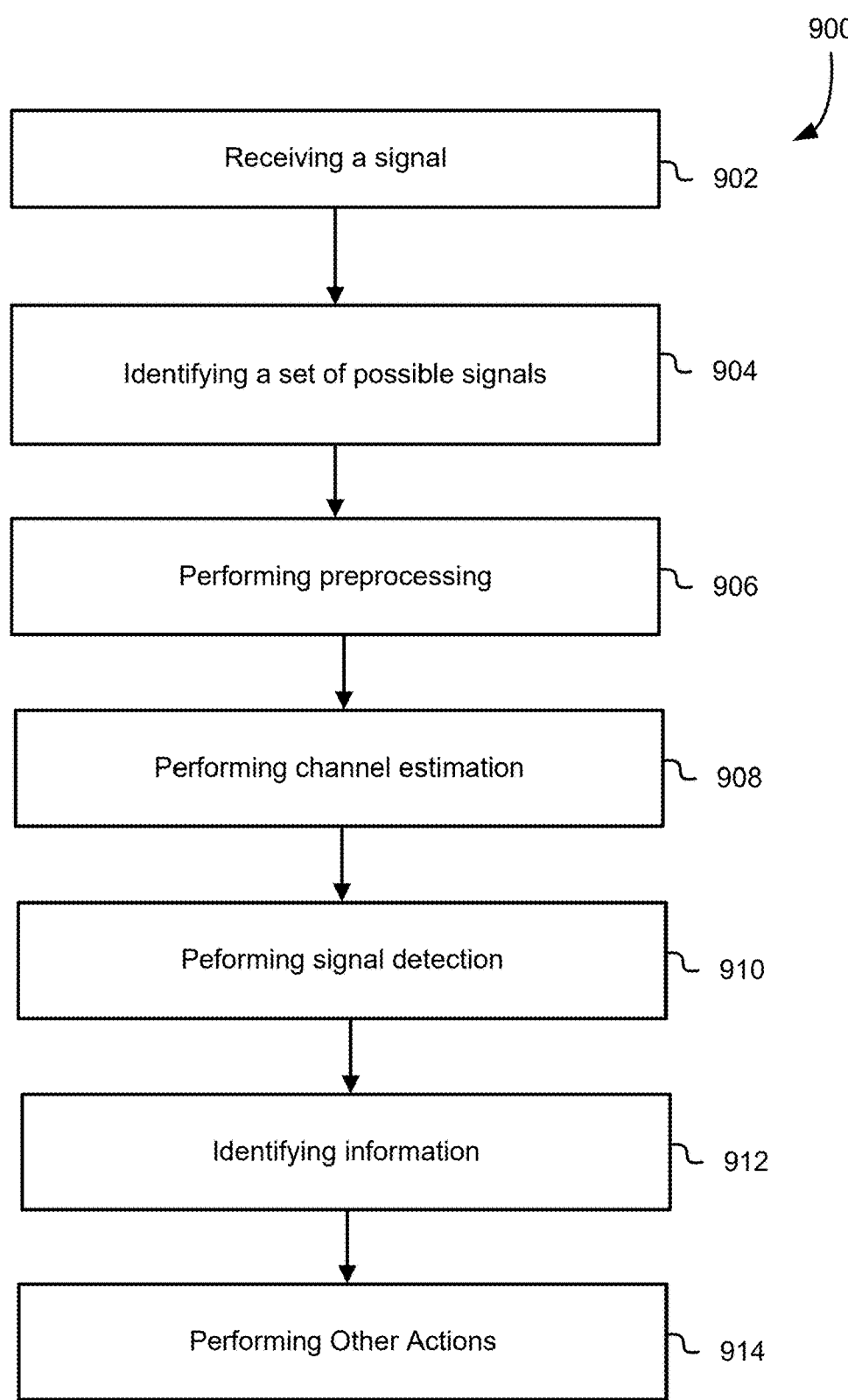
FIG. 9 is a flowchart of a technique of performing coherent detection, according to at least one embodiment.

FIG. 9 is a flowchart of a technique 900 of performing coherent detection, according to at least one embodiment. In at least one embodiment, technique 900 is performed by at least one circuit, at least one system, at least one processor, at least one graphics processing unit, at least one parallel processor, and/or at least some other processor or component thereof described and/or shown herein. In at least one embodiment, at least one aspect of technique 900 is performed by computer system 100 of FIG. 1 (e.g., processor 118 and/or accelerator 122 of base station 102). In at least one embodiment, technique 900 is performed, at least in part, by performing a set of instructions (e.g., from a non-transitory machine-readable medium) using one or more processors (e.g., of computer system 100 of FIG. 1 and/or any other suitable processor such as shown or described herein). In at least one embodiment, performing a set of instructions includes executing set of instructions (e.g., using one or more processors).

In at least one embodiment, at a block 902, technique 900 includes receiving a signal. In at least one embodiment, signal is a wireless radio signal received without a corresponding reference signal (e.g., without a DMRS). In at least one embodiment, signal is received at a base station (e.g., a gNB such as base station 102 of FIG. 1) from a UE. In at least one embodiment, signal is a low-PAPR signal. In at least one embodiment, signal is a PF0 signal or a PRACH signal.

In at least one embodiment, at a block 904, technique 900 includes identifying a set of possible signals. In at least one embodiment, identifying a set of possible signals includes identifying a set of possible cyclic shifts. In at least one embodiment, identifying a set of possible signals includes identifying a set of signal sequences (e.g., a set of sequences that includes a base sequence shifted by different cyclic shift values).

In at least one embodiment, at a block 906, technique 900 includes performing preprocessing. In at least one embodiment, performing preprocessing is to be performed, at least in part, by preprocessor 128 of FIG. 1 and/or preprocessor 216 of FIG. 2. In at least one embodiment, performing preprocessing includes dividing by a base sequence and/or performing a rotation such as described with respect to preprocessor 216 of FIG. 2.

In at least one embodiment, at a block 908, technique 900 includes performing channel estimation. In at least one embodiment, channel estimation is to be performed, at least in part, by channel estimator 126 of FIG. 1 and/or channel estimator 202 of FIG. 2. In at least one embodiment, performing channel estimation includes performing channel estimation corresponding to one or more wireless signals (e.g., signal received at block 902) without using a reference signal. In at least one embodiment, performing channel estimation is based, at least in part, on multiple different possibilities of information encoded by one or more wireless signals (e.g., set of possible signals identified at block 904). In at least one embodiment, performing channel estimation includes performing channel estimation of one or more radio signals without a corresponding reference signal based, at least in part, on a plurality of possible values of one or more radio signals (e.g., possible cyclically shifted base sequences). In at least one embodiment, performing channel estimation is based, at least in part, on using one or more neural networks.

In at least one embodiment, at a block 910, technique 900 includes performing signal detection. In at least one embodiment, performing signal detection is to be performed, at least in part, by signal detector 124 of FIG. 1. In at least one embodiment, performing signal detection includes performing coherent combination corresponding to a first wireless signal of one or more wireless signals received by multiple antennas based, at least in part, on channel estimation. In at least one embodiment, performing coherent combination is to be performed, at least in part, by coherent combiner 130 of FIG. 1. In at least one embodiment, performing signal detection includes identifying a cyclic shift value (e.g., m_cs value) based, at least in part, on channel estimation. In at least one embodiment, performing signal detection is based, at least in part, on coherent combination. In at least one embodiment, performing signal detection includes performing coherent combination based, at least in part, on channel estimation, and identifying a cyclic shift value based, at least in part, on coherent combination.

In at least one embodiment, at a block 912, technique 900 includes identifying information. In at least on embodiment, identifying information include identifying information based, at least in part, on detected signal. In at least one embodiment, identifying information includes identifying information based, at least in part, on cyclic shift value. In at least one embodiment, identifying information includes identifying UCI. In at least one embodiment, identifying information includes identifying DTX status. In at least one embodiment, identifying information is based, at least in part, on a mapping of one or more mappings 136 of FIG. 1.

In at least one embodiment, at a block 914, technique 900 includes performing other actions. In at least one embodiment, performing other actions includes sending a signal to a UE based, at least in part, on identified information. In at least one embodiment, performing other actions includes returning to block 902 to receive another signal.

Figure 10:
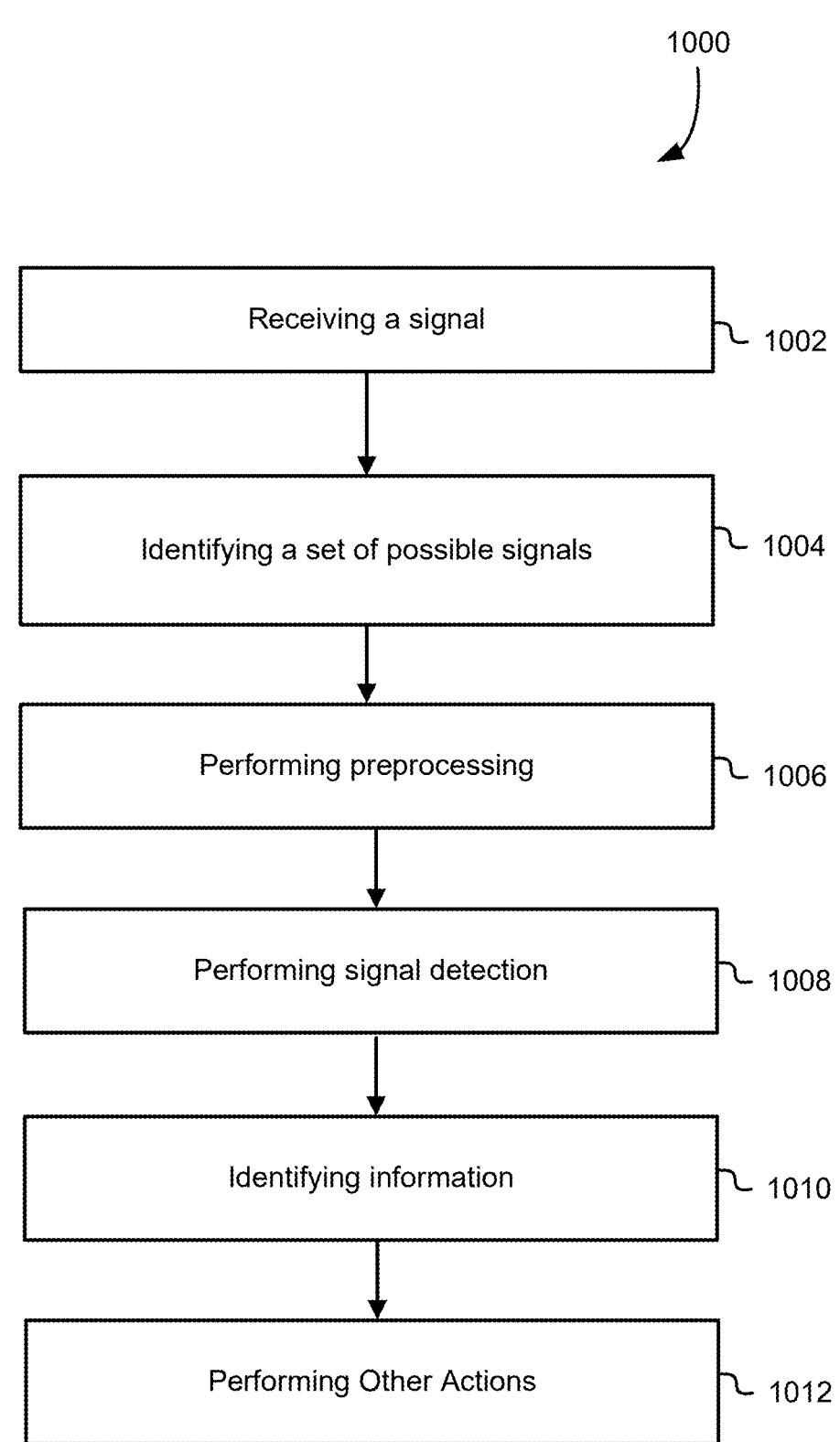
FIG. 10 is a flowchart of a technique of performing signal detection, according to at least one embodiment.

FIG. 10 is a flowchart of a technique 1000 of performing signal detection, according to at least one embodiment. In at least one embodiment, technique 1000 is performed by at least one circuit, at least one system, at least one processor, at least one graphics processing unit, at least one parallel processor, and/or at least some other processor or component thereof described and/or shown herein. In at least one embodiment, at least one aspect of technique 1000 is performed by computer system 100 of FIG. 1 (e.g., processor 118 and/or accelerator 122 of base station 102). In at least one embodiment, technique 1000 is performed, at least in part, by performing a set of instructions (e.g., from a non-transitory machine-readable medium) using one or more processors (e.g., of computer system 100 of FIG. 1 and/or any other suitable processor such as shown or described herein). In at least one embodiment, performing a set of instructions includes executing set of instructions (e.g., using one or more processors).

In at least one embodiment, at a block 1002, technique 1000 includes receiving a signal. In at least one embodiment, signal is a wireless radio signal received without a corresponding reference signal (e.g., without a DMRS). In at least one embodiment, signal is received at a base station (e.g., a gNB) from a UE. In at least one embodiment, signal is a low-PAPR signal. In at least one embodiment, signal is a PF0 signal or a PRACH signal.

In at least one embodiment, at a block 1004, technique 1000 includes identifying a set of possible signals. In a least one embodiment, set of possible signals includes set of possible cyclically shifted base sequences for a particular UE. In at least one embodiment, set of possible signals is based, at least in part, on a type of received signal (e.g., PF0, PRACH, or other type of signal). In at least one embodiment, set of possible signals is based, at least in part, on type of received signal and higher-level signal information (e.g., that identifies a type of information and/or number of bits carried by signal). In at least one embodiment, for a PF0 signal, twelve cyclic shifts are possible, but in some situations, only one of eight, or one of four may be used, instead of one of entire set of twelve possibilities.

In at least one embodiment, at a block 1006, technique 1000 includes performing preprocessing. In at least one embodiment, performing preprocessing includes preprocessing 502 of FIG. 5 and/or preprocessing 702 of FIG. 7. In at least one embodiment, performing preprocessing includes identifying set of possible signals of block 1004. In at least one embodiment, performing preprocessing includes performing one or more correlations (e.g., correlation 506 of FIG. 5 or correlation 710 of FIG. 7), performing one or more inner product calculations (e.g., inner product calculations 706 of FIG. 7), performing one or more summations (e.g., summation 510 of FIG. 5 or summation 712 of FIG. 7) and/or some other suitable preprocessing operation.

In at least one embodiment, at a block 1008, technique 1000 includes performing signal detection. In at least one embodiment, performing signal detection includes using one or more neural networks (e.g., DNN 512 of FIG. 5, DNN 602 of FIG. 6, DNN 714 of FIG. 7, or DNN 802 of FIG. 8) to decode a first radio signal of one or more radio signals based, at least in part, on multiple different possibilities of information encoded by first radio signal. In at least one embodiment, performing signal detection includes using one or more neural networks to identify a cyclic shift value corresponding to a received first radio signal of one or more radio signals based, at least in part, on channel estimation. In at least one embodiment, performing signal detection includes using one or more neural networks to identify a cyclic shift value corresponding to a received first radio signal of one or more radio signals from a UE device. In at least one embodiment, performing signal detection includes performing coherent combination based, at least in part, on channel estimation, and using one or more neural networks to identify a cyclic shift value based, at least in part, on coherent combination. In at least one embodiment, performing channel estimation is based, at least in part, on a first one or more neural networks, and performing signal detection is based, at least in part, on a second one or more neural networks.

In at least one embodiment, at a block 1010, technique 1000 includes identifying information. In at least one embodiment, identifying information includes identifying UCI based, at least in part, on cyclic shift value. In at least one embodiment, identifying information includes identifying DTX status. In at least one embodiment, identifying information is based, at least in part, on a mapping of one or more mappings 136 of FIG. 1. In at least one embodiment, at a block 1012, technique 1000 includes performing other actions. In at least one embodiment, performing other actions includes sending a signal to a UE based, at least in part, on identified information. In at least one embodiment, performing other actions includes returning to block 1002 to receive another signal.

Data Center

FIG. 11 illustrates an example data center 1100, in which at least one embodiment may be used. In at least one embodiment, data center 1100 includes a data center infrastructure layer 1110, a framework layer 1120, a software layer 1130 and an application layer 1140.

In at least one embodiment, as shown in FIG. 11, data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1116(1)-1116(N) may be a server having one or more of above-mentioned computing resources.

In at least one embodiment, grouped computing resources 1114 may include separate groupings of node C.R.s housed within one or more racks (not shown), or many racks housed in data centers at various geographical locations (also not shown). In at least one embodiment, separate groupings of node C.R.s within grouped computing resources 1114 may include grouped compute, network, memory, or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1112 may configure or otherwise control one or more node C.R.s 1116(1)-1116(N) and/or grouped computing resources 1114. In at least one embodiment, resource orchestrator 1112 may include a software design infrastructure ("SDI") management entity for data center 1100. In at least one embodiment, resource orchestrator may include hardware, software, or some combination thereof.

In at least one embodiment, as shown in FIG. 11, framework layer 1120 includes a job scheduler 1132, a configuration manager 1134, a resource manager 1136 and a distributed file system 1138. In at least one embodiment, framework layer 1120 may include a framework to support software 1132 of software layer 1130 and/or one or more application(s) 1142 of application layer 1140. In at least one embodiment, software 1132 or application(s) 1142 may respectively include web-based service software or applications, such as those provided by Amazon Web Services, Google Cloud and Microsoft Azure. In at least one embodiment, framework layer 1120 may be, but is not limited to, a type of free and open-source software web application framework such as Apache Spark™ (hereinafter "Spark") that may utilize distributed file system 1138 for large-scale data processing (e.g., "big data"). In at least one embodiment, job scheduler 1132 may include a Spark driver to facilitate scheduling of workloads supported by various layers of data center 1100. In at least one embodiment, configuration manager 1134 may be capable of configuring different layers such as software layer 1130 and framework layer 1120 including Spark and distributed file system 1138 for supporting large-scale data processing. In at least one embodiment, resource manager 1136 may be capable of managing clustered or grouped computing resources mapped to or allocated for support of distributed file system 1138 and job scheduler 1132. In at least one embodiment, clustered or grouped computing resources may include grouped computing resource 1114 at data center infrastructure layer 1110. In at least one embodiment, resource manager 1136 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1138 of framework layer 1120. In at least one embodiment, one or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116 (1)-1116(N), grouped computing resources 1114, and/or distributed file system 1138 of framework layer 1120. In at least one embodiment, one or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 1134, resource manager 1136, and resource orchestrator 1112 may implement any number and type of self-modifying actions based on any amount and type of data acquired in any technically feasible fashion. In at least one embodiment, self-modifying actions may relieve a data center operator of data center 1100 from making possibly bad configuration decisions and possibly avoiding underutilized and/or poor performing portions of a data center.

In at least one embodiment, data center 1100 may include tools, services, software, or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1100. In at least one embodiment, trained machine learning models corresponding to one or more neural networks may be used to infer or predict information using resources described above with respect to data center 1100 by using weight parameters calculated through one or more training techniques described herein.

In at least one embodiment, data center 1100 may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

In at least one embodiment, at least one component shown or described with respect to FIG. 11 is utilized to implement techniques and/or functions described in connection with FIGS. 1-10. In at least one embodiment, at least one or grouped computing resources 1114 and node C.R. 1116 are used to perform channel estimation, coherent combining, and/or signal detection for one or more signals that do not have a corresponding reference signal. In at least one embodiment, at least one of grouped computing resources 1114 and node C.R. 1116 perform at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

Figure 12A:
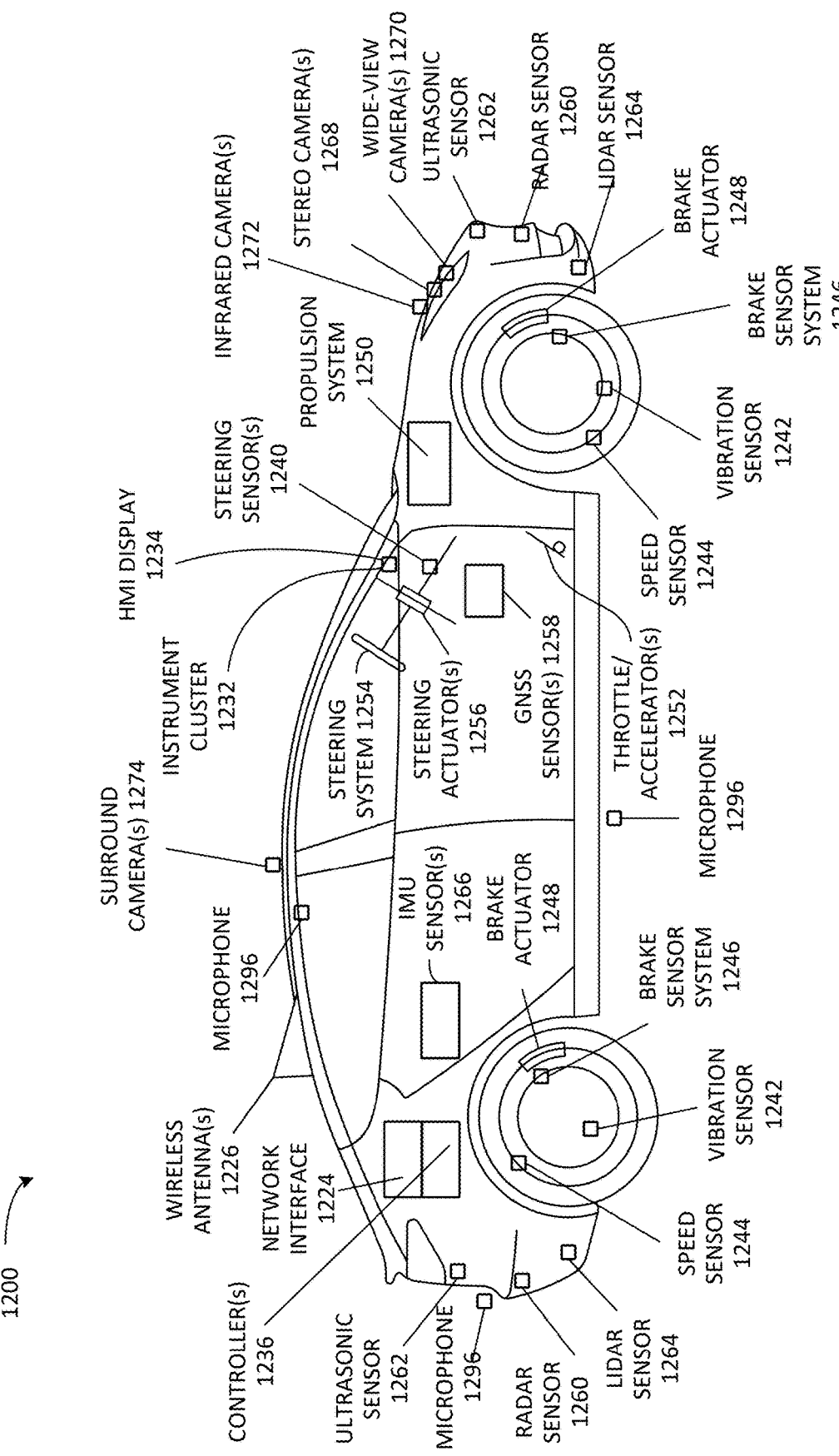
FIG. 12A illustrates an example of an autonomous vehicle, according to at least one embodiment.

FIG. 12A illustrates an example of an autonomous vehicle 1200, according to at least one embodiment. In at least one embodiment, autonomous vehicle 1200 (alternatively referred to herein as "vehicle 1200") may be, without limitation, a passenger vehicle, such as a car, a truck, a bus, and/or another type of vehicle that accommodates one or more passengers. In at least one embodiment, vehicle 1200 may be a semi-tractor-trailer truck used for hauling cargo. In at least one embodiment, vehicle 1200 may be an airplane, robotic vehicle, or other kind of vehicle.

Autonomous vehicles may be described in terms of automation levels, defined by National Highway Traffic Safety Administration ("NHTSA"), a division of US Department of Transportation, and Society of Automotive Engineers ("SAE") "Taxonomy and Definitions for Terms Related to Driving Automation Systems for On-Road Motor Vehicles" (e.g., Standard No. J3016-201806, published on Jun. 15, 2018, Standard No. J3016-201609, published on Sep. 30, 2016, and previous and future versions of this standard). In one or more embodiments, vehicle 1200 may be capable of functionality in accordance with one or more of level 1-level 5 of autonomous driving levels. For example, in at least one embodiment, vehicle 1200 may be capable of conditional automation (Level 3), high automation (Level 4), and/or full automation (Level 5), depending on embodiment.

In at least one embodiment, vehicle 1200 may include, without limitation, components such as a chassis, a vehicle body, wheels (e.g., 2, 4, 6, 8, 18, etc.), tires, axles, and other components of a vehicle. In at least one embodiment, vehicle 1200 may include, without limitation, a propulsion system 1250, such as an internal combustion engine, hybrid electric power plant, an all-electric engine, and/or another propulsion system type. In at least one embodiment, propulsion system 1250 may be connected to a drive train of vehicle 1200, which may include, without limitation, a transmission, to enable propulsion of vehicle 1200. In at least one embodiment, propulsion system 1250 may be controlled in response to receiving signals from a throttle/accelerator(s) 1252.

In at least one embodiment, a steering system 1254, which may include, without limitation, a steering wheel, is used to steer a vehicle 1200 (e.g., along a desired path or route)

when a propulsion system 1250 is operating (e.g., when vehicle is in motion). In at least one embodiment, a steering system 1254 may receive signals from steering actuator(s) 1256. In at least one embodiment, steering wheel may be optional for full automation (Level 5) functionality. In at least one embodiment, a brake sensor system 1246 may be used to operate vehicle brakes in response to receiving signals from brake actuator(s) 1248 and/or brake sensors.

In at least one embodiment, controller(s) 1236, which may include, without limitation, one or more system on chips ("SoCs") (not shown in FIG. 12A) and/or graphics processing unit(s) ("GPU(s)"), provide signals (e.g., representative of commands) to one or more components and/or systems of vehicle 1200. For instance, in at least one embodiment, controller(s) 1236 may send signals to operate vehicle brakes via brake actuators 1248, to operate steering system 1254 via steering actuator(s) 1256, to operate propulsion system 1250 via throttle/accelerator(s) 1252. In at least one embodiment, controller(s) 1236 may include one or more onboard (e.g., integrated) computing devices (e.g., supercomputers) that process sensor signals, and output operation commands (e.g., signals representing commands) to enable autonomous driving and/or to assist a human driver in driving vehicle 1200. In at least one embodiment, controller(s) 1236 may include a first controller 1236 for autonomous driving functions, a second controller 1236 for functional safety functions, a third controller 1236 for artificial intelligence functionality (e.g., computer vision), a fourth controller 1236 for infotainment functionality, a fifth controller 1236 for redundancy in emergency conditions, and/or other controllers. In at least one embodiment, a single controller 1236 may handle two or more of above functionalities, two or more controllers 1236 may handle a single functionality, and/or any combination thereof.

In at least one embodiment, controller(s) 1236 provide signals for controlling one or more components and/or systems of vehicle 1200 in response to sensor data received from one or more sensors (e.g., sensor inputs). In at least one embodiment, sensor data may be received from, for example and without limitation, global navigation satellite systems ("GNSS") sensor(s) 1258 (e.g., Global Positioning System sensor(s)), RADAR sensor(s) 1260, ultrasonic sensor(s) 1262, LIDAR sensor(s) 1264, inertial measurement unit ("IMU") sensor(s) 1266 (e.g., accelerometer(s), gyroscope(s), magnetic compass(es), magnetometer(s), etc.), microphone(s) 1296, stereo camera(s) 1268, wide-view camera(s) 1270 (e.g., fisheye cameras), infrared camera(s) 1272, surround camera(s) 1274 (e.g., 360 degree cameras), long-range cameras (not shown in FIG. 12A), mid-range camera(s) (not shown in FIG. 12A), speed sensor(s) 1244 (e.g., for measuring speed of vehicle 1200), vibration sensor(s) 1242, steering sensor(s) 1240, brake sensor(s) (e.g., as part of brake sensor system 1246), and/or other sensor types.

In at least one embodiment, one or more of controller(s) 1236 may receive inputs (e.g., represented by input data) from an instrument cluster 1232 of vehicle 1200 and provide outputs (e.g., represented by output data, display data, etc.) via a human-machine interface ("HMI") display 1234, an audible annunciator, a loudspeaker, and/or via other components of vehicle 1200. In at least one embodiment, outputs may include information such as vehicle velocity, speed, time, map data (e.g., a High Definition map (not shown in FIG. 12A), location data (e.g., vehicle's 1200 location, such as on a map), direction, location of other vehicles (e.g., an occupancy grid), information about objects and status of objects as perceived by controller(s) 1236, etc. For example, in at least one embodiment, HMI display 1234 may display information about presence of one or more objects (e.g., a street sign, caution sign, traffic light changing, etc.), and/or information about driving maneuvers vehicle has made, is making, or will make (e.g., changing lanes now, taking exit 34B in two miles, etc.).

In at least one embodiment, vehicle 1200 further includes a network interface 1224 which may use wireless antenna(s) 1226 and/or modem(s) to communicate over one or more networks. For example, in at least one embodiment, network interface 1224 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. In at least one embodiment, wireless antenna(s) 1226 may also enable communication between objects in environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

In at least one embodiment, at least one component shown or described with respect to FIG. 12A is utilized to implement techniques and/or functions described in connection with one or more of FIGS. 1-10. In at least one embodiment, techniques and/or functions described in connection with FIGS. 1-10 may receive signals from vehicle 1200 for its autonomous operation and/or may be used to provide a remote operator an ability to control vehicle 1200 remotely. In at least one embodiment, techniques and/or functions described in connection with FIGS. 1-10 may perform channel estimation, coherent combination, and/or signal detection for one or more signals received from vehicle 1200 that do not have a corresponding reference signal.

Figure 12B:
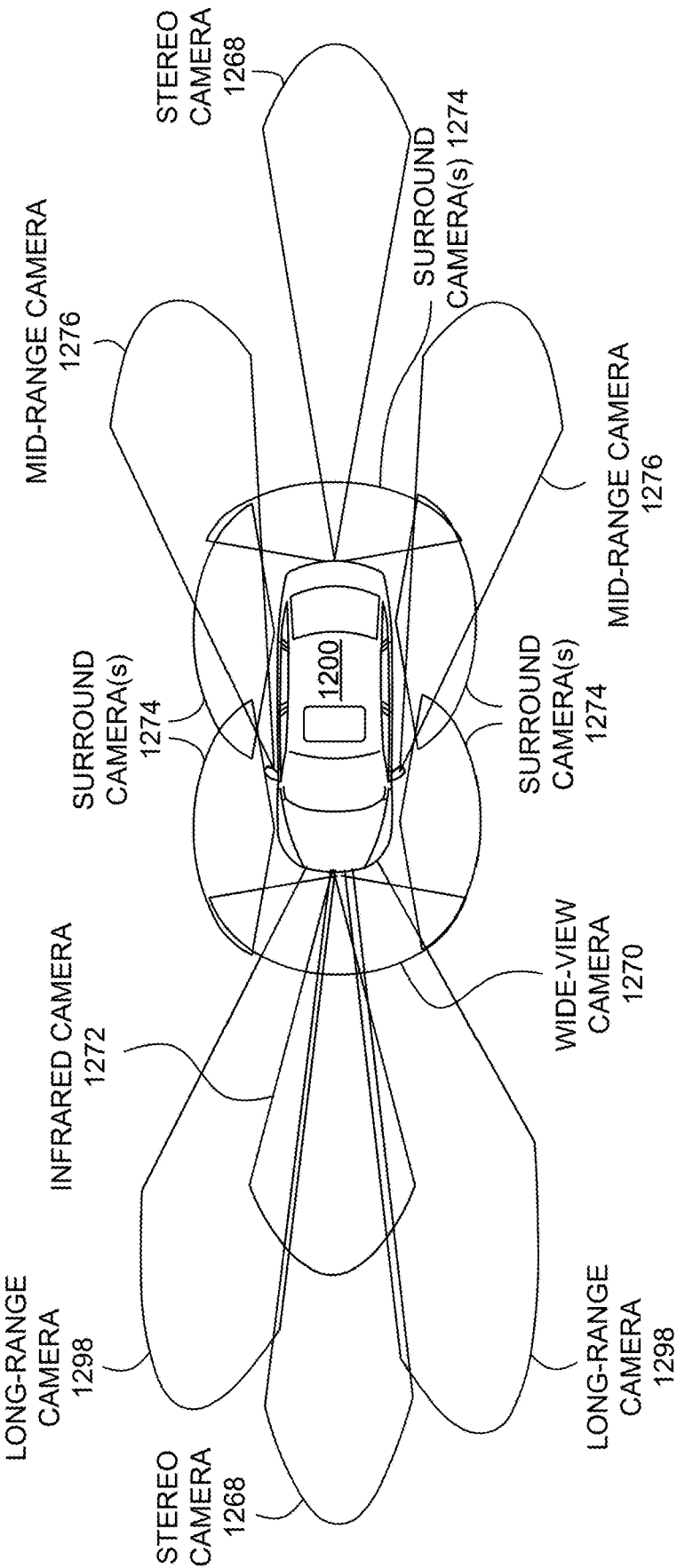
FIG. 12B illustrates an example of camera locations and fields of view for the autonomous vehicle of FIG. 12A, according to at least one embodiment.

FIG. 12B illustrates an example of camera locations and fields of view for autonomous vehicle 1200 of FIG. 12A, according to at least one embodiment. In at least one embodiment, cameras and respective fields of view are one example embodiment and are not intended to be limiting. For instance, in at least one embodiment, additional and/or alternative cameras may be included and/or cameras may be located at different locations on vehicle 1200.

In at least one embodiment, camera types for cameras may include, but are not limited to, digital cameras that may be adapted for use with components and/or systems of vehicle 1200. In at least one embodiment, camera(s) may operate at automotive safety integrity level ("ASIL") B and/or at another ASIL. In at least one embodiment, camera types may be capable of any image capture rate, such as 60 frames per second (fps), 1220 fps, 240 fps, etc., depending on embodiment. In at least one embodiment, cameras may be capable of using rolling shutters, global shutters, another type of shutter, or a combination thereof. In at least one embodiment, color filter array may include a red clear clear clear ("RCCC") color filter array, a red clear clear blue ("RCCB") color filter array, a red blue green clear ("RBGC") color filter array, a Foveon X3 color filter array, a Bayer sensors ("RGGB") color filter array, a monochrome sensor color filter array, and/or another types of color filter arrays. In at least one embodiment, clear pixel cameras, such as cameras with an RCCC, an RCCB, and/or an RBGC color filter array, may be used in an effort to increase light sensitivity.

In at least one embodiment, one or more of camera(s) may be used to perform advanced driver assistance systems ("ADAS") functions (e.g., as part of a redundant or fail-safe design). For example, in at least one embodiment, a Multi-Function Mono Camera may be installed to provide functions including lane departure warning, traffic sign assist and intelligent headlamp control. In at least one embodiment, one or more of camera(s) (e.g., all of cameras) may record and provide image data (e.g., video) simultaneously.

In at least one embodiment, one or more cameras may be mounted in a mounting assembly, such as a custom designed (three-dimensional ("3D") printed) assembly, in order to cut out stray light and reflections from within a car (e.g., reflections from dashboard reflected in windshield mirrors) which may interfere with a camera's image data capture abilities. With reference to wing-mirror mounting assemblies, in at least one embodiment, wing-mirror assemblies may be custom 3D printed so that camera mounting plate matches shape of wing-mirror. In at least one embodiment, camera(s) may be integrated into wing-mirror. In at least one embodiment, for side-view cameras, camera(s) may also be integrated within four pillars at each corner of car.

In at least one embodiment, cameras with a field of view that include portions of environment in front of vehicle 1200 (e.g., front-facing cameras) may be used for surround view, to help identify forward facing paths and obstacles, as well as aid in, with help of one or more of controllers 1236 and/or control SoCs, providing information critical to generating an occupancy grid and/or determining preferred vehicle paths. In at least one embodiment, front-facing cameras may be used to perform many of same ADAS functions as LIDAR, including, without limitation, emergency braking, pedestrian detection, and collision avoidance. In at least one embodiment, front-facing cameras may also be used for ADAS functions and systems including, without limitation, Lane Departure Warnings ("LDW"), Autonomous Cruise Control ("ACC"), and/or other functions such as traffic sign recognition.

In at least one embodiment, a variety of cameras may be used in a front-facing configuration, including, for example, a monocular camera platform that includes a CMOS ("complementary metal oxide semiconductor") color imager. In at least one embodiment, wide-view camera 1270 may be used to perceive objects coming into view from periphery (e.g., pedestrians, crossing traffic or bicycles). Although only one wide-view camera 1270 is illustrated in FIG. 12B, in other embodiments, there may be any number (including zero) of wide-view camera(s) 1270 on vehicle 1200. In at least one embodiment, any number of long-range camera(s) 1298 (e.g., a long-view stereo camera pair) may be used for depth-based object detection, especially for objects for which a neural network has not yet been trained. In at least one embodiment, long-range camera(s) 1298 may also be used for object detection and classification, as well as basic object tracking.

In at least one embodiment, any number of stereo camera(s) 1268 may also be included in a front-facing configuration. In at least one embodiment, one or more of stereo camera(s) 1268 may include an integrated control unit comprising a scalable processing unit, which may provide a programmable logic ("FPGA") and a multi-core microprocessor with an integrated Controller Area Network ("CAN") or Ethernet interface on a single chip. In at least one embodiment, such a unit may be used to generate a 3D map of environment of vehicle 1200, including a distance estimate for all points in image. In at least one embodiment, one or more of stereo camera(s) 1268 may include, without limitation, compact stereo vision sensor(s) that may include, without limitation, two camera lenses (one each on left and right) and an image processing chip that may measure distance from vehicle 1200 to target object and use generated information (e.g., metadata) to activate autonomous emergency braking and lane departure warning functions. In at least one embodiment, other types of stereo camera(s) 1268 may be used in addition to, or alternatively from, those described herein.

In at least one embodiment, cameras with a field of view that include portions of environment to side of vehicle 1200 (e.g., side-view cameras) may be used for surround view, providing information used to create and update occupancy grid, as well as to generate side impact collision warnings. For example, in at least one embodiment, surround camera(s) 1274 (e.g., four surround cameras 1274 as illustrated in FIG. 12B) could be positioned on vehicle 1200. In at least one embodiment, surround camera(s) 1274 may include, without limitation, any number and combination of wide-view camera(s) 1270, fisheye camera(s), 360 degree camera(s), and/or like. For instance, in at least one embodiment, four fisheye cameras may be positioned on front, rear, and sides of vehicle 1200. In at least one embodiment, vehicle 1200 may use three surround camera(s) 1274 (e.g., left, right, and rear), and may leverage one or more other camera(s) (e.g., a forward-facing camera) as a fourth surround-view camera.

In at least one embodiment, cameras with a field of view that include portions of environment to rear of vehicle 1200 (e.g., rear-view cameras) may be used for park assistance, surround view, rear collision warnings, and creating and updating occupancy grid. In at least one embodiment, a wide variety of cameras may be used including, but not limited to, cameras that are also suitable as a front-facing camera(s) (e.g., long-range cameras 1298 and/or mid-range camera(s) 1276, stereo camera(s) 1268), infrared camera(s) 1272, etc.), as described herein.

In at least one embodiment, at least one component shown or described with respect to FIG. 12B is utilized to implement techniques and/or functions described in connection with one or more of FIGS. 1-10. In at least one embodiment, techniques and/or functions described in connection with FIGS. 1-10 may receive signals from vehicle 1200 for its autonomous operation and/or may be used to provide a remote operator an ability to control vehicle 1200 remotely. In at least one embodiment, techniques and/or functions described in connection with FIGS. 1-10 may perform channel estimation, coherent combination, and/or signal detection for one or more signals received from vehicle 1200 that do not have a corresponding reference signal.

Figure 12C:
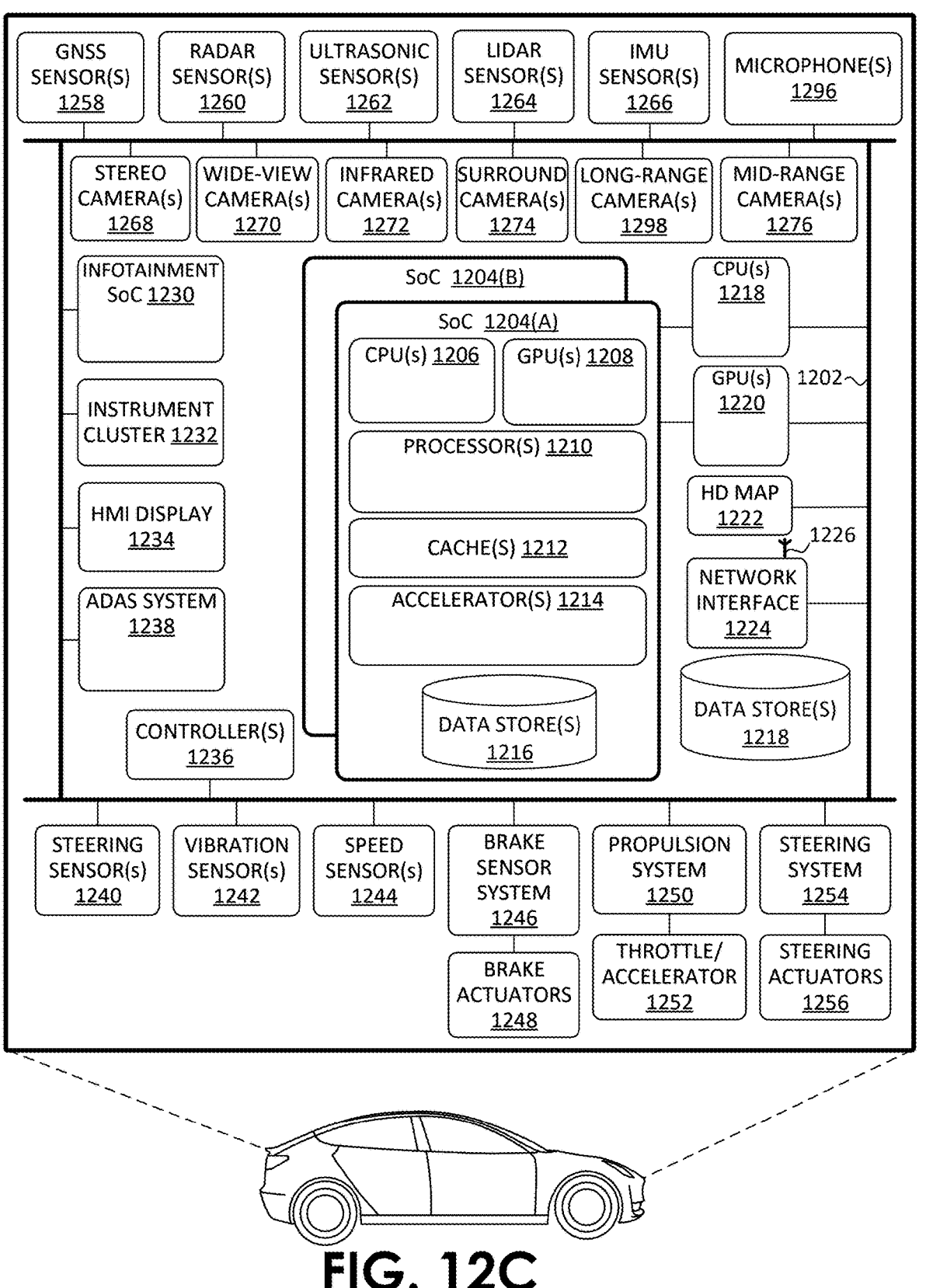
FIG. 12C is a block diagram illustrating an example system architecture for the autonomous vehicle of FIG. 12A, according to at least one embodiment.

FIG. 12C is a block diagram illustrating an example system architecture for autonomous vehicle 1200 of FIG. 12A, according to at least one embodiment. In at least one embodiment, each of components, features, and systems of vehicle 1200 in FIG. 12C are illustrated as being connected via a bus 1202. In at least one embodiment, bus 1202 may include, without limitation, a CAN data interface (alternatively referred to herein as a "CAN bus"). In at least one embodiment, a CAN may be a network inside vehicle 1200 used to aid in control of various features and functionality of vehicle 1200, such as actuation of brakes, acceleration, braking, steering, windshield wipers, etc. In at least one embodiment, bus 1202 may be configured to have dozens or even hundreds of nodes, each with its own unique identifier (e.g., a CAN ID). In at least one embodiment, bus 1202 may be read to find steering wheel angle, ground speed, engine revolutions per minute ("RPMs"), button positions, and/or other vehicle status indicators. In at least one embodiment, bus 1202 may be a CAN bus that is ASIL B compliant.

In at least one embodiment, in addition to, or alternatively from CAN, FlexRay and/or Ethernet may be used. In at least one embodiment, there may be any number of busses 1202, which may include, without limitation, zero or more CAN busses, zero or more FlexRay busses, zero or more Ethernet busses, and/or zero or more other types of busses using a different protocol. In at least one embodiment, two or more busses 1202 may be used to perform different functions, and/or may be used for redundancy. For example, a first bus 1202 may be used for collision avoidance functionality and a second bus 1202 may be used for actuation control. In at least one embodiment, each bus 1202 may communicate with any of components of vehicle 1200, and two or more busses 1202 may communicate with same components. In at least one embodiment, each of any number of system(s) on chip(s) ("SoC(s)") 1204, each of controller(s) 1236, and/or each computer within vehicle may have access to same input data (e.g., inputs from sensors of vehicle 1200), and may be connected to a common bus, such CAN bus.

In at least one embodiment, vehicle 1200 may include one or more controller(s) 1236, such as those described herein with respect to FIG. 12A. In at least one embodiment, controller(s) 1236 may be used for a variety of functions. In at least one embodiment, controller(s) 1236 may be coupled to any of various other components and systems of vehicle 1200, and may be used for control of vehicle 1200, artificial intelligence of vehicle 1200, infotainment for vehicle 1200, and/or like.

In at least one embodiment, vehicle 1200 may include any number of SoCs 1204. Each of SoCs 1204 may include, without limitation, central processing units ("CPU(s)") 1206, graphics processing units ("GPU(s)") 1208, processor(s) 1210, cache(s) 1212, accelerator(s) 1214, data store(s) 1216, and/or other components and features not illustrated. In at least one embodiment, SoC(s) 1204 may be used to control vehicle 1200 in a variety of platforms and systems. For example, in at least one embodiment, SoC(s) 1204 may be combined in a system (e.g., system of vehicle 1200) with a High Definition ("HD") map 1222 which may obtain map refreshes and/or updates via network interface 1224 from one or more servers (not shown in FIG. 12C).

In at least one embodiment, CPU(s) 1206 may include a CPU cluster or CPU complex (alternatively referred to herein as a "CCPLEX"). In at least one embodiment, CPU(s) 1206 may include multiple cores and/or level two ("L2") caches. For instance, in at least one embodiment, CPU(s) 1206 may include eight cores in a coherent multi-processor configuration. In at least one embodiment, CPU(s) 1206 may include four dual-core clusters where each cluster has a dedicated L2 cache (e.g., a 2 MB L2 cache). In at least one embodiment, CPU(s) 1206 (e.g., CCPLEX) may be configured to support simultaneous cluster operation enabling any combination of clusters of CPU(s) 1206 to be active at any given time.

In at least one embodiment, one or more of CPU(s) 1206 may implement power management capabilities that include, without limitation, one or more of following features: individual hardware blocks may be clock-gated automatically when idle to save dynamic power; each core clock may be gated when core is not actively executing instructions due to execution of Wait for Interrupt ("WFI")/Wait for Event ("WFE") instructions; each core may be independently power-gated; each core cluster may be independently clock-gated when all cores are clock-gated or power-gated; and/or each core cluster may be independently power-gated when all cores are power-gated. In at least one embodiment, CPU(s) 1206 may further implement an enhanced algorithm for managing power states, where allowed power states and expected wakeup times are specified, and hardware/microcode determines best power state to enter for core, cluster, and CCPLEX. In at least one embodiment, processing cores may support simplified power state entry sequences in software with work offloaded to microcode.

In at least one embodiment, GPU(s) 1208 may include an integrated GPU (alternatively referred to herein as an "iGPU"). In at least one embodiment, GPU(s) 1208 may be programmable and may be efficient for parallel workloads. In at least one embodiment, GPU(s) 1208, in at least one embodiment, may use an enhanced tensor instruction set. In on embodiment, GPU(s) 1208 may include one or more streaming microprocessors, where each streaming microprocessor may include a level one ("L1") cache (e.g., an L1 cache with at least 96 KB storage capacity), and two or more of streaming microprocessors may share an L2 cache (e.g., an L2 cache with a 512 KB storage capacity). In at least one embodiment, GPU(s) 1208 may include at least eight streaming microprocessors. In at least one embodiment, GPU(s) 1208 may use compute application programming interface(s) (API(s)). In at least one embodiment, GPU(s) 1208 may use one or more parallel computing platforms and/or programming models (e.g., NVIDIA's CUDA).

In at least one embodiment, one or more of GPU(s) 1208 may be power-optimized for best performance in automotive and embedded use cases. For example, in on embodiment, GPU(s) 1208 could be fabricated on a Fin field-effect transistor ("FinFET"). In at least one embodiment, each streaming microprocessor may incorporate a number of mixed-precision processing cores partitioned into multiple blocks. For example, and without limitation, 64 PF32 cores and 32 PF64 cores could be partitioned into four processing blocks. In at least one embodiment, each processing block could be allocated 16 FP32 cores, 8 FP64 cores, 16 INT32 cores, two mixed-precision NVIDIA TENSOR COREs for deep learning matrix arithmetic, a level zero ("L0") instruction cache, a warp scheduler, a dispatch unit, and/or a 64 KB register file. In at least one embodiment, streaming microprocessors may include independent parallel integer and floating-point data paths to provide for efficient execution of workloads with a mix of computation and addressing calculations. In at least one embodiment, streaming microprocessors may include independent thread scheduling capability to enable finer-grain synchronization and cooperation between parallel threads. In at least one embodiment, streaming microprocessors may include a combined L1 data cache and shared memory unit in order to improve performance while simplifying programming.

In at least one embodiment, one or more of GPU(s) 1208 may include a high bandwidth memory ("HBM) and/or a 16 GB HBM2 memory subsystem to provide, in some examples, about 900 GB/second peak memory bandwidth. In at least one embodiment, in addition to, or alternatively from, HBM memory, a synchronous graphics random-access memory ("SGRAM") may be used, such as a graphics double data rate type five synchronous random-access memory ("GDDR5").

In at least one embodiment, GPU(s) 1208 may include unified memory technology. In at least one embodiment, address translation services ("ATS") support may be used to allow GPU(s) 1208 to access CPU(s) 1206 page tables directly. In at least one embodiment, embodiment, when GPU(s) 1208 memory management unit ("MMU") experiences a miss, an address translation request may be transmitted to CPU(s) 1206. In response, CPU(s) 1206 may look in its page tables for virtual-to-physical mapping for address and transmits translation back to GPU(s) 1208, in at least one embodiment. In at least one embodiment, unified memory technology may allow a single unified virtual address space for memory of both CPU(s) 1206 and GPU(s) 1208, thereby simplifying GPU(s) 1208 programming and porting of applications to GPU(s) 1208.

In at least one embodiment, GPU(s) 1208 may include any number of access counters that may keep track of frequency of access of GPU(s) 1208 to memory of other processors. In at least one embodiment, access counter(s) may help ensure that memory pages are moved to physical memory of processor that is accessing pages most frequently, thereby improving efficiency for memory ranges shared between processors.

In at least one embodiment, one or more of SoC(s) 1204 may include any number of cache(s) 1212, including those described herein. For example, in at least one embodiment, cache(s) 1212 could include a level three ("L3") cache that is available to both CPU(s) 1206 and GPU(s) 1208 (e.g., that is connected to both CPU(s) 1206 and GPU(s) 1208). In at least one embodiment, cache(s) 1212 may include a write-back cache that may keep track of states of lines, such as by using a cache coherence protocol (e.g., MEI, MESI, MSI, etc.). In at least one embodiment, L3 cache may include 4 MB or more, depending on embodiment, although smaller cache sizes may be used.

In at least one embodiment, one or more of SoC(s) 1204 may include one or more accelerator(s) 1214 (e.g., hardware accelerators, software accelerators, or a combination thereof). In at least one embodiment, SoC(s) 1204 may include a hardware acceleration cluster that may include optimized hardware accelerators and/or large on-chip memory. In at least one embodiment, large on-chip memory (e.g., 4 MB of SRAM), may enable hardware acceleration cluster to accelerate neural networks and other calculations. In at least one embodiment, hardware acceleration cluster may be used to complement GPU(s) 1208 and to off-load some of tasks of GPU(s) 1208 (e.g., to free up more cycles of GPU(s) 1208 for performing other tasks). In at least one embodiment, accelerator(s) 1214 could be used for targeted workloads (e.g., perception, convolutional neural networks ("CNNs"), recurrent neural networks ("RNNs"), etc.) that are stable enough to be amenable to acceleration. In at least one embodiment, a CNN may include a region-based or regional convolutional neural networks ("RCNNs") and Fast RCNNs (e.g., as used for object detection) or other type of CNN.

In at least one embodiment, accelerator(s) 1214 (e.g., hardware acceleration cluster) may include a deep learning accelerator(s) ("DLA). DLA(s) may include, without limitation, one or more Tensor processing units ("TPUs) that may be configured to provide an additional ten trillion operations per second for deep learning applications and inferencing. In at least one embodiment, TPUs may be accelerators configured to, and optimized for, performing image processing functions (e.g., for CNNs, RCNNs, etc.). DLA(s) may further be optimized for a specific set of neural network types and floating point operations, as well as inferencing. In at least one embodiment, design of DLA(s) may provide more performance per millimeter than a typical general-purpose GPU, and typically vastly exceeds performance of a CPU. In at least one embodiment, TPU(s) may perform several functions, including a single-instance convolution function, supporting, for example, INT8, INT16, and FP16 data types for both features and weights, as well as post-processor functions. In at least one embodiment, DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones 1296; a CNN for facial recognition and vehicle owner identification using data from camera sensors; and/or a CNN for security and/or safety related events.

In at least one embodiment, DLA(s) may perform any function of GPU(s) 1208, and by using an inference accelerator, for example, a designer may target either DLA(s) or GPU(s) 1208 for any function. For example, in at least one embodiment, designer may focus processing of CNNs and floating point operations on DLA(s) and leave other functions to GPU(s) 1208 and/or other accelerator(s) 1214.

In at least one embodiment, accelerator(s) 1214 (e.g., hardware acceleration cluster) may include a programmable vision accelerator(s) ("PVA"), which may alternatively be referred to herein as a computer vision accelerator. In at least one embodiment, PVA(s) may be designed and configured to accelerate computer vision algorithms for advanced driver assistance system ("ADAS") 1238, autonomous driving, augmented reality ("AR") applications, and/or virtual reality ("VR") applications. PVA(s) may provide a balance between performance and flexibility. For example, in at least one embodiment, each PVA(s) may include, for example and without limitation, any number of reduced instruction set computer ("RISC") cores, direct memory access ("DMA"), and/or any number of vector processors.

In at least one embodiment, RISC cores may interact with image sensors (e.g., image sensors of any of cameras described herein), image signal processor(s), and/or like. In at least one embodiment, each of RISC cores may include any amount of memory. In at least one embodiment, RISC cores may use any of a number of protocols, depending on embodiment. In at least one embodiment, RISC cores may execute a real-time operating system ("RTOS"). In at least one embodiment, RISC cores may be implemented using one or more integrated circuit devices, application specific integrated circuits ("ASICs"), and/or memory devices. For example, in at least one embodiment, RISC cores could include an instruction cache and/or a tightly coupled RAM.

In at least one embodiment, DMA may enable components of PVA(s) to access system memory independently of CPU(s) 1206. In at least one embodiment, DMA may support any number of features used to provide optimization to PVA including, but not limited to, supporting multi-dimensional addressing and/or circular addressing. In at least one embodiment, DMA may support up to six or more dimensions of addressing, which may include, without limitation, block width, block height, block depth, horizontal block stepping, vertical block stepping, and/or depth stepping.

In at least one embodiment, vector processors may be programmable processors that may be designed to efficiently and flexibly execute programming for computer vision algorithms and provide signal processing capabilities. In at least one embodiment, PVA may include a PVA core and two vector processing subsystem partitions. In at least one embodiment, PVA core may include a processor subsystem, DMA engine(s) (e.g., two DMA engines), and/or other peripherals. In at least one embodiment, vector processing subsystem may operate as a primary processing engine of PVA and may include a vector processing unit ("VPU"), an instruction cache, and/or vector memory (e.g., "VMEM").

In at least one embodiment, VPU core may include a digital signal processor such as, for example, a single instruction, multiple data ("SIMD"), very long instruction word ("VLIW") digital signal processor. In at least one embodiment, a combination of SIMD and VLIW may enhance throughput and speed.

In at least one embodiment, each of vector processors may include an instruction cache and may be coupled to dedicated memory. As a result, in at least one embodiment, each of vector processors may be configured to execute independently of other vector processors. In at least one embodiment, vector processors that are included in a particular PVA may be configured to employ data parallelism. For instance, in at least one embodiment, plurality of vector processors included in a single PVA may execute same computer vision algorithm, but on different regions of an image. In at least one embodiment, vector processors included in a particular PVA may simultaneously execute different computer vision algorithms, on same image, or even execute different algorithms on sequential images or portions of an image. In at least one embodiment, among other things, any number of PVAs may be included in hardware acceleration cluster and any number of vector processors may be included in each of PVAs. In at least one embodiment, PVA(s) may include additional error correcting code ("ECC") memory, to enhance overall system safety.

In at least one embodiment, accelerator(s) 1214 (e.g., hardware acceleration cluster) may include a computer vision network on-chip and static random-access memory ("SRAM"), for providing a high-bandwidth, low latency SRAM for accelerator(s) 1214. In at least one embodiment, on-chip memory may include at least 4 MB SRAM, consisting of, for example and without limitation, eight field-configurable memory blocks, that may be accessible by both PVA and DLA. In at least one embodiment, each pair of memory blocks may include an advanced peripheral bus ("APB") interface, configuration circuitry, a controller, and a multiplexer. In at least one embodiment, any type of memory may be used. In at least one embodiment, PVA and DLA may access memory via a backbone that provides PVA and DLA with high-speed access to memory. In at least one embodiment, backbone may include a computer vision network on-chip that interconnects PVA and DLA to memory (e.g., using APB).

In at least one embodiment, computer vision network on-chip may include an interface that determines, before transmission of any control signal/address/data, that both PVA and DLA provide ready and valid signals. In at least one embodiment, an interface may provide for separate phases and separate channels for transmitting control signals/addresses/data, as well as burst-type communications for continuous data transfer. In at least one embodiment, an interface may comply with International Organization for Standardization ("ISO") 26262 or International Electrotechnical Commission ("IEC") 61508 standards, although other standards and protocols may be used.

In at least one embodiment, one or more of SoC(s) 1204 may include a real-time ray-tracing hardware accelerator. In at least one embodiment, real-time ray-tracing hardware accelerator may be used to quickly and efficiently determine positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

In at least one embodiment, accelerator(s) 1214 (e.g., hardware accelerator cluster) have a wide array of uses for autonomous driving. In at least one embodiment, PVA may be a programmable vision accelerator that may be used for key processing stages in ADAS and autonomous vehicles. In at least one embodiment, PVA's capabilities are a good match for algorithmic domains needing predictable processing, at low power and low latency. In other words, PVA performs well on semi-dense or dense regular computation, even on small data sets, which need predictable run-times with low latency and low power. In at least one embodiment, autonomous vehicles, such as vehicle 1200, PVAs are designed to run classic computer vision algorithms, as they are efficient at object detection and operating on integer math.

For example, according to at least one embodiment of technology, PVA is used to perform computer stereo vision. In at least one embodiment, semi-global matching-based algorithm may be used in some examples, although this is not intended to be limiting. In at least one embodiment, applications for Level 3-5 autonomous driving use motion estimation/stereo matching on-the-fly (e.g., structure from motion, pedestrian recognition, lane detection, etc.). In at least one embodiment, PVA may perform computer stereo vision function on inputs from two monocular cameras.

In at least one embodiment, PVA may be used to perform dense optical flow. For example, in at least one embodiment, PVA could process raw RADAR data (e.g., using a 4D Fast Fourier Transform) to provide processed RADAR data. In at least one embodiment, PVA is used for time-of-flight depth processing, by processing raw time of flight data to provide processed time of flight data, for example.

In at least one embodiment, DLA may be used to run any type of network to enhance control and driving safety, including for example and without limitation, a neural network that outputs a measure of confidence for each object detection. In at least one embodiment, confidence may be represented or interpreted as a probability, or as providing a relative "weight" of each detection compared to other detections. In at least one embodiment, confidence enables a system to make further decisions regarding which detections should be considered as true positive detections rather than false positive detections. In at least one embodiment, a system may set a threshold value for confidence and consider only detections exceeding threshold value as true positive detections. In an embodiment in which an automatic emergency braking ("AEB") system is used, false positive detections would cause vehicle to automatically perform emergency braking, which is obviously undesirable. In at least one embodiment, highly confident detections may be considered as triggers for AEB. In at least one embodiment, DLA may run a neural network for regressing confidence value. In at least one embodiment, neural network may take as its input at least some subset of parameters, such as bounding box dimensions, ground plane estimate obtained (e.g., from another subsystem), output from IMU sensor(s) 1266 that correlates with vehicle 1200 orientation, distance, 3D location estimates of object obtained from neural network and/or other sensors (e.g., LIDAR sensor(s) 1264 or RADAR sensor(s) 1260), among others.

In at least one embodiment, one or more of SoC(s) 1204 may include data store(s) 1216 (e.g., memory). In at least one embodiment, data store(s) 1216 may be on-chip memory of SoC(s) 1204, which may store neural networks to be executed on GPU(s) 1208 and/or DLA. In at least one embodiment, data store(s) 1216 may be large enough in capacity to store multiple instances of neural networks for redundancy and safety. In at least one embodiment, data store(s) 1212 may comprise L2 or L3 cache(s).

In at least one embodiment, one or more of SoC(s) 1204 may include any number of processor(s) 1210 (e.g., embedded processors). In at least one embodiment, processor(s) 1210 may include a boot and power management processor that may be a dedicated processor and subsystem to handle boot power and management functions and related security enforcement. In at least one embodiment, boot and power management processor may be a part of SoC(s) 1204 boot sequence and may provide runtime power management services. In at least one embodiment, boot power and management processor may provide clock and voltage programming, assistance in system low power state transitions, management of SoC(s) 1204 thermals and temperature sensors, and/or management of SoC(s) 1204 power states. In at least one embodiment, each temperature sensor may be implemented as a ring-oscillator whose output frequency is proportional to temperature, and SoC(s) 1204 may use ring-oscillators to detect temperatures of CPU(s) 1206, GPU(s) 1208, and/or accelerator(s) 1214. In at least one embodiment, if temperatures are determined to exceed a threshold, then boot and power management processor may enter a temperature fault routine and put SoC(s) 1204 into a lower power state and/or put vehicle 1200 into a chauffeur to safe stop mode (e.g., bring vehicle 1200 to a safe stop).

In at least one embodiment, processor(s) 1210 may further include a set of embedded processors that may serve as an audio processing engine. In at least one embodiment, audio processing engine may be an audio subsystem that enables full hardware support for multi-channel audio over multiple interfaces, and a broad and flexible range of audio I/O interfaces. In at least one embodiment, audio processing engine is a dedicated processor core with a digital signal processor with dedicated RAM.

In at least one embodiment, processor(s) 1210 may further include an always on processor engine that may provide necessary hardware features to support low power sensor management and wake use cases. In at least one embodiment, always on processor engine may include, without limitation, a processor core, a tightly coupled RAM, supporting peripherals (e.g., timers and interrupt controllers), various I/O controller peripherals, and routing logic.

In at least one embodiment, processor(s) 1210 may further include a safety cluster engine that includes, without limitation, a dedicated processor subsystem to handle safety management for automotive applications. In at least one embodiment, safety cluster engine may include, without limitation, two or more processor cores, a tightly coupled RAM, support peripherals (e.g., timers, an interrupt controller, etc.), and/or routing logic. In a safety mode, two or more cores may operate, in at least one embodiment, in a lockstep mode and function as a single core with comparison logic to detect any differences between their operations. In at least one embodiment, processor(s) 1210 may further include a real-time camera engine that may include, without limitation, a dedicated processor subsystem for handling real-time camera management. In at least one embodiment, processor(s) 1210 may further include a high-dynamic range signal processor that may include, without limitation, an image signal processor that is a hardware engine that is part of camera processing pipeline.

In at least one embodiment, processor(s) 1210 may include a video image compositor that may be a processing block (e.g., implemented on a microprocessor) that implements video post-processing functions needed by a video playback application to produce final image for player window. In at least one embodiment, video image compositor may perform lens distortion correction on wide-view camera(s) 1270, surround camera(s) 1274, and/or on in-cabin monitoring camera sensor(s). In at least one embodiment, in-cabin monitoring camera sensor(s) are preferably monitored by a neural network running on another instance of SoC 1204, configured to identify in cabin events and respond accordingly. In at least one embodiment, an in-cabin system may perform, without limitation, lip reading to activate cellular service and place a phone call, dictate emails, change vehicle's destination, activate or change vehicle's infotainment system and settings, or provide voice-activated web surfing. In at least one embodiment, certain functions are available to driver when vehicle is operating in an autonomous mode and are disabled otherwise.

In at least one embodiment, video image compositor may include enhanced temporal noise reduction for both spatial and temporal noise reduction. For example, in at least one embodiment, where motion occurs in a video, noise reduction weights spatial information appropriately, decreasing weight of information provided by adjacent frames. In at least one embodiment, where an image or portion of an image does not include motion, temporal noise reduction performed by video image compositor may use information from previous image to reduce noise in current image.

In at least one embodiment, video image compositor may also be configured to perform stereo rectification on input stereo lens frames. In at least one embodiment, video image compositor may further be used for user interface composition when operating system desktop is in use, and GPU(s) 1208 are not required to continuously render new surfaces. In at least one embodiment, when GPU(s) 1208 are powered on and active doing 3D rendering, video image compositor may be used to offload GPU(s) 1208 to improve performance and responsiveness.

In at least one embodiment, one or more of SoC(s) 1204 may further include a mobile industry processor interface ("MIPI") camera serial interface for receiving video and input from cameras, a high-speed interface, and/or a video input block that may be used for camera and related pixel input functions. In at least one embodiment, one or more of SoC(s) 1204 may further include an input/output controller(s) that may be controlled by software and may be used for receiving I/O signals that are uncommitted to a specific role.

In at least one embodiment, one or more of SoC(s) 1204 may further include a broad range of peripheral interfaces to enable communication with peripherals, audio encoders/decoders ("codecs"), power management, and/or other devices. SoC(s) 1204 may be used to process data from cameras (e.g., connected over Gigabit Multimedia Serial Link and Ethernet), sensors (e.g., LIDAR sensor(s) 1264, RADAR sensor(s) 1260, etc. that may be connected over Ethernet), data from bus 1202 (e.g., speed of vehicle 1200, steering wheel position, etc.), data from GNSS sensor(s) 1258 (e.g., connected over Ethernet or CAN bus), etc. In at least one embodiment, one or more of SoC(s) 1204 may further include dedicated high-performance mass storage controllers that may include their own DMA engines, and that may be used to free CPU(s) 1206 from routine data management tasks.

In at least one embodiment, SoC(s) 1204 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. In at least one embodiment, SoC(s) 1204 may be faster, more reliable, and even more energy-efficient and space-efficient than conventional systems. For example, in at least one embodiment, accelerator(s) 1214, when combined with CPU(s) 1206, GPU(s) 1208, and data store(s) 1216, may provide for a fast, efficient platform for level 3-5 autonomous vehicles.

In at least one embodiment, computer vision algorithms may be executed on CPUs, which may be configured using high-level programming language, such as C programming language, to execute a wide variety of processing algorithms across a wide variety of visual data. However, in at least one embodiment, CPUs are oftentimes unable to meet performance requirements of many computer vision applications, such as those related to execution time and power consumption, for example. In at least one embodiment, many CPUs are unable to execute complex object detection algorithms in real-time, which is used in in-vehicle ADAS applications and in practical Level 3-5 autonomous vehicles.

Embodiments described herein allow for multiple neural networks to be performed simultaneously and/or sequentially, and for results to be combined together to enable Level 3-5 autonomous driving functionality. For example, in at least one embodiment, a CNN executing on DLA or discrete GPU (e.g., GPU(s) 1220) may include text and word recognition, allowing supercomputer to read and understand traffic signs, including signs for which neural network has not been specifically trained. In at least one embodiment, DLA may further include a neural network that is able to identify, interpret, and provide semantic understanding of sign, and to pass that semantic understanding to path planning modules running on CPU Complex.

In at least one embodiment, multiple neural networks may be run simultaneously, as for Level 3, 4, or 5 driving. For example, in at least one embodiment, a warning sign consisting of "Caution: flashing lights indicate icy conditions," along with an electric light, may be independently or collectively interpreted by several neural networks. In at least one embodiment, sign itself may be identified as a traffic sign by a first deployed neural network (e.g., a neural network that has been trained), text "flashing lights indicate icy conditions" may be interpreted by a second deployed neural network, which informs vehicle's path planning software (preferably executing on CPU Complex) that when flashing lights are detected, icy conditions exist. In at least one embodiment, flashing light may be identified by operating a third deployed neural network over multiple frames, informing vehicle's path-planning software of presence (or absence) of flashing lights. In at least one embodiment, all three neural networks may run simultaneously, such as within DLA and/or on GPU(s) 1208.

In at least one embodiment, a CNN for facial recognition and vehicle owner identification may use data from camera sensors to identify presence of an authorized driver and/or owner of vehicle 1200. In at least one embodiment, an always on sensor processing engine may be used to unlock vehicle when owner approaches driver door and turn on lights, and, in security mode, to disable vehicle when owner leaves vehicle. In this way, SoC(s) 1204 provide for security against theft and/or carjacking.

In at least one embodiment, a CNN for emergency vehicle detection and identification may use data from microphones 1296 to detect and identify emergency vehicle sirens. In at least one embodiment, SoC(s) 1204 use CNN for classifying environmental and urban sounds, as well as classifying visual data. In at least one embodiment, CNN running on DLA is trained to identify relative closing speed of emergency vehicle (e.g., by using Doppler effect). In at least one embodiment, CNN may also be trained to identify emergency vehicles specific to local area in which vehicle is operating, as identified by GNSS sensor(s) 1258. In at least one embodiment, when operating in Europe, CNN will seek to detect European sirens, and when in United States CNN will seek to identify only North American sirens. In at least one embodiment, once an emergency vehicle is detected, a control program may be used to execute an emergency vehicle safety routine, slowing vehicle, pulling over to side of road, parking vehicle, and/or idling vehicle, with assistance of ultrasonic sensor(s) 1262, until emergency vehicle(s) passes.

In at least one embodiment, vehicle 1200 may include CPU(s) 1218 (e.g., discrete CPU(s), or dCPU(s)), that may be coupled to SoC(s) 1204 via a high-speed interconnect (e.g., PCIe). In at least one embodiment, CPU(s) 1218 may include an X86 processor, for example. CPU(s) 1218 may be used to perform any of a variety of functions, including arbitrating potentially inconsistent results between ADAS sensors and SoC(s) 1204, and/or monitoring status and health of controller(s) 1236 and/or an infotainment system on a chip ("infotainment SoC") 1230, for example.

In at least one embodiment, vehicle 1200 may include GPU(s) 1220 (e.g., discrete GPU(s), or dGPU(s)), that may be coupled to SoC(s) 1204 via a high-speed interconnect (e.g., NVIDIA's NVLINK). In at least one embodiment, GPU(s) 1220 may provide additional artificial intelligence functionality, such as by executing redundant and/or different neural networks and may be used to train and/or update neural networks based at least in part on input (e.g., sensor data) from sensors of vehicle 1200.

In at least one embodiment, vehicle 1200 may further include network interface 1224 which may include, without limitation, wireless antenna(s) 1226 (e.g., one or more wireless antennas 1226 for different communication protocols, such as a cellular antenna, a Bluetooth antenna, etc.). In at least one embodiment, network interface 1224 may be used to enable wireless connectivity over Internet with cloud (e.g., with server(s) and/or other network devices), with other vehicles, and/or with computing devices (e.g., client devices of passengers). In at least one embodiment, to communicate with other vehicles, a direct link may be established between vehicle 120 and other vehicle and/or an indirect link may be established (e.g., across networks and over Internet). In at least one embodiment, direct links may be provided using a vehicle-to-vehicle communication link. In at least one embodiment, vehicle-to-vehicle communication link may provide vehicle 1200 information about vehicles in proximity to vehicle 1200 (e.g., vehicles in front of, on side of, and/or behind vehicle 1200). In at least one embodiment, aforementioned functionality may be part of a cooperative adaptive cruise control functionality of vehicle 1200.

In at least one embodiment, network interface 1224 may include an SoC that provides modulation and demodulation functionality and enables controller(s) 1236 to communicate over wireless networks. In at least one embodiment, network interface 1224 may include a radio frequency front-end for up-conversion from baseband to radio frequency, and down conversion from radio frequency to baseband. In at least one embodiment, frequency conversions may be performed in any technically feasible fashion. For example, frequency conversions could be performed through well-known processes, and/or using super-heterodyne processes. In at least one embodiment, radio frequency front end functionality may be provided by a separate chip. In at least one embodiment, network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

In at least one embodiment, vehicle 1200 may further include data store(s) 1228 which may include, without limitation, off-chip (e.g., off SoC(s) 1204) storage. In at least one embodiment, data store(s) 1228 may include, without limitation, one or more storage elements including RAM, SRAM, dynamic random-access memory ("DRAM"), video random-access memory ("VRAM"), Flash, hard disks, and/or other components and/or devices that may store at least one bit of data.

In at least one embodiment, vehicle 1200 may further include GNSS sensor(s) 1258 (e.g., GPS and/or assisted GPS sensors), to assist in mapping, perception, occupancy grid generation, and/or path planning functions. In at least one embodiment, any number of GNSS sensor(s) 1258 may be used, including, for example and without limitation, a GPS using a USB connector with an Ethernet to Serial (e.g., RS-232) bridge.

In at least one embodiment, vehicle 1200 may further include RADAR sensor(s) 1260. RADAR sensor(s) 1260 may be used by vehicle 1200 for long-range vehicle detection, even in darkness and/or severe weather conditions. In at least one embodiment, RADAR functional safety levels may be ASIL B. RADAR sensor(s) 1260 may use CAN and/or bus 1202 (e.g., to transmit data generated by RADAR sensor(s) 1260) for control and to access object tracking data, with access to Ethernet to access raw data in some examples. In at least one embodiment, wide variety of RADAR sensor types may be used. For example, and without limitation, RADAR sensor(s) 1260 may be suitable for front, rear, and side RADAR use. In at least one embodiment, one or more of RADAR sensors(s) 1260 are Pulse Doppler RADAR sensor(s).

In at least one embodiment, RADAR sensor(s) 1260 may include different configurations, such as long-range with narrow field of view, short-range with wide field of view, short-range side coverage, etc. In at least one embodiment, long-range RADAR may be used for adaptive cruise control functionality. In at least one embodiment, long-range RADAR systems may provide a broad field of view realized by two or more independent scans, such as within a 250 m range. In at least one embodiment, RADAR sensor(s) 1260 may help in distinguishing between static and moving objects, and may be used by ADAS system 1238 for emergency brake assist and forward collision warning. In at least one embodiment, sensors 1260 (s) included in a long-range RADAR system may include, without limitation, monostatic multimodal RADAR with multiple (e.g., six or more) fixed RADAR antennae and a high-speed CAN and FlexRay interface. In at least one embodiment, with six antennae, central four antennae may create a focused beam pattern, designed to record vehicle's 1200 surroundings at higher speeds with minimal interference from traffic in adjacent lanes. In at least one embodiment, other two antennae may expand field of view, making it possible to quickly detect vehicles entering or leaving vehicle's 1200 lane.

In at least one embodiment, mid-range RADAR systems may include, as an example, a range of up to 160 m (front) or 80 m (rear), and a field of view of up to 42 degrees (front) or 150 degrees (rear). In at least one embodiment, short-range RADAR systems may include, without limitation, any number of RADAR sensor(s) 1260 designed to be installed at both ends of rear bumper. When installed at both ends of rear bumper, in at least one embodiment, a RADAR sensor system may create two beams that constantly monitor blind spot in rear and next to vehicle. In at least one embodiment, short-range RADAR systems may be used in ADAS system 1238 for blind spot detection and/or lane change assist.

In at least one embodiment, vehicle 1200 may further include ultrasonic sensor(s) 1262. In at least one embodiment, ultrasonic sensor(s) 1262, which may be positioned at front, back, and/or sides of vehicle 1200, may be used for park assist and/or to create and update an occupancy grid. In at least one embodiment, a wide variety of ultrasonic sensor(s) 1262 may be used, and different ultrasonic sensor(s) 1262 may be used for different ranges of detection (e.g., 2.5 m, 4 m). In at least one embodiment, ultrasonic sensor(s) 1262 may operate at functional safety levels of ASIL B.

In at least one embodiment, vehicle 1200 may include LIDAR sensor(s) 1264. LIDAR sensor(s) 1264 may be used for object and pedestrian detection, emergency braking, collision avoidance, and/or other functions. In at least one embodiment, LIDAR sensor(s) 1264 may be functional safety level ASIL B. In at least one embodiment, vehicle 1200 may include multiple LIDAR sensors 1264 (e.g., two, four, six, etc.) that may use Ethernet (e.g., to provide data to a Gigabit Ethernet switch).

In at least one embodiment, LIDAR sensor(s) 1264 may be capable of providing a list of objects and their distances for a 360-degree field of view. In at least one embodiment, commercially available LIDAR sensor(s) 1264 may have an advertised range of approximately 100 m, with an accuracy of 2 cm-3 cm, and with support for a 100 Mbps Ethernet connection, for example. In at least one embodiment, one or more non-protruding LIDAR sensors 1264 may be used. In such an embodiment, LIDAR sensor(s) 1264 may be implemented as a small device that may be embedded into front, rear, sides, and/or corners of vehicle 1200. In at least one embodiment, LIDAR sensor(s) 1264, in such an embodiment, may provide up to a 120-degree horizontal and 35-degree vertical field-of-view, with a 200 m range even for low-reflectivity objects. In at least one embodiment, front-mounted LIDAR sensor(s) 1264 may be configured for a horizontal field of view between 45 degrees and 135 degrees.

In at least one embodiment, LIDAR technologies, such as 3D flash LIDAR, may also be used. 3D Flash LIDAR uses a flash of a laser as a transmission source, to illuminate surroundings of vehicle 1200 up to approximately 200 m. In at least one embodiment, a flash LIDAR unit includes, without limitation, a receptor, which records laser pulse transit time and reflected light on each pixel, which in turn corresponds to range from vehicle 1200 to objects. In at least one embodiment, flash LIDAR may allow for highly accurate and distortion-free images of surroundings to be generated with every laser flash. In at least one embodiment, four flash LIDAR sensors may be deployed, one at each side of vehicle 1200. In at least one embodiment, 3D flash LIDAR systems include, without limitation, a solid-state 3D staring array LIDAR camera with no moving parts other than a fan (e.g., a non-scanning LIDAR device). In at least one embodiment, flash LIDAR device may use a 5 nanosecond class I (eye-safe) laser pulse per frame and may capture reflected laser light in form of 3D range point clouds and co-registered intensity data.

In at least one embodiment, vehicle may further include IMU sensor(s) 1266. In at least one embodiment, IMU sensor(s) 1266 may be located at a center of rear axle of vehicle 1200, in at least one embodiment. In at least one embodiment, IMU sensor(s) 1266 may include, for example and without limitation, accelerometer(s), magnetometer(s), gyroscope(s), magnetic compass(es), and/or other sensor types. In at least one embodiment, such as in six-axis applications, IMU sensor(s) 1266 may include, without limitation, accelerometers and gyroscopes. In at least one embodiment, such as in nine-axis applications, IMU sensor(s) 1266 may include, without limitation, accelerometers, gyroscopes, and magnetometers.

In at least one embodiment, IMU sensor(s) 1266 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. In at least one embodiment, IMU sensor(s) 1266 may enable vehicle 1200 to estimate heading without requiring input from a magnetic sensor by directly observing and correlating changes in velocity from GPS to IMU sensor(s) 1266. In at least one embodiment, IMU sensor(s) 1266 and GNSS sensor(s) 1258 may be combined in a single integrated unit.

In at least one embodiment, vehicle 1200 may include microphone(s) 1296 placed in and/or around vehicle 1200. In at least one embodiment, microphone(s) 1296 may be used for emergency vehicle detection and identification, among other things.

In at least one embodiment, vehicle 1200 may further include any number of camera types, including stereo camera(s) 1268, wide-view camera(s) 1270, infrared camera(s) 1272, surround camera(s) 1274, long-range camera(s) 1298, mid-range camera(s) 1276, and/or other camera types. In at least one embodiment, cameras may be used to capture image data around an entire periphery of vehicle 1200. In at least one embodiment, types of cameras used depends vehicle 1200. In at least one embodiment, any combination of camera types may be used to provide necessary coverage around vehicle 1200. In at least one embodiment, number of cameras may differ depending on embodiment. For example, in at least one embodiment, vehicle 1200 could include six cameras, seven cameras, ten cameras, twelve cameras, or another number of cameras. In at least one embodiment, cameras may support, as an example and without limitation, Gigabit Multimedia Serial Link ("GMSL") and/or Gigabit Ethernet. In at least one embodiment, each of camera(s) is described with more detail previously herein with respect to FIG. 12A and FIG. 12B.

In at least one embodiment, vehicle 1200 may further include vibration sensor(s) 1242. In at least one embodiment, vibration sensor(s) 1242 may measure vibrations of components of vehicle 1200, such as axle(s). For example, in at least one embodiment, changes in vibrations may indicate a change in road surfaces. In at least one embodiment, when two or more vibration sensors 1242 are used, differences between vibrations may be used to determine friction or slippage of road surface (e.g., when difference in vibration is between a power-driven axle and a freely rotating axle).

In at least one embodiment, vehicle 1200 may include ADAS system 1238. ADAS system 1238 may include, without limitation, an SoC, in some examples. In at least one embodiment, ADAS system 1238 may include, without limitation, any number and combination of an autonomous/adaptive/automatic cruise control ("ACC") system, a cooperative adaptive cruise control ("CACC") system, a forward crash warning ("FCW") system, an automatic emergency braking ("AEB") system, a lane departure warning ("LDW)" system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

In at least one embodiment, ACC system may use RADAR sensor(s) 1260, LIDAR sensor(s) 1264, and/or any number of camera(s). In at least one embodiment, ACC system may include a longitudinal ACC system and/or a lateral ACC system. In at least one embodiment, longitudinal ACC system monitors and controls distance to vehicle immediately ahead of vehicle 1200 and automatically adjust speed of vehicle 1200 to maintain a safe distance from vehicles ahead. In at least one embodiment, lateral ACC system performs distance keeping, and advises vehicle 1200 to change lanes when necessary. In at least one embodiment, lateral ACC is related to other ADAS applications such as LC and CW.

In at least one embodiment, CACC system uses information from other vehicles that may be received via network interface 1224 and/or wireless antenna(s) 1226 from other vehicles via a wireless link, or indirectly, over a network connection (e.g., over Internet). In at least one embodiment, direct links may be provided by a vehicle-to-vehicle ("V2V") communication link, while indirect links may be provided by an infrastructure-to-vehicle ("I2V") communication link. In general, V2V communication concept provides information about immediately preceding vehicles (e.g., vehicles immediately ahead of and in same lane as vehicle 1200), while I2V communication concept provides information about traffic further ahead. In at least one embodiment, CACC system may include either or both I2V and V2V information sources. In at least one embodiment, given information of vehicles ahead of vehicle 1200, CACC system may be more reliable, and it has potential to improve traffic flow smoothness and reduce congestion on a road.

In at least one embodiment, FCW system is designed to alert driver to a hazard, so that driver may take corrective action. In at least one embodiment, FCW system uses a front-facing camera and/or RADAR sensor(s) 1260, coupled to a dedicated processor, DSP, FPGA, and/or ASIC, that is electrically coupled to driver feedback, such as a display, speaker, and/or vibrating component. In at least one embodiment, FCW system may provide a warning, such as in form of a sound, visual warning, vibration and/or a quick brake pulse.

In at least one embodiment, AEB system detects an impending forward collision with another vehicle or other object, and may automatically apply brakes if driver does not take corrective action within a specified time or distance parameter. In at least one embodiment, AEB system may use front-facing camera(s) and/or RADAR sensor(s) 1260, coupled to a dedicated processor, DSP, FPGA, and/or ASIC. In at least one embodiment, when AEB system detects a hazard, AEB system typically first alerts driver to take corrective action to avoid collision and, if driver does not take corrective action, AEB system may automatically apply brakes in an effort to prevent, or at least mitigate, impact of predicted collision. In at least one embodiment, AEB system, may include techniques such as dynamic brake support and/or crash imminent braking.

In at least one embodiment, LDW system provides visual, audible, and/or tactile warnings, such as steering wheel or seat vibrations, to alert driver when vehicle 1200 crosses lane markings. In at least one embodiment, LDW system does not activate when driver indicates an intentional lane departure, by activating a turn signal. In at least one embodiment, LDW system may use front-side facing cameras, coupled to a dedicated processor, DSP, FPGA, and/or ASIC, that is electrically coupled to driver feedback, such as a display, speaker, and/or vibrating component. In at least one embodiment, LKA system is a variation of LDW system. LKA system provides steering input or braking to correct vehicle 1200 if vehicle 1200 starts to exit lane.

In at least one embodiment, BSW system detects and warns driver of vehicles in an automobile's blind spot. In at least one embodiment, BSW system may provide a visual, audible, and/or tactile alert to indicate that merging or changing lanes is unsafe. In at least one embodiment, BSW system may provide an additional warning when driver uses a turn signal. In at least one embodiment, BSW system may use rear-side facing camera(s) and/or RADAR sensor(s) 1260, coupled to a dedicated processor, DSP, FPGA, and/or ASIC, that is electrically coupled to driver feedback, such as a display, speaker, and/or vibrating component.

In at least one embodiment, RCTW system may provide visual, audible, and/or tactile notification when an object is detected outside rear-camera range when vehicle 1200 is backing up. In at least one embodiment, RCTW system includes AEB system to ensure that vehicle brakes are applied to avoid a crash. In at least one embodiment, RCTW system may use one or more rear-facing RADAR sensor(s) 1260, coupled to a dedicated processor, DSP, FPGA, and/or ASIC, that is electrically coupled to driver feedback, such as a display, speaker, and/or vibrating component.

In at least one embodiment, conventional ADAS systems may be prone to false positive results which may be annoying and distracting to a driver, but typically are not catastrophic, because conventional ADAS systems alert driver and allow driver to decide whether a safety condition truly exists and act accordingly. In at least one embodiment, vehicle 1200 itself decides, in case of conflicting results, whether to heed result from a primary computer or a secondary computer (e.g., first controller 1236 or second controller 1236). For example, in at least one embodiment, ADAS system 1238 may be a backup and/or secondary computer for providing perception information to a backup computer rationality module. In at least one embodiment, backup computer rationality monitor may run a redundant diverse software on hardware components to detect faults in perception and dynamic driving tasks. In at least one embodiment, outputs from ADAS system 1238 may be provided to a supervisory MCU. In at least one embodiment, if outputs from primary computer and secondary computer conflict, supervisory MCU determines how to reconcile conflict to ensure safe operation.

In at least one embodiment, primary computer may be configured to provide supervisory MCU with a confidence score, indicating primary computer's confidence in chosen result. In at least one embodiment, if confidence score exceeds a threshold, supervisory MCU may follow primary computer's direction, regardless of whether secondary computer provides a conflicting or inconsistent result. In at least one embodiment, where confidence score does not meet threshold, and where primary and secondary computer indicate different results (e.g., a conflict), supervisory MCU may arbitrate between computers to determine appropriate outcome.

In at least one embodiment, supervisory MCU may be configured to run a neural network(s) that is trained and configured to determine, based at least in part on outputs from primary computer and secondary computer, conditions under which secondary computer provides false alarms. In at least one embodiment, neural network(s) in supervisory MCU may learn when secondary computer's output may be trusted, and when it cannot. For example, in at least one embodiment, when secondary computer is a RADAR-based FCW system, a neural network(s) in supervisory MCU may learn when FCW system is identifying metallic objects that are not, in fact, hazards, such as a drainage grate or manhole cover that triggers an alarm. In at least one embodiment, when secondary computer is a camera-based LDW system, a neural network in supervisory MCU may learn to override LDW when bicyclists or pedestrians are present and a lane departure is, in fact, safest maneuver. In at least one embodiment, supervisory MCU may include at least one of a DLA or GPU suitable for running neural network(s) with associated memory. In at least one embodiment, supervisory MCU may comprise and/or be included as a component of SoC(s) 1204.

In at least one embodiment, ADAS system 1238 may include a secondary computer that performs ADAS functionality using traditional rules of computer vision. In at least one embodiment, secondary computer may use classic computer vision rules (if-then), and presence of a neural network(s) in supervisory MCU may improve reliability, safety, and performance. For example, in at least one embodiment, diverse implementation and intentional non-identity makes overall system more fault-tolerant, especially to faults caused by software (or software-hardware interface) functionality. For example, in at least one embodiment, if there is a software bug or error in software running on primary computer, and non-identical software code running on secondary computer provides same overall result, then supervisory MCU may have greater confidence that overall result is correct, and bug in software or hardware on primary computer is not causing material error.

In at least one embodiment, output of ADAS system 1238 may be fed into primary computer's perception block and/or primary computer's dynamic driving task block. For example, in at least one embodiment, if ADAS system 1238 indicates a forward crash warning due to an object immediately ahead, perception block may use this information when identifying objects. In at least one embodiment, secondary computer may have its own neural network which is trained and thus reduces risk of false positives, as described herein.

In at least one embodiment, vehicle 1200 may further include infotainment SoC 1230 (e.g., an in-vehicle infotainment system (IVI)). Although illustrated and described as an SoC, infotainment system 1230, in at least one embodiment, may not be an SoC, and may include, without limitation, two or more discrete components. In at least one embodiment, infotainment SoC 1230 may include, without limitation, a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to vehicle 1200. For example, infotainment SoC 1230 could include radios, disk players, navigation systems, video players, USB and Bluetooth connectivity, carputers, in-car entertainment, WiFi, steering wheel audio controls, hands free voice control, a heads-up display ("HUD"), HMI display 1234, a telematics device, a control panel (e.g., for controlling and/or interacting with various components, features, and/or systems), and/or other components. In at least one embodiment, infotainment SoC 1230 may further be used to provide information (e.g., visual and/or audible) to user(s) of vehicle, such as information from ADAS system 1238, autonomous driving information such as planned vehicle maneuvers, trajectories, surrounding environment information (e.g., intersection information, vehicle information, road information, etc.), and/or other information.

In at least one embodiment, infotainment SoC 1230 may include any amount and type of GPU functionality. In at least one embodiment, infotainment SoC 1230 may communicate over bus 1202 (e.g., CAN bus, Ethernet, etc.) with other devices, systems, and/or components of vehicle 1200. In at least one embodiment, infotainment SoC 1230 may be coupled to a supervisory MCU such that GPU of infotainment system may perform some self-driving functions in event that primary controller(s) 1236 (e.g., primary and/or backup computers of vehicle 1200) fail. In at least one embodiment, infotainment SoC 1230 may put vehicle 1200 into a chauffeur to safe stop mode, as described herein.

In at least one embodiment, vehicle 1200 may further include instrument cluster 1232 (e.g., a digital dash, an electronic instrument cluster, a digital instrument panel, etc.). In at least one embodiment, instrument cluster 1232 may include, without limitation, a controller and/or supercomputer (e.g., a discrete controller or supercomputer). In at least one embodiment, instrument cluster 1232 may include, without limitation, any number and combination of a set of instrumentation such as a speedometer, fuel level, oil pressure, tachometer, odometer, turn indicators, gearshift position indicator, seat belt warning light(s), parking-brake warning light(s), engine-malfunction light(s), supplemental restraint system (e.g., airbag) information, lighting controls, safety system controls, navigation information, etc. In some examples, information may be displayed and/or shared among infotainment SoC 1230 and instrument cluster 1232. In at least one embodiment, instrument cluster 1232 may be included as part of infotainment SoC 1230, or vice versa.

In at least one embodiment, at least one component shown or described with respect to FIG. 12C is utilized to implement techniques and/or functions described in connection with one or more of FIGS. 1-10. In at least one embodiment, techniques and/or functions described in connection with FIGS. 1-10 may receive signals from vehicle 1200 for its autonomous operation and/or may be used to provide a remote operator an ability to control vehicle 1200 remotely. In at least one embodiment, techniques and/or functions described in connection with FIGS. 1-10 may perform channel estimation, coherent combination, and/or signal detection for one or more signals received from vehicle 1200 that do not have a corresponding reference signal.

Figure 12D:
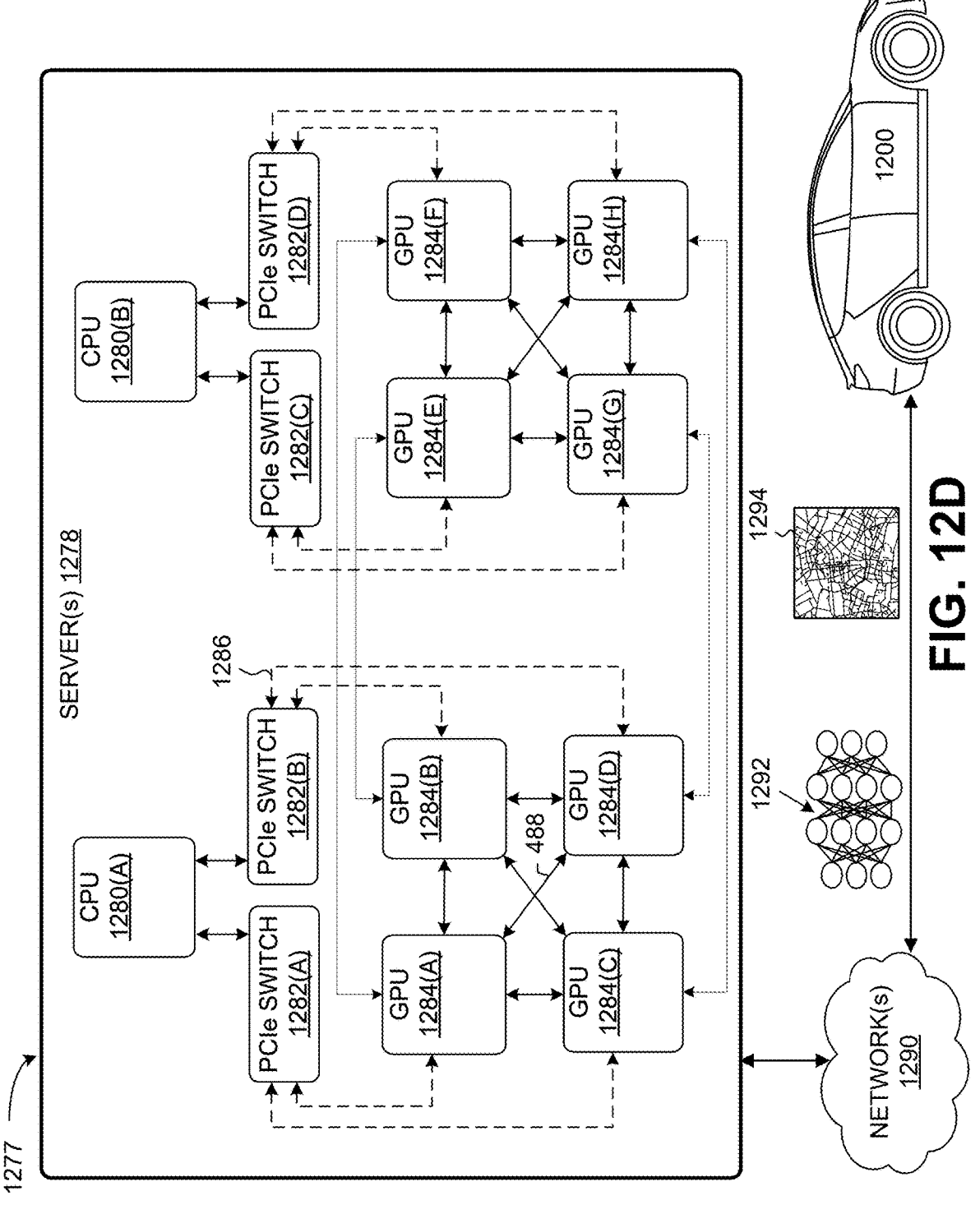
FIG. 12D is a diagram illustrating a system for communication between cloud-based server(s) and the autonomous vehicle of FIG. 12A, according to at least one embodiment.

FIG. 12D is a diagram of a system 1277 for communication between cloud-based server(s) and autonomous vehicle 1200 of FIG. 12A, according to at least one embodiment. In at least one embodiment, system 1277 may include, without limitation, server(s) 1278, network(s) 1290, and any number and type of vehicles, including vehicle 1200. server(s) 1278 may include, without limitation, a plurality of GPUs 1284(A)-1284(H) (collectively referred to herein as GPUs 1284), PCIe switches 1282(A)-1282(H) (collectively referred to herein as PCIe switches 1282), and/or CPUs 1280(A)-1280(B) (collectively referred to herein as CPUs 1280). GPUs 1284, CPUs 1280, and PCIe switches 1282 may be interconnected with high-speed interconnects such as, for example and without limitation, NVLink interfaces 1288 developed by NVIDIA and/or PCIe connections 1286.

In at least one embodiment, GPUs 1284 are connected via an NVLink and/or NVSwitch SoC and GPUs 1284 and PCIe switches 1282 are connected via PCIe interconnects. In at least one embodiment, although eight GPUs 1284, two CPUs 1280, and four PCIe switches 1282 are illustrated, this is not intended to be limiting. In at least one embodiment, each of server(s) 1278 may include, without limitation, any number of GPUs 1284, CPUs 1280, and/or PCIe switches 1282, in any combination. For example, in at least one embodiment, server(s) 1278 could each include eight, sixteen, thirty-two, and/or more GPUs 1284.

In at least one embodiment, server(s) 1278 may receive, over network(s) 1290 and from vehicles, image data representative of images showing unexpected or changed road conditions, such as recently commenced roadwork. In at least one embodiment, server(s) 1278 may transmit, over network(s) 1290 and to vehicles, neural networks 1292, updated neural networks 1292, and/or map information 1294, including, without limitation, information regarding traffic and road conditions. In at least one embodiment, updates to map information 1294 may include, without limitation, updates for HD map 1222, such as information regarding construction sites, potholes, detours, flooding, and/or other obstructions. In at least one embodiment, neural networks 1292, updated neural networks 1292, and/or map information 1294 may have resulted from new training and/or experiences represented in data received from any number of vehicles in environment, and/or based at least in part on training performed at a data center (e.g., using server(s) 1278 and/or other servers).

In at least one embodiment, server(s) 1278 may be used to train machine learning models (e.g., neural networks) based at least in part on training data. In at least one embodiment, training data may be generated by vehicles, and/or may be generated in a simulation (e.g., using a game engine). In at least one embodiment, any amount of training data is tagged (e.g., where associated neural network benefits from supervised learning) and/or undergoes other pre-processing. In at least one embodiment, any amount of training data is not tagged and/or pre-processed (e.g., where associated neural network does not require supervised learning). In at least one embodiment, once machine learning models are trained, machine learning models may be used by vehicles (e.g., transmitted to vehicles over network(s) 1290, and/or machine learning models may be used by server(s) 1278 to remotely monitor vehicles.

In at least one embodiment, server(s) 1278 may receive data from vehicles and apply data to up-to-date real-time neural networks for real-time intelligent inferencing. In at least one embodiment, server(s) 1278 may include deep-learning supercomputers and/or dedicated AI computers powered by GPU(s) 1284, such as a DGX and DGX Station machines developed by NVIDIA. However, in at least one embodiment, server(s) 1278 may include deep learning infrastructure that use CPU-powered data centers.

In at least one embodiment, deep-learning infrastructure of server(s) 1278 may be capable of fast, real-time inferencing, and may use that capability to evaluate and verify health of processors, software, and/or associated hardware in vehicle 1200. For example, in at least one embodiment, deep-learning infrastructure may receive periodic updates from vehicle 1200, such as a sequence of images and/or objects that vehicle 1200 has located in that sequence of images (e.g., via computer vision and/or other machine learning object classification techniques). In at least one embodiment, deep-learning infrastructure may run its own neural network to identify objects and compare them with objects identified by vehicle 1200 and, if results do not match and deep-learning infrastructure concludes that AI in vehicle 1200 is malfunctioning, then server(s) 1278 may transmit a signal to vehicle 1200 instructing a fail-safe computer of vehicle 1200 to assume control, notify passengers, and complete a safe parking maneuver.

In at least one embodiment, server(s) 1278 may include GPU(s) 1284 and one or more programmable inference accelerators (e.g., NVIDIA's TensorRT 3). In at least one embodiment, combination of GPU-powered servers and inference acceleration may make real-time responsiveness possible. In at least one embodiment, such as where performance is less critical, servers powered by CPUs, FPGAs, and other processors may be used for inferencing.

Computer Systems

Figure 13:
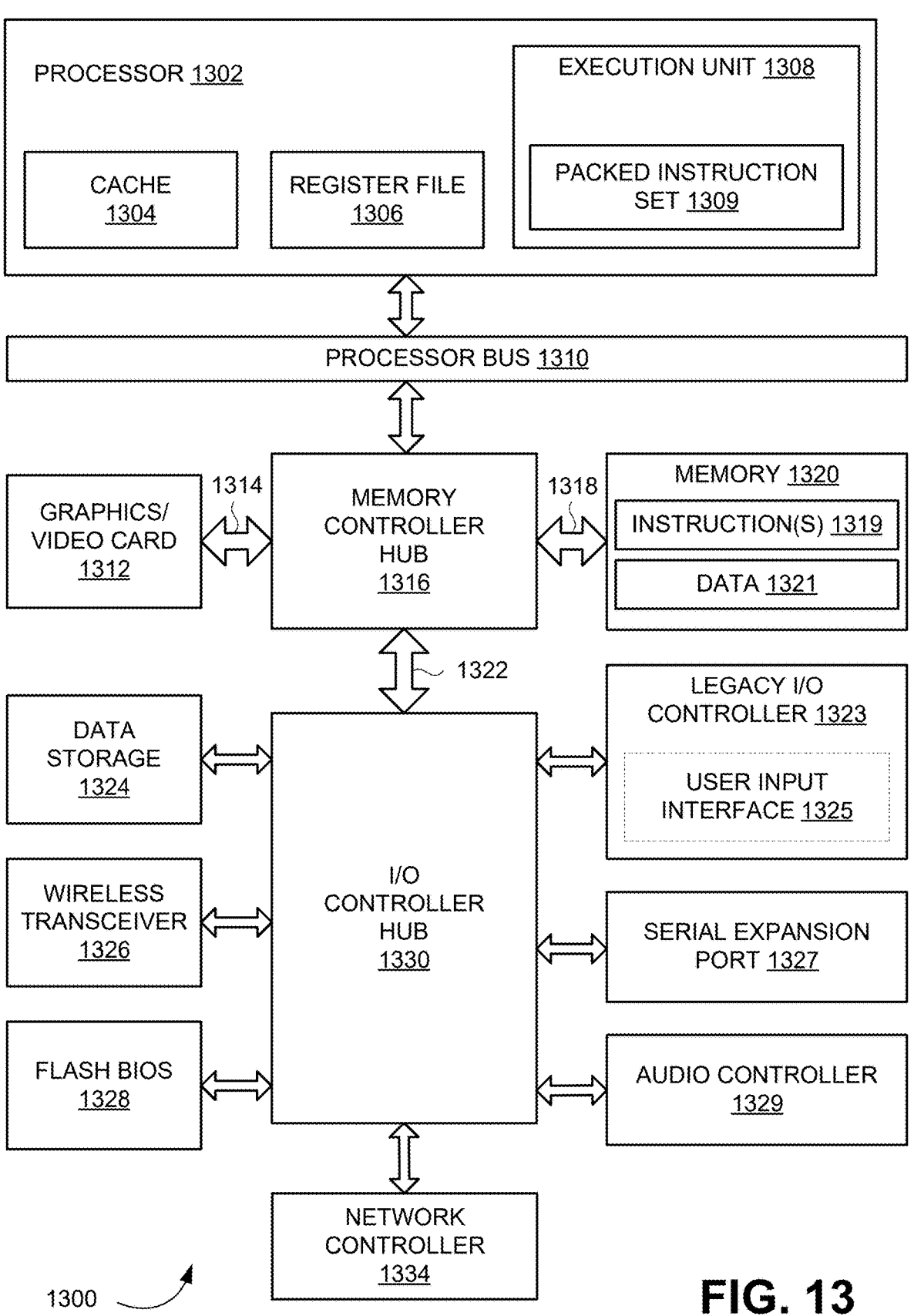
FIG. 13 is a block diagram illustrating a computer system, according to at least one embodiment.

FIG. 13 is a block diagram illustrating an exemplary computer system, which may be a system with interconnected devices and components, a system-on-a-chip (SOC) or some combination thereof 1300 formed with a processor that may include execution units to execute an instruction, according to at least one embodiment. In at least one embodiment, computer system 1300 may include, without limitation, a component, such as a processor 1302 to employ execution units including logic to perform algorithms for process data, in accordance with present disclosure, such as in embodiment described herein. In at least one embodiment, computer system 1300 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1300 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 1300 may include, without limitation, processor 1302 that may include, without limitation, one or more execution units 1308 to perform machine learning model training and/or inferencing according to techniques described herein. In at least one embodiment, system 13 is a single processor desktop or server system, but in another embodiment system 13 may be a multiprocessor system. In at least one embodiment, processor 1302 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 1302 may be coupled to a processor bus 1310 that may transmit data signals between processor 1302 and other components in computer system 1300.

In at least one embodiment, processor 1302 may include, without limitation, a Level 1 ("L1") internal cache memory ("cache") 1304. In at least one embodiment, processor 1302 may have a single internal cache or multiple levels of internal cache. In at least one embodiment, cache memory may reside external to processor 1302. Other embodiments may also include a combination of both internal and external caches depending on particular implementation and needs. In at least one embodiment, register file 1306 may store different types of data in various registers including, without limitation, integer registers, floating point registers, status registers, and instruction pointer register.

In at least one embodiment, execution unit 1308, including, without limitation, logic to perform integer and floating point operations, also resides in processor 1302. In at least one embodiment, processor 1302 may also include a microcode ("ucode") read only memory ("ROM") that stores microcode for certain macro instructions. In at least one embodiment, execution unit 1308 may include logic to handle a packed instruction set 1309. In at least one embodiment, by including packed instruction set 1309 in instruction set of a general-purpose processor 1302, along with associated circuitry to execute instructions, operations used by many multimedia applications may be performed using packed data in a general-purpose processor 1302. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 1308 may also be used in microcontrollers, embedded processors, graphics devices, DSPs, and other types of logic circuits. In at least one embodiment, computer system 1300 may include, without limitation, a memory 1320. In at least one embodiment, memory 1320 may be implemented as a Dynamic Random Access Memory ("DRAM") device, a Static Random Access Memory ("SRAM") device, flash memory device, or other memory device. In at least one embodiment, memory 1320 may store instruction(s) 1319 and/or data 1321 represented by data signals that may be executed by processor 1302.

In at least one embodiment, system logic chip may be coupled to processor bus 1310 and memory 1320. In at least one embodiment, system logic chip may include, without limitation, a memory controller hub ("MCH") 1316, and processor 1302 may communicate with MCH 1316 via processor bus 1310. In at least one embodiment, MCH 1316 may provide a high bandwidth memory path 1318 to memory 1320 for instruction and data storage and for storage of graphics commands, data, and textures. In at least one embodiment, MCH 1316 may direct data signals between processor 1302, memory 1320, and other components in computer system 1300 and to bridge data signals between processor bus 1310, memory 1320, and a system I/O 1322. In at least one embodiment, system logic chip may provide a graphics port for coupling to a graphics controller. In at least one embodiment, MCH 1316 may be coupled to memory 1320 through a high bandwidth memory path 1318 and graphics/video card 1312 may be coupled to MCH 1316 through an Accelerated Graphics Port ("AGP") interconnect 1314.

In at least one embodiment, computer system 1300 may use system I/O 1322 that is a proprietary hub interface bus to couple MCH 1316 to I/O controller hub ("ICH") 1330. In at least one embodiment, ICH 1330 may provide direct connections to some I/O devices via a local I/O bus. In at least one embodiment, local I/O bus may include, without limitation, a high-speed I/O bus for connecting peripherals to memory 1320, chipset, and processor 1302. Examples may include, without limitation, an audio controller 1329, a firmware hub ("flash BIOS") 1328, a wireless transceiver 1326, a data storage 1324, a legacy I/O controller 1323 containing user input and keyboard interfaces, a serial expansion port 1327, such as Universal Serial Bus ("USB"), and a network controller 1334. In at least one embodiment, data storage 1324 may comprise a hard disk drive, a floppy disk drive, a CD-ROM device, a flash memory device, or other mass storage device.

In at least one embodiment, FIG. 13 illustrates a system, which includes interconnected hardware devices or "chips", whereas in other embodiments, FIG. 13 may illustrate an exemplary System on a Chip ("SoC"). In at least one embodiment, devices illustrated in FIG. 13 may be interconnected with proprietary interconnects, standardized interconnects (e.g., PCIe) or some combination thereof. In at least one embodiment, one or more components of system 1300 are interconnected using compute express link (CXL) interconnects.

In at least one embodiment, at least one component shown or described with respect to FIG. 13 is utilized to implement techniques and/or functions described in connection with FIGS. 1-10. In at least one embodiment, at least one of processor 1302 and graphics card 1312 are used to perform channel estimation, coherent combining, and/or signal detection for one or more signals that do not have a corresponding reference signal. In at least one embodiment, at least one of processor 1302 and graphics card 1312 perform at least one aspect described with respect to pre-processor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

Figure 14:
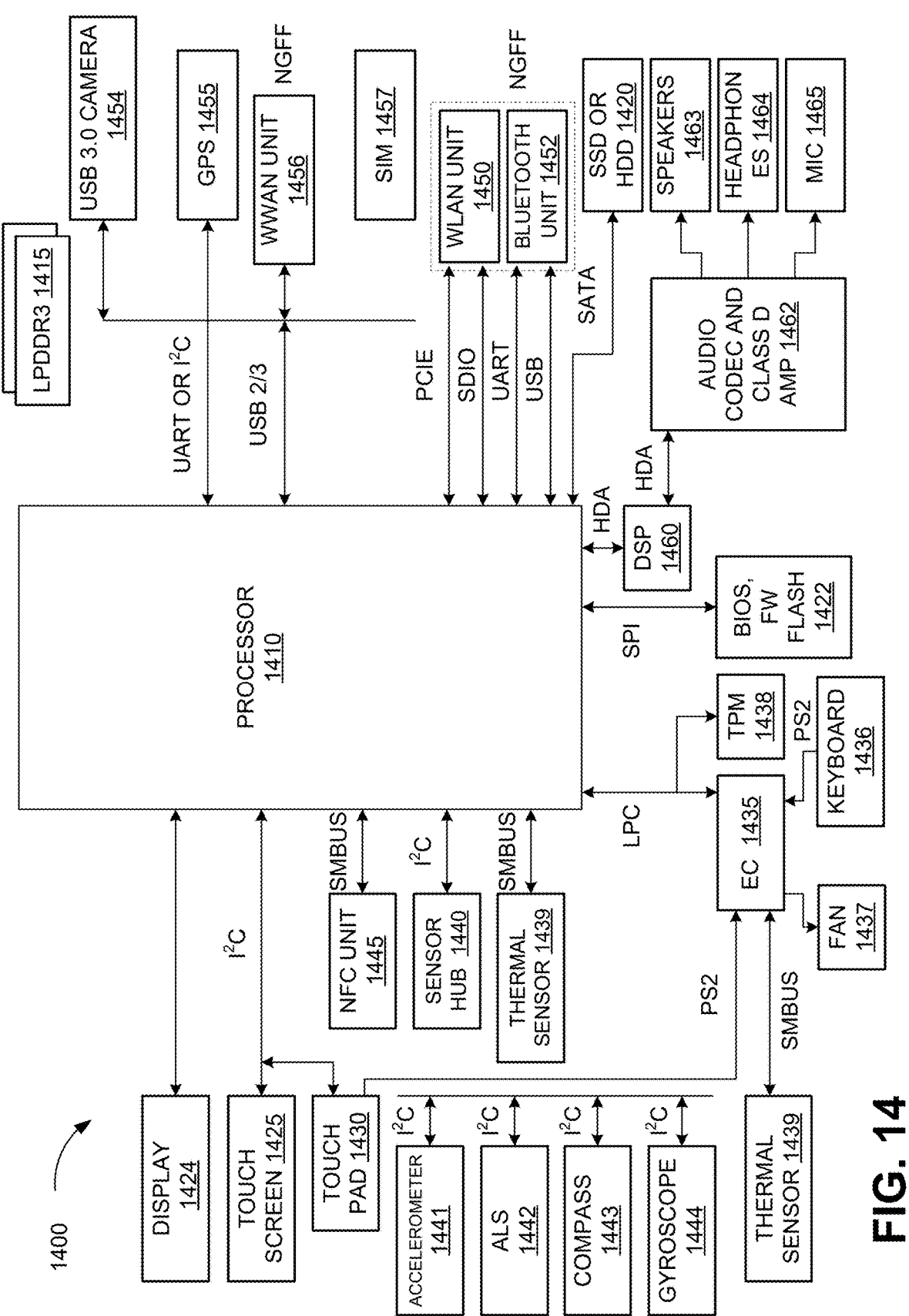
FIG. 14 is a block diagram illustrating computer system, according to at least one embodiment.

FIG. 14 is a block diagram illustrating an electronic device 1400 for utilizing a processor 1410, according to at least one embodiment. In at least one embodiment, electronic device 1400 may be, for example and without limitation, a notebook, a tower server, a rack server, a blade server, a laptop, a desktop, a tablet, a mobile device, a phone, an embedded computer, or any other suitable electronic device.

In at least one embodiment, system 1400 may include, without limitation, processor 1410 communicatively coupled to any suitable number or kind of components, peripherals, modules, or devices. In at least one embodiment, processor 1410 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 14 illustrates a system, which includes interconnected hardware devices or "chips", whereas in other embodiments, FIG. 14 may illustrate an exemplary System on a Chip ("SoC"). In at least one embodiment, devices illustrated in FIG. 14 may be interconnected with proprietary interconnects, standardized interconnects (e.g., PCIe) or some combination thereof. In at least one embodiment, one or more components of FIG. 14 are interconnected using compute express link (CXL) interconnects.

In at least one embodiment, FIG. 14 may include a display 1424, a touch screen 1425, a touch pad 1430, a Near Field Communications unit ("NFC") 1445, a sensor hub 1440, a thermal sensor 1446, an Express Chipset ("EC") 1435, a Trusted Platform Module ("TPM") 1438, BIOS/firmware/flash memory ("BIOS, FW Flash") 1422, a DSP 1460, a drive "SSD or HDD") 1420 such as a Solid State Disk ("SSD") or a Hard Disk Drive ("HDD"), a wireless local area network unit ("WLAN") 1450, a Bluetooth unit 1452, a Wireless Wide Area Network unit ("WWAN") 1456, a Global Positioning System (GPS) 1455, a camera ("USB 3.0 camera") 1454 such as a USB 3.0 camera, or a Low Power Double Data Rate ("LPDDR") memory unit ("LPDDR3") 1415 implemented in, for example, LPDDR3 standard. These components may each be implemented in any suitable manner.

In at least one embodiment, other components may be communicatively coupled to processor 1410 through components discussed above. In at least one embodiment, an accelerometer 1441, Ambient Light Sensor ("ALS") 1442, compass 1443, and a gyroscope 1444 may be communicatively coupled to sensor hub 1440. In at least one embodiment, thermal sensor 1439, a fan 1437, a keyboard 1446, and a touch pad 1430 may be communicatively coupled to EC 1435. In at least one embodiment, speaker 1463, a headphone 1464, and a microphone ("mic") 1465 may be communicatively coupled to an audio unit ("audio codec and class d amp") 1464, which may in turn be communicatively coupled to DSP 1460. In at least one embodiment, audio unit 1464 may include, for example and without limitation, an audio coder/decoder ("codec") and a class D amplifier. In at least one embodiment, SIM card ("SIM") 1457 may be communicatively coupled to WWAN unit 1456. In at least one embodiment, components such as WLAN unit 1450 and Bluetooth unit 1452, as well as WWAN unit 1456 may be implemented in a Next Generation Form Factor ("NGFF").

In at least one embodiment, at least one component shown or described with respect to FIG. 14 is utilized to implement techniques and/or functions described in connection with FIGS. 1-10. In at least one embodiment, processor 1410 is used to perform channel estimation, coherent combining, and/or signal detection for one or more signals that do not have a corresponding reference signal. In at least one embodiment, processor 1410 performs at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

Figure 15:
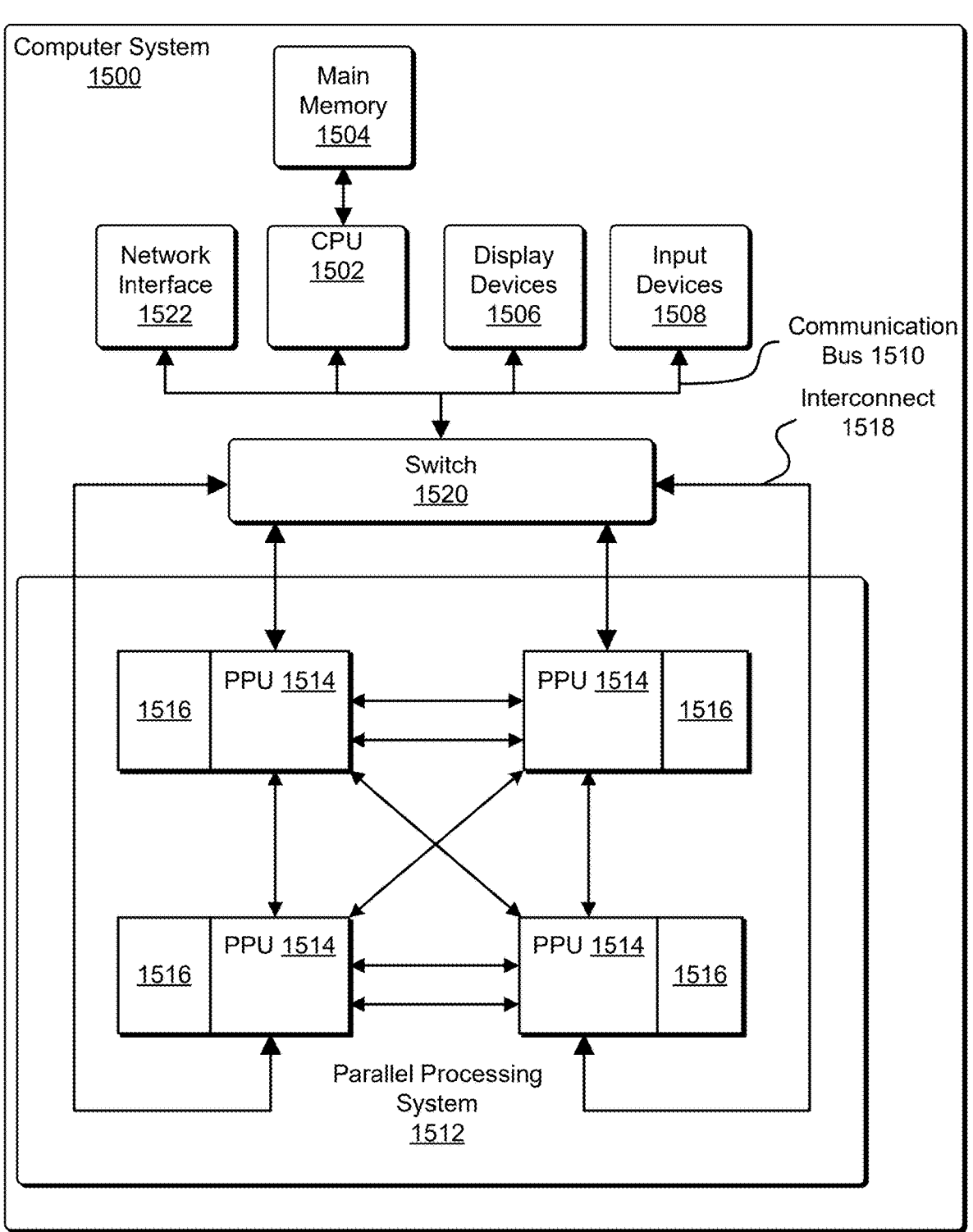
FIG. 15 illustrates a computer system, according to at least one embodiment.

FIG. 15 illustrates a computer system 1500, according to at least one embodiment. In at least one embodiment, computer system 1500 is configured to implement various processes and methods described throughout this disclosure.

In at least one embodiment, computer system 1500 comprises, without limitation, at least one central processing unit ("CPU") 1502 that is connected to a communication bus 1510 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 1500 includes, without limitation, a main memory 1504 and control logic (e.g., implemented as hardware, software, or a combination thereof) and data are stored in main memory 1504 which may take form of random access memory ("RAM"). In at least one embodiment, a network interface subsystem ("network interface") 1522 provides an interface to other computing devices and networks for receiving data from and transmitting data to other systems from computer system 1500.

In at least one embodiment, computer system 1500, in at least one embodiment, includes, without limitation, input devices 1508, parallel processing system 1512, and display devices 1506 which can be implemented using a conventional cathode ray tube ("CRT"), liquid crystal display ("LCD"), light emitting diode ("LED"), plasma display, or other suitable display technologies. In at least one embodiment, user input is received from input devices 1508 such as keyboard, mouse, touchpad, microphone, and more. In at least one embodiment, each of foregoing modules can be situated on a single semiconductor platform to form a processing system.

In at least one embodiment, at least one component shown or described with respect to FIG. 15 is utilized to implement techniques and/or functions described in connection with FIGS. 1-10. In at least one embodiment, at least one of parallel processing system 1512 and CPU 1502 are used to perform channel estimation, coherent combining, and/or signal detection for one or more signals that do not have a corresponding reference signal. In at least one embodiment, at least one of parallel processing system 1512 and CPU 1502 perform at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

FIG. 16 illustrates a computer system 1600, according to at least one embodiment. In at least one embodiment, computer system 1600 includes, without limitation, a computer 1610 and a USB stick 1620. In at least one embodiment, computer 1610 may include, without limitation, any number and type of processor(s) (not shown) and a memory (not shown). In at least one embodiment, computer 1610 includes, without limitation, a server, a cloud instance, a laptop, and a desktop computer.

In at least one embodiment, USB stick 1620 includes, without limitation, a processing unit 1630, a USB interface 1640, and USB interface logic 1650. In at least one embodiment, processing unit 1630 may be any instruction execution system, apparatus, or device capable of executing instructions. In at least one embodiment, processing unit 1630 may include, without limitation, any number and type of processing cores (not shown). In at least one embodiment, processing core 1630 comprises an application specific integrated circuit ("ASIC") that is optimized to perform any amount and type of operations associated with machine learning. For instance, in at least one embodiment, processing core 1630 is a tensor processing unit ("TPC") that is optimized to perform machine learning inference operations. In at least one embodiment, processing core 1630 is a vision processing unit ("VPU") that is optimized to perform machine vision and machine learning inference operations.

In at least one embodiment, USB interface 1640 may be any type of USB connector or USB socket. For instance, in at least one embodiment, USB interface 1640 is a USB 3.0 Type-C socket for data and power. In at least one embodiment, USB interface 1640 is a USB 3.0 Type-A connector. In at least one embodiment, USB interface logic 1650 may include any amount and type of logic that enables processing unit 1630 to interface with or devices (e.g., computer 1610) via USB connector 1640.

In at least one embodiment, at least one component shown or described with respect to FIG. 16 is utilized to implement techniques and/or functions described in connection with FIGS. 1-10. In at least one embodiment, computer 1610 is used to perform channel estimation, coherent combining, and/or signal detection for one or more signals that do not have a corresponding reference signal. In at least one embodiment, computer 1610 performs at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

Figure 17A:
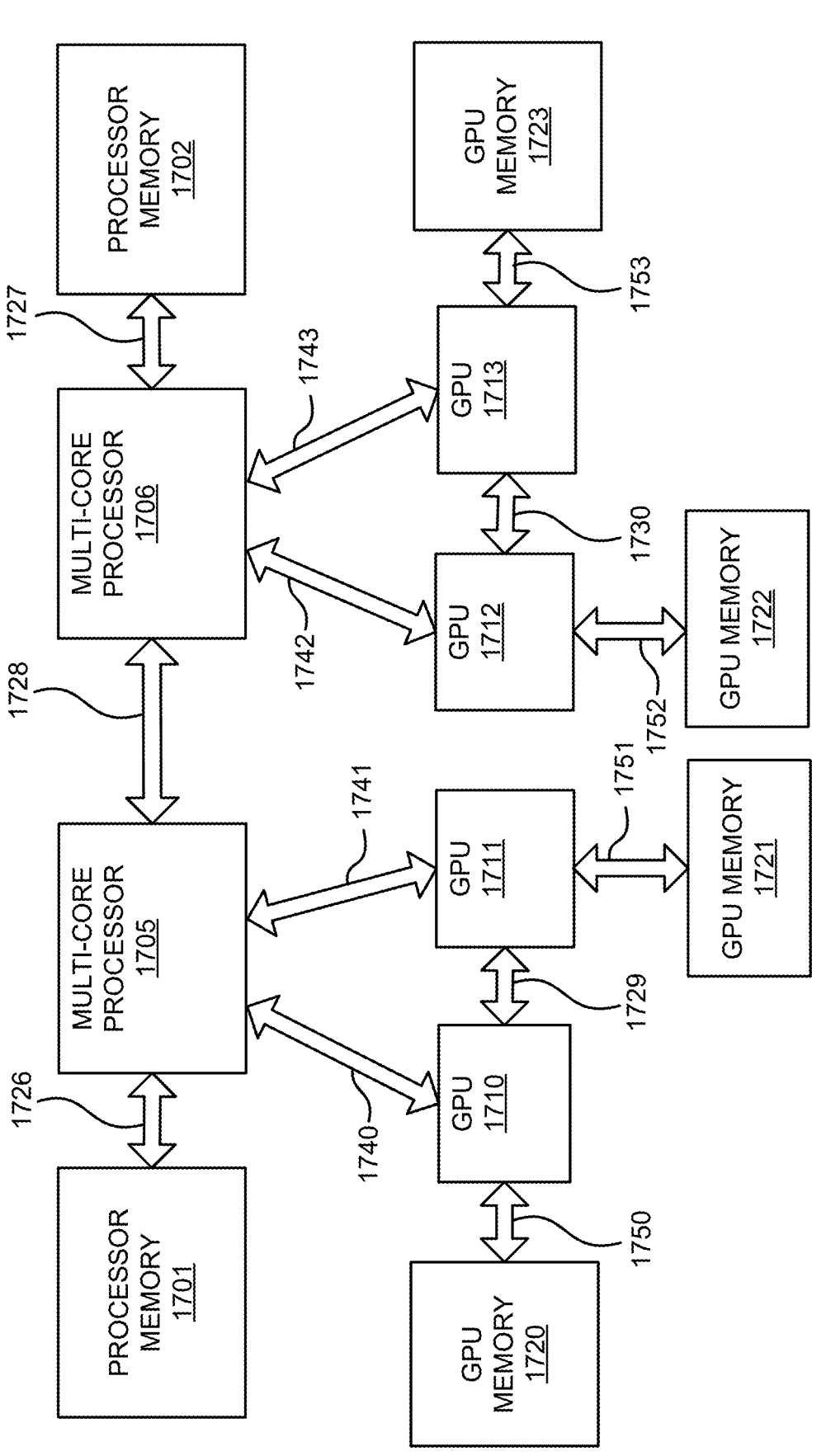
FIG. 17A illustrates a computer system, according to at least one embodiment.

FIG. 17A illustrates an exemplary architecture in which a plurality of GPUs 1710-1713 is communicatively coupled to a plurality of multi-core processors 1705-1706 over high-speed links 1740-1743 (e.g., buses, point-to-point interconnects, etc.). In one embodiment, high-speed links 1740-1743 support a communication throughput of 4 GB/s, 30 GB/s, 80 GB/s or higher. Various interconnect protocols may be used including, but not limited to, PCIe 4.0 or 5.0 and NVLink 2.0.

In addition, and in one embodiment, two or more of GPUs 1710-1713 are interconnected over high-speed links 1729-1730, which may be implemented using same or different protocols/links than those used for high-speed links 1740-1743. Similarly, two or more of multi-core processors 1705-1706 may be connected over high-speed link 1728 which may be symmetric multi-processor (SMP) buses operating at 20 GB/s, 30 GB/s, 120 GB/s or higher. Alternatively, all communication between various system components shown in FIG. 17A may be accomplished using same protocols/links (e.g., over a common interconnection fabric).

In one embodiment, each multi-core processor 1705-1706 is communicatively coupled to a processor memory 1701-1702, via memory interconnects 1726-1727, respectively, and each GPU 1710-1713 is communicatively coupled to GPU memory 1720-1723 over GPU memory interconnects 1750-1753, respectively. Memory interconnects 1726-1727 and 1750-1753 may utilize same or different memory access technologies. By way of example, and not limitation, processor memories 1701-1702 and GPU memories 1720-1723 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In one embodiment, some portion of processor memories 1701-1702 may be volatile memory and another portion may be non-volatile memory (e.g., using a two-level memory (2 LM) hierarchy).

As described herein, although various processors 1705-1706 and GPUs 1710-1713 may be physically coupled to a particular memory 1701-1702, 1720-1723, respectively, a unified memory architecture may be implemented in which a same virtual system address space (also referred to as "effective address" space) is distributed among various physical memories. For example, processor memories 1701-1702 may each comprise 64 GB of system memory address space and GPU memories 1720-1723 may each comprise 32 GB of system memory address space (resulting in a total of 256 GB addressable memory in this example).

Figure 17B:
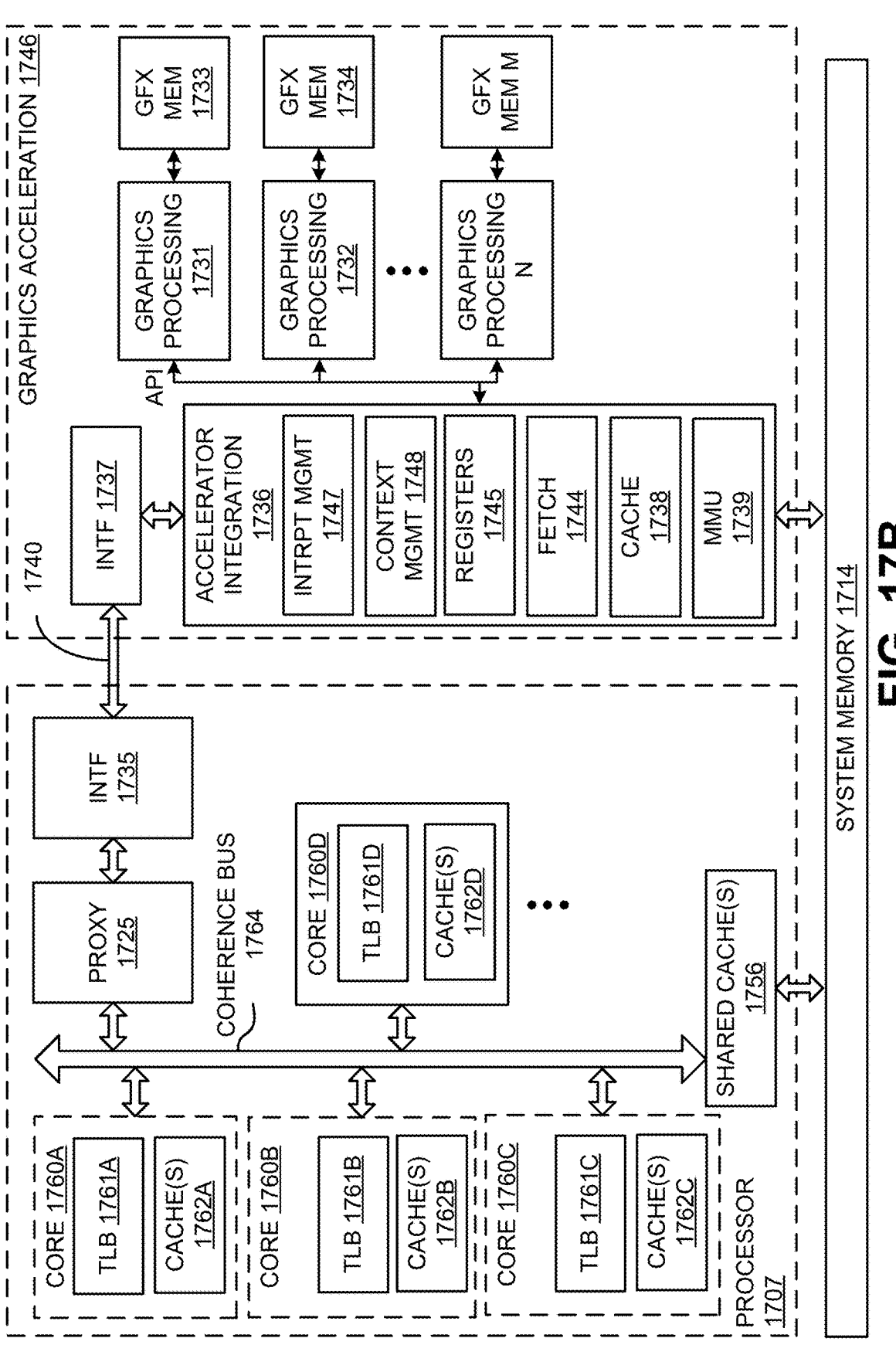
FIG. 17B illustrates a computer system, according to at least one embodiment.

FIG. 17B illustrates additional details for an interconnection between a multi-core processor 1707 and a graphics acceleration module 1746 in accordance with one exemplary embodiment. Graphics acceleration module 1746 may include one or more GPU chips integrated on a line card which is coupled to processor 1707 via high-speed link 1740. Alternatively, graphics acceleration module 1746 may be integrated on a same package or chip as processor 1707.

In at least one embodiment, illustrated processor 1707 includes a plurality of cores 1760A-1760D, each with a translation lookaside buffer 1761A-1761D and one or more caches 1762A-1762D. In at least one embodiment, cores 1760A-1760D may include various other components for executing instructions and processing data which are not illustrated. Caches 1762A-1762D may comprise level 1 (L1) and level 2 (L2) caches. In addition, one or more shared caches 1756 may be included in caches 1762A-1762D and shared by sets of cores 1760A-1760D. For example, one embodiment of processor 1707 includes 24 cores, each with its own L1 cache, twelve shared L2 caches, and twelve shared L3 caches. In this embodiment, one or more L2 and L3 caches are shared by two adjacent cores. Processor 1707 and graphics acceleration module 1746 connect with system memory 1714, which may include processor memories 1701-1702 of FIG. 17A.

Coherency is maintained for data and instructions stored in various caches 1762A-1762D, 1756 and system memory 1714 via inter-core communication over a coherence bus 1764. For example, each cache may have cache coherency logic/circuitry associated therewith to communicate to over coherence bus 1764 in response to detected reads or writes to particular cache lines. In one implementation, a cache snooping protocol is implemented over coherence bus 1764 to snoop cache accesses.

In one embodiment, a proxy circuit 1725 communicatively couples graphics acceleration module 1746 to coherence bus 1764, allowing graphics acceleration module 1746 to participate in a cache coherence protocol as a peer of cores 1760A-1760D. An interface 1735 provides connectivity to proxy circuit 1725 over high-speed link 1740 (e.g., a PCIe bus, NVLink, etc.) and an interface 1737 connects graphics acceleration module 1746 to link 1740.

In one implementation, an accelerator integration circuit 1736 provides cache management, memory access, context management, and interrupt management services on behalf of a plurality of graphics processing engines 1731, 1732, N of graphics acceleration module 1746. Graphics processing engines 1731, 1732, N may each comprise a separate graphics processing unit (GPU). Alternatively, graphics processing engines 1731, 1732, N may comprise different types of graphics processing engines within a GPU such as graphics execution units, media processing engines (e.g., video encoders/decoders), samplers, and blit engines. In at least one embodiment, graphics acceleration module 1746 may be a GPU with a plurality of graphics processing engines 1731-1732, N or graphics processing engines 1731-1732, N may be individual GPUs integrated on a common package, line card, or chip.

In one embodiment, accelerator integration circuit 1736 includes a memory management unit (MMU) 1739 for performing various memory management functions such as virtual-to-physical memory translations (also referred to as effective-to-real memory translations) and memory access protocols for accessing system memory 1714. MMU 1739 may also include a translation lookaside buffer (TLB) (not shown) for caching virtual/effective to physical/real address translations. In one implementation, a cache 1738 stores commands and data for efficient access by graphics processing engines 1731-1732, N. In one embodiment, data stored in cache 1738 and graphics memories 1733-1734, M is kept coherent with core caches 1762A-1762D, 1756 and system memory 1714. As mentioned, this may be accomplished via proxy circuit 1725 on behalf of cache 1738 and memories 1733-1734, M (e.g., sending updates to cache 1738 related to modifications/accesses of cache lines on processor caches 1762A-1762D, 1756 and receiving updates from cache 1738).

A set of registers 1745 store context data for threads executed by graphics processing engines 1731-1732, N and a context management circuit 1748 manages thread contexts. For example, context management circuit 1748 may perform save and restore operations to save and restore contexts of various threads during contexts switches (e.g., where a first thread is saved and a second thread is stored so that a second thread can be execute by a graphics processing engine). For example, on a context switch, context management circuit 1748 may store current register values to a designated region in memory (e.g., identified by a context pointer). It may then restore register values when returning to a context. In one embodiment, an interrupt management circuit 1747 receives and processes interrupts received from system devices.

In one implementation, virtual/effective addresses from a graphics processing engine 1731 are translated to real/physical addresses in system memory 1714 by MMU 1739. One embodiment of accelerator integration circuit 1736 supports multiple (e.g., 4, 8, 16) graphics accelerator modules 1746 and/or other accelerator devices. Graphics accelerator module 1746 may be dedicated to a single application executed on processor 1707 or may be shared between multiple applications. In one embodiment, a virtualized graphics execution environment is presented in which resources of graphics processing engines 1731-1732, N are shared with multiple applications or virtual machines (VMs). In at least one embodiment, resources may be subdivided into "slices" which are allocated to different VMs and/or applications based on processing requirements and priorities associated with VMs and/or applications.

In at least one embodiment, accelerator integration circuit 1736 performs as a bridge to a system for graphics acceleration module 1746 and provides address translation and system memory cache services. In addition, accelerator integration circuit 1736 may provide virtualization facilities for a host processor to manage virtualization of graphics processing engines 1731-1732, interrupts, and memory management.

Because hardware resources of graphics processing engines 1731-1732, N are mapped explicitly to a real address space seen by host processor 1707, any host processor can address these resources directly using an effective address value. One function of accelerator integration circuit 1736, in one embodiment, is physical separation of graphics processing engines 1731-1732, N so that they appear to a system as independent units.

In at least one embodiment, one or more graphics memories 1733-1734, M are coupled to each of graphics processing engines 1731-1732, N, respectively. Graphics memories 1733-1734, M store instructions and data being processed by each of graphics processing engines 1731-1732, N. Graphics memories 1733-1734, M may be volatile memories such as DRAMs (including stacked DRAMs), GDDR memory (e.g., GDDR5, GDDR6), or HBM, and/or may be non-volatile memories such as 3D XPoint or Nano-Ram.

In one embodiment, to reduce data traffic over link 1740, biasing techniques are used to ensure that data stored in graphics memories 1733-1734, M is data which will be used most frequently by graphics processing engines 1731-1732, N and preferably not used by cores 1760A-1760D (at least not frequently). Similarly, a biasing mechanism attempts to keep data needed by cores (and preferably not graphics processing engines 1731-1732, N) within caches 1762A-1762D, 1756 of cores and system memory 1714.

Figure 17C:
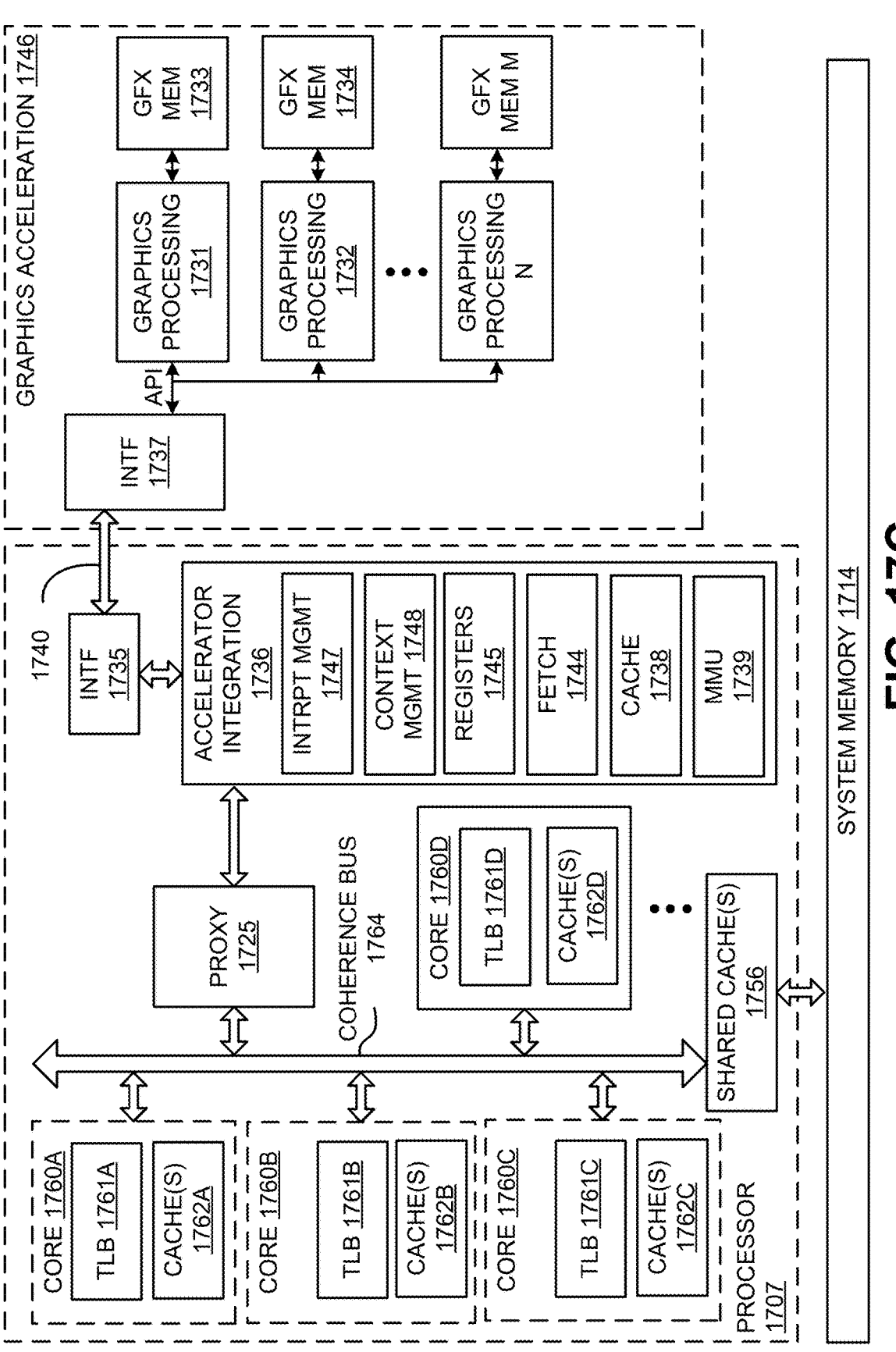
FIG. 17C illustrates a computer system, according to at least one embodiment.

FIG. 17C illustrates another exemplary embodiment in which accelerator integration circuit 1736 is integrated within processor 1707. In this embodiment, graphics processing engines 1731-1732, N communicate directly over high-speed link 1740 to accelerator integration circuit 1736 via interface 1737 and interface 1735 (which, again, may be utilize any form of bus or interface protocol). Accelerator integration circuit 1736 may perform same operations as those described with respect to FIG. 17B, but potentially at a higher throughput given its close proximity to coherence bus 1764 and caches 1762A-1762D, 1756. One embodiment supports different programming models including a dedicated-process programming model (no graphics acceleration module virtualization) and shared programming models (with virtualization), which may include programming models which are controlled by accelerator integration circuit 1736 and programming models which are controlled by graphics acceleration module 1746.

In at least one embodiment, graphics processing engines 1731-1732, N are dedicated to a single application or process under a single operating system. In at least one embodiment, a single application can funnel other application requests to graphics processing engines 1731-1732, N, providing virtualization within a VM/partition.

In at least one embodiment, graphics processing engines 1731-1732, N, may be shared by multiple VM/application partitions. In at least one embodiment, shared models may use a system hypervisor to virtualize graphics processing engines 1731-1732, N to allow access by each operating system. For single-partition systems without a hypervisor, graphics processing engines 1731-1732, N are owned by an operating system. In at least one embodiment, an operating system can virtualize graphics processing engines 1731-1732, N to provide access to each process or application.

In at least one embodiment, graphics acceleration module 1746 or an individual graphics processing engine 1731-1732, N selects a process element using a process handle. In one embodiment, process elements are stored in system memory 1714 and are addressable using an effective address to real address translation techniques described herein. In at least one embodiment, a process handle may be an implementation-specific value provided to a host process when registering its context with graphics processing engine 1731-1732, N (that is, calling system software to add a process element to a process element linked list). In at least one embodiment, a lower 16-bits of a process handle may be an offset of the process element within a process element linked list.

Figure 17D:
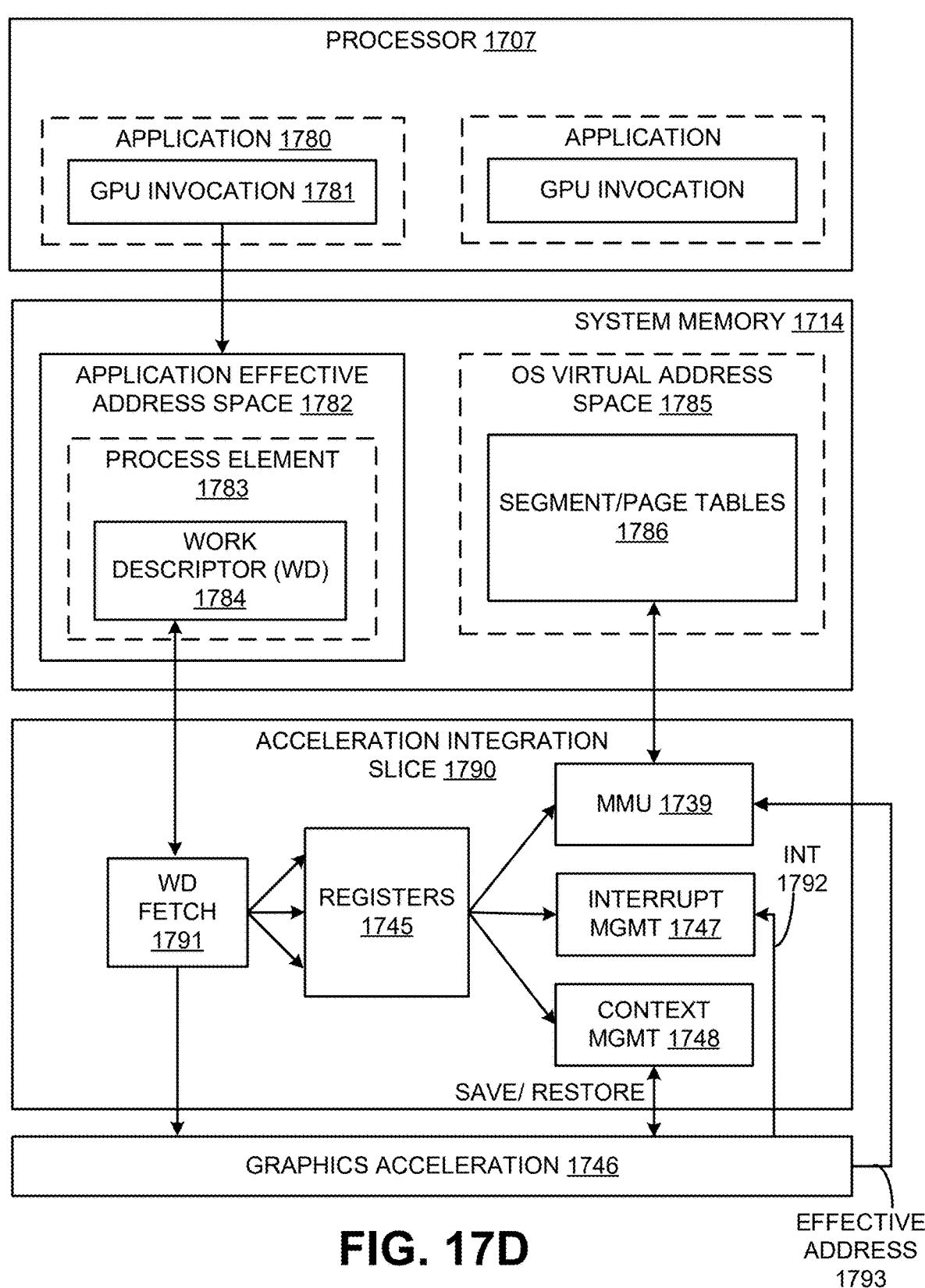
FIG. 17D illustrates a computer system, according to at least one embodiment.

FIG. 17D illustrates an exemplary accelerator integration slice 1790. As used herein, a "slice" comprises a specified portion of processing resources of accelerator integration circuit 1736. Application effective address space 1782 within system memory 1714 stores process elements 1783. In one embodiment, process elements 1783 are stored in response to GPU invocations 1781 from applications 1780 executed on processor 1707. A process element 1783 contains process state for corresponding application 1780. A work descriptor (WD) 1784 contained in process element 1783 can be a single job requested by an application or may contain a pointer to a queue of jobs. In at least one embodiment, WD 1784 is a pointer to a job request queue in an application's address space 1782.

Graphics acceleration module 1746 and/or individual graphics processing engines 1731-1732, N can be shared by all or a subset of processes in a system. In at least one embodiment, an infrastructure for setting up process state and sending a WD 1784 to a graphics acceleration module 1746 to start a job in a virtualized environment may be included.

In at least one embodiment, a dedicated-process programming model is implementation-specific. In this model, a single process owns graphics acceleration module 1746 or an individual graphics processing engine 1731. Because graphics acceleration module 1746 is owned by a single process, a hypervisor initializes accelerator integration circuit 1736 for an owning partition and an operating system initializes accelerator integration circuit 1736 for an owning process when graphics acceleration module 1746 is assigned.

In operation, a WD fetch unit 1791 in accelerator integration slice 1790 fetches next WD 1784 which includes an indication of work to be done by one or more graphics processing engines of graphics acceleration module 1746. Data from WD 1784 may be stored in registers 1745 and used by MMU 1739, interrupt management circuit 1747 and/or context management circuit 1748 as illustrated. For example, one embodiment of MMU 1739 includes segment/page walk circuitry for accessing segment/page tables 1786 within OS virtual address space 1785. Interrupt management circuit 1747 may process interrupt events 1792 received from graphics acceleration module 1746. When performing graphics operations, an effective address 1793 generated by a graphics processing engine 1731-1732, N is translated to a real address by MMU 1739.

In one embodiment, a same set of registers 1745 are duplicated for each graphics processing engine 1731-1732, N and/or graphics acceleration module 1746 and may be initialized by a hypervisor or operating system. Each of these duplicated registers may be included in an accelerator integration slice 1790. Exemplary registers that may be initialized by a hypervisor are shown in Table 1.

TABLE 1

| | Hypervisor Initialized Registers |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by an operating system are shown in Table 2.

TABLE 2

| | Operating System Initialized Registers |
|---|---|
| 1 | Process and Thread Identification |
| 2 | Effective Address (EA) Context Save/Restore Pointer |
| 3 | Virtual Address (VA) Accelerator Utilization Record Pointer |

TABLE 2-continued

| Operating System Initialized Registers | |
| --- | --- |
| 4 | Virtual Address (VA) Storage Segment Table Pointer |
| 5 | Authority Mask |
| 6 | Work descriptor |

In one embodiment, each WD 1784 is specific to a particular graphics acceleration module 1746 and/or graphics processing engines 1731-1732, N. It contains all information required by a graphics processing engine 1731-1732, N to do work or it can be a pointer to a memory location where an application has set up a command queue of work to be completed.

Figure 17E:
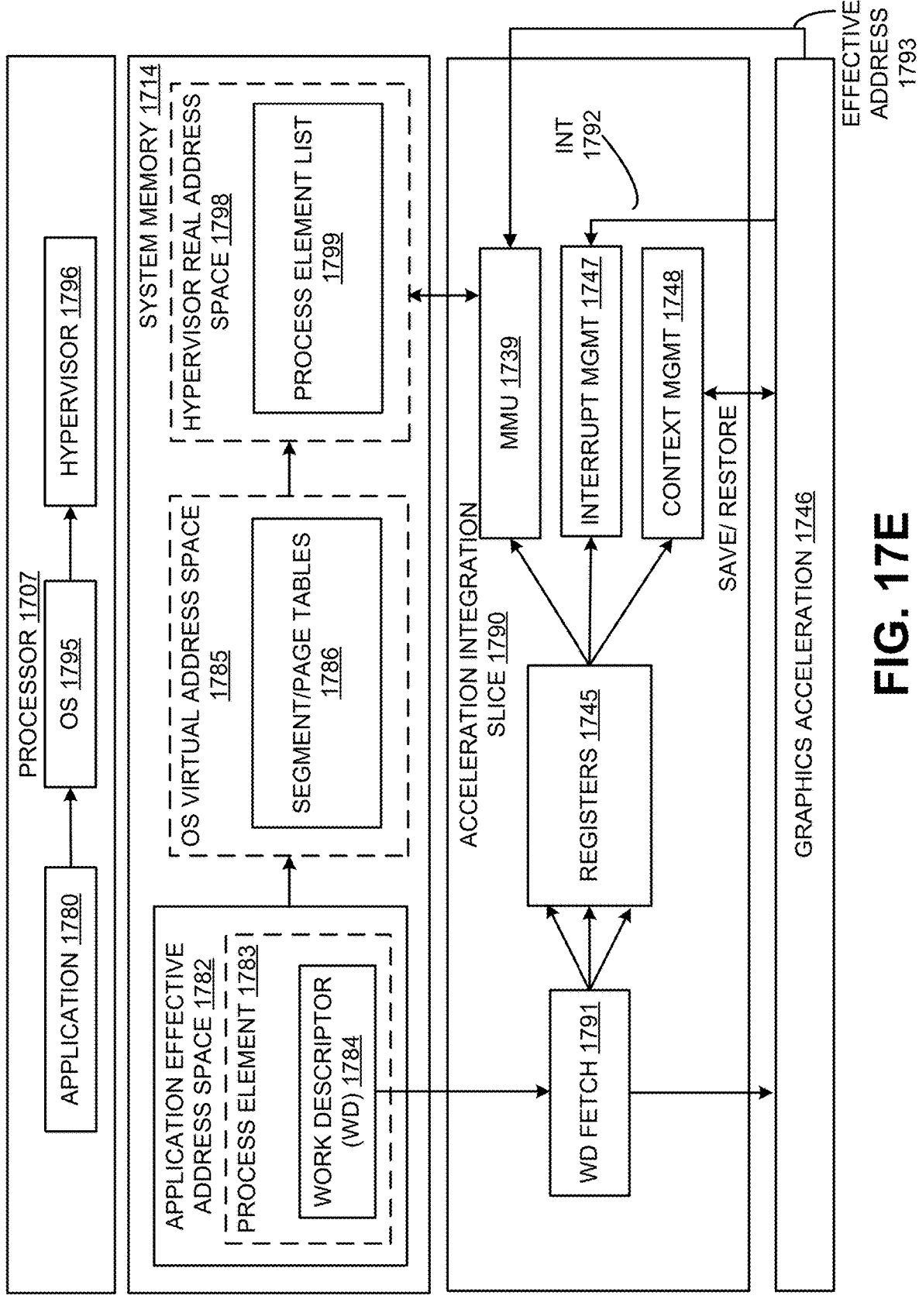
FIGS. 17E and 17F illustrate a shared programming model, according to at least one embodiment.

FIG. 17E illustrates additional details for one exemplary embodiment of a shared model. This embodiment includes a hypervisor real address space 1798 in which a process element list 1799 is stored. Hypervisor real address space 1798 is accessible via a hypervisor 1796 which virtualizes graphics acceleration module engines for operating system 1795.

In at least one embodiment, shared programming models allow for all or a subset of processes from all or a subset of partitions in a system to use a graphics acceleration module 1746. There are two programming models where graphics acceleration module 1746 is shared by multiple processes and partitions: time-sliced shared and graphics directed shared.

In this model, system hypervisor 1796 owns graphics acceleration module 1746 and makes its function available to all operating systems 1795. For a graphics acceleration module 1746 to support virtualization by system hypervisor 1796, graphics acceleration module 1746 may adhere to the following: 1) An application's job request must be autonomous (that is, state does not need to be maintained between jobs), or graphics acceleration module 1746 must provide a context save and restore mechanism. 2) An application's job request is guaranteed by graphics acceleration module 1746 to complete in a specified amount of time, including any translation faults, or graphics acceleration module 1746 provides an ability to preempt processing of a job. 3) Graphics acceleration module 1746 must be guaranteed fairness between processes when operating in a directed shared programming model.

In at least one embodiment, application 1780 is required to make an operating system 1795 system call with a graphics acceleration module 1746 type, a work descriptor (WD), an authority mask register (AMR) value, and a context save/restore area pointer (CSRP). In at least one embodiment, graphics acceleration module 1746 type describes a targeted acceleration function for a system call. In at least one embodiment, graphics acceleration module 1746 type may be a system-specific value. In at least one embodiment, WD is formatted specifically for graphics acceleration module 1746 and can be in a form of a graphics acceleration module 1746 command, an effective address pointer to a user-defined structure, an effective address pointer to a queue of commands, or any other data structure to describe work to be done by graphics acceleration module 1746. In one embodiment, an AMR value is an AMR state to use for a current process. In at least one embodiment, a value passed to an operating system is similar to an application setting an AMR. If accelerator integration circuit 1736 and graphics acceleration module 1746 implementations do not support a User Authority Mask Override Register (UAMOR), an operating system may apply a current UAMOR value to an AMR value before passing an AMR in a hypervisor call. Hypervisor 1796 may optionally apply a current Authority Mask Override Register (AMOR) value before placing an AMR into process element 1783. In at least one embodiment, CSRP is one of registers 1745 containing an effective address of an area in an application's address space 1782 for graphics acceleration module 1746 to save and restore context state. This pointer is optional if no state is required to be saved between jobs or when a job is preempted. In at least one embodiment, context save/restore area may be pinned system memory.

Upon receiving a system call, operating system 1795 may verify that application 1780 has registered and been given authority to use graphics acceleration module 1746. Operating system 1795 then calls hypervisor 1796 with information shown in Table 3.

TABLE 3

| OS to Hypervisor Call Parameters | |
| --- | --- |
| 1 | A work descriptor (WD) |
| 2 | An Authority Mask Register (AMR) value (potentially masked) |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |

Upon receiving a hypervisor call, hypervisor 1796 verifies that operating system 1795 has registered and been given authority to use graphics acceleration module 1746. Hypervisor 1796 then puts process element 1783 into a process element linked list for a corresponding graphics acceleration module 1746 type. A process element may include information shown in Table 4.

TABLE 4

| Process Element Information | |
| --- | --- |
| 1 | A work descriptor (WD) |
| 2 | An Authority Mask Register (AMR) value (potentially masked). |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |
| 8 | Interrupt vector table, derived from hypervisor call parameters |
| 9 | A state register (SR) value |
| 10 | A logical partition ID (LPID) |
| 11 | A real address (RA) hypervisor accelerator utilization record pointer |
| 12 | Storage Descriptor Register (SDR) |

In at least one embodiment, hypervisor initializes a plurality of accelerator integration slice 1790 registers 1745.

Figure 17F:
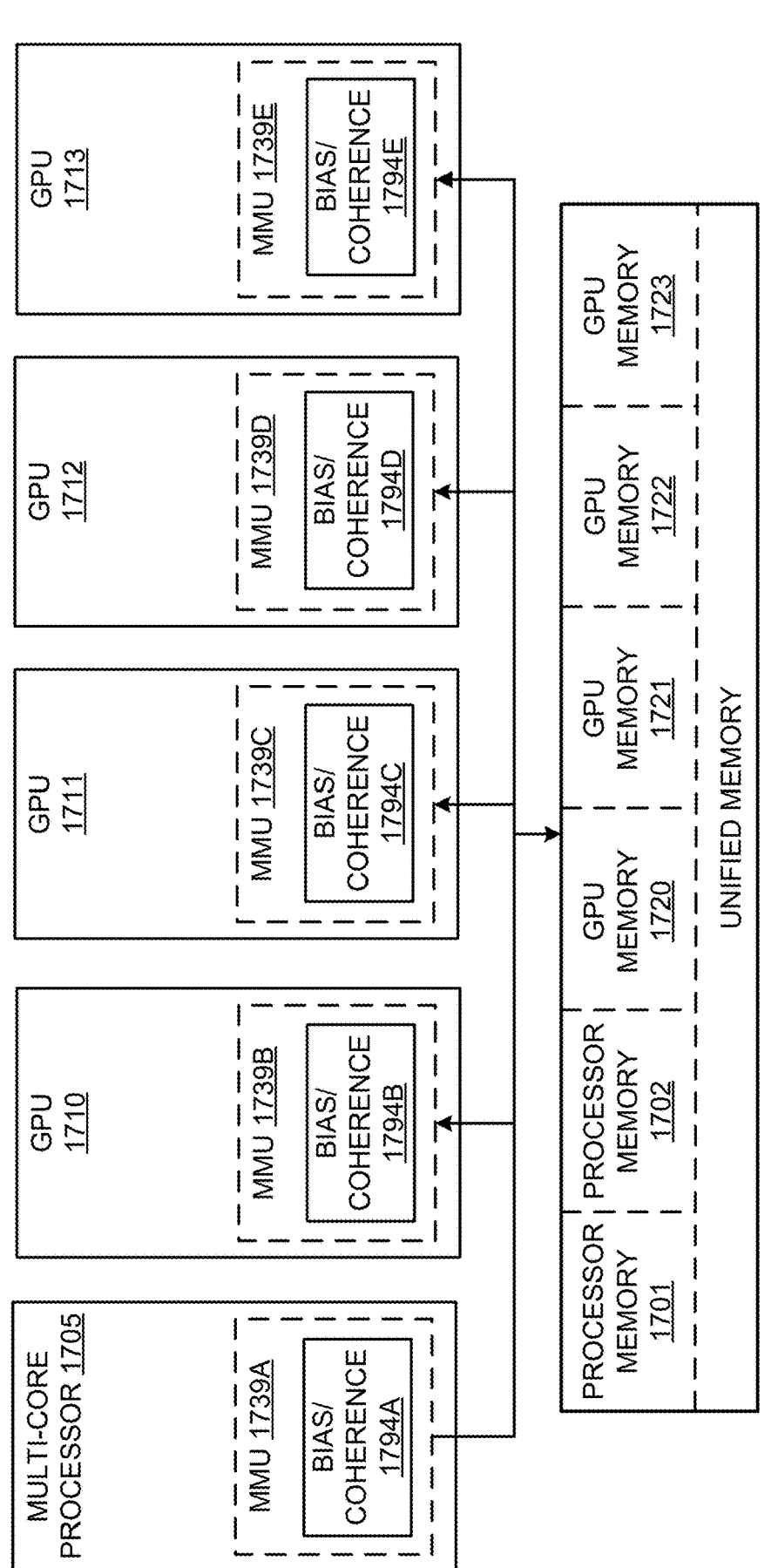

As illustrated in FIG. 17F, in at least one embodiment, a unified memory is used, addressable via a common virtual memory address space used to access physical processor memories 1701-1702 and GPU memories 1720-1723. In this implementation, operations executed on GPUs 1710-1713 utilize a same virtual/effective memory address space to access processor memories 1701-1702 and vice versa, thereby simplifying programmability. In one embodiment, a first portion of a virtual/effective address space is allocated to processor memory 1701, a second portion to second processor memory 1702, a third portion to GPU memory 1720, and so on. In at least one embodiment, an entire virtual/effective memory space (sometimes referred to as an effective address space) is thereby distributed across each of processor memories 1701-1702 and GPU memories 1720-1723, allowing any processor or GPU to access any physical memory with a virtual address mapped to that memory.

In one embodiment, bias/coherence management circuitry 1794A-1794E within one or more of MMUs 1739A-1739E ensures cache coherence between caches of one or more host processors (e.g., 1705) and GPUs 1710-1713 and implements biasing techniques indicating physical memories in which certain types of data should be stored. While multiple instances of bias/coherence management circuitry 1794A-1794E are illustrated in FIG. 17F, bias/coherence circuitry may be implemented within an MMU of one or more host processors 1705 and/or within accelerator integration circuit 1736.

One embodiment allows GPU-attached memory 1720-1723 to be mapped as part of system memory, and accessed using shared virtual memory (SVM) technology, but without suffering performance drawbacks associated with full system cache coherence. In at least one embodiment, an ability for GPU-attached memory 1720-1723 to be accessed as system memory without onerous cache coherence overhead provides a beneficial operating environment for GPU offload. This arrangement allows host processor 1705 software to setup operands and access computation results, without overhead of tradition I/O DMA data copies. Such traditional copies involve driver calls, interrupts and memory mapped I/O (MMIO) accesses that are all inefficient relative to simple memory accesses. In at least one embodiment, an ability to access GPU attached memory 1720-1723 without cache coherence overheads can be critical to execution time of an offloaded computation. In cases with substantial streaming write memory traffic, for example, cache coherence overhead can significantly reduce an effective write bandwidth seen by a GPU 1710-1713. In at least one embodiment, efficiency of operand setup, efficiency of results access, and efficiency of GPU computation may play a role in determining effectiveness of a GPU offload.

In at least one embodiment, selection of GPU bias and host processor bias is driven by a bias tracker data structure. A bias table may be used, for example, which may be a page-granular structure (i.e., controlled at a granularity of a memory page) that includes 1 or 2 bits per GPU-attached memory page. In at least one embodiment, a bias table may be implemented in a stolen memory range of one or more GPU-attached memories 1720-1723, with or without a bias cache in GPU 1710-1713 (e.g., to cache frequently/recently used entries of a bias table). Alternatively, an entire bias table may be maintained within a GPU.

In at least one embodiment, a bias table entry associated with each access to GPU-attached memory 1720-1723 is accessed prior to actual access to a GPU memory, causing the following operations. First, local requests from GPU 1710-1713 that find their page in GPU bias are forwarded directly to a corresponding GPU memory 1720-1723. Local requests from a GPU that find their page in host bias are forwarded to processor 1705 (e.g., over a high-speed link as discussed above). In one embodiment, requests from processor 1705 that find a requested page in host processor bias complete a request like a normal memory read. Alternatively, requests directed to a GPU-biased page may be forwarded to GPU 1710-1713. In at least one embodiment, a GPU may then transition a page to a host processor bias if it is not currently using a page. In at least one embodiment, bias state of a page can be changed either by a software-based mechanism, a hardware-assisted software-based mechanism, or, for a limited set of cases, a purely hardware-based mechanism.

One mechanism for changing bias state employs an API call (e.g., OpenCL), which, in turn, calls a GPU's device driver which, in turn, sends a message (or enqueues a command descriptor) to a GPU directing it to change a bias state and, for some transitions, perform a cache flushing operation in a host. In at least one embodiment, cache flushing operation is used for a transition from host processor 1705 bias to GPU bias, but is not for an opposite transition.

In one embodiment, cache coherency is maintained by temporarily rendering GPU-biased pages uncacheable by host processor 1705. To access these pages, processor 1705 may request access from GPU 1710 which may or may not grant access right away. Thus, to reduce communication between processor 1705 and GPU 1710 it is beneficial to ensure that GPU-biased pages are those which are required by a GPU but not host processor 1705 and vice versa.

In at least one embodiment, at least one component shown or described with respect to one or more of FIGS. 17A-F is utilized to implement techniques and/or functions described in connection with FIGS. 1-10. In at least one embodiment, at least one GPU and/or multi-core processor shown or described with respect to FIGS. 17A-F is used to perform channel estimation, coherent combining, and/or signal detection for one or more signals that do not have a corresponding reference signal. In at least one embodiment, at least one GPU and/or multi-core processor shown or described with respect to FIGS. 17A-F performs at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

Figure 18:
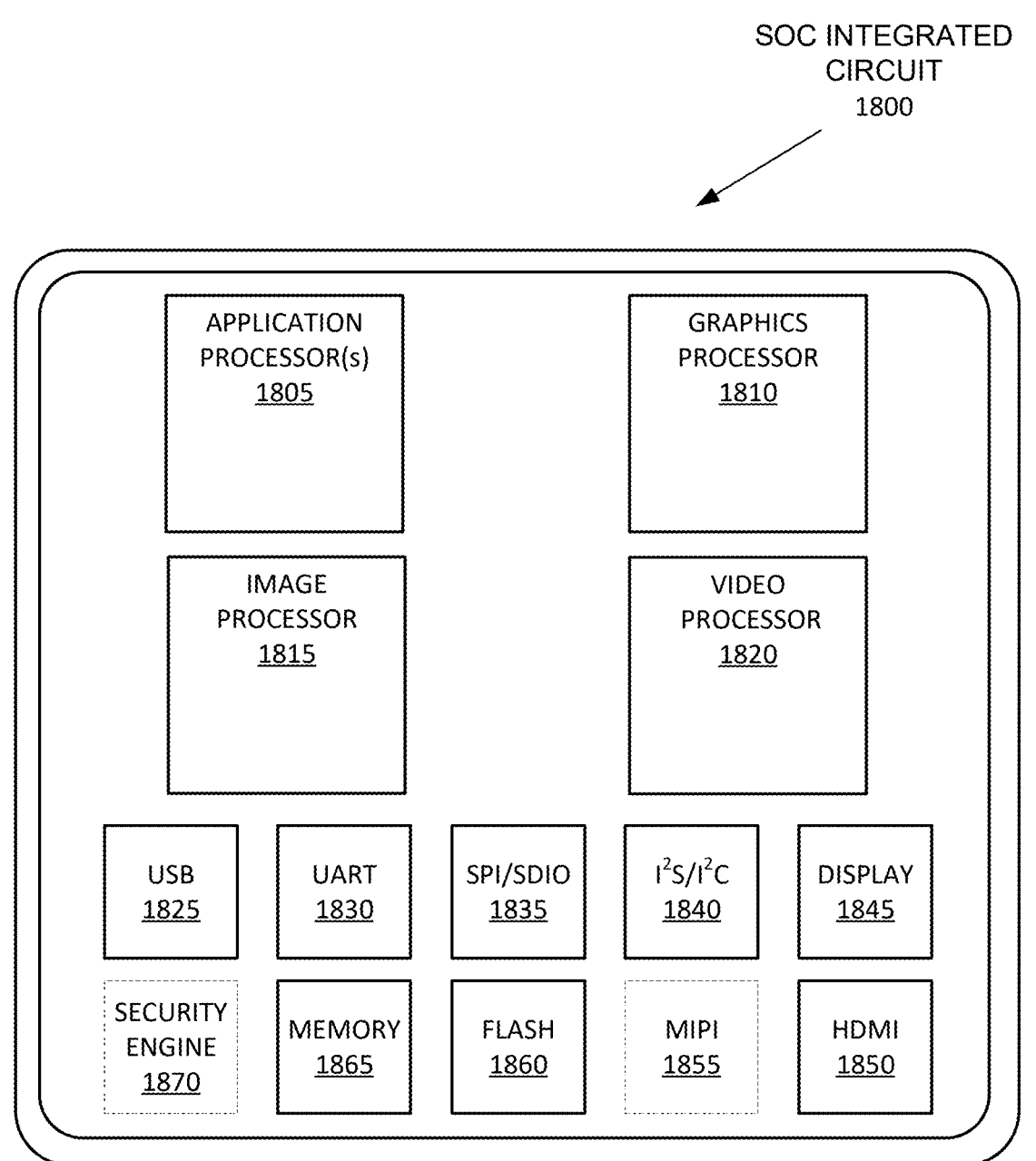
FIG. 18 illustrates exemplary integrated circuits and associated graphics processors, according to at least one embodiment.

FIG. 18 illustrates exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIG. 18 is a block diagram illustrating an exemplary system on a chip integrated circuit 1800 that may be fabricated using one or more IP cores, according to at least one embodiment. In at least one embodiment, integrated circuit 1800 includes one or more application processor(s) 1805 (e.g., CPUs), at least one graphics processor 1810, and may additionally include an image processor 1815 and/or a video processor 1820, any of which may be a modular IP core. In at least one embodiment, integrated circuit 1800 includes peripheral or bus logic including a USB controller 1825, UART controller 1830, an SPI/SDIO controller 1835, and an I.sup.2S/I.sup.2C controller 1840. In at least one embodiment, integrated circuit 1800 can include a display device 1845 coupled to one or more of a high-definition multimedia interface (HDMI) controller 1850 and a mobile industry processor interface (MIPI) display interface 1855. In at least one embodiment, storage may be provided by a flash memory subsystem 1860 including flash memory and a flash memory controller. In at least one embodiment, memory interface may be provided via a memory controller 1865 for access to SDRAM or SRAM memory devices. In at least one embodiment, some integrated circuits additionally include an embedded security engine 1870.

In at least one embodiment, at least one component shown or described with respect to FIG. 18 is utilized to implement techniques and/or functions described in connection with FIGS. 1-10. In at least one embodiment, graphics processor 1810 is used to perform channel estimation, coherent combining, and/or signal detection for one or more signals that do not have a corresponding reference signal. In at least one embodiment, graphics processor 1810 performs at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

FIGS. 19A-19B illustrate exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIGS. 19A-19B are block diagrams illustrating exemplary graphics processors for use within an SoC, according to embodiments described herein. FIG. 19A illustrates an exemplary graphics processor 1910 of a system on a chip integrated circuit that may be fabricated using one or more IP cores, according to at least one embodiment. FIG. 19B illustrates an additional exemplary graphics processor 1940 of a system on a chip integrated circuit that may be fabricated using one or more IP cores, according to at least one embodiment. In at least one embodiment, graphics processor 1910 of FIG. 19A is a low power graphics processor core. In at least one embodiment, graphics processor 1940 of FIG. 19B is a higher performance graphics processor core. In at least one embodiment, each of graphics processors 1910, 1940 can be variants of graphics processor 1810 of FIG. 18.

In at least one embodiment, graphics processor 1910 includes a vertex processor 1905 and one or more fragment processor(s) 1915A-1915N (e.g., 1915A, 1915B, 1915C, 1915D, through 1915N-1, and 1915N). In at least one embodiment, graphics processor 1910 can execute different shader programs via separate logic, such that vertex processor 1905 is optimized to execute operations for vertex shader programs, while one or more fragment processor(s) 1915A-1915N execute fragment (e.g., pixel) shading operations for fragment or pixel shader programs. In at least one embodiment, vertex processor 1905 performs a vertex processing stage of a 3D graphics pipeline and generates primitives and vertex data. In at least one embodiment, fragment processor(s) 1915A-1915N use primitive and vertex data generated by vertex processor 1905 to produce a framebuffer that is displayed on a display device. In at least one embodiment, fragment processor(s) 1915A-1915N are optimized to execute fragment shader programs as provided for in an OpenGL API, which may be used to perform similar operations as a pixel shader program as provided for in a Direct 3D API.

In at least one embodiment, graphics processor 1910 additionally includes one or more memory management units (MMUs) 1920A-1920B, cache(s) 1925A-1925B, and circuit interconnect(s) 1930A-1930B. In at least one embodiment, one or more MMU(s) 1920A-1920B provide for virtual to physical address mapping for graphics processor 1910, including for vertex processor 1905 and/or fragment processor(s) 1915A-1915N, which may reference vertex or image/texture data stored in memory, in addition to vertex or image/texture data stored in one or more cache(s) 1925A-1925B. In at least one embodiment, one or more MMU(s) 1920A-1920B may be synchronized with other MMUs within system, including one or more MMUs associated with one or more application processor(s) 1805, image processors 1815, and/or video processors 1820 of FIG. 18, such that each processor 1805-1820 can participate in a shared or unified virtual memory system. In at least one embodiment, one or more circuit interconnect(s) 1930A-1930B enable graphics processor 1910 to interface with other IP cores within SoC, either via an internal bus of SoC or via a direct connection.

In at least one embodiment, graphics processor 1940 includes one or more MMU(s) 1920A-1920B, caches 1925A-1925B, and circuit interconnects 1930A-1930B of graphics processor 1910 of FIG. 19A. In at least one embodiment, graphics processor 1940 includes one or more shader core(s) 1955A-1955N (e.g., 1955A, 1955B, 1955C, 1955D, 1955E, 1955F, through 1955N-1, and 1955N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 1940 includes an inter-core task manager 1945, which acts as a thread dispatcher to dispatch execution threads to one or more shader cores 1955A-1955N and a tiling unit 1958 to accelerate tiling operations for tile-based rendering, in which rendering operations for a scene are subdivided in image space, for example to exploit local spatial coherence within a scene or to optimize use of internal caches.

In at least one embodiment, at least one component shown or described with respect to FIGS. 19A and 19B is utilized to implement techniques and/or functions described in connection with FIGS. 1-10. In at least one embodiment, graphics processor 1910 is used to perform channel estimation, coherent combining, and/or signal detection for one or more signals that do not have a corresponding reference signal. In at least one embodiment, graphics processor 1910 performs at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

Figure 20A:
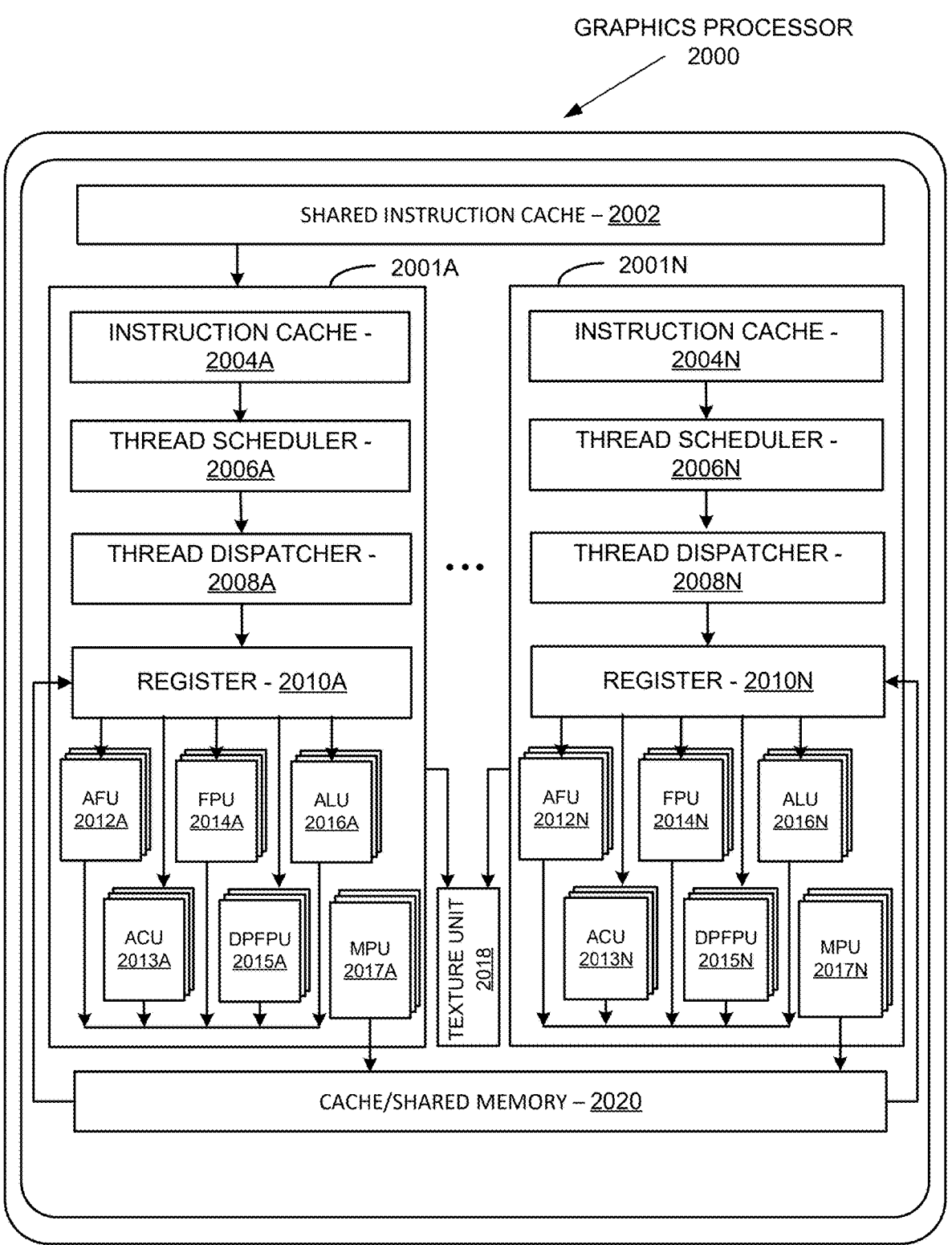
FIGS. 20A and 20B illustrate additional exemplary graphics processor logic according to at least one embodiment.
Figure 20B:
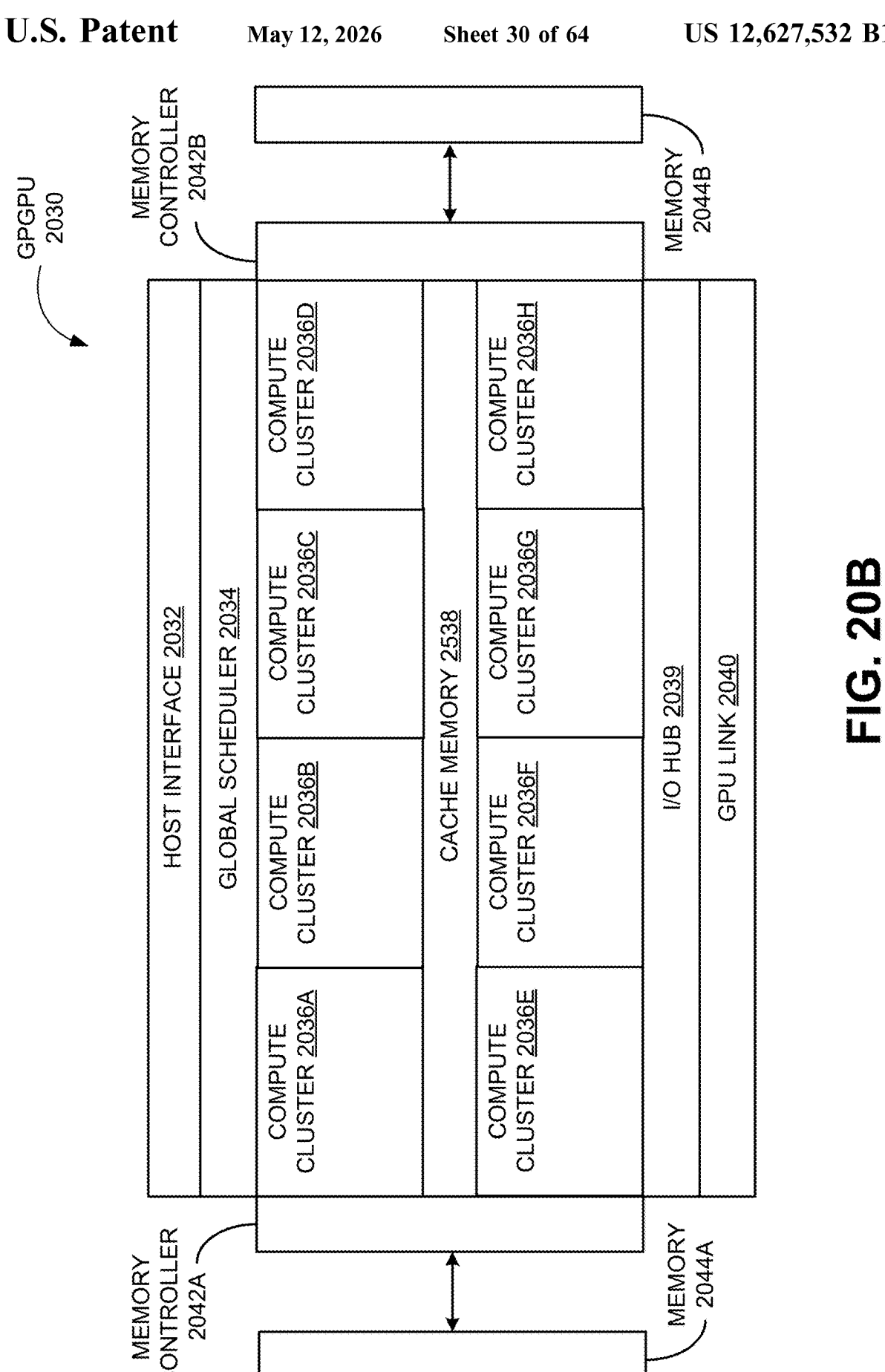

FIGS. 20A-20B illustrate additional exemplary graphics processor logic according to embodiments described herein. FIG. 20A illustrates a graphics core 2000 that may be included within graphics processor 1810 of FIG. 18, in at least one embodiment, and may be a unified shader core 1955A-1955N as in FIG. 19B in at least one embodiment. FIG. 20B illustrates a highly-parallel general-purpose graphics processing unit 2030 suitable for deployment on a multi-chip module in at least one embodiment.

In at least one embodiment, graphics core 2000 includes a shared instruction cache 2002, a texture unit 2018, and a cache/shared memory 2020 that are common to execution resources within graphics core 2000. In at least one embodiment, graphics core 2000 can include multiple slices 2001A-2001N or partition for each core, and a graphics processor can include multiple instances of graphics core 2000. Slices 2001A-2001N can include support logic including a local instruction cache 2004A-2004N, a thread scheduler 2006A-

2006N, a thread dispatcher 2008A-2008N, and a set of registers 2010A-2010N. In at least one embodiment, slices 2001A-2001N can include a set of additional function units (AFUs 2012A-2012N), floating-point units (FPU 2014A-2014N), integer arithmetic logic units (ALUs 2016-2016N), address computational units (ACU 2013A-2013N), double-precision floating-point units (DPFPU 2015A-2015N), and matrix processing units (MPU 2017A-2017N).

In at least one embodiment, FPUs 2014A-2014N can perform single-precision (32-bit) and half-precision (16-bit) floating point operations, while DPFPUs 2015A-2015N perform double precision (64-bit) floating point operations. In at least one embodiment, ALUs 2016A-2016N can perform variable precision integer operations at 8-bit, 16-bit, and 32-bit precision, and can be configured for mixed precision operations. In at least one embodiment, MPUs 2017A-2017N can also be configured for mixed precision matrix operations, including half-precision floating point and 8-bit integer operations. In at least one embodiment, MPUs 2017-2017N can perform a variety of matrix operations to accelerate machine learning application frameworks, including enabling support for accelerated general matrix to matrix multiplication (GEMM). In at least one embodiment, AFUs 2012A-2012N can perform additional logic operations not supported by floating-point or integer units, including trigonometric operations (e.g., Sine, Cosine, etc.).

In at least one embodiment, at least one component shown or described with respect to FIG. 20A is utilized to implement techniques and/or functions described in connection with FIGS. 1-10. In at least one embodiment, at least one graphics processor 2000 is used to perform channel estimation, coherent combining, and/or signal detection for one or more signals that do not have a corresponding reference signal. In at least one embodiment, at least one graphics processor 2000 performs at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

FIG. 20B illustrates a general-purpose processing unit (GPGPU) 2030 that can be configured to enable highly-parallel compute operations to be performed by an array of graphics processing units, in at least one embodiment. In at least one embodiment, GPGPU 2030 can be linked directly to other instances of GPGPU 2030 to create a multi-GPU cluster to improve training speed for deep neural networks. In at least one embodiment, GPGPU 2030 includes a host interface 2032 to enable a connection with a host processor. In at least one embodiment, host interface 2032 is a PCI Express interface. In at least one embodiment, host interface 2032 can be a vendor specific communications interface or communications fabric. In at least one embodiment, GPGPU 2030 receives commands from a host processor and uses a global scheduler 2034 to distribute execution threads associated with those commands to a set of compute clusters 2036A-2036H. In at least one embodiment, compute clusters 2036A-2036H share a cache memory 2038. In at least one embodiment, cache memory 2038 can serve as a higher-level cache for cache memories within compute clusters 2036A-2036H.

In at least one embodiment, GPGPU 2030 includes memory 2044A-2044B coupled with compute clusters 2036A-2036H via a set of memory controllers 2042A-2042B. In at least one embodiment, memory 2044A-2044B can include various types of memory devices including dynamic random access memory (DRAM) or graphics random access memory, such as synchronous graphics random access memory (SGRAM), including graphics double data rate (GDDR) memory.

In at least one embodiment, compute clusters 2036A-2036H each include a set of graphics cores, such as graphics core 2000 of FIG. 20A, which can include multiple types of integer and floating point logic units that can perform computational operations at a range of precisions including suited for machine learning computations. For example, in at least one embodiment, at least a subset of floating point units in each of compute clusters 2036A-2036H can be configured to perform 16-bit or 32-bit floating point operations, while a different subset of floating point units can be configured to perform 64-bit floating point operations.

In at least one embodiment, multiple instances of GPGPU 2030 can be configured to operate as a compute cluster. In at least one embodiment, communication used by compute clusters 2036A-2036H for synchronization and data exchange varies across embodiments. In at least one embodiment, multiple instances of GPGPU 2030 communicate over host interface 2032. In at least one embodiment, GPGPU 2030 includes an I/O hub 2039 that couples GPGPU 2030 with a GPU link 2040 that enables a direct connection to other instances of GPGPU 2030. In at least one embodiment, GPU link 2040 is coupled to a dedicated GPU-to-GPU bridge that enables communication and synchronization between multiple instances of GPGPU 2030. In at least one embodiment GPU link 2040 couples with a high-speed interconnect to transmit and receive data to other GPGPUs or parallel processors. In at least one embodiment, multiple instances of GPGPU 2030 are located in separate data processing systems and communicate via a network device that is accessible via host interface 2032. In at least one embodiment GPU link 2040 can be configured to enable a connection to a host processor in addition to or as an alternative to host interface 2032.

In at least one embodiment, GPGPU 2030 can be configured to train neural networks. In at least one embodiment, GPGPU 2030 can be used within an inferencing platform. In at least one embodiment, in which GPGPU 2030 is used for inferencing, GPGPU may include fewer compute clusters 2036A-2036H relative to when GPGPU is used for training a neural network. In at least one embodiment, memory technology associated with memory 2044A-2044B may differ between inferencing and training configurations, with higher bandwidth memory technologies devoted to training configurations. In at least one embodiment, inferencing configuration of GPGPU 2030 can support inferencing specific instructions. For example, in at least one embodiment, an inferencing configuration can provide support for one or more 8-bit integer dot product instructions, which may be used during inferencing operations for deployed neural networks.

In at least one embodiment, at least one component shown or described with respect to FIG. 20B is utilized to implement techniques and/or functions described in connection with FIGS. 1-10. In at least one embodiment, at least one GPGPU 2030 os used to perform channel estimation, coherent combining, and/or signal detection for one or more signals that do not have a corresponding reference signal. In at least one embodiment, at least one GPGPU 2030 perform at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

Figure 21:
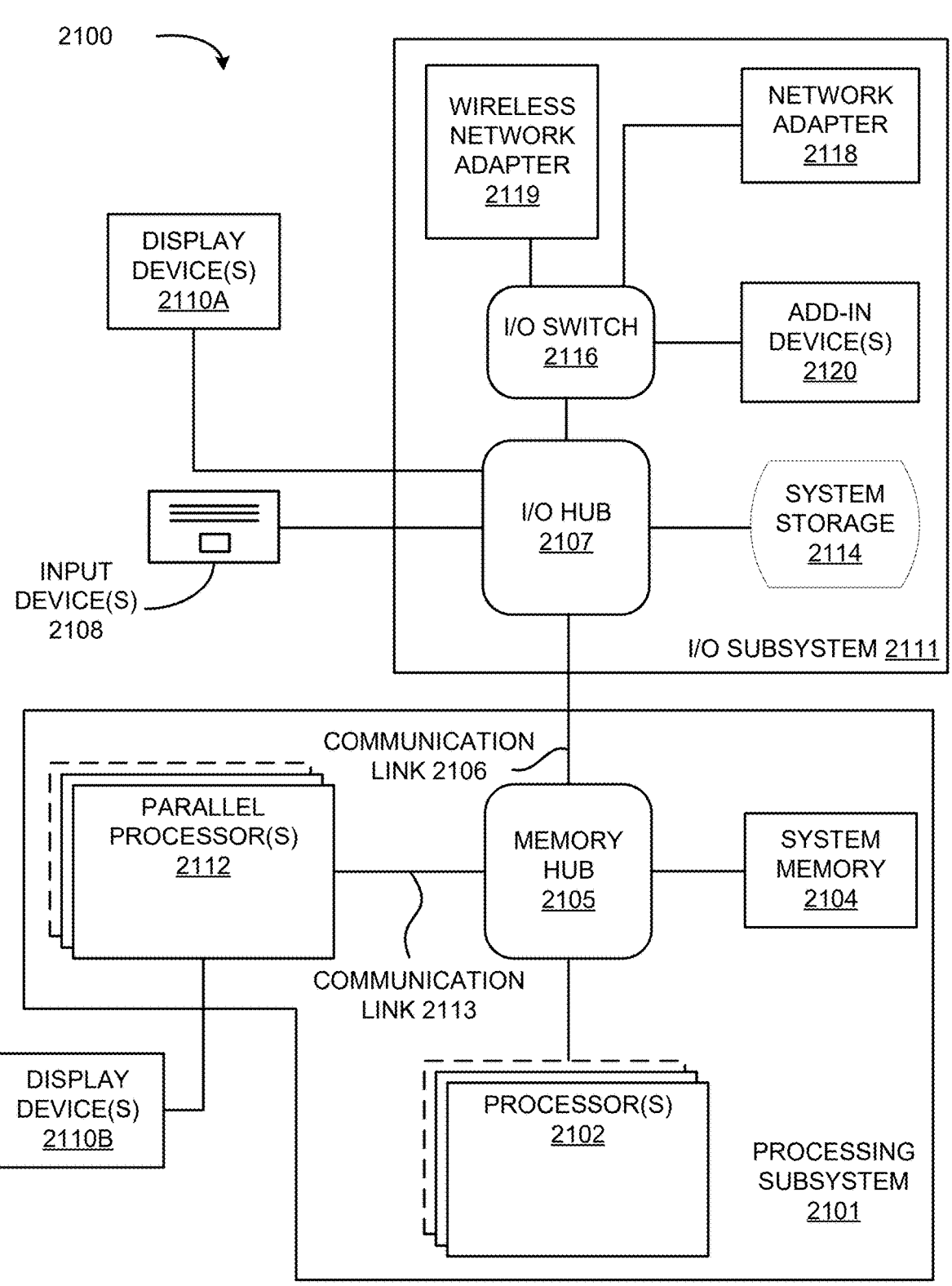
FIG. 21 illustrates a computer system, according to at least one embodiment.

FIG. 21 is a block diagram illustrating a computing system 2100 according to at least one embodiment. In at least one embodiment, computing system 2100 includes a processing subsystem 2101 having one or more processor(s) 2102 and a system memory 2104 communicating via an interconnection path that may include a memory hub 2105. In at least one embodiment, memory hub 2105 may be a separate component within a chipset component or may be integrated within one or more processor(s) 2102. In at least one embodiment, memory hub 2105 couples with an I/O subsystem 2111 via a communication link 2106. In at least one embodiment, I/O subsystem 2111 includes an I/O hub 2107 that can enable computing system 2100 to receive input from one or more input device(s) 2108. In at least one embodiment, I/O hub 2107 can enable a display controller, which may be included in one or more processor(s) 2102, to provide outputs to one or more display device(s) 2110A. In at least one embodiment, one or more display device(s) 2110A coupled with I/O hub 2107 can include a local, internal, or embedded display device.

In at least one embodiment, processing subsystem 2101 includes one or more parallel processor(s) 2112 coupled to memory hub 2105 via a bus or other communication link 2113. In at least one embodiment, communication link 2113 may be one of any number of standards based communication link technologies or protocols, such as, but not limited to PCI Express, or may be a vendor specific communications interface or communications fabric. In at least one embodiment, one or more parallel processor(s) 2112 form a computationally focused parallel or vector processing system that can include a large number of processing cores and/or processing clusters, such as a many integrated core (MIC) processor. In at least one embodiment, one or more parallel processor(s) 2112 form a graphics processing subsystem that can output pixels to one of one or more display device(s) 2110A coupled via I/O Hub 2107. In at least one embodiment, one or more parallel processor(s) 2112 can also include a display controller and display interface (not shown) to enable a direct connection to one or more display device(s) 2110B.

In at least one embodiment, a system storage unit 2114 can connect to I/O hub 2107 to provide a storage mechanism for computing system 2100. In at least one embodiment, an I/O switch 2116 can be used to provide an interface mechanism to enable connections between I/O hub 2107 and other components, such as a network adapter 2118 and/or wireless network adapter 2119 that may be integrated into platform, and various other devices that can be added via one or more add-in device(s) 2120. In at least one embodiment, network adapter 2118 can be an Ethernet adapter or another wired network adapter. In at least one embodiment, wireless network adapter 2119 can include one or more of a Wi-Fi, Bluetooth, near field communication (NFC), or other network device that includes one or more wireless radios.

In at least one embodiment, computing system 2100 can include other components not explicitly shown, including USB or other port connections, optical storage drives, video capture devices, and like, may also be connected to I/O hub 2107. In at least one embodiment, communication paths interconnecting various components in FIG. 21 may be implemented using any suitable protocols, such as PCI (Peripheral Component Interconnect) based protocols (e.g., PCI-Express), or other bus or point-to-point communication interfaces and/or protocol(s), such as NV-Link high-speed interconnect, or interconnect protocols.

In at least one embodiment, one or more parallel processor(s) 2112 incorporate circuitry optimized for graphics and video processing, including, for example, video output circuitry, and constitutes a graphics processing unit (GPU). In at least one embodiment, one or more parallel processor(s) 2112 incorporate circuitry optimized for general purpose processing. In at least embodiment, components of computing system 2100 may be integrated with one or more other system elements on a single integrated circuit. For example, in at least one embodiment, one or more parallel processor(s) 2112, memory hub 2105, processor(s) 2102, and I/O hub 2107 can be integrated into a system on chip (SoC) integrated circuit. In at least one embodiment, components of computing system 2100 can be integrated into a single package to form a system in package (SIP) configuration. In at least one embodiment, at least a portion of components of computing system 2100 can be integrated into a multi-chip module (MCM), which can be interconnected with other multi-chip modules into a modular computing system.

In at least one embodiment, at least one component shown or described with respect to FIG. 21 is utilized to implement techniques and/or functions described in connection with FIGS. 1-10. In at least one embodiment, at least one of processor 2102 and parallel processor 2112 are used to perform channel estimation, coherent combining, and/or signal detection for one or more signals that do not have a corresponding reference signal. In at least one embodiment, at least one of processor 2102 and parallel processor 2112 perform at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

Processors

Figure 22A:
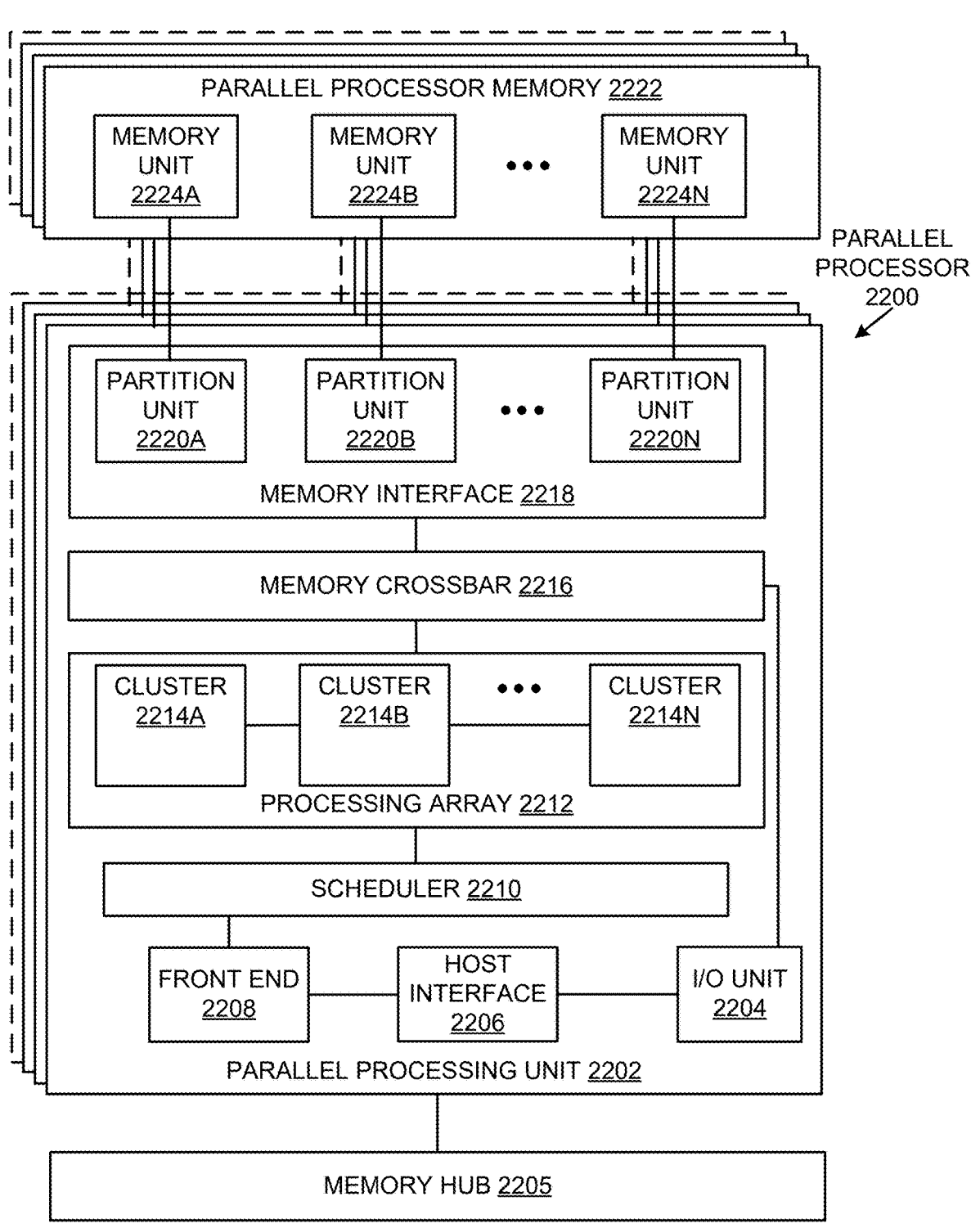
FIG. 22A illustrates a parallel processor, according to at least one embodiment.

FIG. 22A illustrates a parallel processor 2200 according to at least on embodiment. In at least one embodiment, various components of parallel processor 2200 may be implemented using one or more integrated circuit devices, such as programmable processors, application specific integrated circuits (ASICs), or field programmable gate arrays (FPGA). In at least one embodiment, illustrated parallel processor 2200 is a variant of one or more parallel processor(s) 2112 shown in FIG. 21 according to an exemplary embodiment.

In at least one embodiment, parallel processor 2200 includes a parallel processing unit 2202. In at least one embodiment, parallel processing unit 2202 includes an I/O unit 2204 that enables communication with other devices, including other instances of parallel processing unit 2202. In at least one embodiment, I/O unit 2204 may be directly connected to other devices. In at least one embodiment, I/O unit 2204 connects with other devices via use of a hub or switch interface, such as memory hub 2105. In at least one embodiment, connections between memory hub 2105 and I/O unit 2204 form a communication link 2113. In at least one embodiment, I/O unit 2204 connects with a host interface 2206 and a memory crossbar 2216, where host interface 2206 receives commands directed to performing processing operations and memory crossbar 2216 receives commands directed to performing memory operations.

In at least one embodiment, when host interface 2206 receives a command buffer via I/O unit 2204, host interface 2206 can direct work operations to perform those commands to a front end 2208. In at least one embodiment, front end 2208 couples with a scheduler 2210, which is configured to distribute commands or other work items to a processing cluster array 2212. In at least one embodiment, scheduler 2210 ensures that processing cluster array 2212 is properly configured and in a valid state before tasks are distributed to processing cluster array 2212 of processing cluster array 2212. In at least one embodiment, scheduler 2210 is implemented via firmware logic executing on a microcontroller. In at least one embodiment, microcontroller implemented scheduler 2210 is configurable to perform complex scheduling and work distribution operations at coarse and fine granularity, enabling rapid preemption and context switching of threads executing on processing array 2212. In at least one embodiment, host software can prove workloads for scheduling on processing array 2212 via one of multiple graphics processing doorbells. In at least one embodiment, workloads can then be automatically distributed across processing array 2212 by scheduler 2210 logic within a microcontroller including scheduler 2210.

In at least one embodiment, processing cluster array 2212 can include up to "N" processing clusters (e.g., cluster 2214A, cluster 2214B, through cluster 2214N). In at least one embodiment, each cluster 2214A-2214N of processing cluster array 2212 can execute a large number of concurrent threads. In at least one embodiment, scheduler 2210 can allocate work to clusters 2214A-2214N of processing cluster array 2212 using various scheduling and/or work distribution algorithms, which may vary depending on workload arising for each type of program or computation. In at least one embodiment, scheduling can be handled dynamically by scheduler 2210, or can be assisted in part by compiler logic during compilation of program logic configured for execution by processing cluster array 2212. In at least one embodiment, different clusters 2214A-2214N of processing cluster array 2212 can be allocated for processing different types of programs or for performing different types of computations.

In at least one embodiment, processing cluster array 2212 can be configured to perform various types of parallel processing operations. In at least one embodiment, processing cluster array 2212 is configured to perform general-purpose parallel compute operations. For example, in at least one embodiment, processing cluster array 2212 can include logic to execute processing tasks including filtering of video and/or audio data, performing modeling operations, including physics operations, and performing data transformations.

In at least one embodiment, processing cluster array 2212 is configured to perform parallel graphics processing operations. In at least one embodiment, processing cluster array 2212 can include additional logic to support execution of such graphics processing operations, including, but not limited to texture sampling logic to perform texture operations, as well as tessellation logic and other vertex processing logic. In at least one embodiment, processing cluster array 2212 can be configured to execute graphics processing related shader programs such as, but not limited to vertex shaders, tessellation shaders, geometry shaders, and pixel shaders. In at least one embodiment, parallel processing unit 2202 can transfer data from system memory via I/O unit 2204 for processing. In at least one embodiment, during processing, transferred data can be stored to on-chip memory (e.g., parallel processor memory 2222) during processing, then written back to system memory.

In at least one embodiment, when parallel processing unit 2202 is used to perform graphics processing, scheduler 2210 can be configured to divide a processing workload into approximately equal sized tasks, to better enable distribution of graphics processing operations to multiple clusters 2214A-2214N of processing cluster array 2212. In at least one embodiment, portions of processing cluster array 2212 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 2214A-2214N may be stored in buffers to allow intermediate data to be transmitted between clusters 2214A-2214N for further processing.

In at least one embodiment, processing cluster array 2212 can receive processing tasks to be executed via scheduler 2210, which receives commands defining processing tasks from front end 2208. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 2210 may be configured to fetch indices corresponding to tasks or may receive indices from front end 2208. In at least one embodiment, front end 2208 can be configured to ensure processing cluster array 2212 is configured to a valid state before a workload specified by incoming command buffers (e.g., batch-buffers, push buffers, etc.) is initiated.

In at least one embodiment, each of one or more instances of parallel processing unit 2202 can couple with parallel processor memory 2222. In at least one embodiment, parallel processor memory 2222 can be accessed via memory crossbar 2216, which can receive memory requests from processing cluster array 2212 as well as I/O unit 2204. In at least one embodiment, memory crossbar 2216 can access parallel processor memory 2222 via a memory interface 2218. In at least one embodiment, memory interface 2218 can include multiple partition units (e.g., partition unit 2220A, partition unit 2220B, through partition unit 2220N) that can each couple to a portion (e.g., memory unit) of parallel processor memory 2222. In at least one embodiment, a number of partition units 2220A-2220N is configured to be equal to a number of memory units, such that a first partition unit 2220A has a corresponding first memory unit 2224A, a second partition unit 2220B has a corresponding memory unit 2224B, and an Nth partition unit 2220N has a corresponding Nth memory unit 2224N. In at least one embodiment, a number of partition units 2220A-2220N may not be equal to a number of memory devices.

In at least one embodiment, memory units 2224A-2224N can include various types of memory devices, including dynamic random access memory (DRAM) or graphics random access memory, such as synchronous graphics random access memory (SGRAM), including graphics double data rate (GDDR) memory. In at least one embodiment, memory units 2224A-2224N may also include 3D stacked memory, including but not limited to high bandwidth memory (HBM). In at least one embodiment, render targets, such as frame buffers or texture maps may be stored across memory units 2224A-2224N, allowing partition units 2220A-2220N to write portions of each render target in parallel to efficiently use available bandwidth of parallel processor memory 2222. In at least one embodiment, a local instance of parallel processor memory 2222 may be excluded in favor of a unified memory design that utilizes system memory in conjunction with local cache memory.

In at least one embodiment, any one of clusters 2214A-2214N of processing cluster array 2212 can process data that will be written to any of memory units 2224A-2224N within parallel processor memory 2222. In at least one embodiment, memory crossbar 2216 can be configured to transfer an output of each cluster 2214A-2214N to any partition unit 2220A-2220N or to another cluster 2214A-2214N, which can perform additional processing operations on an output. In at least one embodiment, each cluster 2214A-2214N can communicate with memory interface 2218 through memory crossbar 2216 to read from or write to various external memory devices. In at least one embodiment, memory crossbar 2216 has a connection to memory interface 2218 to communicate with I/O unit 2204, as well as a connection to a local instance of parallel processor memory 2222, enabling processing units within different processing clusters 2214A-2214N to communicate with system memory or other memory that is not local to parallel processing unit 2202. In at least one embodiment, memory crossbar 2216 can use virtual channels to separate traffic streams between clusters 2214A-2214N and partition units 2220A-2220N.

In at least one embodiment, multiple instances of parallel processing unit 2202 can be provided on a single add-in card, or multiple add-in cards can be interconnected. In at least one embodiment, different instances of parallel processing unit 2202 can be configured to inter-operate even if different instances have different numbers of processing cores, different amounts of local parallel processor memory, and/or other configuration differences. For example, in at least one embodiment, some instances of parallel processing unit 2202 can include higher precision floating point units relative to other instances. In at least one embodiment, systems incorporating one or more instances of parallel processing unit 2202 or parallel processor 2200 can be implemented in a variety of configurations and form factors, including but not limited to desktop, laptop, or handheld personal computers, servers, workstations, game consoles, and/or embedded systems.

Figure 22B:
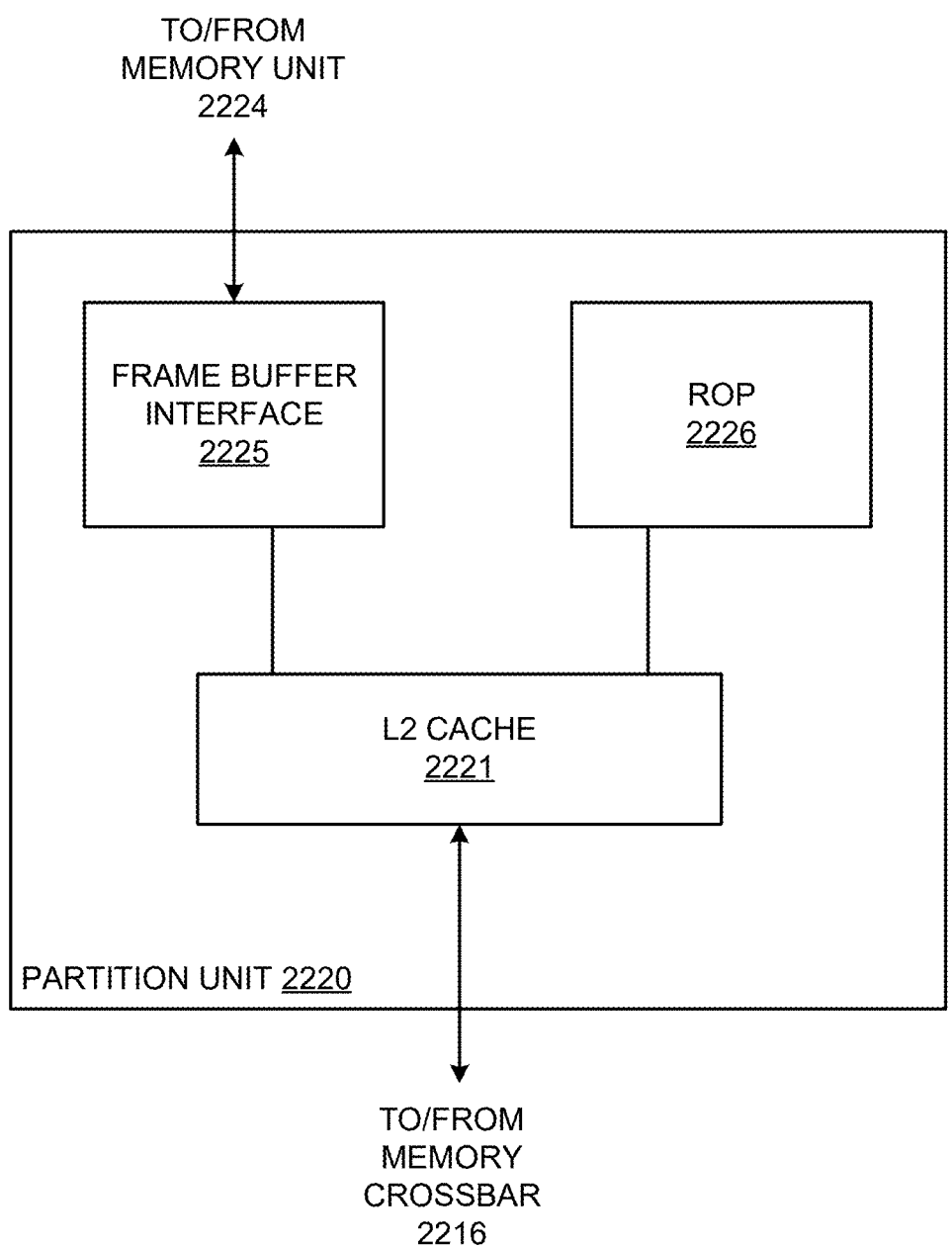
FIG. 22B illustrates a partition unit, according to at least one embodiment.

FIG. 22B is a block diagram of a partition unit 2220 according to at least one embodiment. In at least one embodiment, partition unit 2220 is an instance of one of partition units 2220A-2220N of FIG. 22A. In at least one embodiment, partition unit 2220 includes an L2 cache 2221, a frame buffer interface 2225, and a ROP 2226 (raster operations unit). L2 cache 2221 is a read/write cache that is configured to perform load and store operations received from memory crossbar 2216 and ROP 2226. In at least one embodiment, read misses and urgent write-back requests are output by L2 cache 2221 to frame buffer interface 2225 for processing. In at least one embodiment, updates can also be sent to a frame buffer via frame buffer interface 2225 for processing. In at least one embodiment, frame buffer interface 2225 interfaces with one of memory units in parallel processor memory, such as memory units 2224A-2224N of FIG. 22 (e.g., within parallel processor memory 2222).

In at least one embodiment, ROP 2226 is a processing unit that performs raster operations such as stencil, z test, blending, and like. In at least one embodiment, ROP 2226 then outputs processed graphics data that is stored in graphics memory. In at least one embodiment, ROP 2226 includes compression logic to compress depth or color data that is written to memory and decompress depth or color data that is read from memory. In at least one embodiment, compression logic can be lossless compression logic that makes use of one or more of multiple compression algorithms. In at least one embodiment, type of compression that is performed by ROP 2226 can vary based on statistical characteristics of data to be compressed. For example, in at least one embodiment, delta color compression is performed on depth and color data on a per-tile basis.

In In at least one embodiment, ROP 2226 is included within each processing cluster (e.g., cluster 2214A-2214N of FIG. 22) instead of within partition unit 2220. In at least one embodiment, read and write requests for pixel data are transmitted over memory crossbar 2216 instead of pixel fragment data. In at least one embodiment, processed graphics data may be displayed on a display device, such as one of one or more display device(s) 2110 of FIG. 21, routed for further processing by processor(s) 2102, or routed for further processing by one of processing entities within parallel processor 2200 of FIG. 22A.

Figure 22C:
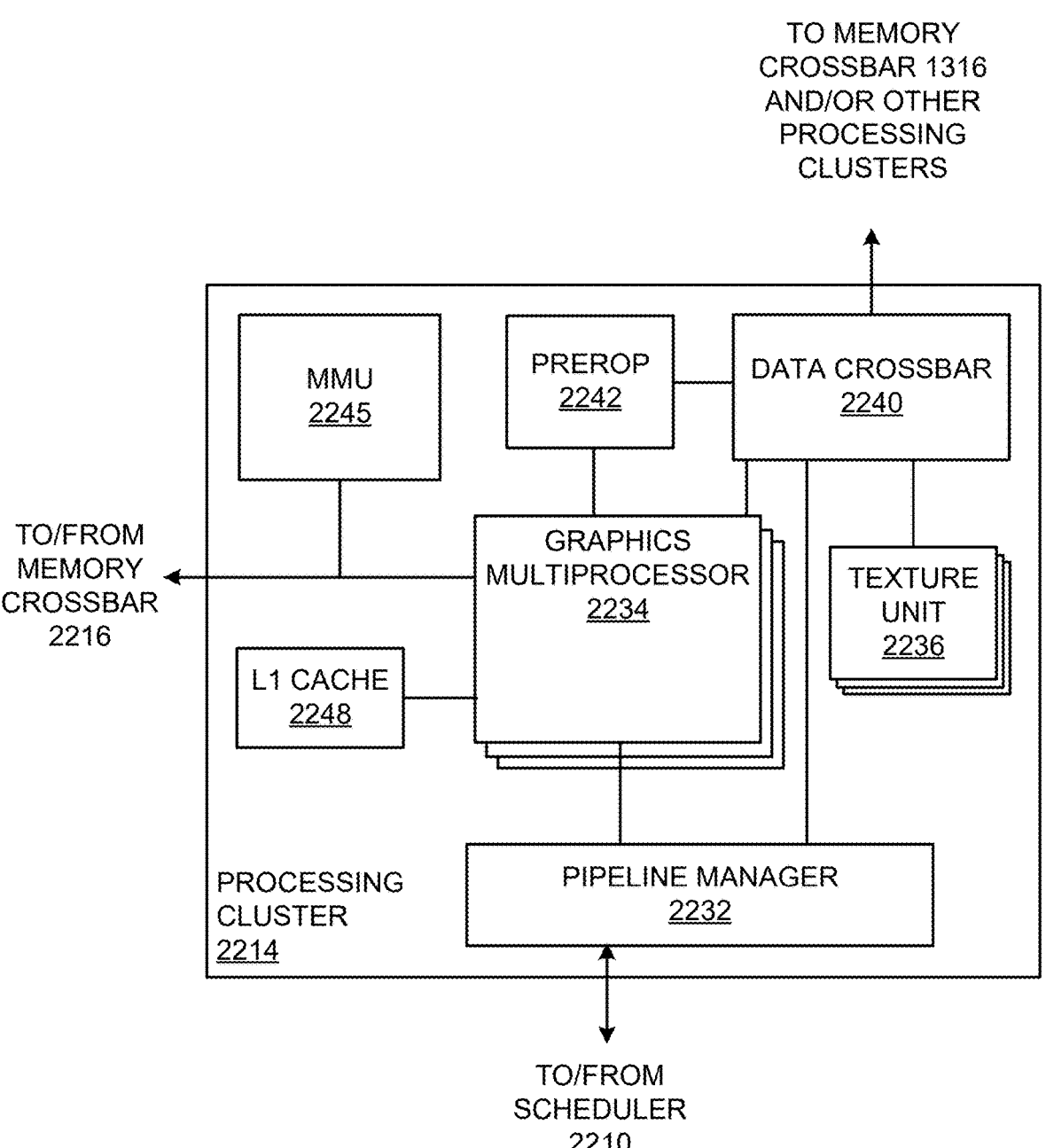
FIG. 22C illustrates a processing cluster, according to at least one embodiment.

FIG. 22C is a block diagram of a processing cluster 2214 within a parallel processing unit according to at least one embodiment. In at least one embodiment, a processing cluster is an instance of one of processing clusters 2214A-2214N of FIG. 22. In at least one embodiment, processing cluster 2214 can be configured to execute many threads in parallel, where term "thread" refers to an instance of a particular program executing on a particular set of input data. In at least one embodiment, single-instruction, multiple-data (SIMD) instruction issue techniques are used to support parallel execution of a large number of threads without providing multiple independent instruction units. In at least one embodiment, single-instruction, multiple-thread (SIMT) techniques are used to support parallel execution of a large number of generally synchronized threads, using a common instruction unit configured to issue instructions to a set of processing engines within each one of processing clusters.

In at least one embodiment, operation of processing cluster 2214 can be controlled via a pipeline manager 2232 that distributes processing tasks to SIMT parallel processors. In at least one embodiment, pipeline manager 2232 receives instructions from scheduler 2210 of FIG. 22 and manages execution of those instructions via a graphics multiprocessor 2234 and/or a texture unit 2236. In at least one embodiment, graphics multiprocessor 2234 is an exemplary instance of a SIMT parallel processor. However, in at least one embodiment, various types of SIMT parallel processors of differing architectures may be included within processing cluster 2214. In at least one embodiment, one or more instances of graphics multiprocessor 2234 can be included within a processing cluster 2214. In at least one embodiment, graphics multiprocessor 2234 can process data and a data crossbar 2240 can be used to distribute processed data to one of multiple possible destinations, including other shader units. In at least one embodiment, pipeline manager 2232 can facilitate distribution of processed data by specifying destinations for processed data to be distributed via data crossbar 2240.

In at least one embodiment, each graphics multiprocessor 2234 within processing cluster 2214 can include an identical set of functional execution logic (e.g., arithmetic logic units, load-store units, etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 2214 constitute a thread. In at least one embodiment, a set of threads executing across a set of parallel processing engines is a thread group. In at least one embodiment, thread group executes a program on different input data. In at least one embodiment, each thread within a thread group can be assigned to a different processing engine within a graphics multiprocessor 2234. In at least one embodiment, a thread group may include fewer threads than a number of processing engines within graphics multiprocessor 2234. In at least one embodiment, when a thread group includes fewer threads than a number of processing engines, one or more of processing engines may be idle during cycles in which that thread group is being processed. In at least one embodiment, a thread group may also include more threads than a number of processing engines within graphics multiprocessor 2234. In at least one embodiment, when a thread group includes more threads than number of processing engines within graphics multiprocessor 2234, processing can be performed over consecutive clock cycles. In at least one embodiment, multiple thread groups can be executed concurrently on a graphics multiprocessor 2234.

In at least one embodiment, graphics multiprocessor 2234 includes an internal cache memory to perform load and store operations. In at least one embodiment, graphics multiprocessor 2234 can forego an internal cache and use a cache memory (e.g., L1 cache 2248) within processing cluster 2214. In at least one embodiment, each graphics multiprocessor 2234 also has access to L2 caches within partition units (e.g., partition units 2220A-2220N of FIG. 22) that are shared among all processing clusters 2214 and may be used to transfer data between threads. In at least one embodiment, graphics multiprocessor 2234 may also access off-chip global memory, which can include one or more of local parallel processor memory and/or system memory. In at least one embodiment, any memory external to parallel processing unit 2202 may be used as global memory. In at least one embodiment, processing cluster 2214 includes multiple instances of graphics multiprocessor 2234 can share common instructions and data, which may be stored in L1 cache 2248.

In at least one embodiment, each processing cluster 2214 may include an MMU 2245 (memory management unit) that is configured to map virtual addresses into physical addresses. In at least one embodiment, one or more instances of MMU 2245 may reside within memory interface 2218 of FIG. 22. In at least one embodiment, MMU 2245 includes a set of page table entries (PTEs) used to map a virtual address to a physical address of a tile and optionally a cache line index. In at least one embodiment, MMU 2245 may include address translation lookaside buffers (TLB) or caches that may reside within graphics multiprocessor 2234 or L1 cache or processing cluster 2214. In at least one embodiment, physical address is processed to distribute surface data access locality to allow efficient request interleaving among partition units. In at least one embodiment, cache line index may be used to determine whether a request for a cache line is a hit or miss.

In at least one embodiment, a processing cluster 2214 may be configured such that each graphics multiprocessor 2234 is coupled to a texture unit 2236 for performing texture mapping operations, e.g., determining texture sample positions, reading texture data, and filtering texture data. In at least one embodiment, texture data is read from an internal texture L1 cache (not shown) or from an L1 cache within graphics multiprocessor 2234 and is fetched from an L2 cache, local parallel processor memory, or system memory, as needed. In at least one embodiment, each graphics multiprocessor 2234 outputs processed tasks to data crossbar 2240 to provide processed task to another processing cluster 2214 for further processing or to store processed task in an L2 cache, local parallel processor memory, or system memory via memory crossbar 2216. In at least one embodiment, preROP 2242 (pre-raster operations unit) is configured to receive data from graphics multiprocessor 2234, direct data to ROP units, which may be located with partition units as described herein (e.g., partition units 2220A-2220N of FIG. 22). In at least one embodiment, PreROP 2242 unit can perform optimizations for color blending, organize pixel color data, and perform address translations.

In at least one embodiment, at least one component shown or described with respect to FIGS. 22A-C is utilized to implement techniques and/or functions described in connection with FIGS. 1-10. In at least one embodiment, at least one parallel processor 2200 is used to perform channel estimation, coherent combining, and/or signal detection for one or more signals that do not have a corresponding reference signal. In at least one embodiment, at least one parallel processor 2200 performs at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

Figure 22D:
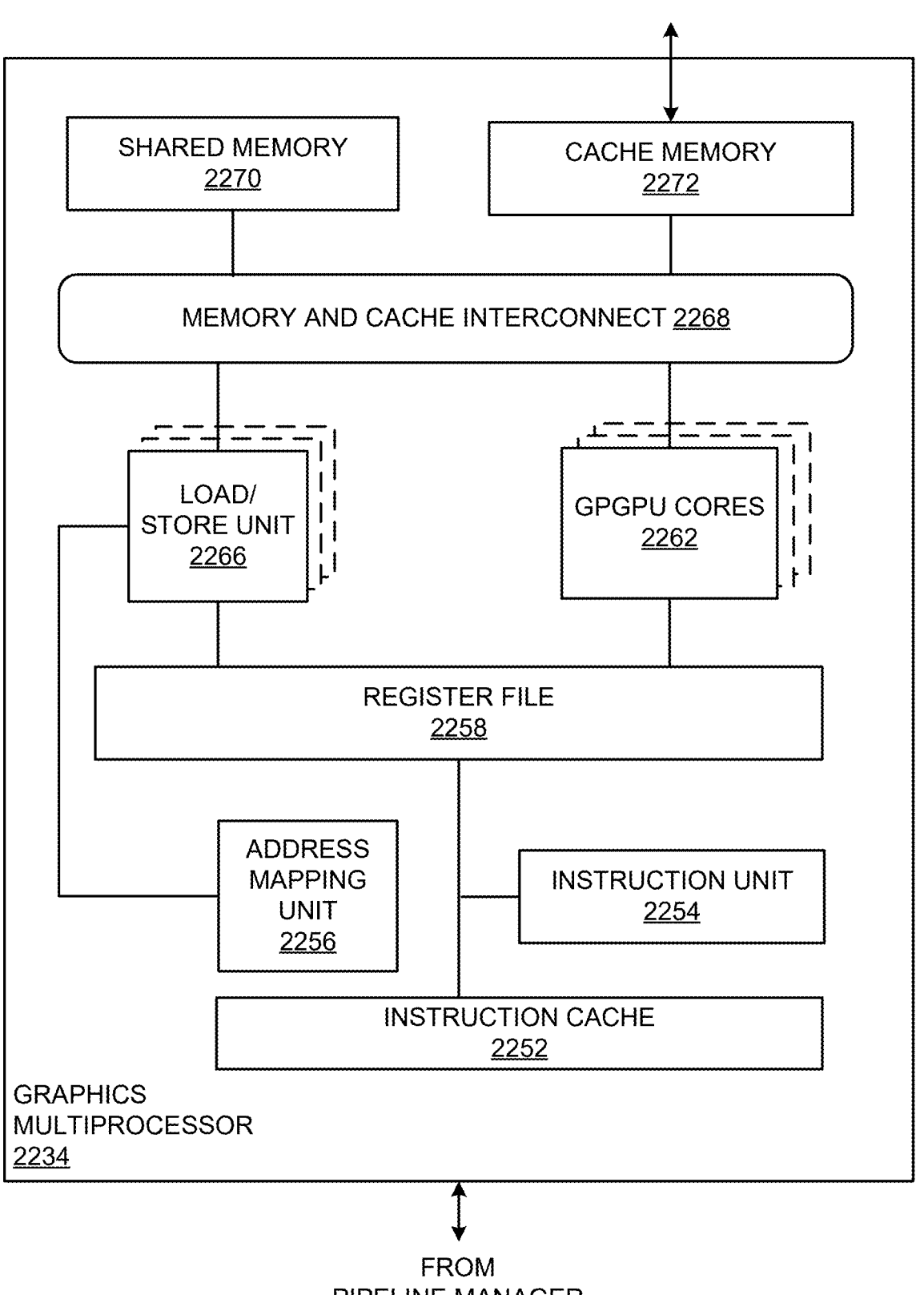
FIG. 22D illustrates a graphics multiprocessor, according to at least one embodiment.

FIG. 22D shows a graphics multiprocessor 2234 according to at least one embodiment. In at least one embodiment, graphics multiprocessor 2234 couples with pipeline manager 2232 of processing cluster 2214. In at least one embodiment, graphics multiprocessor 2234 has an execution pipeline including but not limited to an instruction cache 2252, an instruction unit 2254, an address mapping unit 2256, a register file 2258, one or more general purpose graphics processing unit (GPGPU) cores 2262, and one or more load/store units 2266. GPGPU cores 2262 and load/store units 2266 are coupled with cache memory 2272 and shared memory 2270 via a memory and cache interconnect 2268.

In at least one embodiment, instruction cache 2252 receives a stream of instructions to execute from pipeline manager 2232. In at least one embodiment, instructions are cached in instruction cache 2252 and dispatched for execution by instruction unit 2254. In at least one embodiment, instruction unit 2254 can dispatch instructions as thread groups (e.g., warps), with each thread of thread group assigned to a different execution unit within GPGPU core 2262. In at least one embodiment, an instruction can access any of a local, shared, or global address space by specifying an address within a unified address space. In at least one embodiment, address mapping unit 2256 can be used to translate addresses in a unified address space into a distinct memory address that can be accessed by load/store units 2266.

In at least one embodiment, register file 2258 provides a set of registers for functional units of graphics multiprocessor 2234. In at least one embodiment, register file 2258 provides temporary storage for operands connected to data paths of functional units (e.g., GPGPU cores 2262, load/store units 2266) of graphics multiprocessor 2234. In at least one embodiment, register file 2258 is divided between each of functional units such that each functional unit is allocated a dedicated portion of register file 2258. In at least one embodiment, register file 2258 is divided between different warps being executed by graphics multiprocessor 2234.

In at least one embodiment, GPGPU cores 2262 can each include floating point units (FPUs) and/or integer arithmetic logic units (ALUs) that are used to execute instructions of graphics multiprocessor 2234. GPGPU cores 2262 can be similar in architecture or can differ in architecture. In at least one embodiment, a first portion of GPGPU cores 2262 include a single precision FPU and an integer ALU while a second portion of GPGPU cores include a double precision FPU. In at least one embodiment, FPUs can implement IEEE 754-2008 standard for floating point arithmetic or enable variable precision floating point arithmetic. In at least one embodiment, graphics multiprocessor 2234 can additionally include one or more fixed function or special function units to perform specific functions such as copy rectangle or pixel blending operations. In at least one embodiment one or more of GPGPU cores can also include fixed or special function logic.

In at least one embodiment, GPGPU cores 2262 include SIMD logic capable of performing a single instruction on multiple sets of data. In at least one embodiment GPGPU cores 2262 can physically execute SIMD4, SIMD8, and SIMD16 instructions and logically execute SIMD1, SIMD2, and SIMD32 instructions. In at least one embodiment, SIMD instructions for GPGPU cores can be generated at compile time by a shader compiler or automatically generated when executing programs written and compiled for single program multiple data (SPMD) or SIMT architectures. In at least one embodiment, multiple threads of a program configured for an SIMT execution model can executed via a single SIMD instruction. For example, in at least one embodiment, eight SIMT threads that perform same or similar operations can be executed in parallel via a single SIMD8 logic unit.

In at least one embodiment, memory and cache interconnect 2268 is an interconnect network that connects each functional unit of graphics multiprocessor 2234 to register file 2258 and to shared memory 2270. In at least one embodiment, memory and cache interconnect 2268 is a crossbar interconnect that allows load/store unit 2266 to implement load and store operations between shared memory 2270 and register file 2258. In at least one embodiment, register file 2258 can operate at a same frequency as GPGPU cores 2262, thus data transfer between GPGPU cores 2262 and register file 2258 is very low latency. In at least one embodiment, shared memory 2270 can be used to enable communication between threads that execute on functional units within graphics multiprocessor 2234. In at least one embodiment, cache memory 2272 can be used as a data cache for example, to cache texture data communicated between functional units and texture unit 2236. In at least one embodiment, shared memory 2270 can also be used as a program managed cached. In at least one embodiment, threads executing on GPGPU cores 2262 can programmatically store data within shared memory in addition to automatically cached data that is stored within cache memory 2272.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, GPU may be communicatively coupled to host processor/cores over a bus or other interconnect (e.g., a high-speed interconnect such as PCIe or NVLink). In at least one embodiment, GPU may be integrated on same package or chip as cores and communicatively coupled to cores over an internal processor bus/interconnect (i.e., internal to package or chip). In at least one embodiment, regardless of manner in which GPU is connected, processor cores may allocate work to GPU in form of sequences of commands/instructions contained in a work descriptor. In at least one embodiment, GPU then uses dedicated circuitry/logic for efficiently processing these commands/instructions.

In at least one embodiment, at least one component shown or described with respect to FIG. 22D is utilized to implement techniques and/or functions described in connection with FIGS. 1-10. In at least one embodiment, at least one graphics multiprocessor 2234 is used to perform channel estimation, coherent combining, and/or signal detection for one or more signals that do not have a corresponding reference signal. In at least one embodiment, at least one graphics multiprocessor 2234 performs at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

Figure 23:
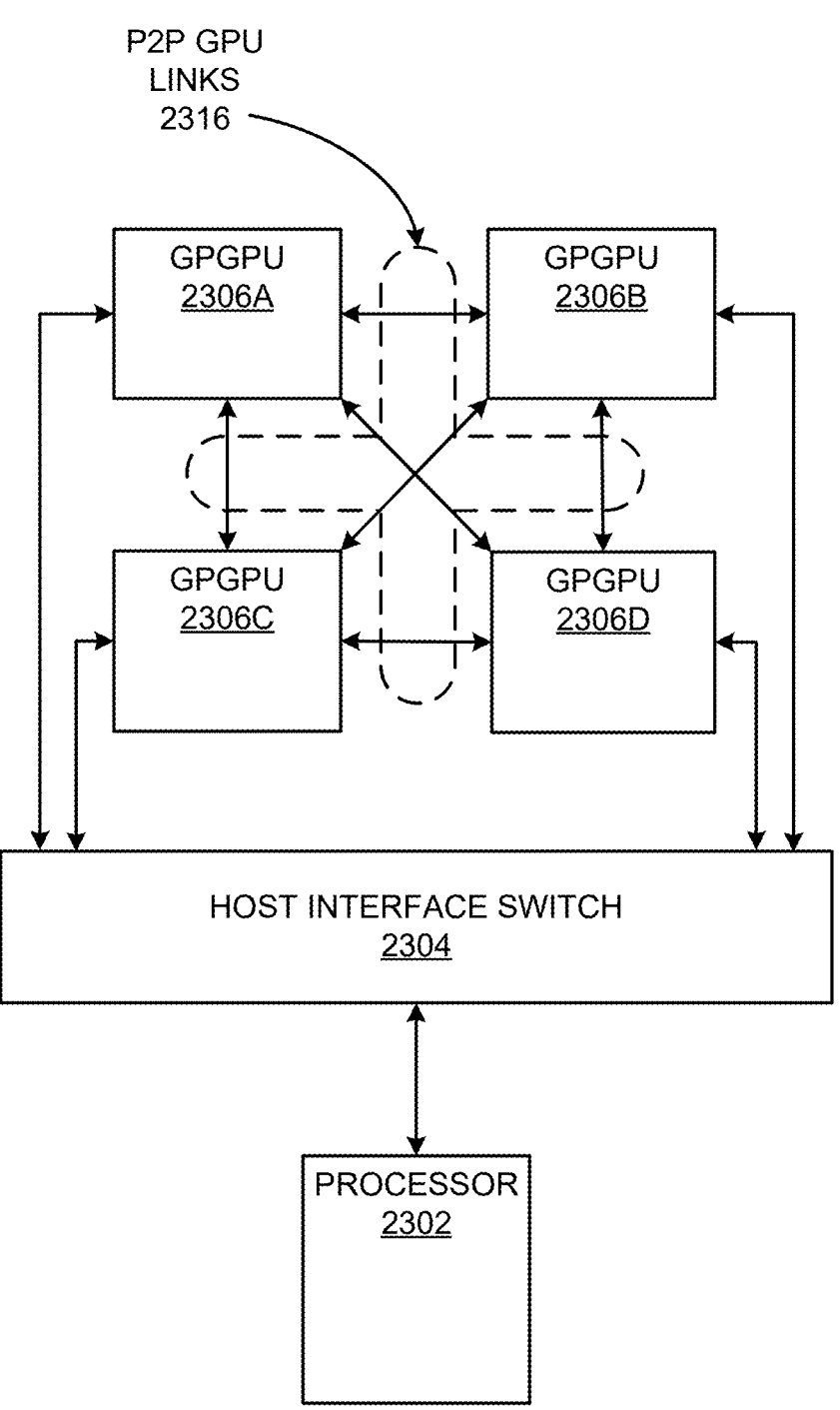
FIG. 23 illustrates a multi-graphics processing unit (GPU) system, according to at least one embodiment.

FIG. 23 illustrates a multi-GPU computing system 2300, according to at least one embodiment. In at least one embodiment, multi-GPU computing system 2300 can include a processor 2302 coupled to multiple general purpose graphics processing units (GPGPUs) 2306A-D via a host interface switch 2304. In at least one embodiment, host interface switch 2304 is a PCI express switch device that couples processor 2302 to a PCI express bus over which processor 2302 can communicate with GPGPUs 2306A-D. GPGPUs 2306A-D can interconnect via a set of high-speed point to point GPU to GPU links 2316. In at least one embodiment, GPU to GPU links 2316 connect to each of GPGPUs 2306A-D via a dedicated GPU link. In at least one embodiment, P2P GPU links 2316 enable direct communication between each of GPGPUs 2306A-D without requiring communication over host interface bus 2304 to which processor 2302 is connected. In at least one embodiment, with GPU-to-GPU traffic directed to P2P GPU links 2316, host interface bus 2304 remains available for system memory access or to communicate with other instances of multi-GPU computing system 2300, for example, via one or more network devices. While in at least one embodiment GPGPUs 2306A-D connect to processor 2302 via host interface switch 2304, in at least one embodiment processor 2302 includes direct support for P2P GPU links 2316 and can connect directly to GPGPUs 2306A-D.

In at least one embodiment, at least one component shown or described with respect to FIG. 23 is utilized to implement techniques and/or functions described in connection with FIGS. 1-10. In at least one embodiment, at least one GPGPU 2306 is used to perform channel estimation, coherent combining, and/or signal detection for one or more signals that do not have a corresponding reference signal. In at least one embodiment, at least one GPGPU 2306 performs at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

Figure 24:
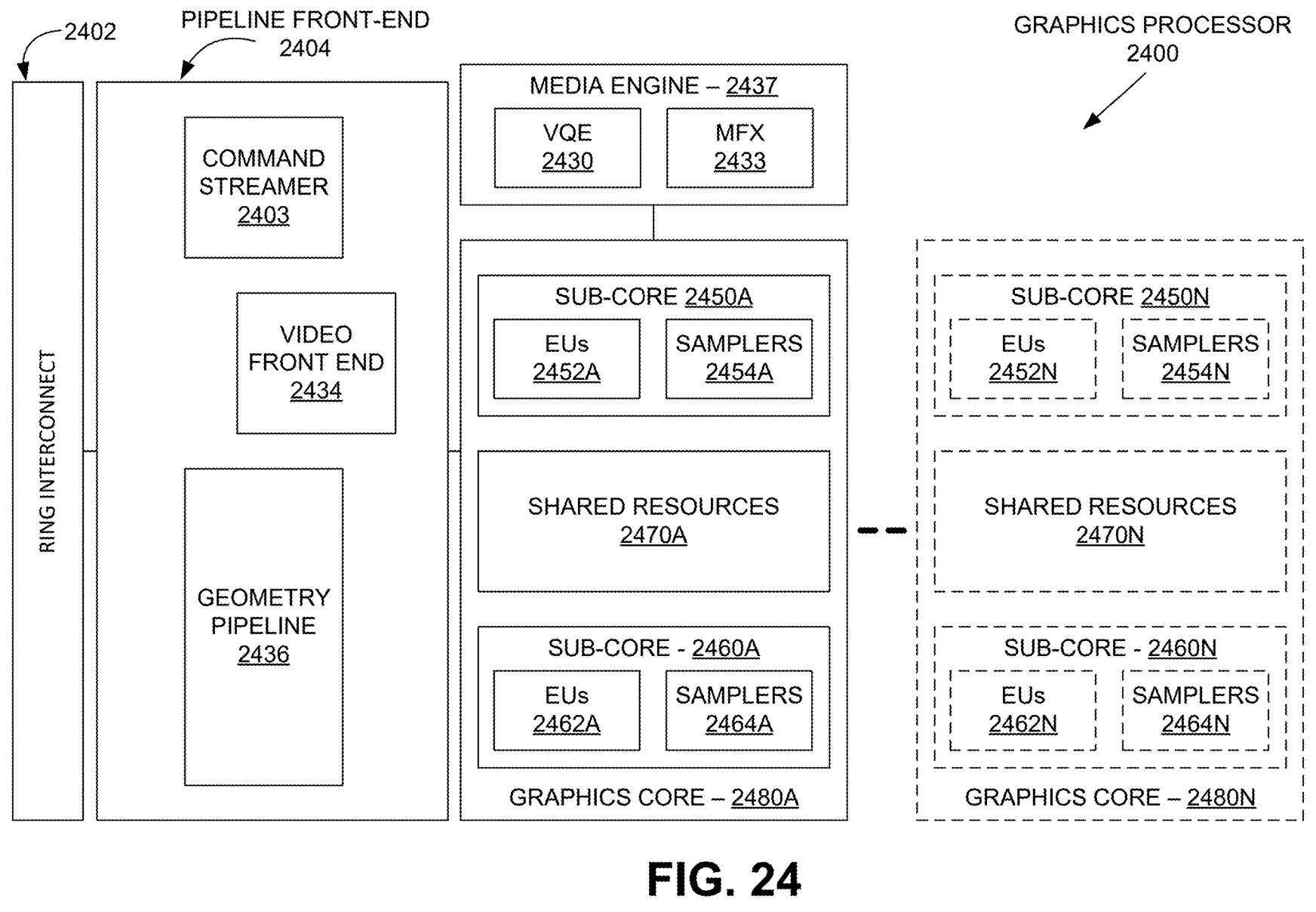

FIG. 24 is a block diagram of a graphics processor 2400, according to at least one embodiment. In at least one embodiment, graphics processor 2400 includes a ring interconnect 2402, a pipeline front-end 2404, a media engine 2437, and graphics cores 2480A-2480N. In at least one embodiment, ring interconnect 2402 couples graphics processor 2400 to other processing units, including other graphics processors or one or more general-purpose processor cores. In at least one embodiment, graphics processor 2400 is one of many processors integrated within a multi-core processing system.

In at least one embodiment, graphics processor 2400 receives batches of commands via ring interconnect 2402. In at least one embodiment, incoming commands are interpreted by a command streamer 2403 in pipeline front-end 2404. In at least one embodiment, graphics processor 2400 includes scalable execution logic to perform 3D geometry processing and media processing via graphics core(s) 2480A-2480N. In at least one embodiment, for 3D geometry processing commands, command streamer 2403 supplies commands to geometry pipeline 2436. In at least one embodiment, for at least some media processing commands, command streamer 2403 supplies commands to a video front end 2434, which couples with a media engine 2437. In at least one embodiment, media engine 2437 includes a Video Quality Engine (VQE) 2430 for video and image post-processing and a multi-format encode/decode (MFX) 2433 engine to provide hardware-accelerated media data encode and decode. In at least one embodiment, geometry pipeline 2436 and media engine 2437 each generate execution threads for thread execution resources provided by at least one graphics core 2480A.

In at least one embodiment, graphics processor 2400 includes scalable thread execution resources featuring modular cores 2480A-2480N (sometimes referred to as core slices), each having multiple sub-cores 2450A-550N, 2460A-2460N (sometimes referred to as core sub-slices). In at least one embodiment, graphics processor 2400 can have any number of graphics cores 2480A through 2480N. In at least one embodiment, graphics processor 2400 includes a graphics core 2480A having at least a first sub-core 2450A and a second sub-core 2460A. In at least one embodiment, graphics processor 2400 is a low power processor with a single sub-core (e.g., 2450A). In at least one embodiment, graphics processor 2400 includes multiple graphics cores 2480A-2480N, each including a set of first sub-cores 2450A-2450N and a set of second sub-cores 2460A-2460N. In at least one embodiment, each sub-core in first sub-cores 2450A-2450N includes at least a first set of execution units 2452A-2452N and media/texture samplers 2454A-2454N. In at least one embodiment, each sub-core in second sub-cores 2460A-2460N includes at least a second set of execution units 2462A-2462N and samplers 2464A-2464N. In at least one embodiment, each sub-core 2450A-2450N, 2460A-2460N shares a set of shared resources 2470A-2470N. In at least one embodiment, shared resources include shared cache memory and pixel operation logic.

In at least one embodiment, at least one component shown or described with respect to FIG. 24 is utilized to implement techniques and/or functions described in connection with FIGS. 1-10. In at least one embodiment, at least one graphics processor 2400 is used to perform channel estimation, coherent combining, and/or signal detection for one or more signals that do not have a corresponding reference signal. In at least one embodiment, at least one graphics processor 2400 performs at least one aspect described with respect to preprocessor 128, channel estimator 126, coherent combiner

130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

Figure 25:
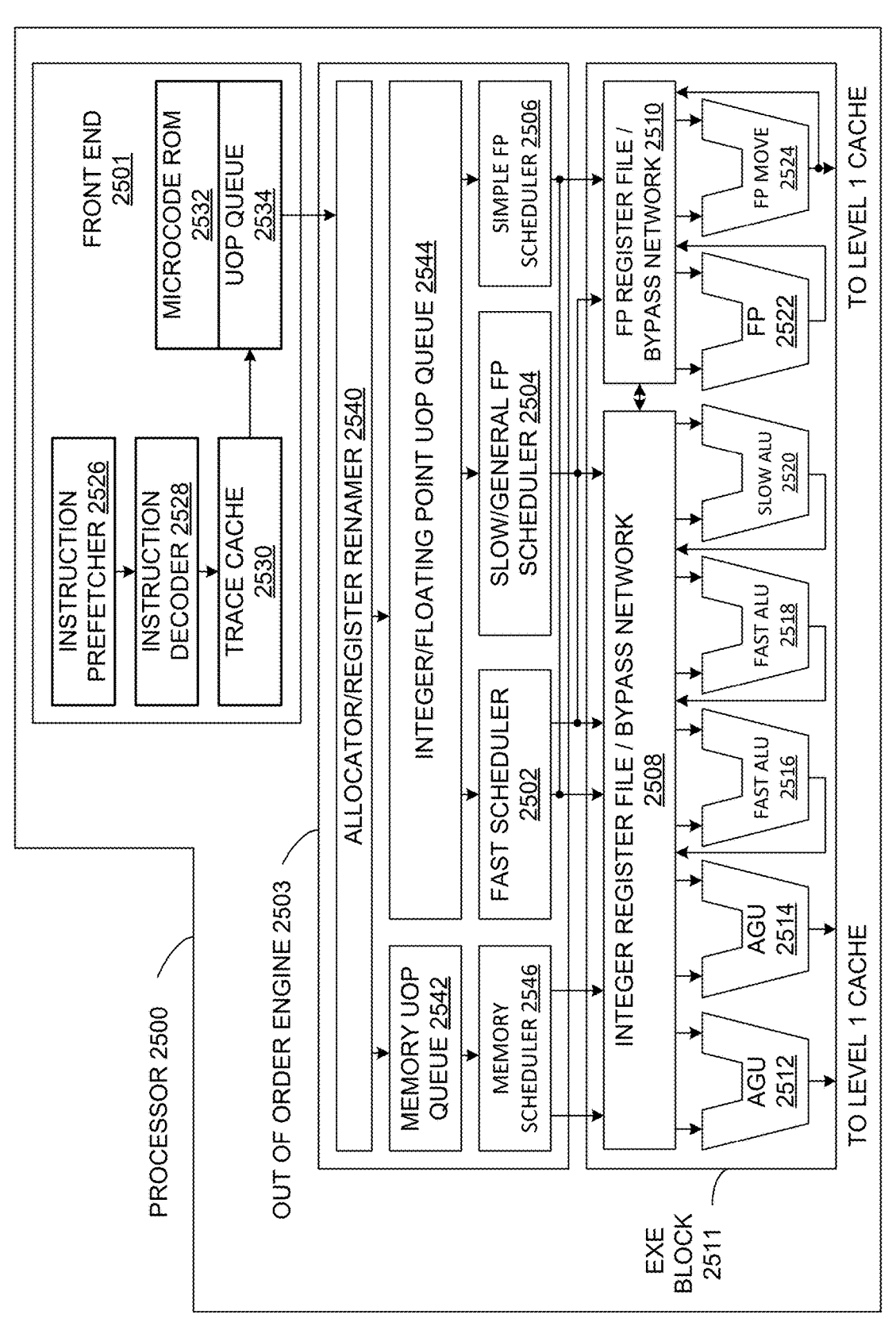
FIG. 25 is a block diagram illustrating a processor micro-architecture for a processor, according to at least one embodiment.

FIG. 25 is a block diagram illustrating micro-architecture for a processor 2500 that may include logic circuits to perform instructions, according to at least one embodiment. In at least one embodiment, processor 2500 may perform instructions, including x86 instructions, ARM instructions, specialized instructions for application-specific integrated circuits (ASICs), etc. In at least one embodiment, processor 2510 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany single instruction, multiple data ("SIMD") and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processors 2510 may perform instructions to accelerate machine learning or deep learning algorithms, training, or inferencing.

In at least one embodiment, processor 2500 includes an in-order front end ("front end") 2501 to fetch instructions to be executed and prepare instructions to be used later in processor pipeline. In at least one embodiment, front end 2501 may include several units. In at least one embodiment, an instruction prefetcher 2526 fetches instructions from memory and feeds instructions to an instruction decoder 2528 which in turn decodes or interprets instructions. For example, in at least one embodiment, instruction decoder 2528 decodes a received instruction into one or more operations called "micro-instructions" or "micro-operations" (also called "micro ops" or "uops") that machine may execute. In at least one embodiment, instruction decoder 2528 parses instruction into an opcode and corresponding data and control fields that may be used by micro-architecture to perform operations in accordance with at least one embodiment. In at least one embodiment, a trace cache 2530 may assemble decoded uops into program ordered sequences or traces in a uop queue 2534 for execution. In at least one embodiment, when trace cache 2530 encounters a complex instruction, a microcode ROM 2532 provides uops needed to complete operation.

In at least one embodiment, some instructions may be converted into a single micro-op, whereas others need several micro-ops to complete full operation. In at least one embodiment, if more than four micro-ops are needed to complete an instruction, instruction decoder 2528 may access microcode ROM 2532 to perform instruction. In at least one embodiment, an instruction may be decoded into a small number of micro-ops for processing at instruction decoder 2528. In at least one embodiment, an instruction may be stored within microcode ROM 2532 should a number of micro-ops be needed to accomplish operation. In at least one embodiment, trace cache 2530 refers to an entry point programmable logic array ("PLA") to determine a correct micro-instruction pointer for reading microcode sequences to complete one or more instructions from microcode ROM 2532 in accordance with at least one embodiment. In at least one embodiment, after microcode ROM

2532 finishes sequencing micro-ops for an instruction, front end 2501 of machine may resume fetching micro-ops from trace cache 2530.

In at least one embodiment, out-of-order execution engine ("out of order engine") 2503 may prepare instructions for execution. In at least one embodiment, out-of-order execution logic has a number of buffers to smooth out and re-order flow of instructions to optimize performance as they go down pipeline and get scheduled for execution. out-of-order execution engine 2503 includes, without limitation, an allocator/register renamer 2540, a memory uop queue 2542, an integer/floating point uop queue 2544, a memory scheduler 2546, a fast scheduler 2502, a slow/general floating point scheduler ("slow/general FP scheduler") 2504, and a simple floating point scheduler ("simple FP scheduler") 2506. In at least one embodiment, fast schedule 2502, slow/general floating point scheduler 2504, and simple floating point scheduler 2506 are also collectively referred to herein as "uop schedulers 2502, 2504, 2506." In at least one embodiment, allocator/register renamer 2540 allocates machine buffers and resources that each uop needs in order to execute. In at least one embodiment, allocator/register renamer 2540 renames logic registers onto entries in a register file. In at least one embodiment, allocator/register renamer 2540 also allocates an entry for each uop in one of two uop queues, memory uop queue 2542 for memory operations and integer/floating point uop queue 2544 for non-memory operations, in front of memory scheduler 2546 and uop schedulers 2502, 2504, 2506. In at least one embodiment, uop schedulers 2502, 2504, 2506, determine when a uop is ready to execute based on readiness of their dependent input register operand sources and availability of execution resources uops need to complete their operation. In at least one embodiment, fast scheduler 2502 of at least one embodiment may schedule on each half of main clock cycle while slow/general floating point scheduler 2504 and simple floating point scheduler 2506 may schedule once per main processor clock cycle. In at least one embodiment, uop schedulers 2502, 2504, 2506 arbitrate for dispatch ports to schedule uops for execution.

In at least one embodiment, execution block b11 includes, without limitation, an integer register file/bypass network 2508, a floating point register file/bypass network ("FP register file/bypass network") 2510, address generation units ("AGUs") 2512 and 2514, fast Arithmetic Logic Units (ALUs) ("fast ALUs") 2516 and 2518, a slow Arithmetic Logic Unit ("slow ALU") 2520, a floating point ALU ("FP") 2522, and a floating point move unit ("FP move") 2524. In at least one embodiment, integer register file/bypass network 2508 and floating point register file/bypass network 2510 are also referred to herein as "register files 2508, 2510." In at least one embodiment, AGUSs 2512 and 2514, fast ALUs 2516 and 2518, slow ALU 2520, floating point ALU 2522, and floating point move unit 2524 are also referred to herein as "execution units 2512, 2514, 2516, 2518, 2520, 2522, and 2524." In at least one embodiment, execution block b11 may include, without limitation, any number (including zero) and type of register files, bypass networks, address generation units, and execution units, in any combination.

In at least one embodiment, register files 2508, 2510 may be arranged between uop schedulers 2502, 2504, 2506, and execution units 2512, 2514, 2516, 2518, 2520, 2522, and 2524. In at least one embodiment, integer register file/bypass network 2508 performs integer operations. In at least one embodiment, floating point register file/bypass network 2510 performs floating point operations. In at least one embodiment, each of register files 2508, 2510 may include, without limitation, a bypass network that may bypass or forward just completed results that have not yet been written into register file to new dependent uops. In at least one embodiment, register files 2508, 2510 may communicate data with each other. In at least one embodiment, integer register file/bypass network 2508 may include, without limitation, two separate register files, one register file for low-order thirty-two bits of data and a second register file for high order thirty-two bits of data. In at least one embodiment, floating point register file/bypass network 2510 may include, without limitation, 128-bit wide entries because floating point instructions typically have operands from 64 to 128 bits in width.

In at least one embodiment, execution units 2512, 2514, 2516, 2518, 2520, 2522, 2524 may execute instructions. In at least one embodiment, register files 2508, 2510 store integer and floating point data operand values that microinstructions need to execute. In at least one embodiment, processor 2500 may include, without limitation, any number and combination of execution units 2512, 2514, 2516, 2518, 2520, 2522, 2524. In at least one embodiment, floating point ALU 2522 and floating point move unit 2524, may execute floating point, MMX, SIMD, AVX and SSE, or other operations, including specialized machine learning instructions. In at least one embodiment, floating point ALU 2522 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 2516, 2518. In at least one embodiment, fast ALUS 2516, 2518 may execute fast operations with an effective latency of half a clock cycle. In at least one embodiment, most complex integer operations go to slow ALU 2520 as slow ALU 2520 may include, without limitation, integer execution hardware for long-latency type of operations, such as a multiplier, shifts, flag logic, and branch processing. In at least one embodiment, memory load/store operations may be executed by AGUS 2512, 2514. In at least one embodiment, fast ALU 2516, fast ALU 2518, and slow ALU 2520 may perform integer operations on 64-bit data operands. In at least one embodiment, fast ALU 2516, fast ALU 2518, and slow ALU 2520 may be implemented to support a variety of data bit sizes including sixteen, thirty-two, 128, 256, etc. In at least one embodiment, floating point ALU 2522 and floating point move unit 2524 may be implemented to support a range of operands having bits of various widths. In at least one embodiment, floating point ALU 2522 and floating point move unit 2524 may operate on 128-bit wide packed data operands in conjunction with SIMD and multimedia instructions.

In at least one embodiment, uop schedulers 2502, 2504, 2506, dispatch dependent operations before parent load has finished executing. In at least one embodiment, as uops may be speculatively scheduled and executed in processor 2500, processor 2500 may also include logic to handle memory misses. In at least one embodiment, if a data load misses in data cache, there may be dependent operations in flight in pipeline that have left scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and replay mechanism of at least one embodiment of a processor may also be designed to catch instruction sequences for text string comparison operations.

In at least one embodiment, term "registers" may refer to on-board processor storage locations that may be used as part of instructions to identify operands. In at least one embodiment, registers may be those that may be usable from outside of processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

In at least one embodiment, at least one component shown or described with respect to FIG. 25 is utilized to implement techniques and/or functions described in connection with FIGS. 1-10. In at least one embodiment, at least one processor 2500 is used to perform channel estimation, coherent combining, and/or signal detection for one or more signals that do not have a corresponding reference signal. In at least one embodiment, at least one processor 2500 performs at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

Figure 26:
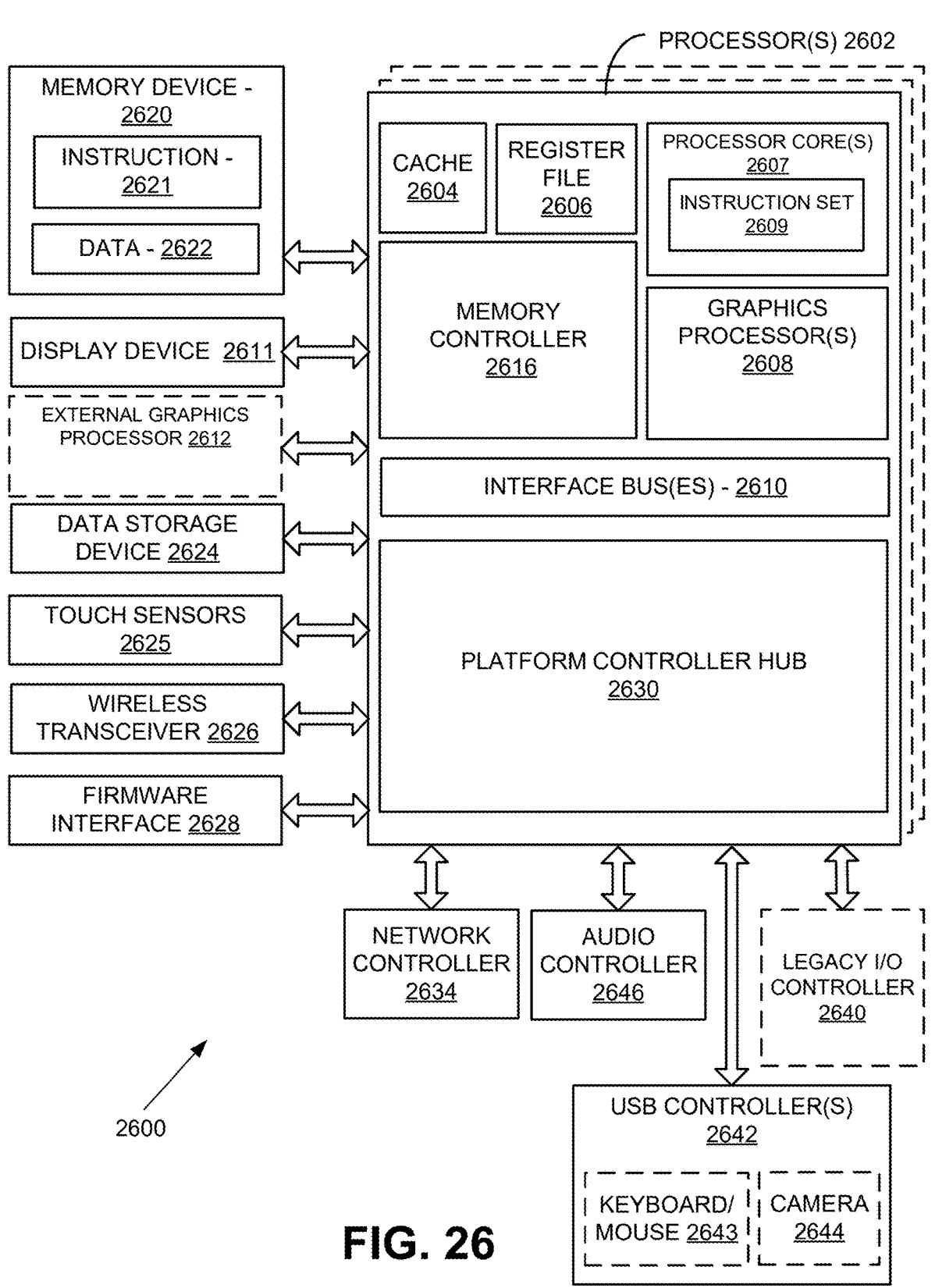
FIG. 26 illustrates at least portions of a graphics processor, according to one or more embodiments.

FIG. 26 is a block diagram of a processing system, according to at least one embodiment. In at least one embodiment, system 2600 includes one or more processors 2602 and one or more graphics processors 2608, and may be a single processor desktop system, a multiprocessor workstation system, or a server system having a large number of processors 2602 or processor cores 2607. In at least one embodiment, system 2600 is a processing platform incorporated within a system-on-a-chip (SoC) integrated circuit for use in mobile, handheld, or embedded devices.

In at least one embodiment, system 2600 can include, or be incorporated within a server-based gaming platform, a game console, including a game and media console, a mobile gaming console, a handheld game console, or an online game console. In at least one embodiment, system 2600 is a mobile phone, smart phone, tablet computing device or mobile Internet device. In at least one embodiment, processing system 2600 can also include, couple with, or be integrated within a wearable device, such as a smart watch wearable device, smart eyewear device, augmented reality device, or virtual reality device. In at least one embodiment, processing system 2600 is a television or set top box device having one or more processors 2602 and a graphical interface generated by one or more graphics processors 2608.

In at least one embodiment, one or more processors 2602 each include one or more processor cores 2607 to process instructions which, when executed, perform operations for system and user software. In at least one embodiment, each of one or more processor cores 2607 is configured to process a specific instruction set 2609. In at least one embodiment, instruction set 2609 may facilitate Complex Instruction Set Computing (CISC), Reduced Instruction Set Computing (RISC), or computing via a Very Long Instruction Word (VLIW). In at least one embodiment, processor cores 2607 may each process a different instruction set 2609, which may include instructions to facilitate emulation of other instruction sets. In at least one embodiment, processor core 2607 may also include other processing devices, such a Digital Signal Processor (DSP).

In at least one embodiment, processor 2602 includes cache memory 2604. In at least one embodiment, processor 2602 can have a single internal cache or multiple levels of internal cache. In at least one embodiment, cache memory is shared among various components of processor 2602. In at least one embodiment, processor 2602 also uses an external cache (e.g., a Level-3 (L3) cache or Last Level Cache (LLC)) (not shown), which may be shared among processor cores 2607 using known cache coherency techniques. In at least one embodiment, register file 2606 is additionally included in processor 2602 which may include different types of registers for storing different types of data (e.g., integer registers, floating point registers, status registers, and an instruction pointer register). In at least one embodiment, register file 2606 may include general-purpose registers or other registers.

In at least one embodiment, one or more processor(s) 2602 are coupled with one or more interface bus(es) 2610 to transmit communication signals such as address, data, or control signals between processor 2602 and other components in system 2600. In at least one embodiment interface bus 2610, in one embodiment, can be a processor bus, such as a version of a Direct Media Interface (DMI) bus. In at least one embodiment, interface 2610 is not limited to a DMI bus, and may include one or more Peripheral Component Interconnect buses (e.g., PCI, PCI Express), memory busses, or other types of interface busses. In at least one embodiment processor(s) 2602 include an integrated memory controller 2616 and a platform controller hub 2630. In at least one embodiment, memory controller 2616 facilitates communication between a memory device and other components of system 2600, while platform controller hub (PCH) 2630 provides connections to I/O devices via a local I/O bus.

In at least one embodiment, memory device 2620 can be a dynamic random access memory (DRAM) device, a static random access memory (SRAM) device, flash memory device, phase-change memory device, or some other memory device having suitable performance to serve as process memory. In at least one embodiment memory device 2620 can operate as system memory for system 2600, to store data 2622 and instructions 2621 for use when one or more processors 2602 executes an application or process. In at least one embodiment, memory controller 2616 also couples with an optional external graphics processor 2612, which may communicate with one or more graphics processors 2608 in processors 2602 to perform graphics and media operations. In at least one embodiment, a display device 2611 can connect to processor(s) 2602. In at least one embodiment display device 2611 can include one or more of an internal display device, as in a mobile electronic device or a laptop device or an external display device attached via a display interface (e.g., DisplayPort, etc.). In at least one embodiment, display device 2611 can include a head mounted display (HMD) such as a stereoscopic display device for use in virtual reality (VR) applications or augmented reality (AR) applications.

In at least one embodiment, platform controller hub 2630 enables peripherals to connect to memory device 2620 and processor 2602 via a high-speed I/O bus. In at least one embodiment, I/O peripherals include, but are not limited to, an audio controller 2646, a network controller 2634, a firmware interface 2628, a wireless transceiver 2626, touch sensors 2625, a data storage device 2624 (e.g., hard disk drive, flash memory, etc.). In at least one embodiment, data storage device 2624 can connect via a storage interface (e.g., SATA) or via a peripheral bus, such as a Peripheral Component Interconnect bus (e.g., PCI, PCI Express). In at least one embodiment, touch sensors 2625 can include touch screen sensors, pressure sensors, or fingerprint sensors. In at least one embodiment, wireless transceiver 2626 can be a Wi-Fi transceiver, a Bluetooth transceiver, or a mobile network transceiver such as a 3G, 4G, or Long Term Evolution (LTE) transceiver. In at least one embodiment, firmware interface 2628 enables communication with system firmware, and can be, for example, a unified extensible firmware interface (UEFI). In at least one embodiment, network controller 2634 can enable a network connection to a wired network. In at least one embodiment, a high-performance network controller (not shown) couples with interface bus 2610. In at least one embodiment, audio controller 2646 is a multi-channel high definition audio controller. In at least one embodiment, system 2600 includes an optional legacy I/O controller 2640 for coupling legacy (e.g., Personal System 2 (PS/2)) devices to system. In at least one embodiment, platform controller hub 2630 can also connect to one or more Universal Serial Bus (USB) controllers 2642 connect input devices, such as keyboard and mouse 2643 combinations, a camera 2644, or other USB input devices.

In at least one embodiment, an instance of memory controller 2616 and platform controller hub 2630 may be integrated into a discreet external graphics processor, such as external graphics processor 2612. In at least one embodiment, platform controller hub 2630 and/or memory controller 2616 may be external to one or more processor(s) 2602. For example, in at least one embodiment, system 2600 can include an external memory controller 2616 and platform controller hub 2630, which may be configured as a memory controller hub and peripheral controller hub within a system chipset that is in communication with processor(s) 2602.

In at least one embodiment, at least one component shown or described with respect to FIG. 26 is utilized to implement techniques and/or functions described in connection with FIGS. 1-10. In at least one embodiment, at least one graphics processor 2608 is used to perform channel estimation, coherent combining, and/or signal detection for one or more signals that do not have a corresponding reference signal. In at least one embodiment, at least one graphics processor 2608 performs at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

Figure 27:
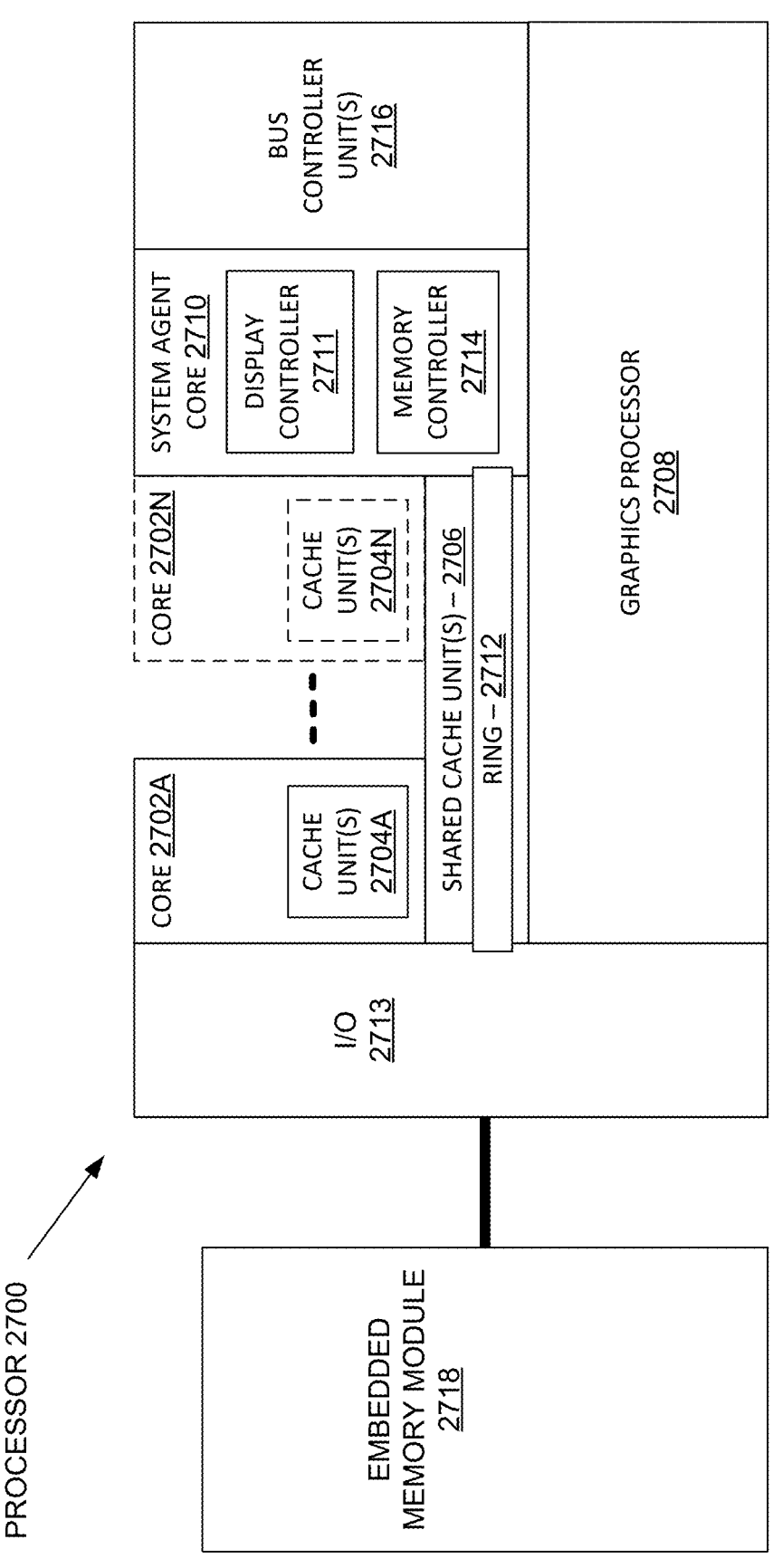
FIG. 27 illustrates at least portions of a graphics processor, according to one or more embodiments.

FIG. 27 is a block diagram of a processor 2700 having one or more processor cores 2702A-2702N, an integrated memory controller 2714, and an integrated graphics processor 2708, according to at least one embodiment. In at least one embodiment, processor 2700 can include additional cores up to and including additional core 2702N represented by dashed lined boxes. In at least one embodiment, each of processor cores 2702A-2702N includes one or more internal cache units 2704A-2704N. In at least one embodiment, each processor core also has access to one or more shared cached units 2706.

In at least one embodiment, internal cache units 2704A-2704N and shared cache units 2706 represent a cache memory hierarchy within processor 2700. In at least one embodiment, cache memory units 2704A-2704N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 2706 and 2704A-2704N.

In at least one embodiment, processor 2700 may also include a set of one or more bus controller units 2716 and a system agent core 2710. In at least one embodiment, one or more bus controller units 2716 manage a set of peripheral buses, such as one or more PCI or PCI express busses. In at least one embodiment, system agent core 2710 provides management functionality for various processor components. In at least one embodiment, system agent core 2710 includes one or more integrated memory controllers 2714 to manage access to various external memory devices (not shown).

In at least one embodiment, one or more of processor cores 2702A-2702N include support for simultaneous multi-threading. In at least one embodiment, system agent core 2710 includes components for coordinating and operating cores 2702A-2702N during multi-threaded processing. In at least one embodiment, system agent core 2710 may additionally include a power control unit (PCU), which includes logic and components to regulate one or more power states of processor cores 2702A-2702N and graphics processor 2708.

In at least one embodiment, processor 2700 additionally includes graphics processor 2708 to execute graphics processing operations. In at least one embodiment, graphics processor 2708 couples with shared cache units 2706, and system agent core 2710, including one or more integrated memory controllers 2714. In at least one embodiment, system agent core 2710 also includes a display controller 2711 to drive graphics processor output to one or more coupled displays. In at least one embodiment, display controller 2711 may also be a separate module coupled with graphics processor 2708 via at least one interconnect, or may be integrated within graphics processor 2708.

In at least one embodiment, a ring based interconnect unit 2712 is used to couple internal components of processor 2700. In at least one embodiment, an alternative interconnect unit may be used, such as a point-to-point interconnect, a switched interconnect, or other techniques. In at least one embodiment, graphics processor 2708 couples with ring interconnect 2712 via an I/O link 2713.

In at least one embodiment, I/O link 2713 represents at least one of multiple varieties of I/O interconnects, including an on package I/O interconnect which facilitates communication between various processor components and a high-performance embedded memory module 2718, such as an eDRAM module. In at least one embodiment, each of processor cores 2702A-2702N and graphics processor 2708 use embedded memory modules 2718 as a shared Last Level Cache.

In at least one embodiment, processor cores 2702A-2702N are homogenous cores executing a common instruction set architecture. In at least one embodiment, processor cores 2702A-2702N are heterogeneous in terms of instruction set architecture (ISA), where one or more of processor cores 2702A-2702N execute a common instruction set, while one or more other cores of processor cores 2702A-27-02N executes a subset of a common instruction set or a different instruction set. In at least one embodiment, processor cores 2702A-2702N are heterogeneous in terms of microarchitecture, where one or more cores having a relatively higher power consumption couple with one or more power cores having a lower power consumption. In at least one embodiment, processor 2700 can be implemented on one or more chips or as an SoC integrated circuit.

In at least one embodiment, at least one component shown or described with respect to FIG. 27 is utilized to implement techniques and/or functions described in connection with FIGS. 1-10. In at least one embodiment, at least one graphics processor 2708 is used to perform channel estimation, coherent combining, and/or signal detection for one or more signals that do not have a corresponding reference signal. In at least one embodiment, at least one graphics processor 2708 performs at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

Figure 28:
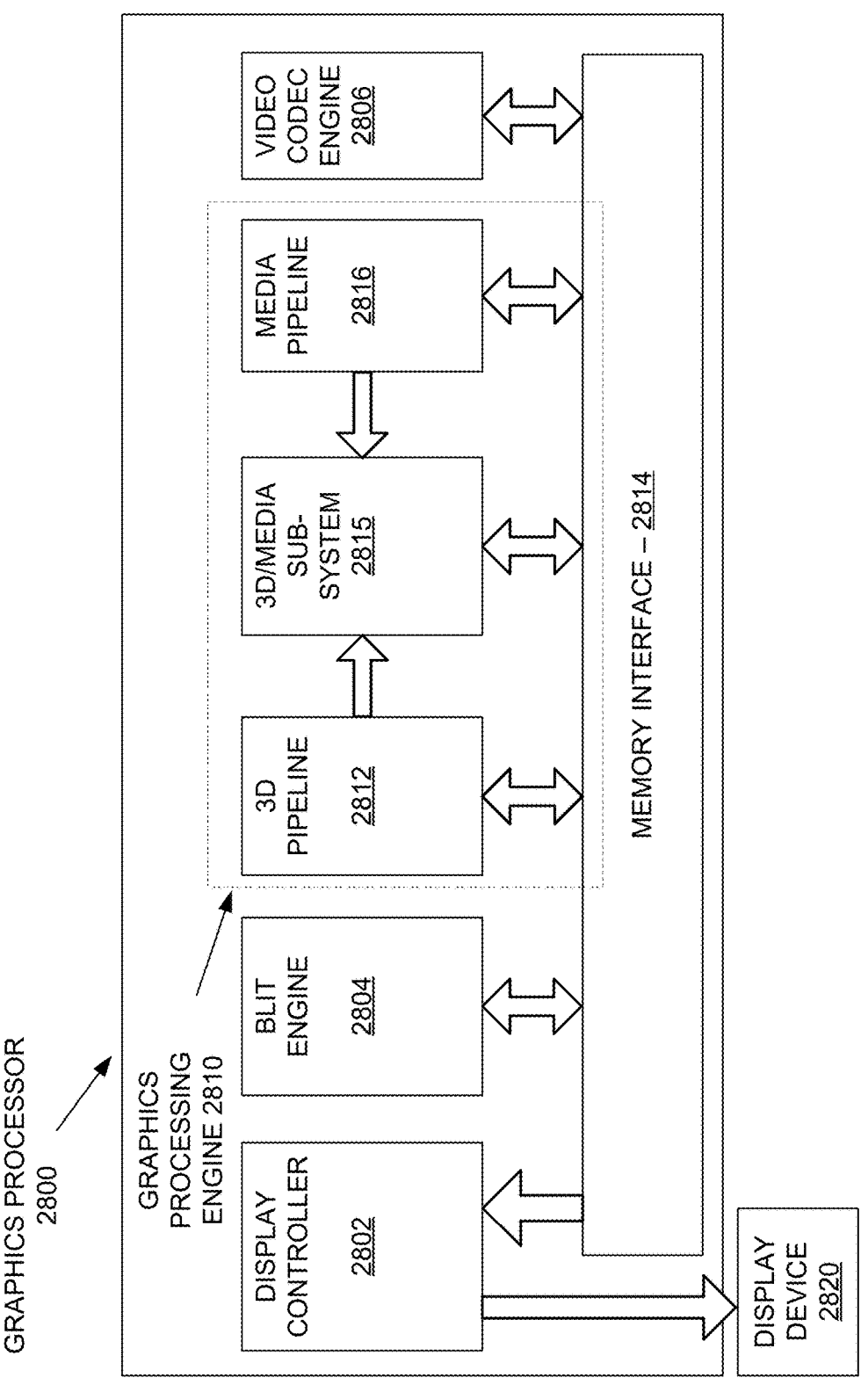
FIG. 28 illustrates at least portions of a graphics processor, according to one or more embodiments.

FIG. 28 is a block diagram of a graphics processor 2800, which may be a discrete graphics processing unit, or may be a graphics processor integrated with a plurality of processing cores. In at least one embodiment, graphics processor 2800 communicates via a memory mapped I/O interface to registers on graphics processor 2800 and with commands placed into memory. In at least one embodiment, graphics processor 2800 includes a memory interface 2814 to access memory. In at least one embodiment, memory interface 2814 is an interface to local memory, one or more internal caches, one or more shared external caches, and/or to system memory.

In at least one embodiment, graphics processor 2800 also includes a display controller 2802 to drive display output data to a display device 2820. In at least one embodiment, display controller 2802 includes hardware for one or more overlay planes for display device 2820 and composition of multiple layers of video or user interface elements. In at least one embodiment, display device 2820 can be an internal or external display device. In at least one embodiment, display device 2820 is a head mounted display device, such as a virtual reality (VR) display device or an augmented reality (AR) display device. In at least one embodiment, graphics processor 2800 includes a video codec engine 2806 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In at least one embodiment, graphics processor 2800 includes a block image transfer (BLIT) engine 2804 to perform two-dimensional (2D) rasterizer operations including, for example, bit-boundary block transfers. However, in at least one embodiment, 2D graphics operations are performed using one or more components of graphics processing engine (GPE) 2810. In at least one embodiment, GPE 2810 is a compute engine for performing graphics operations, including three-dimensional (3D) graphics operations and media operations.

In at least one embodiment, GPE 2810 includes a 3D pipeline 2812 for performing 3D operations, such as rendering three-dimensional images and scenes using processing functions that act upon 3D primitive shapes (e.g., rectangle, triangle, etc.). 3D pipeline 2812 includes programmable and fixed function elements that perform various tasks and/or spawn execution threads to a 3D/Media subsystem 2815. While 3D pipeline 2812 can be used to perform media operations, in at least one embodiment, GPE 2810 also includes a media pipeline 2816 that is used to perform media operations, such as video post-processing and image enhancement.

In at least one embodiment, media pipeline 2816 includes fixed function or programmable logic units to perform one or more specialized media operations, such as video decode acceleration, video de-interlacing, and video encode acceleration in place of, or on behalf of video codec engine 2806. In at least one embodiment, media pipeline 2816 additionally includes a thread spawning unit to spawn threads for execution on 3D/Media sub-system 2815. In at least one embodiment, spawned threads perform computations for media operations on one or more graphics execution units included in 3D/Media sub-system 2815.

In at least one embodiment, 3D/Media subsystem 2815 includes logic for executing threads spawned by 3D pipeline 2812 and media pipeline 2816. In at least one embodiment, 3D pipeline 2812 and media pipeline 2816 send thread execution requests to 3D/Media subsystem 2815, which includes thread dispatch logic for arbitrating and dispatching various requests to available thread execution resources. In at least one embodiment, execution resources include an array of graphics execution units to process 3D and media threads. In at least one embodiment, 3D/Media subsystem 2815 includes one or more internal caches for thread instructions and data. In at least one embodiment, subsystem 2815 also includes shared memory, including registers and addressable memory, to share data between threads and to store output data.

In at least one embodiment, at least one component shown or described with respect to FIG. 28 is utilized to implement techniques and/or functions described in connection with FIGS. 1-10. In at least one embodiment, at least one graphics processor 2800 is used to perform channel estimation, coherent combining, and/or signal detection for one or more signals that do not have a corresponding reference signal. In at least one embodiment, at least one graphics processor 2800 performs at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

Figure 29:
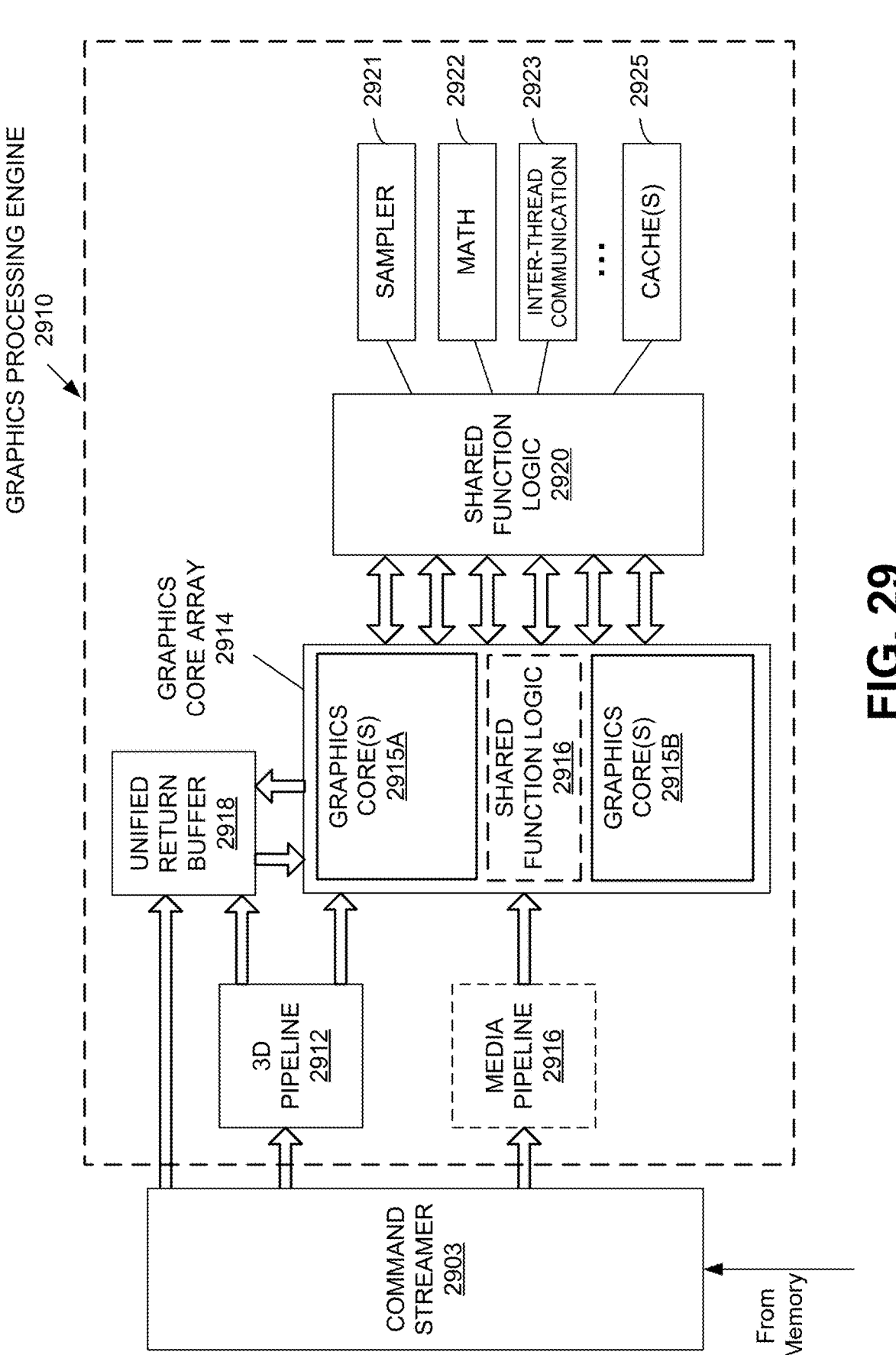
FIG. 29 is a block diagram of a graphics processing engine of a graphics processor in accordance with at least one embodiment.

FIG. 29 is a block diagram of a graphics processing engine 2910 of a graphics processor in accordance with at least one embodiment. In at least one embodiment, graphics processing engine (GPE) 2910 is a version of GPE 2810 shown in FIG. 28. In at least one embodiment, media pipeline 2916 is optional and may not be explicitly included within GPE 2910. In at least one embodiment, a separate media and/or image processor is coupled to GPE 2910.

In at least one embodiment, GPE 2910 is coupled to or includes a command streamer 2903, which provides a command stream to 3D pipeline 2912 and/or media pipelines 2916. In at least one embodiment, command streamer 2903 is coupled to memory, which can be system memory, or one or more of internal cache memory and shared cache memory. In at least one embodiment, command streamer 2903 receives commands from memory and sends commands to 3D pipeline 2912 and/or media pipeline 2916. In at least one embodiment, commands are instructions, primitives, or micro-operations fetched from a ring buffer, which stores commands for 3D pipeline 2912 and media pipeline 2916. In at least one embodiment, a ring buffer can additionally include batch command buffers storing batches of multiple commands. In at least one embodiment, commands for 3D pipeline 2912 can also include references to data stored in memory, such as but not limited to vertex and geometry data for 3D pipeline 2912 and/or image data and memory objects for media pipeline 2916. In at least one embodiment, 3D pipeline 2912 and media pipeline 2916 process commands and data by performing operations or by dispatching one or more execution threads to a graphics core array 2914. In at least one embodiment graphics core array 2914 includes one or more blocks of graphics cores (e.g., graphics core(s) 2915A, graphics core(s) 2915B), each block including one or more graphics cores. In at least one embodiment, each graphics core includes a set of graphics execution resources that includes general-purpose and graphics specific execution logic to perform graphics and compute operations, as well as fixed function texture processing and/or machine learning and artificial intelligence acceleration logic.

In at least one embodiment, 3D pipeline 2912 includes fixed function and programmable logic to process one or more shader programs, such as vertex shaders, geometry shaders, pixel shaders, fragment shaders, compute shaders, or other shader programs, by processing instructions and dispatching execution threads to graphics core array 2914. In at least one embodiment, graphics core array 2914 provides a unified block of execution resources for use in processing shader programs. In at least one embodiment, multi-purpose execution logic (e.g., execution units) within graphics core(s) 2915A-2915B of graphic core array 2914 includes support for various 3D API shader languages and can execute multiple simultaneous execution threads associated with multiple shaders.

In at least one embodiment, graphics core array 2914 also includes execution logic to perform media functions, such as video and/or image processing. In at least one embodiment, execution units additionally include general-purpose logic that is programmable to perform parallel general-purpose computational operations, in addition to graphics processing operations.

In at least one embodiment, output data generated by threads executing on graphics core array 2914 can output data to memory in a unified return buffer (URB) 2918. URB 2918 can store data for multiple threads. In at least one embodiment, URB 2918 may be used to send data between different threads executing on graphics core array 2914. In at least one embodiment, URB 2918 may additionally be used for synchronization between threads on graphics core array 2914 and fixed function logic within shared function logic 2920.

In at least one embodiment, graphics core array 2914 is scalable, such that graphics core array 2914 includes a variable number of graphics cores, each having a variable number of execution units based on a target power and performance level of GPE 2910. In at least one embodiment, execution resources are dynamically scalable, such that execution resources may be enabled or disabled as needed.

In at least one embodiment, graphics core array 2914 is coupled to shared function logic 2920 that includes multiple resources that are shared between graphics cores in graphics core array 2914. In at least one embodiment, shared functions performed by shared function logic 2920 are embodied in hardware logic units that provide specialized supplemental functionality to graphics core array 2914. In at least one embodiment, shared function logic 2920 includes but is not limited to sampler 2921, math 2922, and inter-thread communication (ITC) 2923 logic. In at least one embodiment, one or more cache(s) 2925 are in included in or couple to shared function logic 2920.

In at least one embodiment, a shared function is used if demand for a specialized function is insufficient for inclusion within graphics core array 2914. In at least one embodiment, a single instantiation of a specialized function is used in shared function logic 2920 and shared among other execution resources within graphics core array 2914. In at least one embodiment, specific shared functions within shared function logic 2920 that are used extensively by graphics core array 2914 may be included within shared function logic 2916 within graphics core array 2914. In at least one embodiment, shared function logic 2916 within graphics core array 2914 can include some or all logic within shared function logic 2920. In at least one embodiment, all logic elements within shared function logic 2920 may be duplicated within shared function logic 2916 of graphics core array 2914. In at least one embodiment, shared function logic 2920 is excluded in favor of shared function logic 2916 within graphics core array 2914.

In at least one embodiment, at least one component shown or described with respect to FIG. 29 is utilized to implement techniques and/or functions described in connection with FIGS. 1-10. In at least one embodiment, at least one graphics processing engine 2910 is used to perform channel estimation, coherent combining, and/or signal detection for one or more signals that do not have a corresponding reference signal. In at least one embodiment, at least one graphics processing engine 2910 performs at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

Figure 30:
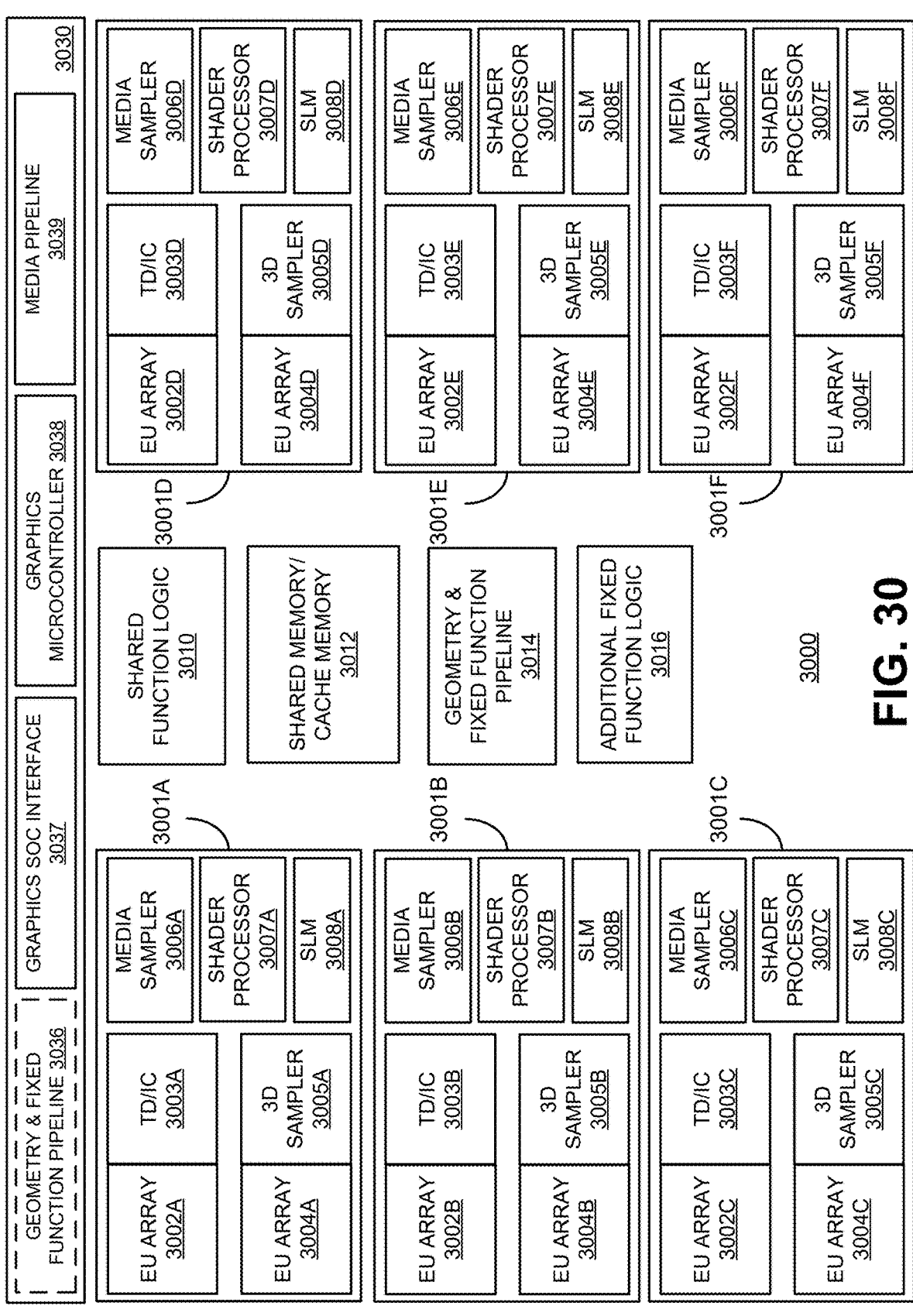
FIG. 30 is a block diagram of at least portions of a graphics processor core, according to at least one embodiment.

FIG. 30 is a block diagram of hardware logic of a graphics processor core 3000, according to at least one embodiment described herein. In at least one embodiment, graphics processor core 3000 is included within a graphics core array. In at least one embodiment, graphics processor core 3000, sometimes referred to as a core slice, can be one or multiple graphics cores within a modular graphics processor. In at least one embodiment, graphics processor core 3000 is exemplary of one graphics core slice, and a graphics processor as described herein may include multiple graphics core slices based on target power and performance envelopes. In at least one embodiment, each graphics core 3000 can include a fixed function block 3030 coupled with multiple sub-cores 3001A-3001F, also referred to as sub-slices, that include modular blocks of general-purpose and fixed function logic.

In at least one embodiment, fixed function block 3030 includes a geometry/fixed function pipeline 3036 that can be shared by all sub-cores in graphics processor 3000, for example, in lower performance and/or lower power graphics processor implementations. In at least one embodiment, geometry/fixed function pipeline 3036 includes a 3D fixed function pipeline, a video front-end unit, a thread spawner and thread dispatcher, and a unified return buffer manager, which manages unified return buffers.

In at least one embodiment fixed function block 3030 also includes a graphics SoC interface 3037, a graphics micro-controller 3038, and a media pipeline 3039. Graphics SoC interface 3037 provides an interface between graphics core 3000 and other processor cores within a system on a chip integrated circuit. In at least one embodiment, graphics microcontroller 3038 is a programmable sub-processor that is configurable to manage various functions of graphics processor 3000, including thread dispatch, scheduling, and pre-emption. In at least one embodiment, media pipeline 3039 includes logic to facilitate decoding, encoding, pre-processing, and/or post-processing of multimedia data, including image and video data. In at least one embodiment, media pipeline 3039 implements media operations via requests to compute or sampling logic within sub-cores 3001-3001F.

In at least one embodiment, SoC interface 3037 enables graphics core 3000 to communicate with general-purpose application processor cores (e.g., CPUs) and/or other components within an SoC, including memory hierarchy elements such as a shared last level cache memory, system RAM, and/or embedded on-chip or on-package DRAM. In at least one embodiment, SoC interface 3037 can also enable communication with fixed function devices within an SoC, such as camera imaging pipelines, and enables use of and/or implements global memory atomics that may be shared between graphics core 3000 and CPUs within an SoC. In at least one embodiment, SoC interface 3037 can also implement power management controls for graphics core 3000 and enable an interface between a clock domain of graphic core 3000 and other clock domains within an SoC. In at least one embodiment, SoC interface 3037 enables receipt of command buffers from a command streamer and global thread dispatcher that are configured to provide commands and instructions to each of one or more graphics cores within a graphics processor. In at least one embodiment, commands and instructions can be dispatched to media pipeline 3039, when media operations are to be performed, or a geometry and fixed function pipeline (e.g., geometry and fixed function pipeline 3036, geometry and fixed function pipeline 3014) when graphics processing operations are to be performed.

In at least one embodiment, graphics microcontroller 3038 can be configured to perform various scheduling and management tasks for graphics core 3000. In at least one embodiment, graphics microcontroller 3038 can perform graphics and/or compute workload scheduling on various graphics parallel engines within execution unit (EU) arrays 3002A-3002F, 3004A-3004F within sub-cores 3001A-3001F. In at least one embodiment, host software executing on a CPU core of an SoC including graphics core 3000 can submit workloads one of multiple graphic processor doorbells, which invokes a scheduling operation on an appropriate graphics engine. In at least one embodiment, scheduling operations include determining which workload to run next, submitting a workload to a command streamer, pre-empting existing workloads running on an engine, monitoring progress of a workload, and notifying host software when a workload is complete. In at least one embodiment, graphics microcontroller 3038 can also facilitate low-power or idle states for graphics core 3000, providing graphics core 3000 with an ability to save and restore registers within graphics core 3000 across low-power state transitions independently from an operating system and/or graphics driver software on a system.

In at least one embodiment, graphics core 3000 may have greater than or fewer than illustrated sub-cores 3001A-3001F, up to N modular sub-cores. For each set of N sub-cores, in at least one embodiment, graphics core 3000 can also include shared function logic 3010, shared and/or cache memory 3012, a geometry/fixed function pipeline 3014, as well as additional fixed function logic 3016 to accelerate various graphics and compute processing operations. In at least one embodiment, shared function logic 3010 can include logic units (e.g., sampler, math, and/or inter-thread communication logic) that can be shared by each N sub-cores within graphics core 3000. Shared and/or cache memory 3012 can be a last-level cache for N sub-cores 3001A-3001F within graphics core 3000 and can also serve as shared memory that is accessible by multiple sub-cores. In at least one embodiment, geometry/fixed function pipeline 3014 can be included instead of geometry/fixed function pipeline 3036 within fixed function block 3030 and can include same or similar logic units.

In at least one embodiment, graphics core 3000 includes additional fixed function logic 3016 that can include various fixed function acceleration logic for use by graphics core 3000. In at least one embodiment, additional fixed function logic 3016 includes an additional geometry pipeline for use in position only shading. In position-only shading, at least two geometry pipelines exist, whereas in a full geometry pipeline within geometry/fixed function pipeline 3016, 3036, and a cull pipeline, which is an additional geometry pipeline which may be included within additional fixed function logic 3016. In at least one embodiment, cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 3016 can execute position shaders in parallel with a main application and generally generates critical results faster than a full pipeline, as cull pipeline fetches and shades position attribute of vertices, without performing rasterization and rendering of pixels to a frame buffer. In at least one embodiment, cull pipeline can use generated critical results to compute visibility information for all triangles without regard to whether those triangles are culled. In at least one embodiment, full pipeline (which in this instance may be referred to as a replay pipeline) can consume visibility information to skip culled triangles to shade only visible triangles that are finally passed to a rasterization phase.

In at least one embodiment, additional fixed function logic 3016 can also include machine-learning acceleration logic, such as fixed function matrix multiplication logic, for implementations including optimizations for machine learning training or inferencing.

In at least one embodiment, within each graphics sub-core 3001A-3001F includes a set of execution resources that may be used to perform graphics, media, and compute operations in response to requests by graphics pipeline, media pipeline, or shader programs. In at least one embodiment, graphics sub-cores 3001A-3001F include multiple EU arrays 3002A-3002F, 3004A-3004F, thread dispatch and inter-thread communication (TD/IC) logic 3003A-3003F, a 3D (e.g., texture) sampler 3005A-3005F, a media sampler 3006A-3006F, a shader processor 3007A-3007F, and shared local memory (SLM) 3008A-3008F. EU arrays 3002A-3002F, 3004A-3004F each include multiple execution units, which are general-purpose graphics processing units capable of performing floating-point and integer/fixed-point logic operations in service of a graphics, media, or compute operation, including graphics, media, or compute shader programs. In at least one embodiment, TD/IC logic 3003A-3003F performs local thread dispatch and thread control operations for execution units within a sub-core and facilitate communication between threads executing on execution units of a sub-core. In at least one embodiment, 3D sampler 3005A-3005F can read texture or other 3D graphics related data into memory. In at least one embodiment, 3D sampler can read texture data differently based on a configured sample state and texture format associated with a given texture. In at least one embodiment, media sampler 3006A-3006F can perform similar read operations based on a type and format associated with media data. In at least one embodiment, each graphics sub-core 3001A-3001F can alternately include a unified 3D and media sampler. In at least one embodiment, threads executing on execution units within each of sub-cores 3001A-3001F can make use of shared local memory 3008A-3008F within each sub-core, to enable threads executing within a thread group to execute using a common pool of on-chip memory.

In at least one embodiment, at least one component shown or described with respect to FIG. 30 is utilized to implement techniques and/or functions described in connection with FIGS. 1-10. In at least one embodiment, at least one graphics processor core 3000 is used to perform channel estimation, coherent combining, and/or signal detection for one or more signals that do not have a corresponding reference signal. In at least one embodiment, at least one graphics processor core 3000 performs at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

Figure 31A:
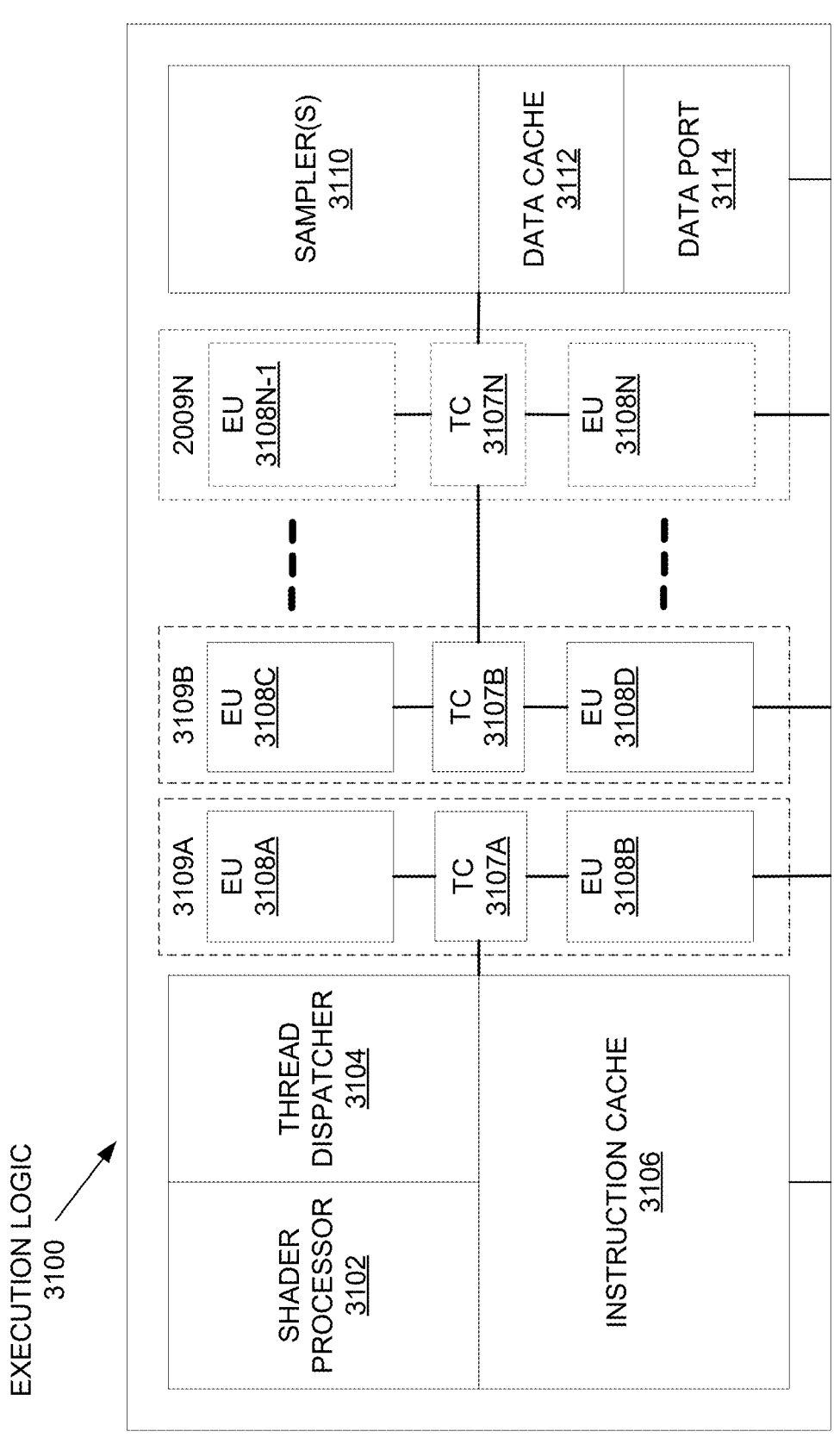
FIGS. 31A and 31B illustrate thread execution logic including an array of processing elements of a graphics processor core according to at least one embodiment.
Figure 31B:
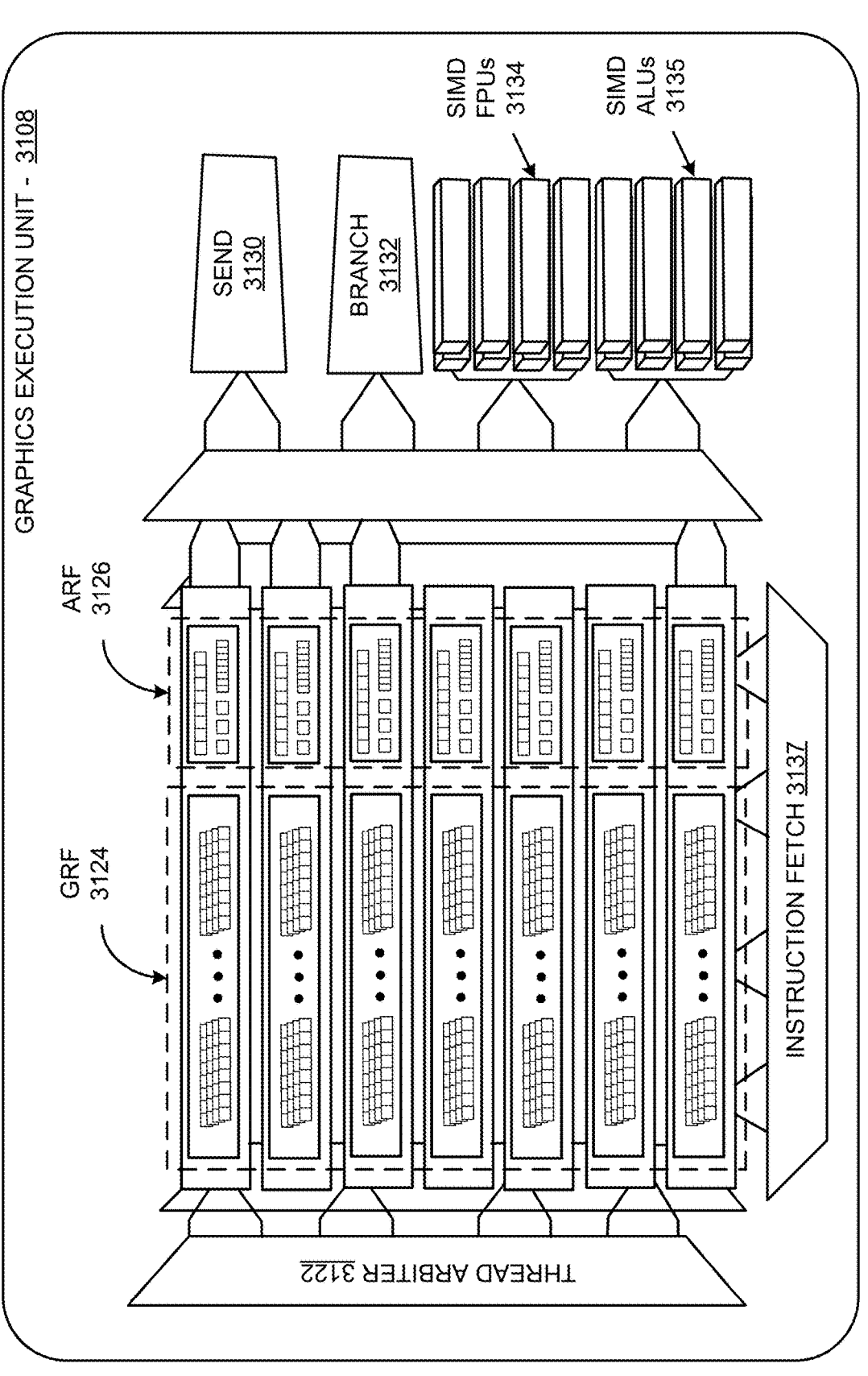

FIGS. 31A-31B illustrate thread execution logic 3100 including an array of processing elements of a graphics processor core according to at least one embodiment. FIG. 31A illustrates at least one embodiment, in which thread execution logic 3100 is used. FIG. 31B illustrates exemplary internal details of an execution unit, according to at least one embodiment.

As illustrated in FIG. 31A, in at least one embodiment, thread execution logic 3100 includes a shader processor 3102, a thread dispatcher 3104, instruction cache 3106, a scalable execution unit array including a plurality of execution units 3108A-3108N, a sampler 3110, a data cache 3112, and a data port 3114. In at least one embodiment a scalable execution unit array can dynamically scale by enabling or disabling one or more execution units (e.g., any of execution unit 3108A, 3108B, 3108C, 3108D, through 3108N-1 and 3108N) based on computational requirements of a workload, for example. In at least one embodiment, scalable execution units are interconnected via an interconnect fabric that links to each of execution unit. In at least one embodiment, thread execution logic 3100 includes one or more connections to memory, such as system memory or cache memory, through one or more of instruction cache 3106, data port 3114, sampler 3110, and execution units 3108A-3108N. In at least one embodiment, each execution unit (e.g., 3108A) is a stand-alone programmable general-purpose computational unit that is capable of executing multiple simultaneous hardware threads while processing multiple data elements in parallel for each thread. In at least one embodiment, array of execution units 3108A-3108N is scalable to include any number individual execution units.

In at least one embodiment, execution units 3108A-3108N are primarily used to execute shader programs. In at least one embodiment, shader processor 3102 can process various shader programs and dispatch execution threads associated with shader programs via a thread dispatcher 3104. In at least one embodiment, thread dispatcher 3104 includes logic to arbitrate thread initiation requests from graphics and media pipelines and instantiate requested threads on one or more execution units in execution units 3108A-3108N. For example, in at least one embodiment, a geometry pipeline can dispatch vertex, tessellation, or geometry shaders to thread execution logic for processing. In at least one embodiment, thread dispatcher 3104 can also process runtime thread spawning requests from executing shader programs.

In at least one embodiment, execution units 3108A-3108N support an instruction set that includes native support for many standard 3D graphics shader instructions, such that shader programs from graphics libraries (e.g., Direct 3D and OpenGL) are executed with a minimal translation. In at least one embodiment, execution units support vertex and geometry processing (e.g., vertex programs, geometry programs, vertex shaders), pixel processing (e.g., pixel shaders, fragment shaders) and general-purpose processing (e.g., compute and media shaders). In at least one embodiment, each of execution units 3108A-3108N, which include one or more arithmetic logic units (ALUs), is capable of multi-issue single instruction multiple data (SIMD) execution and multi-threaded operation enables an efficient execution environment despite higher latency memory accesses. In at least one embodiment, each hardware thread within each execution unit has a dedicated high-bandwidth register file and associated independent thread-state. In at least one embodiment, execution is multi-issue per clock to pipelines capable of integer, single and double precision floating point operations, SIMD branch capability, logical operations, transcendental operations, and other miscellaneous operations. In at least one embodiment, while waiting for data from memory or one of shared functions, dependency logic within execution units 3108A-3108N causes a waiting thread to sleep until requested data has been returned. In at least one embodiment, while a waiting thread is sleeping, hardware resources may be devoted to processing other threads. For example, in at least one embodiment, during a delay associated with a vertex shader operation, an execution unit can perform operations for a pixel shader, fragment shader, or another type of shader program, including a different vertex shader.

In at least one embodiment, each execution unit in execution units 3108A-3108N operates on arrays of data elements. In at least one embodiment, a number of data elements is "execution size," or number of channels for an instruction. In at least one embodiment, an execution channel is a logical unit of execution for data element access, masking, and flow control within instructions. In at least one embodiment, a number of channels may be independent of a number of physical Arithmetic Logic Units (ALUs) or Floating Point Units (FPUs) for a particular graphics processor. In at least one embodiment, execution units 3108A-3108N support integer and floating-point data types.

In at least one embodiment, an execution unit instruction set includes SIMD instructions. In at least one embodiment, various data elements can be stored as a packed data type in a register and execution unit will process various elements based on data size of elements. For example, in at least one embodiment, when operating on a 256-bit wide vector, 256 bits of a vector are stored in a register and an execution unit operates on a vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, in at least one embodiment, different vector widths and register sizes are possible.

In at least one embodiment, one or more execution units can be combined into a fused execution unit 3109A-3109N having thread control logic (3107A-3107N) that is common to fused EUs. In at least one embodiment, multiple EUs can be fused into an EU group. In at least one embodiment, each EU in fused EU group can be configured to execute a separate SIMD hardware thread. Th number of EUs in a fused EU group can vary according to various embodiments. In at least one embodiment, various SIMD widths can be performed per-EU, including but not limited to SIMD8, SIMD16, and SIMD32. In at least one embodiment, each fused graphics execution unit 3109A-3109N includes at least two execution units. For example, in at least one embodiment, fused execution unit 3109A includes a first EU 3108A, second EU 3108B, and thread control logic 3107A that is common to first EU 3108A and second EU 3108B. In at least one embodiment, thread control logic 3107A controls threads executed on fused graphics execution unit 3109A, allowing each EU within fused execution units 3109A-3109N to execute using a common instruction pointer register.

In at least one embodiment, one or more internal instruction caches (e.g., 3106) are included in thread execution logic 3100 to cache thread instructions for execution units. In at least one embodiment, one or more data caches (e.g., 3112) are included to cache thread data during thread execution. In at least one embodiment, a sampler 3110 is included to provide texture sampling for 3D operations and media sampling for media operations. In at least one embodiment, sampler 3110 includes specialized texture or media sampling functionality to process texture or media data during sampling process before providing sampled data to an execution unit.

During execution, in at least one embodiment, graphics and media pipelines send thread initiation requests to thread execution logic 3100 via thread spawning and dispatch logic. In at least one embodiment, once a group of geometric objects has been processed and rasterized into pixel data, pixel processor logic (e.g., pixel shader logic, fragment shader logic, etc.) within shader processor 3102 is invoked to further compute output information and cause results to be written to output surfaces (e.g., color buffers, depth buffers, stencil buffers, etc.). In at least one embodiment, a pixel shader or fragment shader calculates values of various vertex attributes that are to be interpolated across a rasterized object. In at least one embodiment, pixel processor logic within shader processor 3102 then executes an application programming interface (API)-supplied pixel or fragment shader program. In at least one embodiment, to execute a shader program, shader processor 3102 dispatches threads to an execution unit (e.g., 3108A) via thread dispatcher 3104. In at least one embodiment, shader processor 3102 uses texture sampling logic in sampler 3110 to access texture data in texture maps stored in memory. In at least one embodiment, arithmetic operations on texture data and input geometry data compute pixel color data for each geometric fragment, or discards one or more pixels from further processing.

In at least one embodiment, data port 3114 provides a memory access mechanism for thread execution logic 3100 to output processed data to memory for further processing on a graphics processor output pipeline. In at least one embodiment, data port 3114 includes or couples to one or more cache memories (e.g., data cache 3112) to cache data for memory access via a data port.

As illustrated in FIG. 31B, in at least one embodiment, a graphics execution unit 3108 can include an instruction fetch unit 3137, a general register file array (GRF) 3124, an architectural register file array (ARF) 3126, a thread arbiter 3122, a send unit 3130, a branch unit 3132, a set of SIMD floating point units (FPUs) 3134, and In at least one embodiment a set of dedicated integer SIMD ALUs 3135. In at least one embodiment, GRF 3124 and ARF 3126 includes a set of general register files and architecture register files associated with each simultaneous hardware thread that may be active in graphics execution unit 3108. In at least one embodiment, per thread architectural state is maintained in ARF 3126, while data used during thread execution is stored in GRF 3124. In at least one embodiment, execution state of each thread, including instruction pointers for each thread, can be held in thread-specific registers in ARF 3126.

In at least one embodiment, graphics execution unit 3108 has an architecture that is a combination of Simultaneous Multi-Threading (SMT) and fine-grained Interleaved Multi-Threading (IMT). In at least one embodiment, architecture has a modular configuration that can be fine-tuned at design time based on a target number of simultaneous threads and number of registers per execution unit, where execution unit resources are divided across logic used to execute multiple simultaneous threads.

In at least one embodiment, graphics execution unit 3108 can co-issue multiple instructions, which may each be different instructions. In at least one embodiment, thread arbiter 3122 of graphics execution unit thread 3108 can dispatch instructions to one of send unit 3130, branch unit 3142, or SIMD FPU(s) 3134 for execution. In at least one embodiment, each execution thread can access 128 general-purpose registers within GRF 3124, where each register can store 32 bytes, accessible as a SIMD 8-element vector of 32-bit data elements. In at least one embodiment, each execution unit thread has access to 4 Kbytes within GRF 3124, although embodiments are not so limited, and greater or fewer register resources may be provided in other embodiments. In at least one embodiment, up to seven threads can execute simultaneously, although a number of threads per execution unit can also vary according to embodiments. In at least one embodiment, in which seven threads may access 4 Kbytes, GRF 3124 can store a total of 28 Kbytes. In at least one embodiment, flexible addressing modes can permit registers to be addressed together to build effectively wider registers or to represent strided rectangular block data structures.

In at least one embodiment, memory operations, sampler operations, and other longer-latency system communications are dispatched via "send" instructions that are executed by message passing send unit 3130. In at least one embodiment, branch instructions are dispatched to a dedicated branch unit 3132 to facilitate SIMD divergence and eventual convergence.

In at least one embodiment graphics execution unit 3108 includes one or more SIMD floating point units (FPU(s)) 3134 to perform floating-point operations. In at least one embodiment, FPU(s) 3134 also support integer computation. In at least one embodiment FPU(s) 3134 can SIMD execute up to M number of 32-bit floating-point (or integer) operations, or SIMD execute up to 2M 16-bit integer or 16-bit floating-point operations. In at least one embodiment, at least one of FPU(s) provides extended math capability to support high-throughput transcendental math functions and double precision 64-bit floating-point. In at least one embodiment, a set of 8-bit integer SIMD ALUs 3135 are also present, and may be specifically optimized to perform operations associated with machine learning computations.

In at least one embodiment, arrays of multiple instances of graphics execution unit 3108 can be instantiated in a graphics sub-core grouping (e.g., a sub-slice). In at least one embodiment execution unit 3108 can execute instructions across a plurality of execution channels. In at least one embodiment, each thread executed on graphics execution unit 3108 is executed on a different channel.

In at least one embodiment, at least one component shown or described with respect to FIGS. 31A and 31B is utilized to implement techniques and/or functions described in connection with FIGS. 1-10. In at least one embodiment, at least one thread execution logic 3100 is used to perform channel estimation, coherent combining, and/or signal detection for one or more signals that do not have a corresponding reference signal. In at least one embodiment, at least one thread execution logic 3100 performs at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

Figure 32:
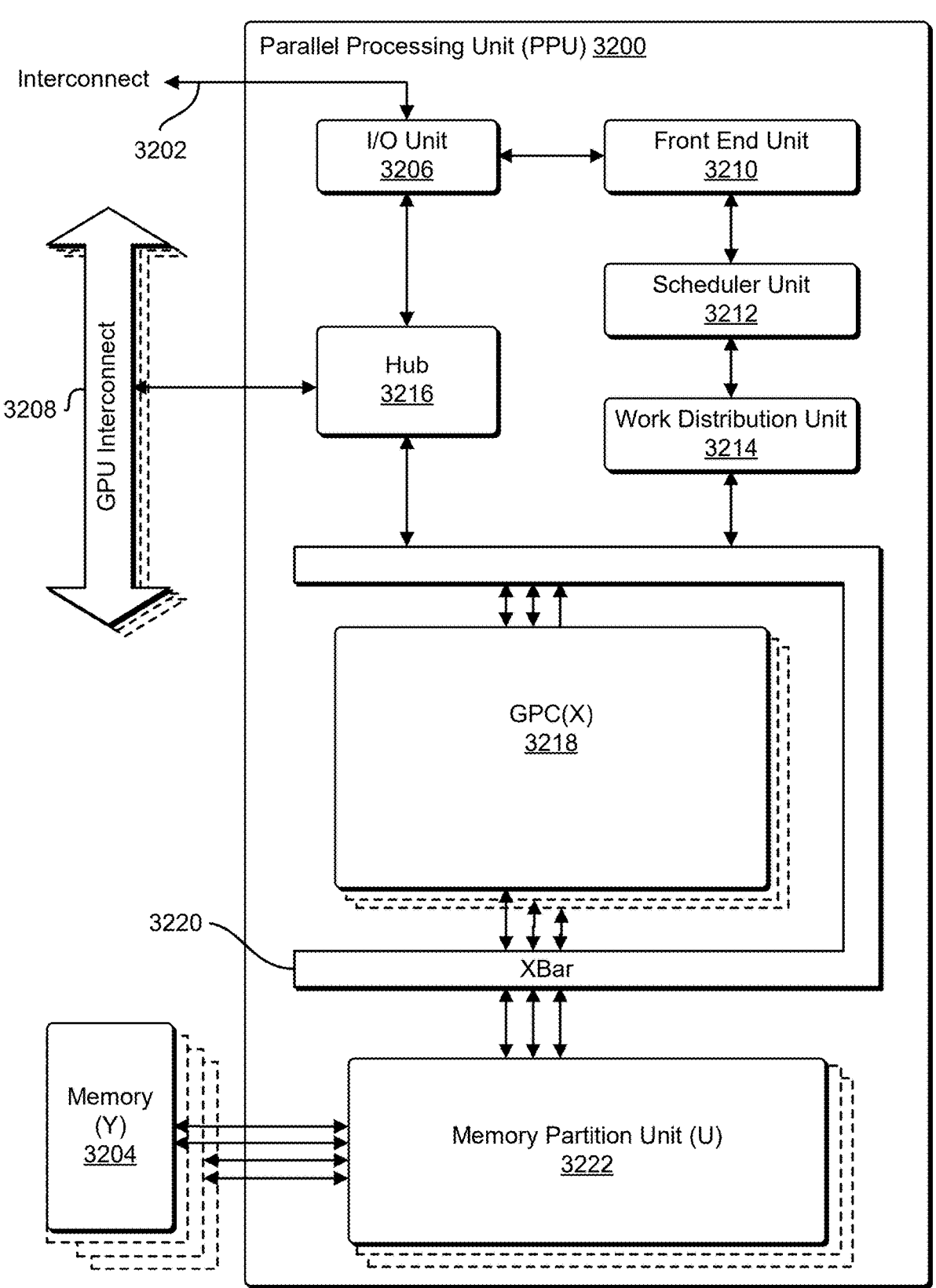
FIG. 32 illustrates a parallel processing unit ("PPU"), according to at least one embodiment.

FIG. 32 illustrates a parallel processing unit ("PPU") 3200, according to at least one embodiment. In at least one embodiment, PPU 3200 is configured with machine-readable code that, if executed by PPU 3200, causes PPU 3200 to perform some or all of processes and techniques described throughout this disclosure. In at least one embodiment, PPU 3200 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 3200. In at least one embodiment, PPU 3200 is a graphics processing unit ("GPU") configured to implement a graphics rendering pipeline for processing three-dimensional ("3D") graphics data in order to generate two-dimensional ("2D") image data for display on a display device such as a liquid crystal display ("LCD") device. In at least one embodiment, PPU 3200 is utilized to perform computations such as linear algebra operations and machine-learning operations. FIG. 32 illustrates an example parallel processor for illustrative purposes only and should be construed as a non-limiting example of processor architectures contemplated within scope of this disclosure and that any suitable processor may be employed to supplement and/or substitute for same.

In at least one embodiment, one or more PPUs 3200 are configured to accelerate High Performance Computing ("HPC"), data center, and machine learning applications. In at least one embodiment, PPU 3200 is configured to accelerate deep learning systems and applications including following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In at least one embodiment, PPU 3200 includes, without limitation, an Input/Output ("I/O") unit 3206, a front-end unit 3210, a scheduler unit 3212, a work distribution unit 3214, a hub 3216, a crossbar ("Xbar") 3220, one or more general processing clusters ("GPCs") 3218, and one or more partition units ("memory partition units") 3222. In at least one embodiment, PPU 3200 is connected to a host processor or other PPUs 3200 via one or more high-speed GPU interconnects ("GPU interconnects") 3208. In at least one embodiment, PPU 3200 is connected to a host processor or other peripheral devices via an interconnect 3202. In at least one embodiment, PPU 3200 is connected to a local memory comprising one or more memory devices ("memory") 3204. In at least one embodiment, memory devices 3204 include, without limitation, one or more dynamic random access memory ("DRAM") devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 3208 may refer to a wire-based multi-lane communications link that is used by systems to scale and include one or more PPUs 3200 combined with one or more central processing units ("CPUs"), supports cache coherence between PPUs 3200 and CPUs, and CPU mastering. In at least one embodiment, data and/or commands are transmitted by high-speed GPU interconnect 3208 through hub 3216 to/from other units of PPU 3200 such as one or more copy engines, video encoders, video decoders, power management units, and other components which may not be explicitly illustrated in FIG. 32.

In at least one embodiment, I/O unit 3206 is configured to transmit and receive communications (e.g., commands, data) from a host processor (not illustrated in FIG. 32) over system bus 3202. In at least one embodiment, I/O unit 3206 communicates with host processor directly via system bus 3202 or through one or more intermediate devices such as a memory bridge. In at least one embodiment, I/O unit 3206 may communicate with one or more other processors, such as one or more of PPUs 3200 via system bus 3202. In at least one embodiment, I/O unit 3206 implements a Peripheral Component Interconnect Express ("PCIe") interface for communications over a PCIe bus. In at least one embodiment, I/O unit 3206 implements interfaces for communicating with external devices.

In at least one embodiment, I/O unit 3206 decodes packets received via system bus 3202. In at least one embodiment, at least some packets represent commands configured to cause PPU 3200 to perform various operations. In at least one embodiment, I/O unit 3206 transmits decoded commands to various other units of PPU 3200 as specified by commands. In at least one embodiment, commands are transmitted to front-end unit 3210 and/or transmitted to hub 3216 or other units of PPU 3200 such as one or more copy engines, a video encoder, a video decoder, a power management unit, etc. (not explicitly illustrated in FIG. 32). In at least one embodiment, I/O unit 3206 is configured to route communications between and among various logical units of PPU 3200.

In at least one embodiment, a program executed by host processor encodes a command stream in a buffer that provides workloads to PPU 3200 for processing. In at least one embodiment, a workload comprises instructions and data to be processed by those instructions. In at least one embodiment, buffer is a region in a memory that is accessible (e.g., read/write) by both host processor and PPU 3200—a host interface unit may be configured to access buffer in a system memory connected to system bus 3202 via memory requests transmitted over system bus 3202 by I/O unit 3206. In at least one embodiment, host processor writes command stream to buffer and then transmits a pointer to start of command stream to PPU 3200 such that front-end unit 3210 receives pointers to one or more command streams and manages one or more command streams, reading commands from command streams and forwarding commands to various units of PPU 3200.

In at least one embodiment, front-end unit 3210 is coupled to scheduler unit 3212 that configures various GPCs 3218 to process tasks defined by one or more command streams. In at least one embodiment, scheduler unit 3212 is configured to track state information related to various tasks managed by scheduler unit 3212 where state information may indicate which of GPCs 3218 a task is assigned to, whether task is active or inactive, a priority level associated with task, and so forth. In at least one embodiment, scheduler unit 3212 manages execution of a plurality of tasks on one or more of GPCs 3218.

In at least one embodiment, scheduler unit 3212 is coupled to work distribution unit 3214 that is configured to dispatch tasks for execution on GPCs 3218. In at least one embodiment, work distribution unit 3214 tracks a number of scheduled tasks received from scheduler unit 3212 and work distribution unit 3214 manages a pending task pool and an active task pool for each of GPCs 3218. In at least one embodiment, pending task pool comprises a number of slots (e.g., 32 slots) that contain tasks assigned to be processed by a particular GPC 3218; active task pool may comprise a number of slots (e.g., 4 slots) for tasks that are actively being processed by GPCs 3218 such that as one of GPCs 3218 completes execution of a task, that task is evicted from active task pool for GPC 3218 and one of other tasks from pending task pool is selected and scheduled for execution on GPC 3218. In at least one embodiment, if an active task is idle on GPC 3218, such as while waiting for a data dependency to be resolved, then active task is evicted from GPC 3218 and returned to pending task pool while another task in pending task pool is selected and scheduled for execution on GPC 3218.

In at least one embodiment, work distribution unit 3214 communicates with one or more GPCs 3218 via XBar 3220. In at least one embodiment, XBar 3220 is an interconnect network that couples many of units of PPU 3200 to other units of PPU 3200 and can be configured to couple work distribution unit 3214 to a particular GPC 3218. In at least one embodiment, one or more other units of PPU 3200 may also be connected to XBar 3220 via hub 3216.

In at least one embodiment, tasks are managed by scheduler unit 3212 and dispatched to one of GPCs 3218 by work distribution unit 3214. GPC 3218 is configured to process task and generate results. In at least one embodiment, results may be consumed by other tasks within GPC 3218, routed to a different GPC 3218 via XBar 3220, or stored in memory 3204. In at least one embodiment, results can be written to memory 3204 via partition units 3222, which implement a memory interface for reading and writing data to/from memory 3204. In at least one embodiment, results can be transmitted to another PPU 3204 or CPU via high-speed GPU interconnect 3208. In at least one embodiment, PPU 3200 includes, without limitation, a number U of partition units 3222 that is equal to number of separate and distinct memory devices 3204 coupled to PPU 3200. In at least one embodiment, partition unit 3222 will be described in more detail herein in conjunction with FIG. 34.

In at least one embodiment, a host processor executes a driver kernel that implements an application programming interface ("API") that enables one or more applications executing on host processor to schedule operations for execution on PPU 3200. In at least one embodiment, multiple compute applications are simultaneously executed by PPU 3200 and PPU 3200 provides isolation, quality of service ("QoS"), and independent address spaces for multiple compute applications. In at least one embodiment, an application generates instructions (e.g., in form of API calls) that cause driver kernel to generate one or more tasks for execution by PPU 3200 and driver kernel outputs tasks to one or more streams being processed by PPU 3200. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform task and that exchange data through shared memory. In at least one embodiment, threads and cooperating threads are described in more detail, in accordance with at least one embodiment, in conjunction with FIG. 34.

In at least one embodiment, at least one component shown or described with respect to FIG. 32 is utilized to implement techniques and/or functions described in connection with FIGS. 1-10. In at least one embodiment, PPU 3200 is used to perform channel estimation, coherent combining, and/or signal detection for one or more signals that do not have a corresponding reference signal. In at least one embodiment, PPU 3200 performs at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

Figure 33:
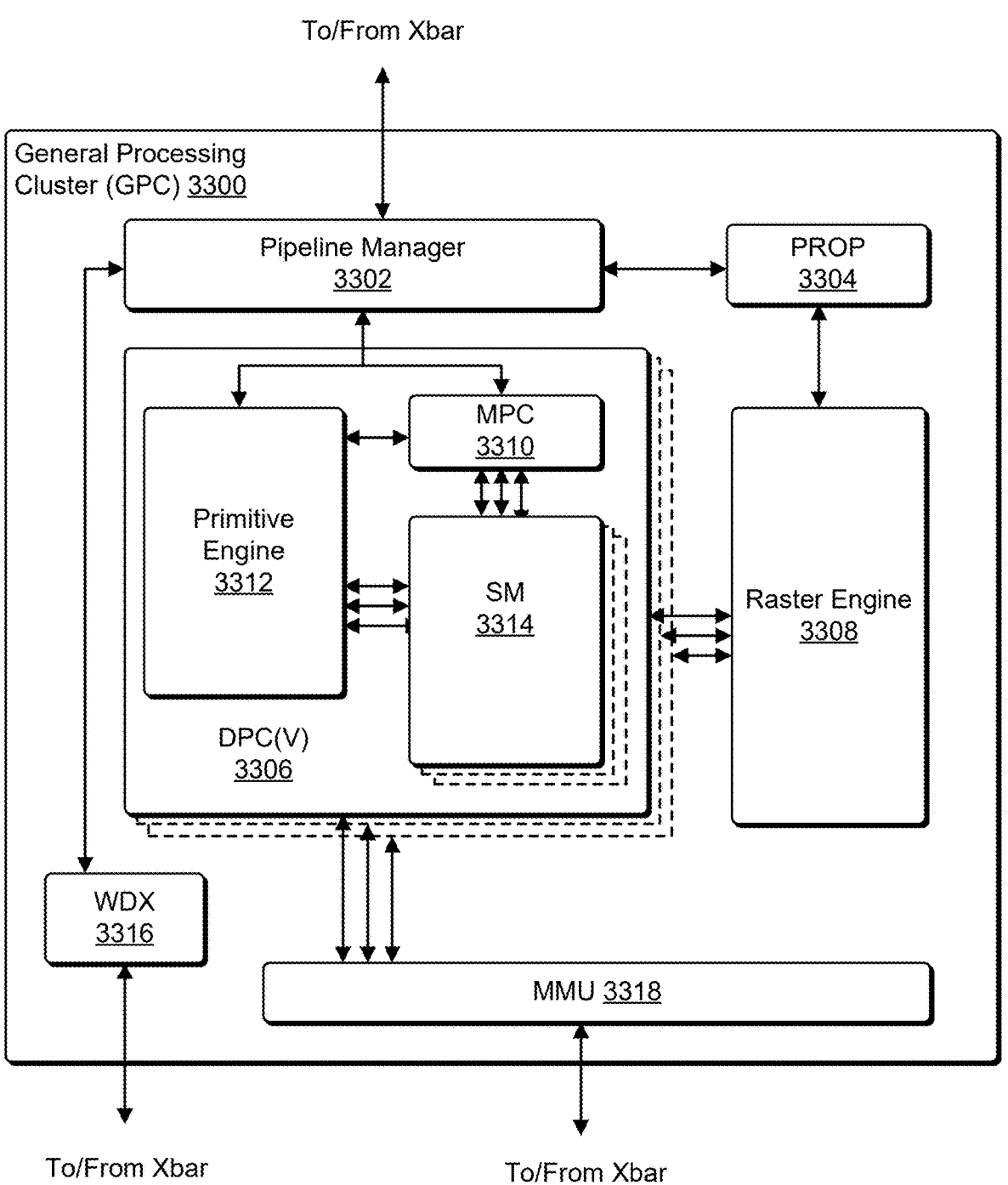
FIG. 33 illustrates a general processing cluster ("GPC"), according to at least one embodiment.

FIG. 33 illustrates a general processing cluster ("GPC") 3300, according to at least one embodiment. In at least one embodiment, GPC 3300 is GPC 3218 of FIG. 32. In at least one embodiment, each GPC 3300 includes, without limitation, a number of hardware units for processing tasks and each GPC 3300 includes, without limitation, a pipeline manager 3302, a pre-raster operations unit ("PROP") 3304, a raster engine 3308, a work distribution crossbar ("WDX") 3316, a memory management unit ("MMU") 3318, one or more Data Processing Clusters ("DPCs") 3306, and any suitable combination of parts.

In at least one embodiment, operation of GPC 3300 is controlled by pipeline manager 3302. In at least one embodiment, pipeline manager 3302 manages configuration of one or more DPCs 3306 for processing tasks allocated to GPC 3300. In at least one embodiment, pipeline manager 3302 configures at least one of one or more DPCs 3306 to implement at least a portion of a graphics rendering pipeline. In at least one embodiment, DPC 3306 is configured to execute a vertex shader program on a programmable streaming multi-processor ("SM") 3314. In at least one embodiment, pipeline manager 3302 is configured to route packets received from a work distribution unit to appropriate logical units within GPC 3300, in at least one embodiment, and some packets may be routed to fixed function hardware units in PROP 3304 and/or raster engine 3308 while other packets may be routed to DPCs 3306 for processing by a primitive engine 3312 or SM 3314. In at least one embodiment, pipeline manager 3302 configures at least one of DPCs 3306 to implement a neural network model and/or a computing pipeline.

In at least one embodiment, PROP unit 3304 is configured, in at least one embodiment, to route data generated by raster engine 3308 and DPCs 3306 to a Raster Operations ("ROP") unit in partition unit 3222, described in more detail above in conjunction with FIG. 32. In at least one embodiment, PROP unit 3304 is configured to perform optimizations for color blending, organize pixel data, perform address translations, and more. In at least one embodiment, raster engine 3308 includes, without limitation, a number of fixed function hardware units configured to perform various raster operations, in at least one embodiment, and raster engine 3308 includes, without limitation, a setup engine, a coarse raster engine, a culling engine, a clipping engine, a fine raster engine, a tile coalescing engine, and any suitable combination thereof. In at least one embodiment, setup engine receives transformed vertices and generates plane equations associated with geometric primitive defined by vertices; plane equations are transmitted to coarse raster engine to generate coverage information (e.g., an x, y coverage mask for a tile) for primitive; output of coarse raster engine is transmitted to culling engine where fragments associated with primitive that fail a z-test are culled, and transmitted to a clipping engine where fragments lying outside a viewing frustum are clipped. In at least one embodiment, fragments that survive clipping and culling are passed to fine raster engine to generate attributes for pixel fragments based on plane equations generated by setup engine. In at least one embodiment, output of raster engine 3308 comprises fragments to be processed by any suitable entity such as by a fragment shader implemented within DPC 3306.

In at least one embodiment, each DPC 3306 included in GPC 3300 comprise, without limitation, an M-Pipe Controller ("MPC") 3310; primitive engine 3312; one or more SMs 3314; and any suitable combination thereof. In at least one embodiment, MPC 3310 controls operation of DPC 3306, routing packets received from pipeline manager 3302 to appropriate units in DPC 3306. In at least one embodiment, packets associated with a vertex are routed to primitive engine 3312, which is configured to fetch vertex attributes associated with vertex from memory; in contrast, packets associated with a shader program may be transmitted to SM 3314.

In at least one embodiment, SM 3314 comprises, without limitation, a programmable streaming processor that is configured to process tasks represented by a number of threads. In at least one embodiment, SM 3314 is multi-threaded and configured to execute a plurality of threads (e.g., 32 threads) from a particular group of threads concurrently and implements a Single-Instruction, Multiple-Data ("SIMD") architecture where each thread in a group of threads (e.g., a warp) is configured to process a different set of data based on same set of instructions. In at least one embodiment, all threads in group of threads execute same instructions. In at least one embodiment, SM 3314 implements a Single-Instruction, Multiple Thread ("SIMT") architecture wherein each thread in a group of threads is configured to process a different set of data based on same set of instructions, but where individual threads in group of threads are allowed to diverge during execution. In at least one embodiment, a program counter, call stack, and execution state is maintained for each warp, enabling concurrency between warps and serial execution within warps when threads within warp diverge. In another embodiment, a program counter, call stack, and execution state is maintained for each individual thread, enabling equal concurrency between all threads, within and between warps. In at least one embodiment, execution state is maintained for each individual thread and threads executing same instructions may be converged and executed in parallel for better efficiency. At least one embodiment of SM 3314 are described in more detail herein.

In at least one embodiment, MMU 3318 provides an interface between GPC 3300 and memory partition unit (e.g., partition unit 3222 of FIG. 32) and MMU 3318 provides translation of virtual addresses into physical addresses, memory protection, and arbitration of memory requests. In at least one embodiment, MMU 3318 provides one or more translation lookaside buffers ("TLBs") for performing translation of virtual addresses into physical addresses in memory.

In at least one embodiment, at least one component shown or described with respect to FIG. 33 is utilized to implement techniques and/or functions described in connection with FIGS. 1-10. In at least one embodiment, at least one GPC 3300 is used to perform channel estimation, coherent combining, and/or signal detection for one or more signals that do not have a corresponding reference signal. In at least one embodiment, at least one GPC 3300 performs at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

Figure 34:
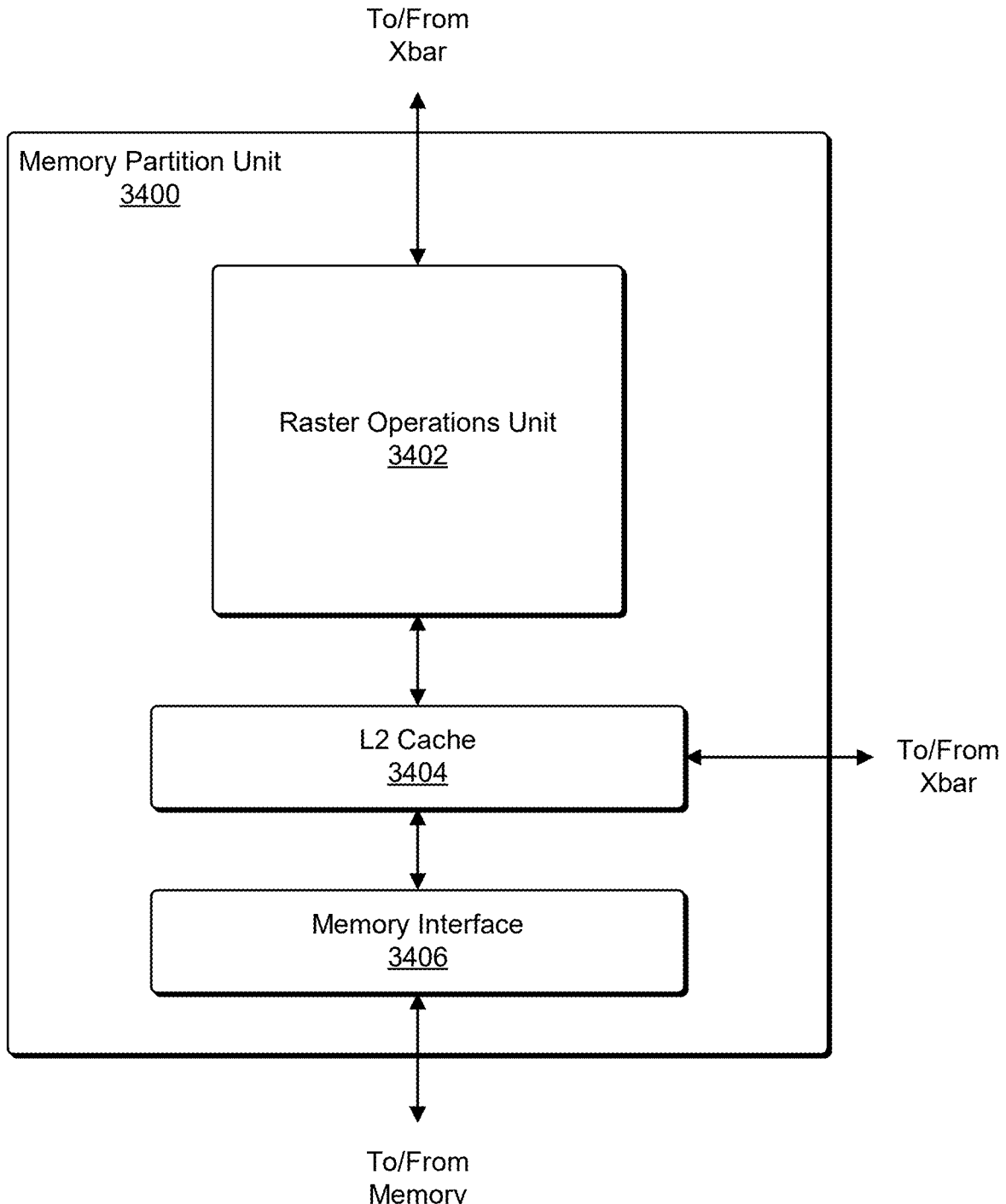
FIG. 34 illustrates a memory partition unit of a parallel processing unit ("PPU"), according to at least one embodiment.

FIG. 34 illustrates a memory partition unit 3400 of a parallel processing unit ("PPU"), in accordance with at least one embodiment. In at least one embodiment, memory partition unit 3400 includes, without limitation, a Raster Operations ("ROP") unit 3402; a level two ("L2") cache 3404; a memory interface 3406; and any suitable combination thereof. In at least one embodiment, memory interface 3406 is coupled to memory. In at least one embodiment, memory interface 3406 may implement 32, 64, 128, 1024-bit data buses, or like, for high-speed data transfer. In at least one embodiment, PPU incorporates U memory interfaces 3406, one memory interface 3406 per pair of partition units 3400, where each pair of partition units 3400 is connected to a corresponding memory device. For example, in at least one embodiment, PPU may be connected to up to Y memory devices, such as high bandwidth memory stacks or graphics double-data-rate, version 5, synchronous dynamic random access memory ("GDDR5 SDRAM").

In at least one embodiment, memory interface 3406 implements a high bandwidth memory second generation ("HBM2") memory interface and Y equals half U. In at least one embodiment, HBM2 memory stacks are located on same physical package as PPU, providing substantial power and area savings compared with conventional GDDR5 SDRAM systems. In at least one embodiment, each HBM2 stack includes, without limitation, four memory dies and Y equals 4, with each HBM2 stack including two 128-bit channels per die for a total of 8 channels and a data bus width of 1024 bits. In at least one embodiment, memory supports Single-Error Correcting Double-Error Detecting ("SECDED") Error Correction Code ("ECC") to protect data. ECC provides higher reliability for compute applications that are sensitive to data corruption.

In at least one embodiment, PPU implements a multilevel memory hierarchy. In at least one embodiment, memory partition unit 3400 supports a unified memory to provide a single unified virtual address space for central processing unit ("CPU") and PPU memory, enabling data sharing between virtual memory systems. In at least one embodiment frequency of accesses by a PPU to memory located on other processors is traced to ensure that memory pages are moved to physical memory of PPU that is accessing pages more frequently. In at least one embodiment, high-speed GPU interconnect 3208 supports address translation services allowing PPU to directly access a CPU's page tables and providing full access to CPU memory by PPU.

In at least one embodiment, copy engines transfer data between multiple PPUs or between PPUs and CPUs. In at least one embodiment, copy engines can generate page faults for addresses that are not mapped into page tables and memory partition unit 3400 then services page faults, mapping addresses into page table, after which copy engine performs transfer. In at least one embodiment, memory is pinned (i.e., non-pageable) for multiple copy engine operations between multiple processors, substantially reducing available memory. In at least one embodiment, with hardware page faulting, addresses can be passed to copy engines without regard as to whether memory pages are resident, and copy process is transparent.

Data from memory 3204 of FIG. 32 or other system memory is fetched by memory partition unit 3400 and stored in L2 cache 3404, which is located on-chip and is shared between various GPCs, in accordance with at least one embodiment. Each memory partition unit 3400, in at least one embodiment, includes, without limitation, at least a portion of L2 cache associated with a corresponding memory device. In at least one embodiment, lower level caches are implemented in various units within GPCs. In at least one embodiment, each of SMs 3314 may implement a level one ("L1") cache wherein L1 cache is private memory that is dedicated to a particular SM 3314 and data from L2 cache 3404 is fetched and stored in each of L1 caches for processing in functional units of SMs 3314. In at least one embodiment, L2 cache 3404 is coupled to memory interface 3406 and XBar 3220.

ROP unit 3402 performs graphics raster operations related to pixel color, such as color compression, pixel blending, and more, in at least one embodiment. ROP unit 3402, in at least one embodiment, implements depth testing in conjunction with raster engine 3308, receiving a depth for a sample location associated with a pixel fragment from culling engine of raster engine 3308. In at least one embodiment, depth is tested against a corresponding depth in a depth buffer for a sample location associated with fragment. In at least one embodiment, if fragment passes depth test for sample location, then ROP unit 3402 updates depth buffer and transmits a result of depth test to raster engine 3308. It will be appreciated that number of partition units 3400 may be different than number of GPCs and, therefore, each ROP unit 3402 can, in at least one embodiment, be coupled to each of GPCs. In at least one embodiment, ROP unit 3402 tracks packets received from different GPCs and determines which that a result generated by ROP unit 3402 is routed to through XBar 3220.

Figure 35:
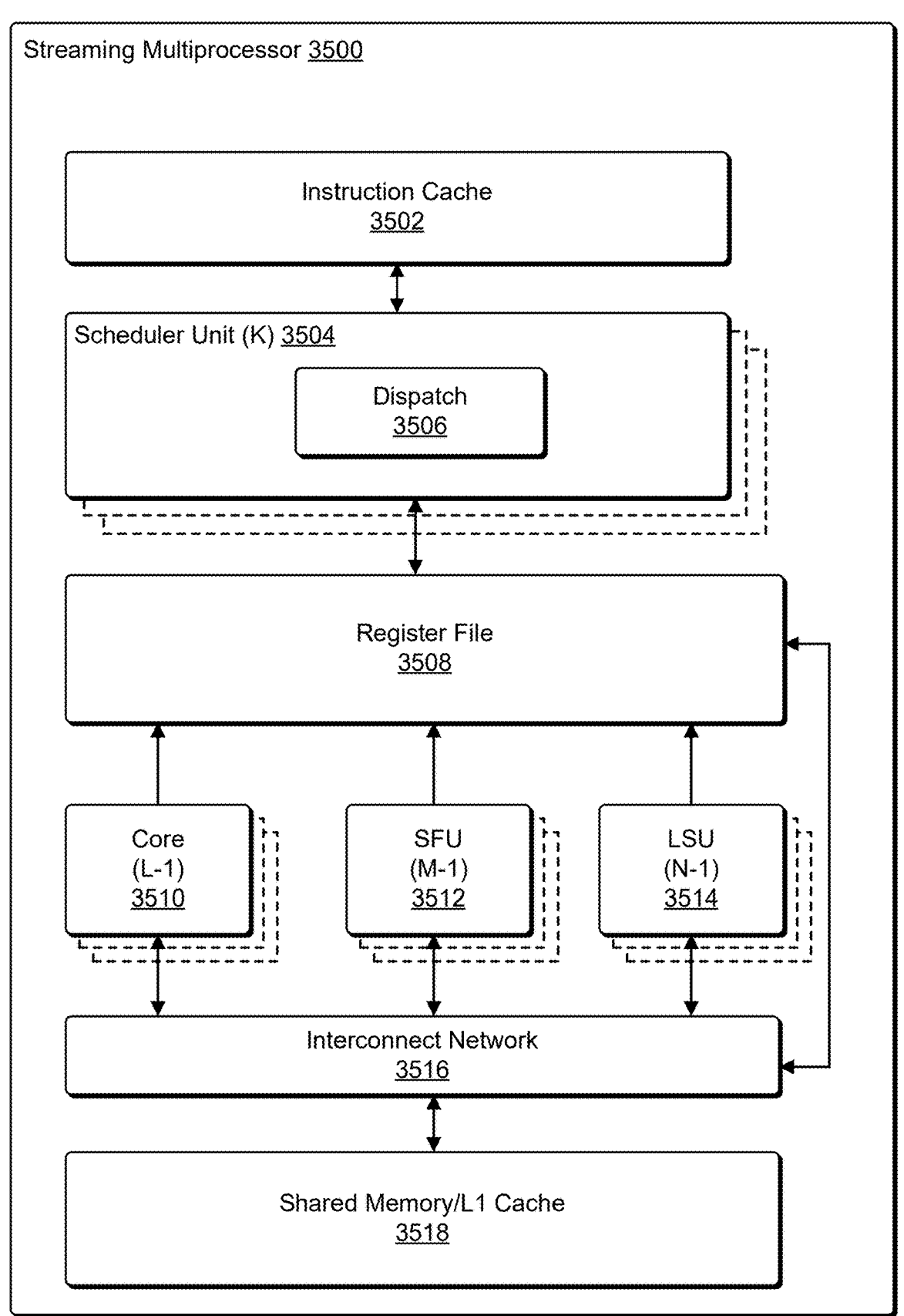
FIG. 35 illustrates a streaming multi-processor, according to at least one embodiment.

FIG. 35 illustrates a streaming multi-processor ("SM") 3500, according to at least one embodiment. In at least one embodiment, SM 3500 is SM of FIG. 33. In at least one embodiment, SM 3500 includes, without limitation, an instruction cache 3502; one or more scheduler units 3504; a register file 3508; one or more processing cores ("cores") 3510; one or more special function units ("SFUs") 3512; one or more load/store units ("LSUs") 3514; an interconnect network 3516; a shared memory/level one ("L1") cache 3518; and any suitable combination thereof. In at least one embodiment, a work distribution unit dispatches tasks for execution on general processing clusters ("GPCs") of parallel processing units ("PPUs") and each task is allocated to a particular Data Processing Cluster ("DPC") within a GPC and, if task is associated with a shader program, task is allocated to one of SMs 3500. In at least one embodiment, scheduler unit 3504 receives tasks from work distribution unit and manages instruction scheduling for one or more thread blocks assigned to SM 3500. In at least one embodiment, scheduler unit 3504 schedules thread blocks for execution as warps of parallel threads, wherein each thread block is allocated at least one warp. In at least one embodiment, each warp executes threads. In at least one embodiment, scheduler unit 3504 manages a plurality of different thread blocks, allocating warps to different thread blocks and then dispatching instructions from plurality of different cooperative groups to various functional units (e.g., processing cores 3510, SFUs 3512, and LSUs 3514) during each clock cycle.

In at least one embodiment, Cooperative Groups may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, applications of conventional programming models provide a single, simple construct for synchronizing cooperating threads: a barrier across all threads of a thread block (e.g., syncthreads( ) function). However, in at least one embodiment, programmers may define groups of threads at smaller than thread block granularities and synchronize within defined groups to enable greater performance, design flexibility, and software reuse in form of collective group-wide function interfaces. In at least one embodiment, Cooperative Groups enables programmers to define groups of threads explicitly at sub-block (i.e., as small as a single thread) and multi-block granularities, and to perform collective operations such as synchronization on threads in a cooperative group. In at least one embodiment, programming model supports clean composition across software boundaries, so that libraries and utility functions can synchronize safely within their local context without having to make assumptions about convergence. In at least one embodiment, Cooperative Groups primitives enable new patterns of cooperative parallelism, including, without limitation, producer-consumer parallelism, opportunistic parallelism, and global synchronization across an entire grid of thread blocks.

In at least one embodiment, a dispatch unit 3506 is configured to transmit instructions to one or more of functional units and scheduler unit 3504 includes, without limitation, two dispatch units 3506 that enable two different instructions from same warp to be dispatched during each clock cycle. In at least one embodiment, each scheduler unit 3504 includes a single dispatch unit 3506 or additional dispatch units 3506.

In at least one embodiment, each SM 3500, in at least one embodiment, includes, without limitation, register file 3508 that provides a set of registers for functional units of SM 3500. In at least one embodiment, register file 3508 is divided between each of functional units such that each functional unit is allocated a dedicated portion of register file 3508. In at least one embodiment, register file 3508 is divided between different warps being executed by SM 3500 and register file 3508 provides temporary storage for operands connected to data paths of functional units. In at least one embodiment, each SM 3500 comprises, without limitation, a plurality of L processing cores 3510. In at least one embodiment, SM 3500 includes, without limitation, a large number (e.g., 128 or more) of distinct processing cores 3510. In at least one embodiment, each processing core 3510, in at least one embodiment, includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 3510 include, without limitation, 64 single-precision (32-bit) floating point cores, 64 integer cores, 32 double-precision (64-bit) floating point cores, and 8 tensor cores.

Tensor cores are configured to perform matrix operations in accordance with at least one embodiment. In at least one embodiment, one or more tensor cores are included in processing cores 3510. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation D=A×B+C, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as CUDA 9 C++ API, exposes specialized matrix load, matrix multiply and accumulate, and matrix store operations to efficiently use tensor cores from a CUDA-C++ program. In at least one embodiment, at CUDA level, warp-level interface assumes 16×16 size matrices spanning all 32 threads of warp.

In at least one embodiment, each SM 3500 comprises, without limitation, M SFUs 3512 that perform special functions (e.g., attribute evaluation, reciprocal square root, and like). In at least one embodiment, SFUs 3512 include, without limitation, a tree traversal unit configured to traverse a hierarchical tree data structure. In at least one embodiment, SFUs 3512 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 3500. In at least one embodiment, texture maps are stored in shared memory/L1 cache 3518. In at least one embodiment, texture units implement texture operations such as filtering operations using mip-maps (e.g., texture maps of varying levels of detail), in accordance with at least one embodiment. In at least one embodiment, each SM 3500 includes, without limitation, two texture units.

Each SM 3500 comprises, without limitation, N LSUs 3514 that implement load and store operations between shared memory/L1 cache 3518 and register file 3508, in at least one embodiment. Each SM 3500 includes, without limitation, interconnect network 3516 that connects each of functional units to register file 3508 and LSU 3514 to register file 3508 and shared memory/L1 cache 3518 in at least one embodiment. In at least one embodiment, interconnect network 3516 is a crossbar that can be configured to connect any of functional units to any of registers in register file 3508 and connect LSUs 3514 to register file 3508 and memory locations in shared memory/L1 cache 3518.

In at least one embodiment, shared memory/L1 cache 3518 is an array of on-chip memory that allows for data storage and communication between SM 3500 and primitive engine and between threads in SM 3500, in at least one embodiment. In at least one embodiment, shared memory/L1 cache 3518 comprises, without limitation, 128 KB of storage capacity and is in path from SM 3500 to partition unit. In at least one embodiment, shared memory/L1 cache 3518, in at least one embodiment, is used to cache reads and writes. In at least one embodiment, one or more of shared memory/L1 cache 3518, L2 cache, and memory are backing stores.

Combining data cache and shared memory functionality into a single memory block provides improved performance for both types of memory accesses, in at least one embodiment. In at least one embodiment, capacity is used or is usable as a cache by programs that do not use shared memory, such as if shared memory is configured to use half of capacity, texture and load/store operations can use remaining capacity. Integration within shared memory/L1 cache 3518 enables shared memory/L1 cache 3518 to function as a high-throughput conduit for streaming data while simultaneously providing high-bandwidth and low-latency access to frequently reused data, in accordance with at least one embodiment. In at least one embodiment, when configured for general purpose parallel computation, a simpler configuration can be used compared with graphics processing. In at least one embodiment, fixed function graphics processing units are bypassed, creating a much simpler programming model. In general purpose parallel computation configuration, work distribution unit assigns and distributes blocks of threads directly to DPCs, in at least one embodiment. In at least one embodiment, threads in a block execute same program, using a unique thread ID in calculation to ensure each thread generates unique results, using SM 3500 to execute program and perform calculations, shared memory/L1 cache 3518 to communicate between threads, and LSU 3514 to read and write global memory through shared memory/L1 cache 3518 and memory partition unit. In at least one embodiment, when configured for general purpose parallel computation, SM 3500 writes commands that scheduler unit 3504 can use to launch new work on DPCs.

In at least one embodiment, PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In at least one embodiment, PPU is embodied on a single semiconductor substrate. In at least one embodiment, PPU is included in a system-on-a-chip ("SoC") along with one or more other devices such as additional PPUs, memory, a reduced instruction set computer ("RISC") CPU, a memory management unit ("MMU"), a digital-to-analog converter ("DAC"), and like.

In at least one embodiment, PPU may be included on a graphics card that includes one or more memory devices. In at least one embodiment, graphics card may be configured to interface with a PCIe slot on a motherboard of a desktop computer. In at least one embodiment, PPU may be an integrated graphics processing unit ("iGPU") included in chipset of motherboard.

In at least one embodiment, at least one component shown or described with respect to FIG. 35 is utilized to implement techniques and/or functions described in connection with FIGS. 1-10. In at least one embodiment, at least one streaming multiprocessor 3500 is used to perform channel estimation, coherent combining, and/or signal detection for one or more signals that do not have a corresponding reference signal. In at least one embodiment, at least one streaming multiprocessor 3500 performs at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a conventional central processing unit ("CPU") and bus implementation. In at least one embodiment, various modules may also be situated separately or in various combinations of semiconductor platforms per desires of user.

In at least one embodiment, computer programs in form of machine-readable executable code or computer control logic algorithms are stored in main memory 1504 and/or secondary storage. Computer programs, if executed by one or more processors, enable system 1500 to perform various functions in accordance with at least one embodiment. In at least one embodiment, memory 1504, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous figures are implemented in context of CPU 1502; parallel processing system 1512; an integrated circuit capable of at least a portion of capabilities of both CPU 1502; parallel processing system 1512; a chipset (e.g., a group of integrated circuits designed to work and sold as a unit for performing related functions, etc.); and any suitable combination of integrated circuit(s).

In at least one embodiment, architecture and/or functionality of various previous figures are implemented in context of a general computer system, a circuit board system, a game console system dedicated for entertainment purposes, an application-specific system, and more. In at least one embodiment, computer system 1500 may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In at least one embodiment, parallel processing system 1512 includes, without limitation, a plurality of parallel processing units ("PPUs") 1514 and associated memories 1516. In at least one embodiment, PPUs 1514 are connected to a host processor or other peripheral devices via an interconnect 1518 and a switch 1520 or multiplexer. In at least one embodiment, parallel processing system 1512 distributes computational tasks across PPUs 1514 which can be parallelizable—for example, as part of distribution of computational tasks across multiple graphics processing unit ("GPU") thread blocks. In at least one embodiment, memory is shared and accessible (e.g., for read and/or write access) across some or all of PPUs 1514, although such shared memory may incur performance penalties relative to use of local memory and registers resident to a PPU 1514. In at least one embodiment, operation of PPUs 1514 is synchronized through use of a command such as syncthreads( ) wherein all threads in a block (e.g., executed across multiple PPUs 1514) to reach a certain point of execution of code before proceeding.

Networks

Figure 36:
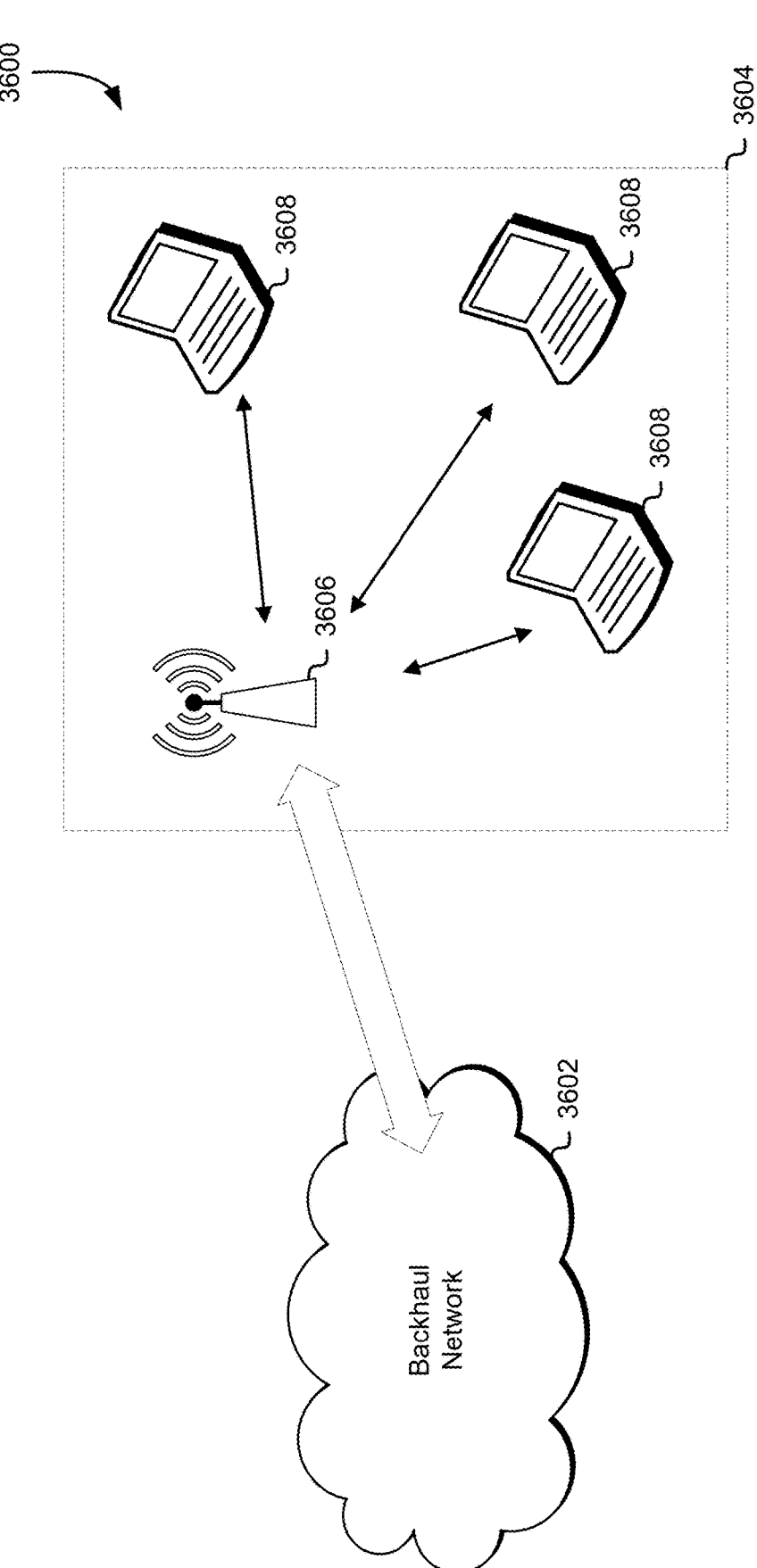
FIG. 36 illustrates a network for communicating data within a 5G wireless communications network, according to at least one embodiment.

FIG. 36 illustrates a network 3600 for communicating data within a 5G wireless communications network, in accordance with at least one embodiment. In at least one embodiment, network 3600 comprises a base station 3606 having a coverage area 3604, a plurality of mobile devices 3608, and a backhaul network 3602. In at least one embodiment, as shown, base station 3606 establishes uplink and/or downlink connections with mobile devices 3608, which serve to carry data from mobile devices 3608 to base station 3606 and vice-versa. In at least one embodiment, data carried over uplink/downlink connections may include data communicated between mobile devices 3608, as well as data communicated to/from a remote-end (not shown) by way of backhaul network 3602. In at least one embodiment, term "base station" refers to any component (or collection of components) configured to provide wireless access to a network, such as an enhanced base station (eNB), a macrocell, a femtocell, a Wi-Fi access point (AP), or other wirelessly enabled devices. In at least one embodiment, base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. In at least one embodiment, term "mobile device" refers to any component (or collection of components) capable of establishing a wireless connection with a base station, such as a user equipment (UE), a mobile station (STA), and other wirelessly enabled devices. In some embodiments, network 3600 may comprise various other wireless devices, such as relays, low power nodes, etc.

In at least one embodiment, at least one component shown or described with respect to FIG. 36 is utilized to implement techniques and/or functions described in connection with FIGS. 1-10. In at least one embodiment, at least one base station 3606 is used to perform channel estimation, coherent combining, and/or signal detection for one or more signals that do not have a corresponding reference signal. In at least one embodiment, at least one base station 3606 performs at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

Figure 37:
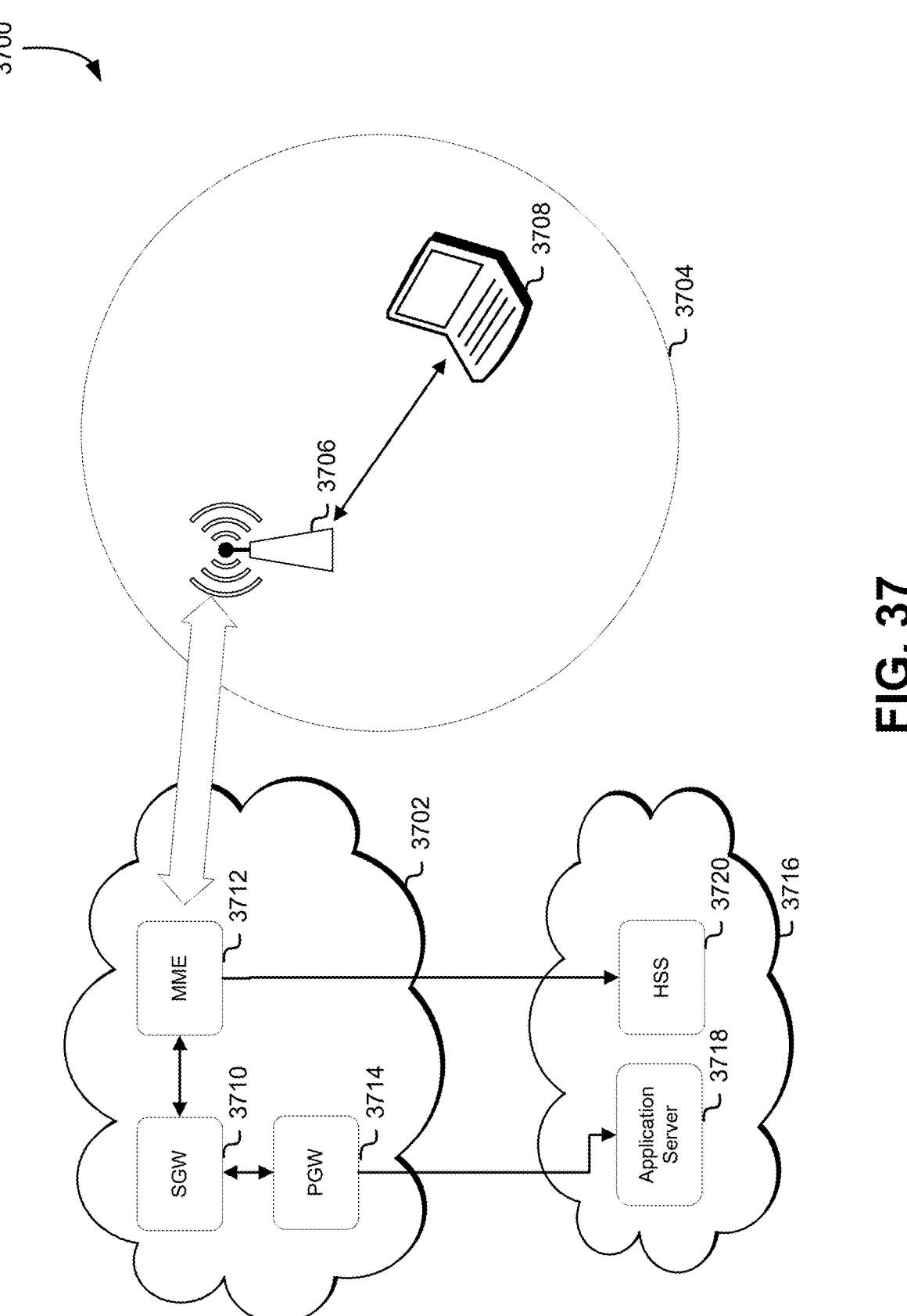
FIG. 37 illustrates a network architecture for a 5G LTE wireless network, according to at least one embodiment.

FIG. 37 illustrates a network architecture 3700 for a 5G wireless network, in accordance with at least one embodiment. In at least one embodiment, as shown, network architecture 3700 includes a radio access network (RAN) 3704, an evolved packet core (EPC) 3702, which may be referred to as a core network, and a home network 3716 of a UE 3708 attempting to access RAN 3704. In at least one embodiment, RAN 3704 and EPC 3702 form a serving wireless network. In at least one embodiment, RAN 3704 includes a base station 3706, and EPC 3702 includes a mobility management entity (MME) 3712, a serving gateway (SGW) 3710, and a packet data network (PDN) gateway (PGW) 3714. In at least one embodiment, home network 3716 includes an application server 3718 and a home subscriber server (HSS) 3720. In at least one embodiment, HSS 3720 may be part of home network 3716, EPC 3702, and/or variations thereof.

In at least one embodiment, MME 3712 is a termination point in a network for ciphering/integrity protection for NAS signaling and handles security key management. In at least one embodiment, it should be appreciated that term "MME" is used in 4G LTE networks, and that 5G LTE networks may include a Security Anchor Node (SEAN) or a Security Access Function (SEAF) that performs similar functions. In at least one embodiment, terms "MME," "SEAN," and "SEAF" may be used interchangeably. In at least one embodiment, MME 3712 also provides control plane function for mobility between LTE and 2G/3G access networks, as well as an interface to home networks of roaming UEs. In at least one embodiment, SGW 3710 routes and forwards user data packets, while also acting as a mobility anchor for a user plane during handovers. In at least one embodiment, PGW 3714 provides connectivity from UEs to external packet data networks by being a point of exit and entry of traffic for UEs. In at least one embodiment, HSS 3720 is a central database that contains user-related and subscription-related information. In at least one embodiment, application server 3718 is a central database that contains user-related information regarding various applications that may utilize and communicate via network architecture 3700.

In at least one embodiment, at least one component shown or described with respect to FIG. 37 is utilized to implement techniques and/or functions described in connection with FIGS. 1-10. In at least one embodiment, at least one base station 3706 is used to perform channel estimation, coherent combining, and/or signal detection for one or more signals that do not have a corresponding reference signal. In at least one embodiment, at least one base station 3706 performs at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

Figure 38:
FIG. 38 is a diagram illustrating some basic functionality of a mobile telecommunications network/system operating in accordance with LTE and 5G principles, according to at least one embodiment.

FIG. 38 is a diagram illustrating some basic functionality of a mobile telecommunications network/system operating in accordance with LTE and 5G principles, in accordance with at least one embodiment. In at least one embodiment, a mobile telecommunications system includes infrastructure equipment comprising base stations 3814 which are connected to a core network 3802, which operates in accordance with a conventional arrangement which will be understood by those acquainted with communications technology. In at least one embodiment, infrastructure equipment 3814 may also be referred to as a base station, network element, enhanced NodeB (eNodeB) or a coordinating entity for example, and provides a wireless access interface to one or more communications devices within a coverage area or cell represented by a broken line 3804, which may be referred to as a radio access network. In at least one embodiment, one or more mobile communications devices 3806 may communicate data via transmission and reception of signals representing data using a wireless access interface. In at least one embodiment, core network 3802 may also provide functionality including authentication, mobility management, charging and so on for communications devices served by a network entity.

In at least one embodiment, mobile communications devices of FIG. 38 may also be referred to as communications terminals, user equipment (UE), terminal devices and so forth, and are configured to communicate with one or more other communications devices served by a same or a different coverage area via a network entity. In at least one embodiment, these communications may be performed by transmitting and receiving signals representing data using a wireless access interface over two way communications links.

In at least one embodiment, as shown in FIG. 38, one of eNodeBs 3814a is shown in more detail to include a transmitter 3812 for transmitting signals via a wireless access interface to one or more communications devices or UEs 3806, and a receiver 3810 to receive signals from one or more UEs within coverage area 3804. In at least one embodiment, controller 3808 controls transmitter 3812 and receiver 3810 to transmit and receive signals via a wireless access interface. In at least one embodiment, controller 3808 may perform a function of controlling allocation of communications resource elements of a wireless access interface and may in some examples include a scheduler for scheduling transmissions via a wireless access interface for both uplink and downlink.

In at least one embodiment, an example UE 3806a is shown in more detail to include a transmitter 3820 for transmitting signals on an uplink of a wireless access interface to eNodeB 3814 and a receiver 3818 for receiving signals transmitted by eNodeB 3814 on a downlink via a wireless access interface. In at least one embodiment, transmitter 3820 and receiver 3818 are controlled by a controller 3816.

In at least one embodiment, at least one component shown or described with respect to FIG. 38 is utilized to implement techniques and/or functions described in connection with FIGS. 1-10. In at least one embodiment, at least one base station 3814 is used to perform channel estimation, coherent combining, and/or signal detection for one or more signals that do not have a corresponding reference signal. In at least one embodiment, at least one base station 3814 performs at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

Figure 39:
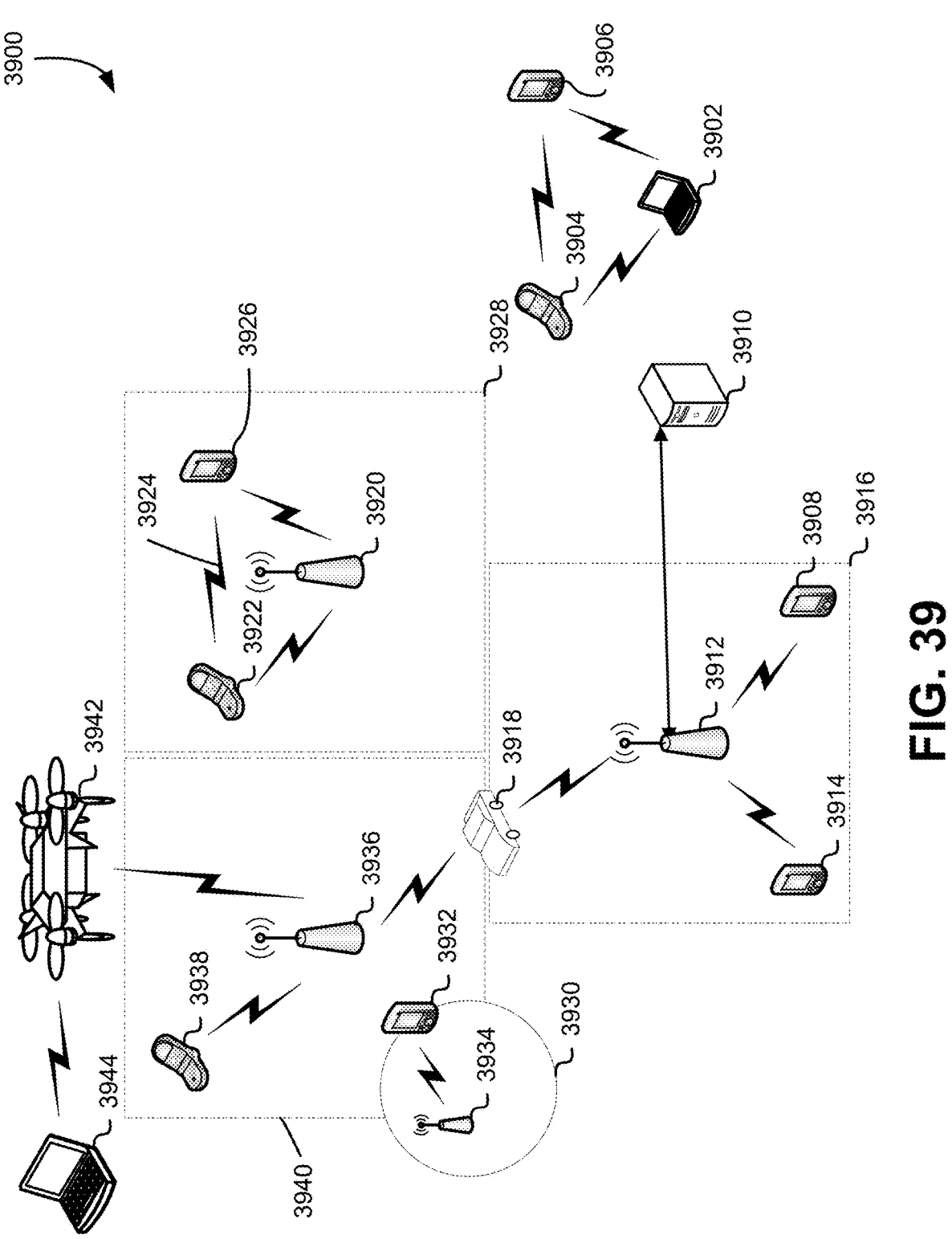
FIG. 39 illustrates a radio access network which may be part of a 5G network architecture, according to at least one embodiment.

FIG. 39 illustrates a radio access network 3900, which may be part of a 5G network architecture, in accordance with at least one embodiment. In at least one embodiment, radio access network 3900 covers a geographic region divided into a number of cellular regions (cells) that can be uniquely identified by a user equipment (UE) based on an identification broadcasted over a geographical area from one access point or base station. In at least one embodiment, macrocells 3940, 3928, and 3916, and a small cell 3930, may include one or more sectors. In at least one embodiment, a sector is a sub-area of a cell and all sectors within one cell are served by a same base station. In at least one embodiment, a single logical identification belonging to that sector can identify a radio link within a sector. In at least one embodiment, multiple sectors within a cell can be formed by groups of antennas with each antenna responsible for communication with UEs in a portion of a cell.

In at least one embodiment, each cell is served by a base station (BS). In at least one embodiment, a base station is a network element in a radio access network responsible for radio transmission and reception in one or more cells to or from a UE. In at least one embodiment, a base station may also be referred to as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology. In at least one embodiment, base stations may include a backhaul interface for communication with a backhaul portion of a network. In at least one embodiment, a base station has an integrated antenna or is connected to an antenna or remote radio head (RRH) by feeder cables.

In at least one embodiment, a backhaul may provide a link between a base station and a core network, and in some examples, a backhaul may provide interconnection between respective base stations. In at least one embodiment, a core network is a part of a wireless communication system that is generally independent of radio access technology used in a radio access network. In at least one embodiment, various types of backhaul interfaces, such as a direct physical connection, a virtual network, or like using any suitable transport network, may be employed. In at least one embodiment, some base stations may be configured as integrated access and backhaul (IAB) nodes, where a wireless spectrum may be used both for access links (i.e., wireless links with UEs), and for backhaul links, which is sometimes referred to as wireless self-backhauling. In at least one embodiment, through wireless self-backhauling, a wireless spectrum utilized for communication between a base station and UE may be leveraged for backhaul communication, enabling fast and easy deployment of highly dense small cell networks, as opposed to requiring each new base station deployment to be outfitted with its own hard-wired backhaul connection.

In at least one embodiment, high-power base stations 3936 and 3920 are shown in cells 3940 and 3928, and a high-power base station 3910 is shown controlling a remote radio head (RRH) 3912 in cell 3916. In at least one embodiment, cells 3940, 3928, and 3916 may be referred to as large size cells or macrocells. In at least one embodiment, a low-power base station 3934 is shown in small cell 3930 (e.g., a microcell, picocell, femtocell, home base station, home Node B, home eNode B, etc.) which may overlap with one or more macrocells, and may be referred to as a small cell or small size cell. In at least one embodiment, cell sizing can be done according to system design as well as component constraints. In at least one embodiment, a relay node may be deployed to extend size or coverage area of a given cell. In at least one embodiment, radio access network 3900 may include any number of wireless base stations and cells. In at least one embodiment, base stations 3936, 3920, 3910, 3934 provide wireless access points to a core network for any number of mobile apparatuses.

In at least one embodiment, a quadcopter or drone 3942 may be configured to function as a base station. In at least one embodiment, a cell may not necessarily be stationary, and a geographic area of a cell may move according to a location of a mobile base station such as quadcopter 3942.

In at least one embodiment, radio access network 3900 supports wireless communications for multiple mobile apparatuses. In at least one embodiment, a mobile apparatus is commonly referred to as user equipment (UE), but may also be referred to as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In at least one embodiment, a UE may be an apparatus that provides a user with access to network services.

In at least one embodiment, a "mobile" apparatus need not necessarily have a capability to move and may be stationary. In at least one embodiment, mobile apparatus or mobile device broadly refers to a diverse array of devices and technologies. In at least one embodiment, a mobile apparatus may be a mobile, a cellular (cell) phone, a smart phone, a session initiation protocol (SIP) phone, a laptop, a personal computer (PC), a notebook, a netbook, a smartbook, a tablet, a personal digital assistant (PDA), a broad array of embedded systems, e.g., corresponding to an "Internet of things" (IoT), an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, a digital home or smart home device such as a home audio, video, and/or multimedia device, an appliance, a vending machine, intelligent lighting, a home security system, a smart meter, a security device, a solar panel or solar array, a municipal infrastructure device controlling electric power (e.g., a smart grid), lighting, water, etc., an industrial automation and enterprise device, a logistics controller, agricultural equipment, military defense equipment, vehicles, aircraft, ships, and weaponry, etc. In at least one embodiment, a mobile apparatus may provide for connected medicine or telemedicine support, i.e., health care at a distance. In at least one embodiment, telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

In at least one embodiment, cells of radio access network 3900 may include UEs that may be in communication with one or more sectors of each cell. In at least one embodiment, UEs 3914 and 3908 may be in communication with base station 3910 by way of RRH 3912; UEs 3922 and 3926 may be in communication with base station 3920; UE 3932 may be in communication with low-power base station 3934; UEs 3938 and 3918 may be in communication with base station 3936; and UE 3944 may be in communication with mobile base station 3942. In at least one embodiment, each base station 3910, 3920, 3934, 3936, and 3942 may be configured to provide an access point to a core network (not shown) for all UEs in respective cells and transmissions from a base station (e.g., base station 3936) to one or more UEs (e.g., UEs 3938 and 3918) may be referred to as downlink (DL) transmission, while transmissions from a UE (e.g., UE 3938) to a base station may be referred to as uplink (UL) transmissions. In at least one embodiment, downlink may refer to a point-to-multipoint transmission, which may be referred to as broadcast channel multiplexing. In at least one embodiment, uplink may refer to a point-to-point transmission.

In at least one embodiment, quadcopter 3942, which may be referred to as a mobile network node, may be configured to function as a UE within cell 3940 by communicating with base station 3936. In at least one embodiment, multiple UEs (e.g., UEs 3922 and 3926) may communicate with each other using peer to peer (P2P) or sidelink signals 3924, which may bypass a base station such as base station 3920.

In at least one embodiment, ability for a UE to communicate while moving, independent of its location, is referred to as mobility. In at least one embodiment, a mobility management entity (MME) sets up, maintains, and releases various physical channels between a UE and a radio access network. In at least one embodiment, DL-based mobility or UL-based mobility may be utilized by a radio access network 3900 to enable mobility and handovers (i.e., transfer of a UE's connection from one radio channel to another). In at least one embodiment, a UE, in a network configured for DL-based mobility, may monitor various parameters of a signal from its serving cell as well as various parameters of neighboring cells, and, depending on a quality of these parameters, a UE may maintain communication with one or more neighboring cells. In at least one embodiment, if signal quality from a neighboring cell exceeds that from a serving cell for a given amount of time, or if a UE moves from one cell to another, a UE may undertake a handoff or handover from a serving cell to a neighboring (target) cell. In at least one embodiment, UE 3918 (illustrated as a vehicle, although any suitable form of UE may be used) may move from a geographic area corresponding to a cell, such as serving cell 3940, to a geographic area corresponding to a neighbor cell, such as neighbor cell 3916. In at least one embodiment, UE 3918 may transmit a reporting message to its serving base station 3936 indicating its condition when signal strength or quality from a neighbor cell 3916 exceeds that of its serving cell 3940 for a given amount of time. In at least one embodiment, UE 3918 may receive a handover command, and may undergo a handover to cell 3916.

In at least one embodiment, UL reference signals from each UE may be utilized by a network configured for UL-based mobility to select a serving cell for each UE. In at least one embodiment, base stations 3936, 3920, and 3910/3912 may broadcast unified synchronization signals (e.g., unified Primary Synchronization Signals (PSSs), unified Secondary Synchronization Signals (SSSs) and unified Physical Broadcast Channels (PBCH)). In at least one embodiment, UEs 3938, 3918, 3922, 3926, 3914, and 3908 may receive unified synchronization signals, derive a carrier frequency and slot timing from synchronization signals, and in response to deriving timing, transmit an uplink pilot or reference signal. In at least one embodiment, two or more cells (e.g., base stations 3936 and 3910/3912) within radio access network 3900 may concurrently receive an uplink pilot signal transmitted by a UE (e.g., UE 3918). In at least one embodiment, cells may measure a strength of a pilot signal, and a radio access network (e.g., one or more of base stations 3936 and 3910/3912 and/or a central node within a core network) may determine a serving cell for UE 3918. In at least one embodiment, a network may continue to monitor an uplink pilot signal transmitted by UE 3918 as UE 3918 moves through radio access network 3900. In at least one embodiment, a network 3900 may handover UE 3918 from a serving cell to a neighboring cell, with or without informing UE 3918, when a signal strength or quality of a pilot signal measured by a neighboring cell exceeds that of a signal strength or quality measured by a serving cell.

In at least one embodiment, synchronization signals transmitted by base stations 3936, 3920, and 3910/3912 may be unified, but may not identify a particular cell and rather may identify a zone of multiple cells operating on a same frequency and/or with a same timing. In at least one embodiment, zones in 5G networks or other next generation communication networks enable uplink-based mobility framework and improves efficiency of both a UE and a network, since amounts of mobility messages that need to be exchanged between a UE and a network may be reduced.

In at least one embodiment, air interface in a radio access network 3900 may utilize unlicensed spectrum, licensed spectrum, or shared spectrum. In at least one embodiment, unlicensed spectrum provides for shared use of a portion of a spectrum without need for a government-granted license, however, while compliance with some technical rules is generally still required to access an unlicensed spectrum, generally, any operator or device may gain access. In at least one embodiment, licensed spectrum provides for exclusive use of a portion of a spectrum, generally by virtue of a mobile network operator purchasing a license from a government regulatory body. In at least one embodiment, shared spectrum may fall between licensed and unlicensed spectrum, wherein technical rules or limitations may be required to access a spectrum, but a spectrum may still be shared by multiple operators and/or multiple RATs. In at least one embodiment, for example, a holder of a license for a portion of licensed spectrum may provide licensed shared access (LSA) to share that spectrum with other parties, e.g., with suitable licensee-determined conditions to gain access.

In at least one embodiment, at least one component shown or described with respect to FIG. 39 is utilized to implement techniques and/or functions described in connection with FIGS. 1-10. In at least one embodiment, at least one component of base station radio access network 3900, such as a gNB, is used to perform channel estimation, coherent combining, and/or signal detection for one or more signals that do not have a corresponding reference signal. In at least one embodiment, at least one component of base station radio access network 3900, such as a gNB, performs at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

Figure 40:
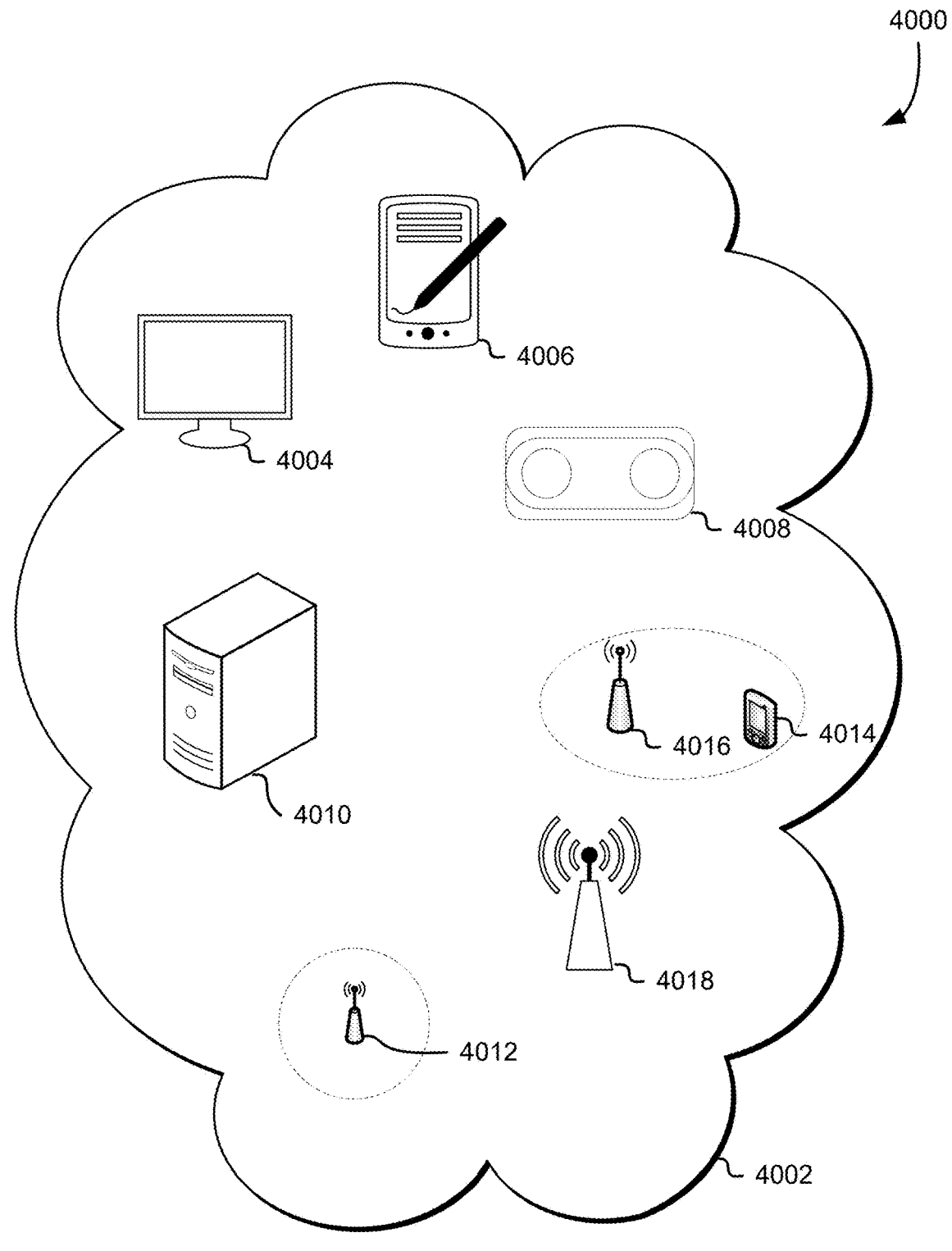
FIG. 40 provides an example illustration of a 5G mobile communications system in which a plurality of different types of devices is used, according to at least one embodiment.

FIG. 40 provides an example illustration of a 5G mobile communications system in which a plurality of different types of devices is used, in accordance with at least one embodiment. In at least one embodiment, as shown in FIG. 40, a first base station 4018 may be provided to a large cell or macro cell in which transmission of signals is over several kilometers. In at least one embodiment, however, system may also support transmission via a very small cell such as transmitted by a second infrastructure equipment 4016 which transmits and receives signals over a distance of hundreds of meters thereby forming a so called "Pico" cell. In at least one embodiment, a third type of infrastructure equipment 4012 may transmit and receive signals over a distance of tens of meters and therefore can be used to form a so called "Femto" cell.

In at least one embodiment, also shown in FIG. 40, different types of communications devices may be used to transmit and receive signals via different types of infrastructure equipment 4012, 4016, 4018 and communication of data may be adapted in accordance with different types of infrastructure equipment using different communications parameters. In at least one embodiment, conventionally, a mobile communications device may be configured to communicate data to and from a mobile communications network via available communication resources of network. In at least one embodiment, a wireless access system is configured to provide highest data rates to devices such as smart phones 4006. In at least one embodiment, "internet of things" may be provided in which low power machine type communications devices transmit and receive data at very low power, low bandwidth and may have a low complexity. In at least one embodiment, an example of such a machine type communication device 4014 may communicate via a Pico cell 4016. In at least one embodiment, a very high data rate and a low mobility may be characteristic of communications with, for example, a television 4004 which may be communicating via a Pico cell. In at least one embodiment, a very high data rate and low latency may be required by a virtual reality headset 4008. In at least one embodiment, a relay device 4010 may be deployed to extend size or coverage area of a given cell or network.

In at least one embodiment, at least one component shown or described with respect to FIG. 40 is utilized to implement techniques and/or functions described in connection with FIGS. 1-10. In at least one embodiment, at least one base station, such as base station 4018, is used to perform channel estimation, coherent combining, and/or signal detection for one or more signals that do not have a corresponding reference signal. In at least one embodiment, at least one base station, such as base station 4018, performs at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

Figure 41:
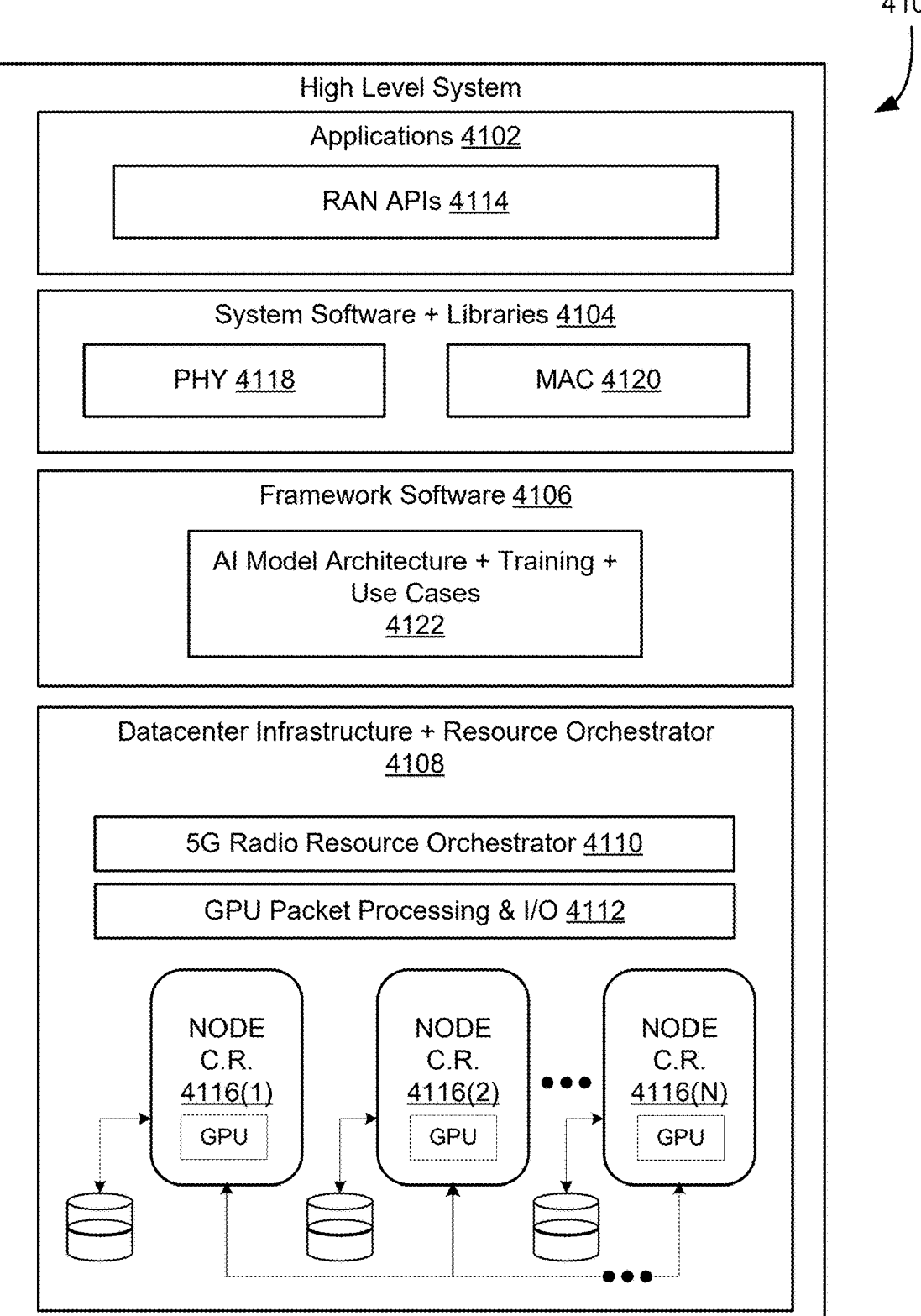
FIG. 41 illustrates an example of a high level system, according to at least one embodiment.

FIG. 41 illustrates an example high level system 4100, in which at least one embodiment may be used. In at least one embodiment, high level system 4100 includes applications 4102, system software+libraries 4104, framework software 4106 and a datacenter infrastructure+resource orchestrator 4108. In at least one embodiment, high level system 4100 may be implemented as a cloud service, physical service, virtual service, network service, and/or variations thereof.

In at least one embodiment, as shown in FIG. 41, datacenter infrastructure+resource orchestrator 4108 may include 5G radio resource orchestrator 4110, GPU packet processing & I/O 4112, and node computing resources ("node C.R.s") 4116(1)-4116(N), where "N" represents any whole, positive integer. In at least one embodiment, node C.R.s 4116(1)-4116(N) may include, but are not limited to, any number of central processing units ("CPUs") or other processors (including accelerators, field programmable gate arrays (FPGAs), graphics processors ("GPUs"), etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 4116(1)-4116(N) may be a server having one or more of above-mentioned computing resources.

In at least one embodiment, 5G radio resource orchestrator 4110 may configure or otherwise control one or more node C.R.s 4116(1)-4116(N) and/or other various components and resources a 5G network architecture may comprise. In at least one embodiment, 5G radio resource orchestrator 4110 may include a software design infrastructure ("SDI") management entity for high level system 4100. In at least one embodiment, 5G radio resource orchestrator 4110 may include hardware, software, or some combination thereof. In at least one embodiment, 5G radio resource orchestrator 4110 may be utilized to configure or otherwise control various medium access control sublayers, radio access networks, physical layers or sublayers, and/or variations thereof, which may be part of a 5G network architecture. In at least one embodiment, 5G radio resource orchestrator 4110 may configure or allocate grouped compute, network, memory or storage resources to support one or more workloads which may be executed as part of a 5G network architecture.

In at least one embodiment, GPU packet processing & I/O 4112 may configure or otherwise process various inputs and outputs, as well as packets such as data packets, which may be transmitted/received as part of a 5G network architecture, which may be implemented by high level system 4100. In at least one embodiment, a packet may be data formatted to be provided by a network and may be typically divided into control information and payload (i.e., user data). In at least one embodiment, types of packets may include Internet Protocol version 4 (IPv4) packets, Internet Protocol version 6 (IPv6) packets, and Ethernet II frame packets. In at least one embodiment, control data of a data packet may be classified into data integrity fields and semantic fields. In at least one embodiment, network connections that a data packet may be received upon include a local area network, a wide-area network, a virtual private network, Internet, an intranet, an extranet, a public switched telephone network, an infrared network, a wireless network, a satellite network, and any combination thereof.

In at least one embodiment, framework software 4106 includes an AI Model Architecture+Training+Use Cases 4122. In at least one embodiment, AI Model Architecture+Training+Use Cases 4122 may include tools, services, software, or other resources to train one or more machine learning models or predict or infer information using one or more machine learning models according to one or more embodiments. For example, in at least one embodiment, a machine learning model may be trained by calculating weight parameters according to a neural network architecture using software and computing resources described above with respect to high level system 4100. In at least one embodiment, trained machine learning models corresponding to one or more neural networks may be used to infer or predict information using resources described above with respect to high level system 4100 by using weight parameters calculated through one or more training techniques. In at least one embodiment, framework software 4106 may include a framework to support system software+libraries 4104 and applications 4102.

In at least one embodiment, system software+libraries 4104 or applications 4102 may respectively include web-based service software or applications, such as those provided by Amazon Web Services, Google Cloud and Microsoft Azure. In at least one embodiment, framework software 4106 may include, but is not limited to, a type of free and open-source software web application framework such as Apache Spark™ (hereinafter "Spark"). In at least one embodiment, system software+libraries 4104 may include software used by at least portions of node C.R.s 4116(1)-4116(N). In at least one embodiment, one or more types of software may include, but are not limited to, Internet web page search software, e-mail virus scan software, database software, and streaming video content software.

In at least one embodiment, PHY 4118 is a set of system software and libraries configured to provide an interface with a physical layer of a wireless technology, which may be a physical layer such as a 5G New Radio (NR) physical layer. In at least one embodiment, an NR physical layer utilizes a flexible and scalable design and may comprise various components and technologies, such as modulation schemes, waveform structures, frame structures, reference signals, multi-antenna transmission and channel coding.

In at least one embodiment, a NR physical layer supports quadrature phase shift keying (QPSK), 16 quadrature amplitude modulation (QAM), 64 QAM and 256 QAM modulation formats. In at least one embodiment, different modulation schemes for different user entity (UE) categories may also be included in a NR physical layer. In at least one embodiment, a NR physical layer may utilize cyclic prefix orthogonal frequency division multiplexing (CP-OFDM) with a scalable numerology (subcarrier spacing, cyclic prefix) in both uplink (UL) and downlink (DL) up to at least 52.6 GHz. In at least one embodiment, a NR physical layer may support discrete Fourier transform spread orthogonal frequency division multiplexing (DFT-SOFDM) in UL for coverage-limited scenarios, with single stream transmissions (that is, without spatial multiplexing).

In at least one embodiment, a NR frame supports time division duplex (TDD) and frequency division duplex (FDD) transmissions and operation in both licensed and unlicensed spectrum, which enables very low latency, fast hybrid automatic repeat request (HARQ) acknowledgements, dynamic TDD, coexistence with LTE and transmissions of variable length (for example, short duration for ultra-reliable low-latency communications (URLLC) and long duration for enhanced mobile broadband (eMBB)). In at least one embodiment, NR frame structure follows three key design principles to enhance forward compatibility and reduce interactions between different features.

In at least one embodiment, a first principle is that transmissions are self-contained, which can refer to a scheme in which data in a slot and in a beam are decodable on its own without dependency on other slots and beams. In at least one embodiment, this implies that reference signals required for demodulation of data are included in a given slot and a given beam. In at least one embodiment, a second principle is that transmissions are well confined in time and frequency, which results in a scheme in which new types of transmissions in parallel with legacy transmissions may be introduced. In at least one embodiment, a third principle is avoiding static and/or strict timing relations across slots and across different transmission directions. In at least one embodiment, usage of a third principle can entail utilizing asynchronous hybrid automatic repeat request (HARQ) instead of predefined retransmission time.

In at least one embodiment, NR frame structure also allows for rapid HARQ acknowledgement, in which decoding is performed during reception of DL data and HARQ acknowledgement is prepared by a UE during a guard period, when switching from DL reception to UL transmission. In at least one embodiment, to obtain low latency, a slot (or a set of slots in case of slot aggregation) is front-loaded with control signals and reference signals at a beginning of a slot (or set of slots).

In at least one embodiment, NR has an ultra-lean design that minimizes always-on transmissions to enhance network energy efficiency and ensure forward compatibility. In at least one embodiment, reference signals in NR are transmitted only when necessary. In at least one embodiment, four main reference signals are demodulation reference signal (DMRS), phase-tracking reference signal (PTRS), sounding reference signal (SRS) and channel-state information reference signal (CSI-RS).

In at least one embodiment, DMRS is used to estimate a radio channel for demodulation. In at least one embodiment, DMRS is UE-specific, can be beamformed, confined in a scheduled resource, and transmitted only when necessary, both in DL and UL. In at least one embodiment, to support multiple-layer multiple-input, multiple-output (MIMO) transmission, multiple orthogonal DMRS ports can be scheduled, one for each layer. In at least one embodiment, a basic DMRS pattern is front loaded, as a DMRS design takes into account an early decoding requirement to support low-latency applications. In at least one embodiment, for low-speed scenarios, DMRS uses low density in a time domain. In at least one embodiment, however, for high-speed scenarios, a time density of DMRS is increased to track fast changes in a radio channel.

In at least one embodiment, PTRS is introduced in NR to enable compensation of oscillator phase noise. In at least one embodiment, typically, phase noise increases as a function of oscillator carrier frequency. In at least one embodiment, PTRS can therefore be utilized at high carrier frequencies (such as mmWave) to mitigate phase noise. In at least one embodiment, PTRS is UE-specific, confined in a scheduled resource and can be beamformed. In at least one embodiment, PTRS is configurable depending on a quality of oscillators, carrier frequency, OFDM sub-carrier spacing, and modulation and coding schemes used for transmission.

In at least one embodiment, SRS is transmitted in UL to perform channel state information (CSI) measurements mainly for scheduling and link adaptation. In at least one embodiment, for NR, SRS is also utilized for reciprocity-based precoder design for massive MIMO and UL beam management. In at least one embodiment, SRS has a modular and flexible design to support different procedures and UE capabilities. In at least one embodiment, an approach for channel state information reference signal (CSI-RS) is similar.

In at least one embodiment, NR employs different antenna solutions and techniques depending on which part of a spectrum is used for its operation. In at least one embodiment, for lower frequencies, a low to moderate number of active antennas (up to around 32 transmitter chains) is assumed and FDD operation is common. In at least one embodiment, acquisition of CSI requires transmission of CSI-RS in a DL and CSI reporting in an UL. In at least one embodiment, limited bandwidths available in this frequency region require high spectral efficiency enabled by multi-user MIMO (MU-MIMO) and higher order spatial multiplexing, which is achieved via higher resolution CSI reporting compared with LTE.

In at least one embodiment, for higher frequencies, a larger number of antennas can be employed in a given aperture, which increases a capability for beamforming and multiuser (MU)-MIMO. In at least one embodiment, here, spectrum allocations are of TDD type and reciprocity-based operation is assumed. In at least one embodiment, high-resolution CSI in a form of explicit channel estimations is acquired by UL channel sounding. In at least one embodiment, such high-resolution CSI enables sophisticated precoding algorithms to be employed at a base station (BS). In at least one embodiment, for even higher frequencies (in mmWave range) an analog beamforming implementation is typically required currently, which limits transmission to a single beam direction per time unit and radio chain. In at least one embodiment, since an isotropic antenna element is very small in this frequency region owing to a short carrier wavelength, a great number of antenna elements is required to maintain coverage. In at least one embodiment, beamforming needs to be applied at both transmitter and receiver ends to combat increased path loss, even for control channel transmission.

In at least one embodiment, to support these diverse use cases, NR features a highly flexible but unified CSI framework, in which there is reduced coupling between CSI measurement, CSI reporting and an actual DL transmission in NR compared with LTE. In at least one embodiment, NR also supports more advanced schemes such as multi-point transmission and coordination. In at least one embodiment, control and data transmissions follow a self-contained principle, where all information required to decode a transmission (such as accompanying DMRS) is contained within a transmission itself. In at least one embodiment, as a result, a network can seamlessly change a transmission point or beam as a UE moves in a network.

In at least one embodiment, MAC 4120 is a set of system software and libraries configured to provide an interface with a medium access control (MAC) layer, which may be part of a 5G network architecture. In at least one embodiment, a MAC layer controls hardware responsible for interaction with a wired, optical, or wireless transmission medium. In at least one embodiment, MAC provides flow control and multiplexing for a transmission medium.

In at least one embodiment, a MAC sublayer provides an abstraction of a physical layer such that complexities of a physical link control are invisible to a logical link control (LLC) and upper layers of a network stack. In at least one embodiment, any LLC sublayer (and higher layers) may be used with any MAC. In at least one embodiment, any MAC can be used with any physical layer, independent of transmission medium. In at least one embodiment, a MAC sublayer, when sending data to another device on a network, encapsulates higher-level frames into frames appropriate for a transmission medium, adds a frame check sequence to identify transmission errors, and then forwards data to a physical layer as soon as appropriate channel access method permits it. In at least one embodiment, MAC is also responsible for compensating for collisions if a jam signal is detected, in which a MAC may initiate retransmission.

In at least one embodiment, applications 4102 may include one or more types of applications used by at least portions of node C.R.s 4116(1)-4116(N) and/or framework software 4106. In at least one embodiment, one or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, RAN APIs 4114 may be a set of subroutine definitions, communication protocols, and/or software tools that provide a method of communication with components of a radio access network (RAN) which may be part of a 5G network architecture. In at least one embodiment, a radio access network is part of a network communications system and may implement a radio access technology. In at least one embodiment, radio access network functionality is typically provided by a silicon chip residing in both a core network as well as user equipment. Further information regarding a radio access network can be found in the description of FIG. 39.

In at least one embodiment, high level system 4100 may use CPUs, application-specific integrated circuits (ASICs), GPUs, FPGAs, or other hardware to perform training, inferencing, and/or other various processes using above-described resources. In at least one embodiment, moreover, one or more software and/or hardware resources described above may be configured as a service to allow users to train or performing inferencing of information, such as image recognition, speech recognition, or other artificial intelligence services, as well as other services such as services that allow users to configure and implement various aspects of a 5G network architecture.

In at least one embodiment, at least one component shown or described with respect to FIG. 41 is utilized to implement techniques and/or functions described in connection with FIGS. 1-10. In at least one embodiment, at least one node C.R. 4116 is used to perform channel estimation, coherent combining, and/or signal detection for one or more signals that do not have a corresponding reference signal. In at least one embodiment, at least one node C.R. 4116 performs at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

Figure 42:
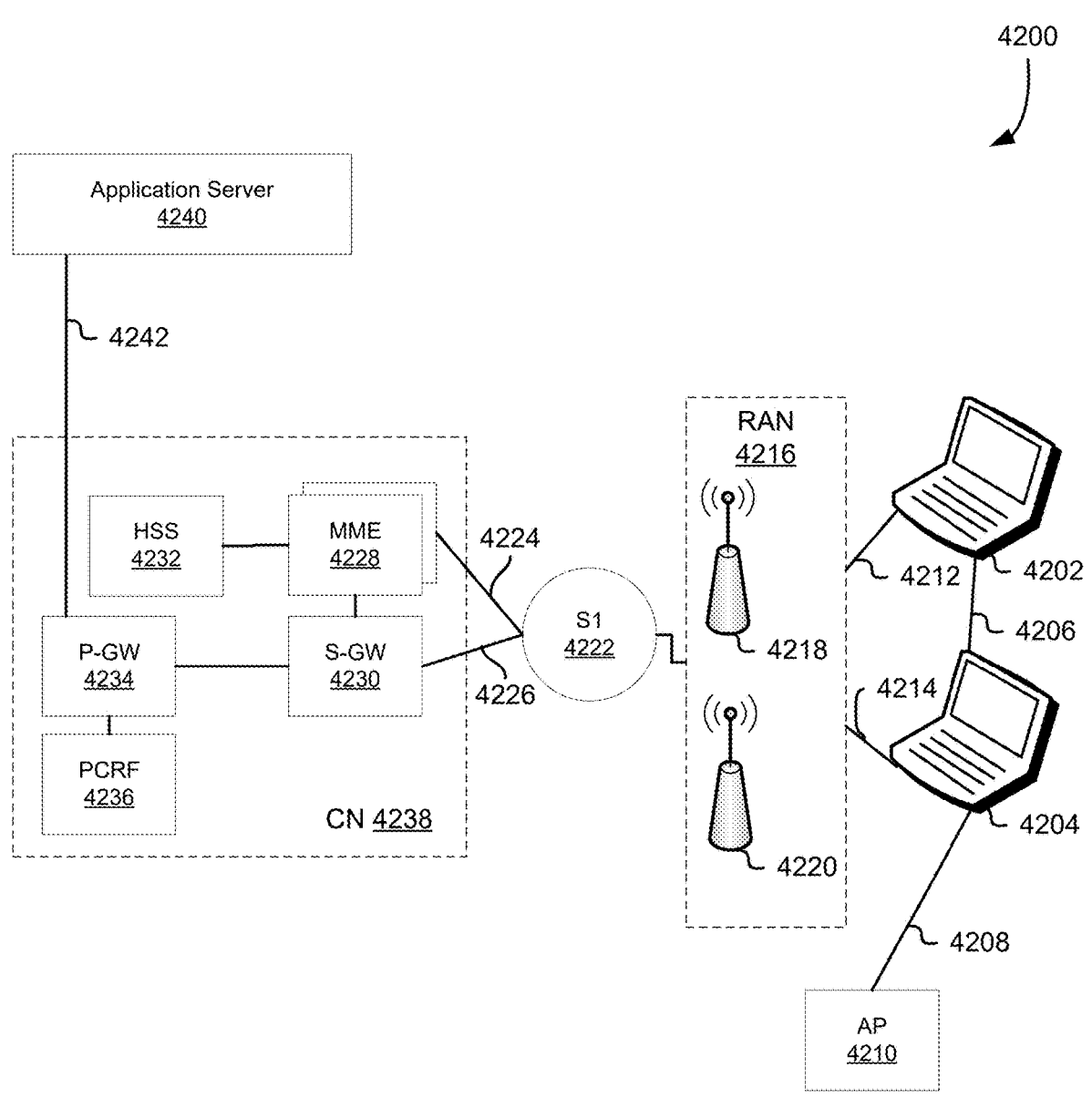
FIG. 42 illustrates an architecture of a system of a network, according to at least one embodiment.

FIG. 42 illustrates an architecture of a system 4200 of a network, in accordance with at least one embodiment. In at least one embodiment, system 4200 is shown to include a user equipment (UE) 4202 and a UE 4204. In at least one embodiment, UEs 4202 and 4204 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In at least one embodiment, any of UEs 4202 and 4204 can comprise an Internet of Things (IoT) UE, which can comprise a network access layer designed for low-power IoT applications utilizing short-lived UE connections. In at least one embodiment, an IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. In at least one embodiment, a M2M or MTC exchange of data may be a machine-initiated exchange of data. In at least one embodiment, an IoT network describes interconnecting IoT UEs, which may include uniquely identifiable embedded computing devices (within Internet infrastructure), with short-lived connections. In at least one embodiment, an IoT UEs may execute background applications (e.g., keep alive messages, status updates, etc.) to facilitate connections of an IoT network.

In at least one embodiment, UEs 4202 and 4204 may be configured to connect, e.g., communicatively couple, with a radio access network (RAN) 4216. In at least one embodiment, RAN 4216 may be, for example, an Evolved Universal Mobile Telecommunications System (UMTS) Terrestrial Radio Access Network (E-UTRAN), a NextGen RAN (NG RAN), or some other type of RAN. In at least one embodiment, UEs 4202 and 4204 utilize connections 4212 and 4214, respectively, each of which comprises a physical communications interface or layer. In at least one embodiment, connections 4212 and 4214 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and variations thereof.

In at least one embodiment, UEs 4202 and 4204 may further directly exchange communication data via a ProSe interface 4206. In at least one embodiment, ProSe interface 4206 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

In at least one embodiment, UE 4204 is shown to be configured to access an access point (AP) 4210 via connection 4208. In at least one embodiment, connection 4208 can comprise a local wireless connection, such as a connection consistent with any IEEE 802.11 protocol, wherein AP 4210 would comprise a wireless fidelity (WiFi®) router. In at least one embodiment, AP 4210 is shown to be connected to an Internet without connecting to a core network of a wireless system.

In at least one embodiment, RAN 4216 can include one or more access nodes that enable connections 4212 and 4214. In at least one embodiment, these access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). In at least one embodiment, RAN 4216 may include one or more RAN nodes for providing macrocells, e.g., macro RAN node 4218, and one or more RAN nodes for providing femtocells or picocells (e.g., cells having smaller coverage areas, smaller user capacity, or higher bandwidth compared to macrocells), e.g., low power (LP) RAN node 4220.

In at least one embodiment, any of RAN nodes 4218 and 4220 can terminate an air interface protocol and can be a first point of contact for UEs 4202 and 4204. In at least one embodiment, any of RAN nodes 4218 and 4220 can fulfill various logical functions for RAN 4216 including, but not limited to, radio network controller (RNC) functions such as radio bearer management, uplink and downlink dynamic radio resource management and data packet scheduling, and mobility management.

In at least one embodiment, UEs 4202 and 4204 can be configured to communicate using Orthogonal Frequency-Division Multiplexing (OFDM) communication signals with each other or with any of RAN nodes 4218 and 4220 over a multi-carrier communication channel in accordance various communication techniques, such as, but not limited to, an Orthogonal Frequency Division Multiple Access (OFDMA) communication technique (e.g., for downlink communications) or a Single Carrier Frequency Division Multiple Access (SC-FDMA) communication technique (e.g., for uplink and ProSe or sidelink communications), and/or variations thereof. In at least one embodiment, OFDM signals can comprise a plurality of orthogonal subcarriers.

In at least one embodiment, a downlink resource grid can be used for downlink transmissions from any of RAN nodes 4218 and 4220 to UEs 4202 and 4204, while uplink transmissions can utilize similar techniques. In at least one embodiment, a grid can be a time frequency grid, called a resource grid or time-frequency resource grid, which is a physical resource in a downlink in each slot. In at least one embodiment, such a time frequency plane representation is a common practice for OFDM systems, which makes it intuitive for radio resource allocation. In at least one embodiment, each column and each row of a resource grid corresponds to one OFDM symbol and one OFDM subcarrier, respectively. In at least one embodiment, a duration of a resource grid in a time domain corresponds to one slot in a radio frame. In at least one embodiment, a smallest time-frequency unit in a resource grid is denoted as a resource element. In at least one embodiment, each resource grid comprises a number of resource blocks, which describe a mapping of certain physical channels to resource elements. In at least one embodiment, each resource block comprises a collection of resource elements. In at least one embodiment, in a frequency domain, this may represent a smallest quantity of resources that currently can be allocated. In at least one embodiment, there are several different physical downlink channels that are conveyed using such resource blocks.

In at least one embodiment, a physical downlink shared channel (PDSCH) may carry user data and higher-layer signaling to UEs 4202 and 4204. In at least one embodiment, a physical downlink control channel (PDCCH) may carry information about a transport format and resource allocations related to PDSCH channel, among other things. In at least one embodiment, it may also inform UEs 4202 and 4204 about a transport format, resource allocation, and HARQ (Hybrid Automatic Repeat Request) information related to an uplink shared channel. In at least one embodiment, typically, downlink scheduling (assigning control and shared channel resource blocks to UE 4202 within a cell) may be performed at any of RAN nodes 4218 and 4220 based on channel quality information fed back from any of UEs 4202 and 4204. In at least one embodiment, downlink resource assignment information may be sent on a PDCCH used for (e.g., assigned to) each of UEs 4202 and 4204.

In at least one embodiment, a PDCCH may use control channel elements (CCEs) to convey control information. In at least one embodiment, before being mapped to resource elements, PDCCH complex valued symbols may first be organized into quadruplets, which may then be permuted using a sub-block interleaver for rate matching. In at least one embodiment, each PDCCH may be transmitted using one or more of these CCEs, where each CCE may correspond to nine sets of four physical resource elements known as resource element groups (REGs). In at least one embodiment, four Quadrature Phase Shift Keying (QPSK) symbols may be mapped to each REG. In at least one embodiment, PDCCH can be transmitted using one or more CCEs, depending on a size of a downlink control information (DCI) and a channel condition. In at least one embodiment, there can be four or more different PDCCH formats defined in LTE with different numbers of CCEs (e.g., aggregation level, L=1, 2, 4, or 8).

In at least one embodiment, an enhanced physical downlink control channel (EPDCCH) that uses PDSCH resources may be utilized for control information transmission. In at least one embodiment, EPDCCH may be transmitted using one or more enhanced control channel elements (ECCEs). In at least one embodiment, each ECCE may correspond to nine sets of four physical resource elements known as an enhanced resource element group (EREG). In at least one embodiment, an ECCE may have other numbers of EREGs in some situations.

In at least one embodiment, RAN 4216 is shown to be communicatively coupled to a core network (CN) 4238 via an S1 interface 4222. In at least one embodiment, CN 4238 may be an evolved packet core (EPC) network, a NextGen Packet Core (NPC) network, or some other type of CN. In at least one embodiment, S1 interface 4222 is split into two parts: S1-U interface 4226, which carries traffic data between RAN nodes 4218 and 4220 and serving gateway (S-GW) 4230, and a S1-mobility management entity (MME) interface 4224, which is a signaling interface between RAN nodes 4218 and 4220 and MMEs 4228.

In at least one embodiment, CN 4238 comprises MMEs 4228, S-GW 4230, Packet Data Network (PDN) Gateway (P-GW) 4234, and a home subscriber server (HSS) 4232. In at least one embodiment, MMEs 4228 may be similar in function to a control plane of legacy Serving General Packet Radio Service (GPRS) Support Nodes (SGSN). In at least one embodiment, MMEs 4228 may manage mobility aspects in access such as gateway selection and tracking area list management. In at least one embodiment, HSS 4232 may comprise a database for network users, including subscription related information to support a network entities' handling of communication sessions. In at least one embodiment, CN 4238 may comprise one or several HSSs 4232, depending on a number of mobile subscribers, on a capacity of an equipment, on an organization of a network, etc. In at least one embodiment, HSS 4232 can provide support for routing/roaming, authentication, authorization, naming/addressing resolution, location dependencies, etc.

In at least one embodiment, S-GW 4230 may terminate a S1 interface 4222 towards RAN 4216, and routes data packets between RAN 4216 and CN 4238. In at least one embodiment, S-GW 4230 may be a local mobility anchor point for inter-RAN node handovers and also may provide an anchor for inter-3GPP mobility. In at least one embodiment, other responsibilities may include lawful intercept, charging, and some policy enforcement.

In at least one embodiment, P-GW 4234 may terminate an SGi interface toward a PDN. In at least one embodiment, P-GW 4234 may route data packets between an EPC network 4238 and external networks such as a network including application server 4240 (alternatively referred to as application function (AF)) via an Internet Protocol (IP) interface 4242. In at least one embodiment, application server 4240 may be an element offering applications that use IP bearer resources with a core network (e.g., UMTS Packet Services (PS) domain, LTE PS data services, etc.). In at least one embodiment, P-GW 4234 is shown to be communicatively coupled to an application server 4240 via an IP communications interface 4242. In at least one embodiment, application server 4240 can also be configured to support one or more communication services (e.g., Voice-over-Internet Protocol (VOIP) sessions, PTT sessions, group communication sessions, social networking services, etc.) for UEs 4202 and 4204 via CN 4238.

In at least one embodiment, P-GW 4234 may further be a node for policy enforcement and charging data collection. In at least one embodiment, policy and Charging Enforcement Function (PCRF) 4236 is a policy and charging control element of CN 4238. In at least one embodiment, in a non-roaming scenario, there may be a single PCRF in a Home Public Land Mobile Network (HPLMN) associated with a UE's Internet Protocol Connectivity Access Network (IP-CAN) session. In at least one embodiment, in a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). In at least one embodiment, PCRF 4236 may be communicatively coupled to application server 4240 via P-GW 4234. In at least one embodiment, application server 4240 may signal PCRF 4236 to indicate a new service flow and select an appropriate Quality of Service (QOS) and charging parameters. In at least one embodiment, PCRF 4236 may provision this rule into a Policy and Charging Enforcement Function (PCEF) (not shown) with an appropriate traffic flow template (TFT) and QoS class of identifier (QCI), which commences a QoS and charging as specified by application server 4240.

In at least one embodiment, at least one component shown or described with respect to FIG. 42 is utilized to implement techniques and/or functions described in connection with FIGS. 1-10. In at least one embodiment, at least one component of RAN 4216, such as RAN 4218 or 4220, is used to perform channel estimation, coherent combining, and/or signal detection for one or more signals that do not have a corresponding reference signal. In at least one embodiment, at least one component of RAN 4216, such as RAN 4218 or 4220, performs at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

Figure 43:
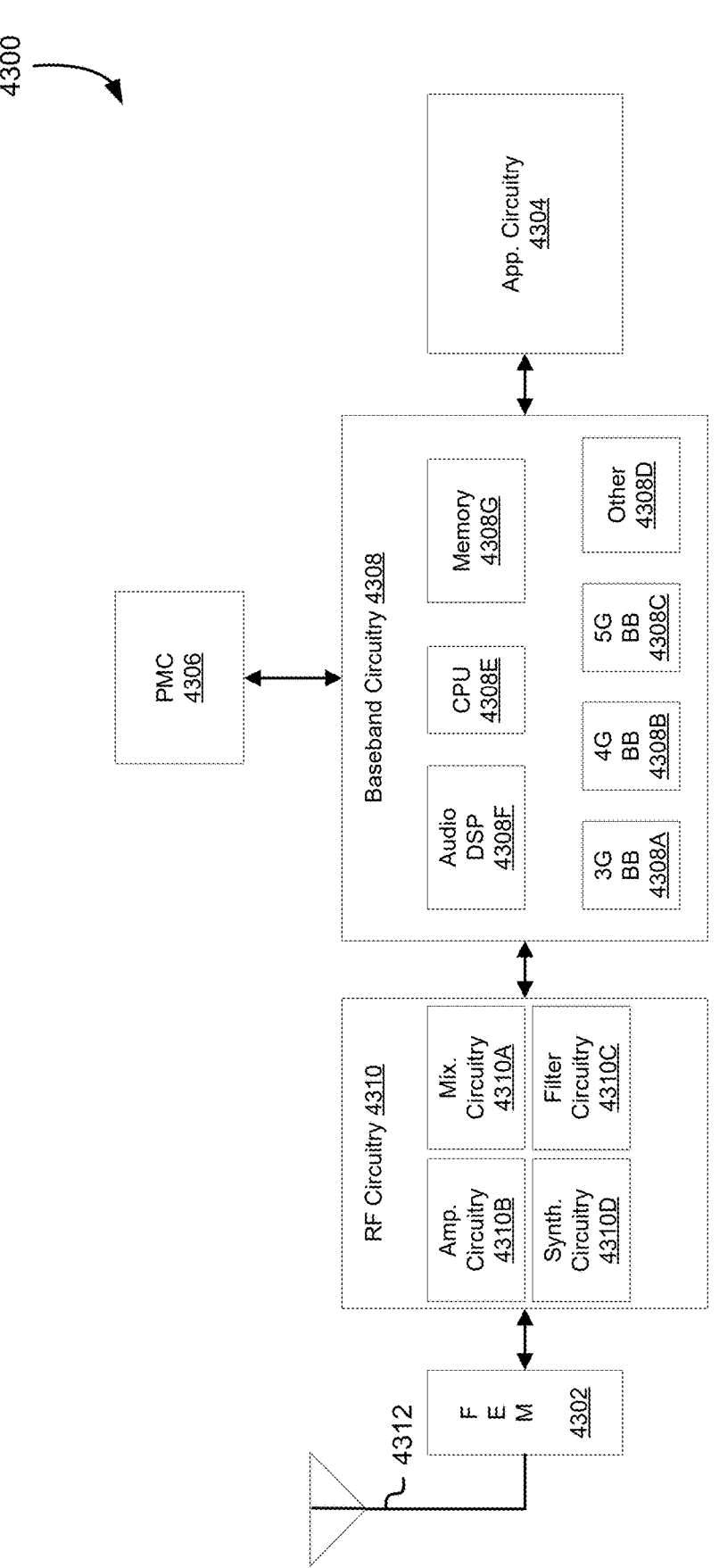
FIG. 43 illustrates example components of a device, according to at least one embodiment.

FIG. 43 illustrates example components of a device 4300 in accordance with at least one embodiment. In at least one embodiment, device 4300 may include application circuitry 4304, baseband circuitry 4308, Radio Frequency (RF) circuitry 4310, front-end module (FEM) circuitry 4302, one or more antennas 4312, and power management circuitry (PMC) 4306 coupled together at least as shown. In at least one embodiment, components of illustrated device 4300 may be included in a UE or a RAN node. In at least one embodiment, device 4300 may include less elements (e.g., a RAN node may not utilize application circuitry 4304, and instead include a processor/controller to process IP data received from an EPC). In at least one embodiment, device 4300 may include additional elements such as, for example, memory/storage, display, camera, sensor, or input/output (I/O) interface. In at least one embodiment, components described below may be included in more than one device (e.g., said circuitries may be separately included in more than one device for Cloud-RAN (C-RAN) implementations).

In at least one embodiment, application circuitry 4304 may include one or more application processors. In at least one embodiment, application circuitry 4304 may include circuitry such as, but not limited to, one or more single-core or multi-core processors. In at least one embodiment, processor(s) may include any combination of general purpose processors and dedicated processors (e.g., graphics processors, application processors, etc.). In at least one embodiment, processors may be coupled with or may include memory/storage and may be configured to execute instructions stored in memory/storage to enable various applications or operating systems to run on device 4300. In at least one embodiment, processors of application circuitry 4304 may process IP data packets received from an EPC.

In at least one embodiment, baseband circuitry 4308 may include circuitry such as, but not limited to, one or more single-core or multi-core processors. In at least one embodiment, baseband circuitry 4308 may include one or more baseband processors or control logic to process baseband signals received from a receive signal path of RF circuitry 4310 and to generate baseband signals for a transmit signal path of RF circuitry 4310. In at least one embodiment, baseband processing circuitry 4308 may interface with application circuitry 4304 for generation and processing of baseband signals and for controlling operations of RF circuitry 4310. In at least one embodiment, baseband circuitry 4308 may include a third generation (3G) baseband processor 4308A, a fourth generation (4G) baseband processor 4308B, a fifth generation (5G) baseband processor 4308C, or other baseband processor(s) 4308D for other existing generations, generations in development or to be developed (e.g., second generation (2G), sixth generation (6G), etc.). In at least one embodiment, baseband circuitry 4308 (e.g., one or more of base-band processors 4308A-D) may handle various radio control functions that enable communication with one or more radio networks via RF circuitry 4310. In at least one embodiment, some, or all of a functionality of baseband processors 4308A-D may be included in modules stored in memory 4308G and executed via a Central Processing Unit (CPU) 4308E. In at least one embodiment, radio control functions may include, but are not limited to, signal modulation/demodulation, encoding/decoding, radio frequency shifting, etc. In at least one embodiment, modulation/demodulation circuitry of baseband circuitry 4308 may include Fast-Fourier Transform (FFT), precoding, or constellation mapping/demapping functionality. In at least one embodiment, encoding/decoding circuitry of baseband circuitry 4308 may include convolution, tail biting convolution, turbo, Viterbi, or Low Density Parity Check (LDPC) encoder/decoder functionality.

In at least one embodiment, baseband circuitry 4308 may include one or more audio digital signal processor(s) (DSP) 4308F. In at least one embodiment, audio DSP(s) 4308F may be include elements for compression/decompression and echo cancellation and may include other suitable processing elements in other embodiments. In at least one embodiment, components of baseband circuitry may be suitably combined in a single chip, a single chipset, or disposed on a same circuit board in some embodiments. In at least one embodiment, some, or all of constituent components of baseband circuitry 4308 and application circuitry 4304 may be implemented together such as, for example, on a system on a chip (SOC).

In at least one embodiment, baseband circuitry 4308 may provide for communication compatible with one or more radio technologies. In at least one embodiment, baseband circuitry 4308 may support communication with an evolved universal terrestrial radio access network (EUTRAN) or other wireless metropolitan area networks (WMAN), a wireless local area network (WLAN), a wireless personal area network (WPAN). In at least one embodiment, baseband circuitry 4308 is configured to support radio communications of more than one wireless protocol and may be referred to as multimode baseband circuitry.

In at least one embodiment, RF circuitry 4310 may enable communication with wireless networks using modulated electromagnetic radiation through a non-solid medium. In at least one embodiment, RF circuitry 4310 may include switches, filters, amplifiers, etc. to facilitate communication with a wireless network. In at least one embodiment, RF circuitry 4310 may include a receive signal path which may include circuitry to down-convert RF signals received from FEM circuitry 4302 and provide baseband signals to baseband circuitry 4308. In at least one embodiment, RF circuitry 4310 may also include a transmit signal path which may include circuitry to up-convert baseband signals provided by baseband circuitry 4308 and provide RF output signals to FEM circuitry 4302 for transmission.

In at least one embodiment, receive signal path of RF circuitry 4310 may include mixer circuitry 4310a, amplifier circuitry 4310b and filter circuitry 4310c. In at least one embodiment, a transmit signal path of RF circuitry 4310 may include filter circuitry 4310c and mixer circuitry 4310a. In at least one embodiment, RF circuitry 4310 may also include synthesizer circuitry 4310d for synthesizing a frequency for use by mixer circuitry 4310a of a receive signal path and a transmit signal path. In at least one embodiment, mixer circuitry 4310a of a receive signal path may be configured to down-convert RF signals received from FEM circuitry 4302 based on a synthesized frequency provided by synthesizer circuitry 4310d. In at least one embodiment, amplifier circuitry 4310b may be configured to amplify down-converted signals and filter circuitry 4310c may be a low-pass filter (LPF) or band-pass filter (BPF) configured to remove unwanted signals from down-converted signals to generate output baseband signals. In at least one embodiment, output baseband signals may be provided to baseband circuitry 4308 for further processing. In at least one embodiment, output baseband signals may be zero-frequency baseband signals, although this is not a requirement. In at least one embodiment, mixer circuitry 4310a of a receive signal path may comprise passive mixers.

In at least one embodiment, mixer circuitry 4310a of a transmit signal path may be configured to up-convert input baseband signals based on a synthesized frequency provided by synthesizer circuitry 4310d to generate RF output signals for FEM circuitry 4302. In at least one embodiment, baseband signals may be provided by baseband circuitry 4308 and may be filtered by filter circuitry 4310c.

In at least one embodiment, mixer circuitry 4310a of a receive signal path and mixer circuitry 4310a of a transmit signal path may include two or more mixers and may be arranged for quadrature down conversion and up conversion, respectively. In at least one embodiment, mixer circuitry 4310a of a receive signal path and mixer circuitry 4310a of a transmit signal path may include two or more mixers and may be arranged for image rejection (e.g., Hartley image rejection). In at least one embodiment, mixer circuitry 4310a of a receive signal path and mixer circuitry 4310a may be arranged for direct down conversion and direct up conversion, respectively. In at least one embodiment, mixer circuitry 4310a of a receive signal path and mixer circuitry 4310a of a transmit signal path may be configured for super-heterodyne operation.

In at least one embodiment, output baseband signals and input baseband signals may be analog baseband signals. In at least one embodiment, output baseband signals and input baseband signals may be digital baseband signals. In at least one embodiment, RF circuitry 4310 may include analog-to-digital converter (ADC) and digital-to-analog converter (DAC) circuitry and baseband circuitry 4308 may include a digital baseband interface to communicate with RF circuitry 4310.

In at least one embodiment, a separate radio IC circuitry may be provided for processing signals for each spectrum In at least one embodiment, synthesizer circuitry 4310d may be a fractional-N synthesizer or a fractional N/N+1 synthesizer. In at least one embodiment, synthesizer circuitry 4310d may be a delta-sigma synthesizer, a frequency multiplier, or a synthesizer comprising a phase-locked loop with a frequency divider.

In at least one embodiment, synthesizer circuitry 4310d may be configured to synthesize an output frequency for use by mixer circuitry 4310a of RF circuitry 4310 based on a frequency input and a divider control input. In at least one embodiment, synthesizer circuitry 4310*d* may be a fractional N/N+1 synthesizer.

In at least one embodiment, frequency input may be provided by a voltage-controlled oscillator (VCO). In at least one embodiment, divider control input may be provided by either baseband circuitry 4308 or applications processor 4304 depending on a desired output frequency. In at least one embodiment, a divider control input (e.g., N) may be determined from a look-up table based on a channel indicated by applications processor 4304.

In at least one embodiment, synthesizer circuitry 4310*d* of RF circuitry 4310 may include a divider, a delay-locked loop (DLL), a multiplexer and a phase accumulator. In at least one embodiment, divider may be a dual modulus divider (DMD) and phase accumulator may be a digital phase accumulator (DPA). In at least one embodiment, DMD may be configured to divide an input signal by either N or N+1 (e.g., based on a carry out) to provide a fractional division ratio. In at least one embodiment, DLL may include a set of cascaded, tunable, delay elements, a phase detector, a charge pump, and a D-type flip-flop. In at least one embodiment, delay elements may be configured to break a VCO period up into Nd equal packets of phase, where Nd is a number of delay elements in a delay line. In at least one embodiment, in this way, DLL provides negative feedback to help ensure that total delay through a delay line is one VCO cycle.

In at least one embodiment, synthesizer circuitry 4310*d* may be configured to generate a carrier frequency as an output frequency, while in other embodiments, output frequency may be a multiple of a carrier frequency (e.g., twice a carrier frequency, four times a carrier frequency) and used in conjunction with quadrature generator and divider circuitry to generate multiple signals at a carrier frequency with multiple different phases with respect to each other. In at least one embodiment, output frequency may be a LO frequency (fLO). In at least one embodiment, RF circuitry 4310 may include an IQ/polar converter.

In at least one embodiment, FEM circuitry 4302 may include a receive signal path which may include circuitry configured to operate on RF signals received from one or more antennas 4312, amplify received signals and provide amplified versions of received signals to RF circuitry 4310 for further processing. In at least one embodiment, FEM circuitry 4302 may also include a transmit signal path which may include circuitry configured to amplify signals for transmission provided by RF circuitry 4310 for transmission by one or more of one or more antennas 4312. In at least one embodiment, amplification through a transmit or receive signal paths may be done solely in RF circuitry 4310, solely in FEM 4302, or in both RF circuitry 4310 and FEM 4302.

In at least one embodiment, FEM circuitry 4302 may include a TX/RX switch to switch between transmit mode and receive mode operation. In at least one embodiment, FEM circuitry may include a receive signal path and a transmit signal path. In at least one embodiment, a receive signal path of FEM circuitry may include an LNA to amplify received RF signals and provide amplified received RF signals as an output (e.g., to RF circuitry 4310). In at least one embodiment, a transmit signal path of FEM circuitry 4302 may include a power amplifier (PA) to amplify input RF signals (e.g., provided by RF circuitry 4310), and one or more filters to generate RF signals for subsequent transmission (e.g., by one or more of one or more antennas 4312).

In at least one embodiment, PMC 4306 may manage power provided to baseband circuitry 4308. In at least one embodiment, PMC 4306 may control power-source selection, voltage scaling, battery charging, or DC-to-DC conversion. In at least one embodiment, PMC 4306 may often be included when device 4300 is capable of being powered by a battery, for example, when device is included in a UE. In at least one embodiment, PMC 4306 may increase power conversion efficiency while providing desirable implementation size and heat dissipation characteristics.

In at least one embodiment, PMC 4306 may be additionally or alternatively coupled with, and perform similar power management operations for, other components such as, but not limited to, application circuitry 4304, RF circuitry 4310, or FEM 4302.

In at least one embodiment, PMC 4306 may control, or otherwise be part of, various power saving mechanisms of device 4300. In at least one embodiment, if device 4300 is in an RRC Connected state, where it is still connected to a RAN node as it expects to receive traffic shortly, then it may enter a state known as Discontinuous Reception Mode (DRX) after a period of inactivity. In at least one embodiment, during this state, device 4300 may power down for brief intervals of time and thus save power.

In at least one embodiment, if there is no data traffic activity for an extended period of time, then device 4300 may transition off to an RRC Idle state, where it disconnects from a network and does not perform operations such as channel quality feedback, handover, etc. In at least one embodiment, device 4300 goes into a very low power state and it performs paging where again it periodically wakes up to listen to a network and then powers down again. In at least one embodiment, device 4300 may not receive data in this state, in order to receive data, it must transition back to RRC Connected state.

In at least one embodiment, an additional power saving mode may allow a device to be unavailable to a network for periods longer than a paging interval (ranging from seconds to a few hours). In at least one embodiment, during this time, a device is totally unreachable to a network and may power down completely. In at least one embodiment, any data sent during this time incurs a large delay and it is assumed delay is acceptable.

In at least one embodiment, processors of application circuitry 4304 and processors of baseband circuitry 4308 may be used to execute elements of one or more instances of a protocol stack. In at least one embodiment, processors of baseband circuitry 4308, alone or in combination, may be used execute Layer 3, Layer 2, or Layer 1 functionality, while processors of application circuitry 4308 may utilize data (e.g., packet data) received from these layers and further execute Layer 4 functionality (e.g., transmission communication protocol (TCP) and user datagram protocol (UDP) layers). In at least one embodiment, layer 3 may comprise a radio resource control (RRC) layer. In at least one embodiment, Layer 2 may comprise a medium access control (MAC) layer, a radio link control (RLC) layer, and a packet data convergence protocol (PDCP) layer. In at least one embodiment, Layer 1 may comprise a physical (PHY) layer of a UE/RAN node.

In at least one embodiment, at least one component shown or described with respect to FIG. 43 is utilized to implement techniques and/or functions described in connection with FIGS. 1-10. In at least one embodiment, at least one component shown or described with respect to FIG. 43 is used to perform channel estimation, coherent combining, and/or signal detection for one or more signals that do not have a corresponding reference signal. In at least one embodiment, at least one component shown or described with respect to FIG. 43 performs at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

Figure 44:
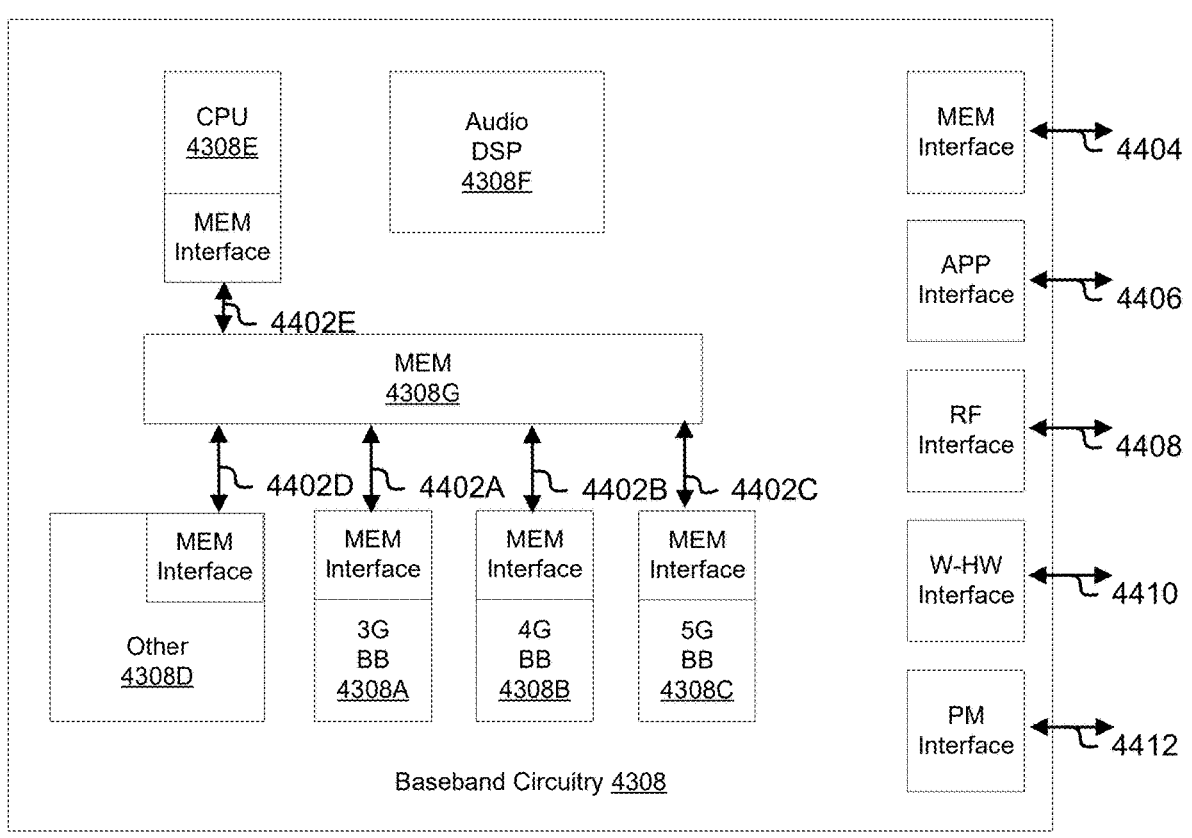
FIG. 44 illustrates example interfaces of baseband circuitry, according to at least one embodiment.

FIG. 44 illustrates example interfaces of baseband circuitry, in accordance with at least one embodiment. In at least one embodiment, as discussed above, baseband circuitry 4308 of FIG. 43 may comprise processors 4308A-4308E and a memory 4308G utilized by said processors. In at least one embodiment, each of processors 4308A-4308E may include a memory interface, 4402A-4402E, respectively, to send/receive data to/from memory 4308G.

In at least one embodiment, baseband circuitry 4308 may further include one or more interfaces to communicatively couple to other circuitries/devices, such as a memory interface 4404 (e.g., an interface to send/receive data to/from memory external to baseband circuitry 4308), an application circuitry interface 4406 (e.g., an interface to send/receive data to/from application circuitry 4304 of FIG. 43), an RF circuitry interface 4408 (e.g., an interface to send/receive data to/from RF circuitry 4310 of FIG. 43), a wireless hardware connectivity interface 4410 (e.g., an interface to send/receive data to/from Near Field Communication (NFC) components, Bluetooth® components (e.g., Bluetooth® Low Energy), Wi-Fi® components, and other communication components), and a power management interface 4412 (e.g., an interface to send/receive power or control signals to/from PMC 4306.

In at least one embodiment, at least one component shown or described with respect to FIG. 44 is utilized to implement techniques and/or functions described in connection with FIGS. 1-10. In at least one embodiment, at least one component shown or described with respect to FIG. 44 is used to perform channel estimation, coherent combining, and/or signal detection for one or more signals that do not have a corresponding reference signal. In at least one embodiment, at least one component shown or described with respect to FIG. 44 performs at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

FIG. 45 illustrates an example of an uplink channel, in accordance with at least one embodiment. In at least one embodiment, FIG. 45 illustrates transmitting and receiving data within a physical uplink shared channel (PUSCH) in 5G NR, which may be part of a physical layer of a mobile device network.

In at least one embodiment, Physical Uplink Shared Channel (PUSCH) in 5G NR is designated to carry multiplexed control information and user application data. In at least one embodiment, 5G NR provides much more flexibility and reliability comparing to its predecessor, which in some examples may be referred to as 4G LTE, including more elastic pilot arrangements and support for both cyclic prefix (CP)-OFDM and Discrete Fourier Transform spread (DFT-s)-OFDM waveforms. In at least one embodiment, standard introduced filtered OFDM (f-OFDM) technique is utilized to add additional filtering to reduce Out-of-Band emission and improve performance at higher modulation orders. In at least one embodiment, modifications in Forward Error Correction (FEC) were imposed to replace Turbo Codes used in 4G LTE by Quasi-Cyclic Low Density Parity Check (QC-LDPC) codes, which were proven to achieve better transmission rates and provide opportunities for more efficient hardware implementations.

In at least one embodiment, transmission of 5G NR downlink and uplink data is organized into frames of 10 ms duration, each divided into 10 subframes of 1 ms each. In at least one embodiment, subframes are composed of a variable number of slots, depending on a selected subcarrier spacing which is parameterized in 5G NR. In at least one embodiment, a slot is built from 14 OFDMA symbols, each prepended with a cyclic prefix. In at least one embodiment, a subcarrier that is located within a passband and is designated for transmission is called a Resource Element (RE). In at least one embodiment, a group of 12 neighboring RE in a same symbol form a Physical Resource Block (PRB).

In at least one embodiment, 5G NR standard defined two types of reference signals associated with transmission within a PUSCH channel. In at least one embodiment, Demodulation Reference Signal (DMRS) is a user specific reference signal with high frequency density. In at least one embodiment, DMRS is transmitted within dedicated orthogonal frequency-division multiple access (OFDMA) symbols only and designated for frequency-selective channel estimation. In at least one embodiment, a number of DMRS symbols within a slot may vary between 1 and 4 depending on configuration, where a denser DMRS symbol spacing in time is designated for fast time-varying channels to obtain more accurate estimates within a coherence time of a channel. In at least one embodiment, in a frequency domain, DMRS PRB are mapped within a whole transmission allocation. In at least one embodiment, spacing between a DMRS resource element (RE) assigned for a same Antenna Port (AP) may be chosen between 2 and 3. In at least one embodiment, in a case of 2-2 multiple-input, multiple-output (MIMO), a standard allows for orthogonal assignment of RE between AP. In at least one embodiment, a receiver may perform partial single input, multiple output (SIMO) channel estimation based on a DMRS RE prior to MIMO equalization, neglecting spatial correlation.

In at least one embodiment, a second type of reference signal is a Phase Tracking Reference Signal (PTRS). In at least one embodiment, PTRS subcarriers are arranged in a comb structure having high density in a time domain. In at least one embodiment, it is used mainly in mm Wave frequency bands to track and correct phase noise, which is a considerable source of performance losses. In at least one embodiment, usage of PTRS is optional, as it may lower a total spectral efficiency of a transmission when effects of phase noise are negligible.

In at least one embodiment, for transmission of data, a transport block may be generated from a MAC layer and given to a physical layer. In at least one embodiment, a transport block may be data that is intended to be transmitted. In at least one embodiment, a transmission in a physical layer starts with grouped resource data, which may be referred to as transport blocks. In at least one embodiment, a transport block is received by a cyclic redundancy check (CRC) 4502. In at least one embodiment, a cyclic redundancy check is appended to each transport block for error detection. In at least one embodiment, a cyclic redundancy check is used for error detection in transport blocks. In at least one embodiment, an entire transport block is used to calculate CRC parity bits and these parity bits are then attached to an end of a transport block. In at least one embodiment, minimum and maximum code block sizes are specified so blocks sizes are compatible with further processes. In at least one embodiment, an input block is segmented when an input block is greater than a maximum code block size.

In at least one embodiment, a transport block is received and encoded by a low-density parity-check (LDPC) encode 4504. In at least one embodiment, NR employs low-density parity-check (LDPC) codes for a data channel and polar codes for a control channel. In at least one embodiment, LDPC codes are defined by their parity-check matrices, with each column representing a coded bit, and each row representing a parity-check equation. In at least one embodiment, LDPC codes are decoded by exchanging messages between variables and parity checks in an iterative manner. In at least one embodiment, LDPC codes proposed for NR use a quasi-cyclic structure, where a parity-check matrix is defined by a smaller base matrix. In at least one embodiment, each entry of the base matrix represents either a Z×Z zero matrix or a shifted Z×Z identity matrix.

In at least one embodiment, an encoded transport block is received by rate match 4506. In at least one embodiment, an encoded block is used to create an output bit stream with a desired code rate. In at least one embodiment, rate match 4506 is utilized to create an output bit stream to be transmitted with a desired code rate. In at least one embodiment, bits are selected and pruned from a buffer to create an output bit stream with a desired code rate. In at least one embodiment, a Hybrid Automatic Repeat Request (HARQ) error correction scheme is incorporated.

In at least one embodiment, output bits are scrambled, which may aid in privacy, in scramble 4508. In at least one embodiment, codewords are bit-wise multiplied with an orthogonal sequence and a UE-specific scrambling sequence. In at least one embodiment, output of scramble 4508 may be input into modulation/mapping/precoding and other processes 4510. In at least one embodiment, various modulation, mapping, and precoding processes are performed.

In at least one embodiment, bits output from scramble 4508 are modulated with a modulation scheme, resulting in blocks of modulation symbols. In at least one embodiment, scrambled codewords undergo modulation using one of modulation schemes QPSK, 16 QAM, 64 QAM, resulting in a block of modulation symbols. In at least one embodiment, a channel interleaver process may be utilized that implements a first time mapping of modulation symbols onto a transmit waveform while ensuring that HARQ information is present on both slots. In at least one embodiment, modulation symbols are mapped to various layers based on transmit antennas. In at least one embodiment, symbols may be precoded, in which they are divided into sets, and an Inverse Fast Fourier Transform may be performed. In at least one embodiment, transport data and control multiplexing may be performed such that HARQ acknowledge (ACK) information is present in both slots and is mapped to resources around demodulation reference signals. In at least one embodiment, various precoding processes are performed.

In at least one embodiment, symbols are mapped to allocated physical resource elements in resource element mapping 4512. In at least one embodiment, allocation sizes may be limited to values whose prime factors are 2, 3 and 5. In at least one embodiment, symbols are mapped in increasing order beginning with subcarriers. In at least one embodiment, subcarrier mapped modulation symbols data are orthogonal frequency-division multiple access (OFDMA) modulated through IFFT operation in OFDMA modulation 4514. In at least one embodiment, time domain representations of each symbol are concatenated and filtered using transmit FIR filter to attenuate unwanted Out of Band emission to adjacent frequency bands caused by phase discontinuities and utilization of different numerologies. In at least one embodiment, an output of OFDMA modulation 4514 may be transmitted to be received and processed by another system.

In at least one embodiment, a transmission may be received by OFDMA demodulation 4516. In at least one embodiment, a transmission may originate from user mobile devices over a cellular network, although other contexts may be present. In at least one embodiment, a transmission may be demodulated through IFFT processing. In at least one embodiment, once OFDMA demodulation through IFFT processing has been accomplished, an estimation and correction of residual Sample Time Offset (STO) and Carrier Frequency Offset (CFO) may be performed. In at least one embodiment, both CFO and STO corrections have to be performed in frequency domain, because a received signal can be a superposition of transmissions coming from multiple UEs multiplexed in frequency, each suffering from a specific residual synchronization error. In at least one embodiment, residual CFO is estimated as a phase rotation between pilot subcarriers belonging to different OFDM symbols and corrected by a circular convolution operation in frequency domain.

In at least one embodiment, output of OFDMA demodulation 4516 may be received by resource element demapping 4518. In at least one embodiment, resource element demapping 4518 may determine symbols and demap symbols from allocated physical resource elements. In at least one embodiment, a channel estimation and equalization is performed in channel estimation 4520 in order to compensate for effects of multipath propagation. In at least one embodiment, channel estimation 4520 may be utilized to minimize effects of noise originating from various transmission layers and antennae. In at least one embodiment, channel estimation 4520 may generate equalized symbols from an output of resource element demapping 4518. In at least one embodiment, demodulation/demapping 4522 may receive equalized symbols from channel estimation 4520. In at least one embodiment, equalized symbols are demapped and permuted through a layer demapping operation. In at least one embodiment, a Maximum A Posteriori Probability (MAP) demodulation approach may be utilized to produce values representing beliefs regarding a received bit being 0 or 1, expressed in a form of Log-Likelihood Ratio (LLR).

In at least one embodiment, soft-demodulated bits are processed using various operations, including descrambling, deinterleaving and rate unmatching with LLR soft-combining using a circular buffer prior to LDPC decoding. In at least one embodiment, descramble 4524 may involve processes that reverse one or more processes of scramble 4508. In at least one embodiment, rate unmatch 4526 may involve processes that reverse one or more processes of rate match 4506. In at least one embodiment, descramble 4524 may receive output from demodulation/demapping 4522, and descramble received bits. In at least one embodiment, rate unmatch 4526 may receive descrambled bits, and utilize LLR soft-combining utilizing a circular buffer prior to LDPC decode 4528.

In at least one embodiment, decoding of LDPC codes in practical applications is done based on iterative belief propagation algorithms. In at least one embodiment, an LDPC code can be represented in a form of a bipartite graph with parity check matrix H of size M×N being a biadjacency matrix defining connections between graph nodes. In at least one embodiment, M rows of matrix H corresponds to parity check nodes, whereas N columns corresponds to variable nodes, i.e., received codeword bits. In at least one embodiment, a principle of belief propagation algorithms is based on iterative message exchange, in which A Posteriori probabilities between a variable and check nodes are updated, until a valid codeword is obtained. In at least one embodiment, LDPC decode 4528 may output a transport block comprising data.

In at least one embodiment, CRC check 4530 may determine errors and perform one or more actions based on parity bits attached to a received transport block. In at least one embodiment, CRC check 4530 may analyze and process parity bits attached to a received transport block, or otherwise any information associated with a CRC. In at least one embodiment, CRC check 4530 may transmit a processed transport block to a MAC layer for further processing.

It should be noted that, in various embodiments, transmitting and receiving data, which may be a transport block or other variation thereof, may include various processes not depicted in FIG. 45. In at least one embodiment, processes depicted in FIG. 45 are not intended to be exhaustive and further processes such as additional modulation, mapping, multiplexing, precoding, constellation mapping/demapping, MIMO detection, detection, decoding and variations thereof may be utilized in transmitting and receiving data as part of a network.

In at least one embodiment, at least one component shown or described with respect to FIG. 45 is utilized to implement techniques and/or functions described in connection with FIGS. 1-10. In at least one embodiment, at least one component shown or described with respect to FIG. 45 is used to perform channel estimation, coherent combining, and/or signal detection for one or more signals that do not have a corresponding reference signal. In at least one embodiment, at least one component shown or described with respect to FIG. 45 performs at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

Figure 46:
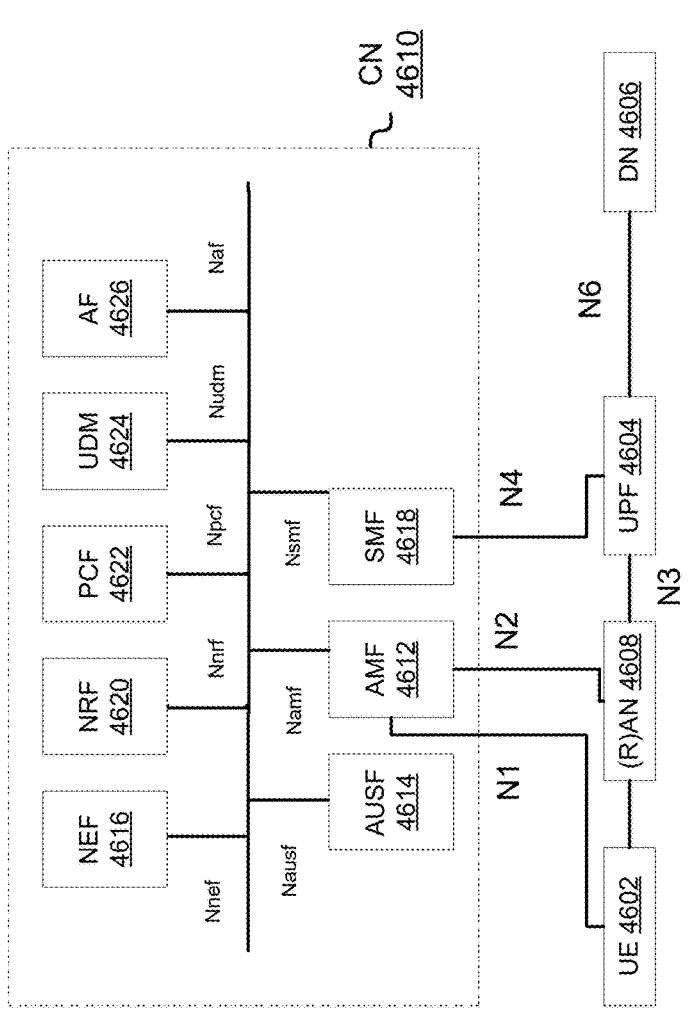
FIG. 46 illustrates an architecture of a system of a network, according to at least one embodiment.

FIG. 46 illustrates an architecture of a system 4600 of a network in accordance with some embodiments. In at least one embodiment, system 4600 is shown to include a UE 4602, a 5G access node or RAN node (shown as (R)AN node 4608), a User Plane Function (shown as UPF 4604), a Data Network (DN 4606), which may be, for example, operator services, Internet access or 3rd party services, and a 5G Core Network (5GC) (shown as CN 4610).

In at least one embodiment, CN 4610 includes an Authentication Server Function (AUSF 4614); a Core Access and Mobility Management Function (AMF 4612); a Session Management Function (SMF 4618); a Network Exposure Function (NEF 4616); a Policy Control Function (PCF 4622); a Network Function (NF) Repository Function (NRF 4620); a Unified Data Management (UDM 4624); and an Application Function (AF 4626). In at least one embodiment, CN 4610 may also include other elements that are not shown, such as a Structured Data Storage network function (SDSF), an Unstructured Data Storage network function (UDSF), and variations thereof.

In at least one embodiment, UPF 4604 may act as an anchor point for intra-RAT and inter-RAT mobility, an external PDU session point of interconnect to DN 4606, and a branching point to support multi-homed PDU session. In at least one embodiment, UPF 4604 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in uplink and downlink, and downlink packet buffering and downlink data notification triggering. In at least one embodiment, UPF 4604 may include an uplink classifier to support routing traffic flows to a data network. In at least one embodiment, DN 4606 may represent various network operator services, Internet access, or third party services.

In at least one embodiment, AUSF 4614 may store data for authentication of UE 4602 and handle authentication related functionality. In at least one embodiment, AUSF 4614 may facilitate a common authentication framework for various access types.

In at least one embodiment, AMF 4612 may be responsible for registration management (e.g., for registering UE 4602, etc.), connection management, reachability management, mobility management, and lawful interception of AMF-related events, and access authentication and authorization. In at least one embodiment, AMF 4612 may provide transport for SM messages for SMF 4618, and act as a transparent proxy for routing SM messages. In at least one embodiment, AMF 4612 may also provide transport for short message service (SMS) messages between UE 4602 and an SMS function (SMSF) (not shown by FIG. 46). In at least one embodiment, AMF 4612 may act as Security Anchor Function (SEA), which may include interaction with AUSF 4614 and UE 4602 and receipt of an intermediate key that was established as a result of UE 4602 authentication process. In at least one embodiment, where USIM based authentication is used, AMF 4612 may retrieve security material from AUSF 4614. In at least one embodiment, AMF 4612 may also include a Security Context Management (SCM) function, which receives a key from SEA that it uses to derive access-network specific keys. In at least one embodiment, furthermore, AMF 4612 may be a termination point of RAN CP interface (N2 reference point), a termination point of NAS (NI) signaling, and perform NAS ciphering and integrity protection.

In at least one embodiment, AMF 4612 may also support NAS signaling with a UE 4602 over an N3 interworking-function (IWF) interface. In at least one embodiment, N3IWF may be used to provide access to untrusted entities. In at least one embodiment, N3IWF may be a termination point for N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in uplink, and enforce QoS corresponding to N3 packet marking taking into account QoS requirements associated to such marking received over N2. In at least one embodiment, N3IWF may also relay uplink and downlink control-plane NAS (NI) signaling between UE 4602 and AMF 4612, and relay uplink and downlink user-plane packets between UE 4602 and UPF 4604. In at least one embodiment, N3IWF also provides mechanisms for IPsec tunnel establishment with UE 4602.

In at least one embodiment, SMF 4618 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. In at least one embodiment, SMF 4618 may include following roaming functionality: handle local enforcement to apply QOS SLAB (VPLMN); charging data collection and charging interface (VPLMN); lawful intercept (in VPLMN for SM events and interface to LI System); support for interaction with external DN for transport of signaling for PDU session authorization/authentication by external DN.

In at least one embodiment, NEF 4616 may provide means for securely exposing services and capabilities provided by 3GPP network functions for third party, internal exposure/re-exposure, Application Functions (e.g., AF 4626), edge computing or fog computing systems, etc. In at least one embodiment, NEF 4616 may authenticate, authorize, and/or throttle AFs. In at least one embodiment, NEF 4616 may also translate information exchanged with AF 4626 and information exchanged with internal network functions. In at least one embodiment, NEF 4616 may translate between an AF-Service-Identifier and an internal 5GC information. In at least one embodiment, NEF 4616 may also receive information from other network functions (NFs) based on exposed capabilities of other network functions. In at least one embodiment, this information may be stored at NEF 4616 as structured data, or at a data storage NF using a standardized interface. In at least one embodiment, stored information can then be re-exposed by NEF 4616 to other NFs and AFs, and/or used for other purposes such as analytics.

In at least one embodiment, NRF 4620 may support service discovery functions, receive NF Discovery Requests from NF instances, and provide information of discovered NF instances to NF instances. In at least one embodiment, NRF 4620 also maintains information of available NF instances and their supported services.

In at least one embodiment, PCF 4622 may provide policy rules to control plane function(s) to enforce them, and may also support unified policy framework to govern network behavior. In at least one embodiment, PCF 4622 may also implement a front end (FE) to access subscription information relevant for policy decisions in a UDR of UDM 4624.

In at least one embodiment, UDM 4624 may handle subscription-related information to support a network entities' handling of communication sessions, and may store subscription data of UE 4602. In at least one embodiment, UDM 4624 may include two parts, an application FE and a User Data Repository (UDR). In at least one embodiment, UDM may include a UDM FE, which is in charge of processing of credentials, location management, subscription management and so on. In at least one embodiment, several different front ends may serve a same user in different transactions. In at least one embodiment, UDM-FE accesses subscription information stored in an UDR and performs authentication credential processing; user identification handling; access authorization; registration/mobility management; and subscription management. In at least one embodiment, UDR may interact with PCF 4622. In at least one embodiment, UDM 4624 may also support SMS management, wherein an SMS-FE implements a similar application logic as discussed previously.

In at least one embodiment, AF 4626 may provide application influence on traffic routing, access to a Network Capability Exposure (NCE), and interact with a policy framework for policy control. In at least one embodiment, NCE may be a mechanism that allows a 5GC and AF 4626 to provide information to each other via NEF 4616, which may be used for edge computing implementations. In at least one embodiment, network operator and third party services may be hosted close to UE 4602 access point of attachment to achieve an efficient service delivery through a reduced end-to-end latency and load on a transport network. In at least one embodiment, for edge computing implementations, 5GC may select a UPF 4604 close to UE 4602 and execute traffic steering from UPF 4604 to DN 4606 via N6 interface. In at least one embodiment, this may be based on UE subscription data, UE location, and information provided by AF 4626. In at least one embodiment, AF 4626 may influence UPF (re) selection and traffic routing. In at least one embodiment, based on operator deployment, when AF 4626 is considered to be a trusted entity, a network operator may permit AF 4626 to interact directly with relevant NFs.

In at least one embodiment, CN 4610 may include an SMSF, which may be responsible for SMS subscription checking and verification, and relaying SM messages to/from UE 4602 to/from other entities, such as an SMS-GMSC/IWMSC/SMS-router. In at least one embodiment, SMS may also interact with AMF 4612 and UDM 4624 for notification procedure that UE 4602 is available for SMS transfer (e.g., set a UE not reachable flag, and notifying UDM 4624 when UE 4602 is available for SMS).

In at least one embodiment, system 4600 may include following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

In at least one embodiment, system 4600 may include following reference points: N1: Reference point between UE and AMF; N2: Reference point between (R)AN and AMF; N3: Reference point between (R)AN and UPF; N4: Reference point between SMF and UPF; and N6: Reference point between UPF and a Data Network. In at least one embodiment, there may be many more reference points and/or service-based interfaces between a NF services in NFs, however, these interfaces and reference points have been omitted for clarity. In at least one embodiment, an NS reference point may be between a PCF and AF; an N7 reference point may be between PCF and SMF; an N11 reference point between AMF and SMF; etc. In at least one embodiment, CN 4610 may include an Nx interface, which is an inter-CN interface between MME and AMF 4612 in order to enable interworking between CN 4610 and CN 7246.

In at least one embodiment, system 4600 may include multiple RAN nodes (such as (R)AN node 4608) wherein an Xn interface is defined between two or more (R)AN node 4608 (e.g., gNBs) that connecting to 5GC 410, between a (R)AN node 4608 (e.g., gNB) connecting to CN 4610 and an eNB (e.g., a macro RAN node), and/or between two eNBs connecting to CN 4610.

In at least one embodiment, Xn interface may include an Xn user plane (Xn-U) interface and an Xn control plane (Xn-C) interface. In at least one embodiment, Xn-U may provide non-guaranteed delivery of user plane PDUs and support/provide data forwarding and flow control functionality. In at least one embodiment, Xn-C may provide management and error handling functionality, functionality to manage a Xn-C interface; mobility support for UE 4602 in a connected mode (e.g., CM-CONNECTED) including functionality to manage UE mobility for connected mode between one or more (R)AN node 4608. In at least one embodiment, mobility support may include context transfer from an old (source) serving (R)AN node 4608 to new (target) serving (R)AN node 4608; and control of user plane tunnels between old (source) serving (R)AN node 4608 to new (target) serving (R)AN node 4608.

In at least one embodiment, a protocol stack of a Xn-U may include a transport network layer built on Internet Protocol (IP) transport layer, and a GTP-U layer on top of a UDP and/or IP layer(s) to carry user plane PDUs. In at least one embodiment, Xn-C protocol stack may include an application layer signaling protocol (referred to as Xn Application Protocol (Xn-AP)) and a transport network layer that is built on an SCTP layer. In at least one embodiment, SCTP layer may be on top of an IP layer. In at least one embodiment, SCTP layer provides a guaranteed delivery of application layer messages. In at least one embodiment, in a transport IP layer point-to-point transmission is used to deliver signaling PDUs. In at least one embodiment, Xn-U protocol stack and/or a Xn-C protocol stack may be same or similar to a user plane and/or control plane protocol stack(s) shown and described herein.

In at least one embodiment, at least one component shown or described with respect to FIG. 46 is utilized to implement techniques and/or functions described in connection with FIGS. 1-10. In at least one embodiment, at least one component of system 4600, such as RAN 4608, is used to perform channel estimation, coherent combining, and/or signal detection for one or more signals that do not have a corresponding reference signal. In at least one embodiment, at least one component of system 4600, such as RAN 4608, performs at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

Figure 47:
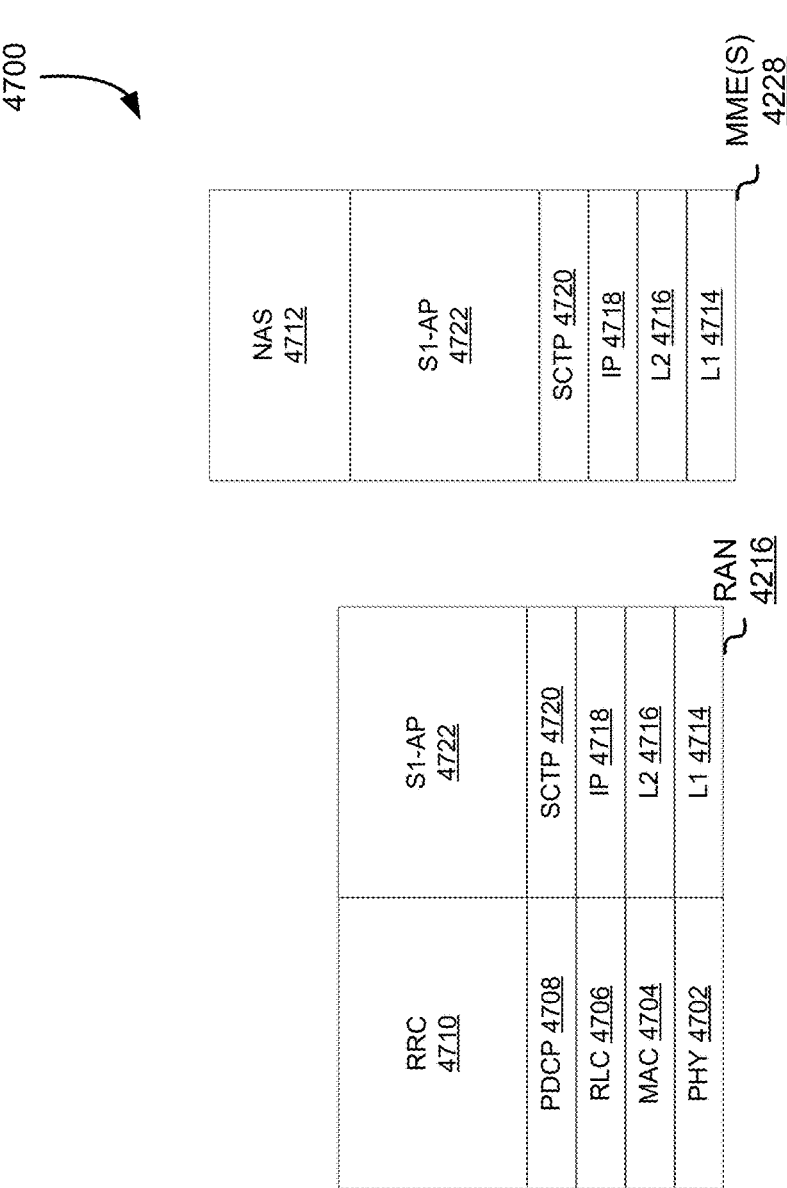
FIG. 47 illustrates a control plane protocol stack, according to at least one embodiment.

FIG. 47 is an illustration of a control plane protocol stack in accordance with some embodiments. In at least one embodiment, a control plane 4700 is shown as a communications protocol stack between UE 4202 (or alternatively, UE 4204), RAN 4216, and MME(s) 4228.

In at least one embodiment, PHY layer 4702 may transmit or receive information used by MAC layer 4704 over one or more air interfaces. In at least one embodiment, PHY layer 4702 may further perform link adaptation or adaptive modulation and coding (AMC), power control, cell search (e.g., for initial synchronization and handover purposes), and other measurements used by higher layers, such as an RRC layer 4710. In at least one embodiment, PHY layer 4702 may still further perform error detection on transport channels, forward error correction (FEC) coding/de-coding of transport channels, modulation/demodulation of physical channels, interleaving, rate matching, mapping onto physical channels, and Multiple Input Multiple Output (MIMO) antenna processing.

In at least one embodiment, MAC layer 4704 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from PHY via transport channels, multiplexing MAC SDUs onto TBs, scheduling information reporting, error correction through hybrid automatic repeat request (HARD), and logical channel prioritization.

In at least one embodiment, RLC layer 4706 may operate in a plurality of modes of operation, including: Transparent Mode (TM), Unacknowledged Mode (UM), and Acknowledged Mode (AM). In at least one embodiment, RLC layer 4706 may execute transfer of upper layer protocol data units (PDUs), error correction through automatic repeat request (ARQ) for AM data transfers, and concatenation, segmentation and reassembly of RLC SDUs for UM and AM data transfers. In at least one embodiment, RLC layer 4706 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

In at least one embodiment, PDCP layer 4708 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

In at least one embodiment, main services and functions of a RRC layer 4710 may include broadcast of system information (e.g., included in Master Information Blocks (MIBs) or System Information Blocks (SIBs) related to a non-access stratum (NAS)), broadcast of system information related to an access stratum (AS), paging, establishment, maintenance and release of an RRC connection between an UE and E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. In at least one embodiment, said MIBs and SIBs may comprise one or more information elements (IEs), which may each comprise individual data fields or data structures.

In at least one embodiment, UE 4202 and RAN 4216 may utilize a Uu interface (e.g., an LTE-Uu interface) to exchange control plane data via a protocol stack comprising PHY layer 4702, MAC layer 4704, RLC layer 4706, PDCP layer 4708, and RRC layer 4710.

In at least one embodiment, non-access stratum (NAS) protocols (NAS protocols 4712) form a highest stratum of a control plane between UE 4202 and MME(s) 4228. In at least one embodiment, NAS protocols 4712 support mobility of UE 4202 and session management procedures to establish and maintain IP connectivity between UE 4202 and P-GW 4234.

In at least one embodiment, Si Application Protocol (S1-AP) layer (Si-AP layer 4722) may support functions of a Si interface and comprise Elementary Procedures (EPs). In at least one embodiment, an EP is a unit of interaction between RAN 4216 and CN 4228. In at least one embodiment, S1-AP layer services may comprise two groups: UE-associated services and non UE-associated services. In at least one embodiment, these services perform functions including, but not limited to: E-UTRAN Radio Access Bearer (E-RAB) management, UE capability indication, mobility, NAS signaling transport, RAN Information Management (RIM), and configuration transfer.

In at least one embodiment, Stream Control Transmission Protocol (SCTP) layer (alternatively referred to as a stream control transmission protocol/internet protocol (SCTP/IP) layer) (SCTP layer 4720) may ensure reliable delivery of signaling messages between RAN 4216 and MME(s) 4228 based, in part, on an IP protocol, supported by an IP layer 4718. In at least one embodiment, L2 layer 4716 and an L1 layer 4714 may refer to communication links (e.g., wired or wireless) used by a RAN node and MME to exchange information.

In at least one embodiment, RAN 4216 and MME(s) 4228 may utilize an S1-MME interface to exchange control plane data via a protocol stack comprising a L1 layer 4714, L2 layer 4716, IP layer 4718, SCTP layer 4720, and Si-AP layer 4722.

In at least one embodiment, at least one component shown or described with respect to FIG. 47 is utilized to implement techniques and/or functions described in connection with FIGS. 1-10. In at least one embodiment, at least one component of RAN 4716 is used to perform channel estimation, coherent combining, and/or signal detection for one or more signals that do not have a corresponding reference signal. In at least one embodiment, at least one component of RAN 4716 performs at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

Figure 48:
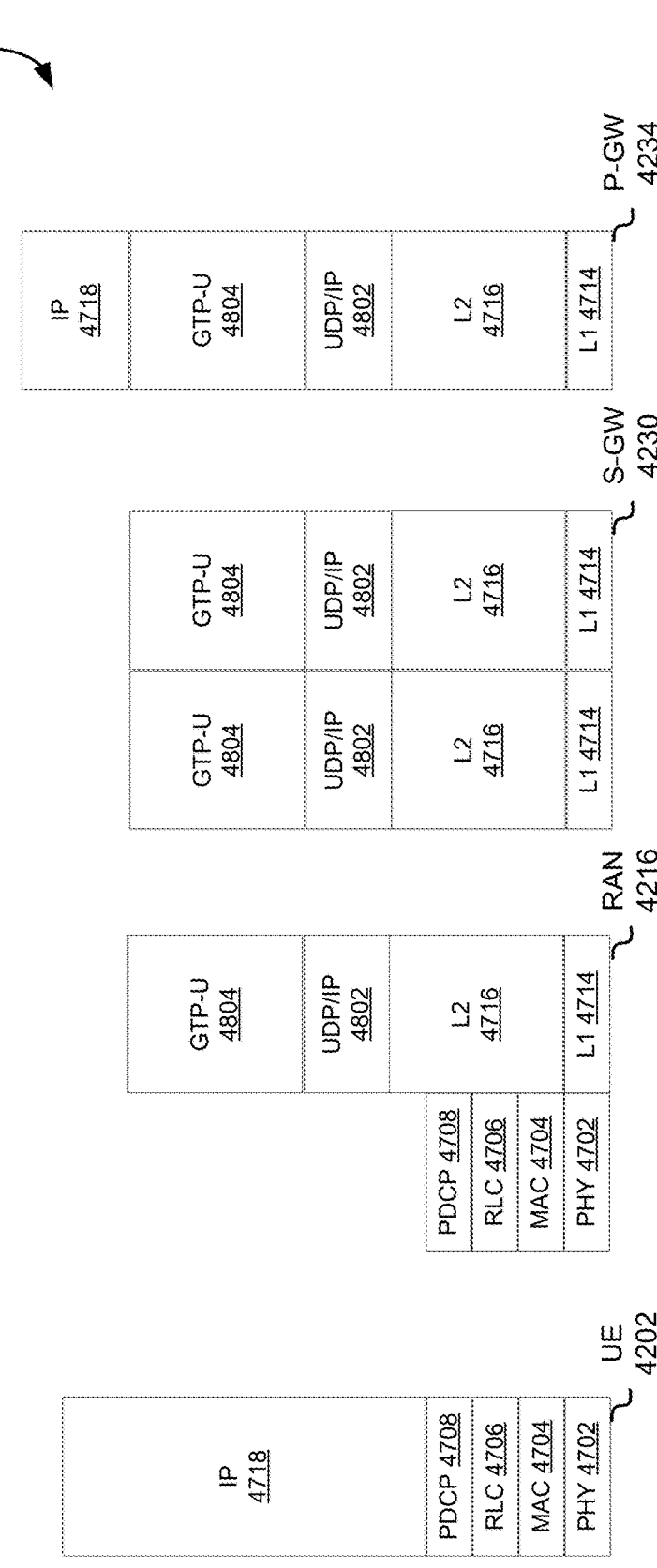
FIG. 48 illustrates a user plane protocol stack, according to at least one embodiment.

FIG. 48 is an illustration of a user plane protocol stack in accordance with at least one embodiment. In at least one embodiment, a user plane 4800 is shown as a communications protocol stack between a UE 4202, RAN 4216, S-GW 4230, and P-GW 4234. In at least one embodiment, user plane 4800 may utilize a same protocol layers as control plane 4700. In at least one embodiment, for example, UE 4202 and RAN 4216 may utilize a Uu interface (e.g., an LTE-Uu interface) to exchange user plane data via a protocol stack comprising PHY layer 4702, MAC layer 4704, RLC layer 4706, PDCP layer 4708.

In at least one embodiment, General Packet Radio Service (GPRS) Tunneling Protocol for a user plane (GTP-U) layer (GTP-U layer 4804) may be used for carrying user data within a GPRS core network and between a radio access network and a core network. In at least one embodiment, user data transported can be packets in any of IPV4, IPv6, or PPP formats, for example. In at least one embodiment, UDP and IP security (UDP/IP) layer (UDP/IP layer 4802) may provide checksums for data integrity, port numbers for addressing different functions at a source and destination, and encryption and authentication on selected data flows. In at least one embodiment, RAN 4216 and S-GW 4230 may utilize an S1-U interface to exchange user plane data via a protocol stack comprising L1 layer 4714, L2 layer 4716, UDP/IP layer 4802, and GTP-U layer 4804. In at least one embodiment, S-GW 4230 and P-GW 4234 may utilize an S5/S8a interface to exchange user plane data via a protocol stack comprising L1 layer 4714, L2 layer 4716, UDP/IP layer 4802, and GTP-U layer 4804. In at least one embodiment, as discussed above with respect to FIG. 47, NAS protocols support a mobility of UE 4202 and session management procedures to establish and maintain IP connectivity between UE 4202 and P-GW 4234.

In at least one embodiment, at least one component shown or described with respect to FIG. 48 is utilized to implement techniques and/or functions described in connection with FIGS. 1-10. In at least one embodiment, at least one component of RAN 4816 is used to perform channel estimation, coherent combining, and/or signal detection for one or more signals that do not have a corresponding reference signal. In at least one embodiment, at least one component of RAN 4816 performs at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

FIG. 49 illustrates components 4900 of a core network in accordance with at least one embodiment. In at least one embodiment, components of CN 4238 may be implemented in one physical node or separate physical nodes including components to read and execute instructions from a machine-readable or computer-readable medium (e.g., a non-transitory machine-readable storage medium). In at least one embodiment, Network Functions Virtualization (NFV) is utilized to virtualize any or all of above described network node functions via executable instructions stored in one or more computer readable storage mediums (described in further detail below). In at least one embodiment, a logical instantiation of CN 4238 may be referred to as a network slice 4902 (e.g., network slice 4902 is shown to include HSS 4232, MME(s) 4228, and S-GW 4230). In at least one embodiment, a logical instantiation of a portion of CN 4238 may be referred to as a network sub-slice 4904 (e.g., network sub-slice 4904 is shown to include P-GW 4234 and PCRF 4236).

In at least one embodiment, NFV architectures and infrastructures may be used to virtualize one or more network functions, alternatively performed by proprietary hardware, onto physical resources comprising a combination of industry-standard server hardware, storage hardware, or switches. In at least one embodiment, NFV systems can be used to execute virtual or reconfigurable implementations of one or more EPC components/functions.

In at least one embodiment, at least one component shown or described with respect to FIG. 49 is utilized to implement techniques and/or functions described in connection with FIGS. 1-10. In at least one embodiment, at least one component of components 4900 is used to perform channel estimation, coherent combining, and/or signal detection for one or more signals that do not have a corresponding reference signal. In at least one embodiment, at least one component of components 4900 performs at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

FIG. 50 is a block diagram illustrating components, according to at least one embodiment, of a system 5000 to support network function virtualization (NFV). In at least one embodiment, system 5000 is illustrated as including a virtualized infrastructure manager (shown as VIM 5002), a network function virtualization infrastructure (shown as NFVI 5004), a VNF manager (shown as VNFM 5006), virtualized network functions (shown as VNF 5008), an element manager (shown as EM 5010), an NFV Orchestrator (shown as NFVO 5012), and a network manager (shown as NM 5014).

In at least one embodiment, VIM 5002 manages resources of NFVI 5004. In at least one embodiment, NFVI 5004 can include physical or virtual resources and applications (including hypervisors) used to execute system 5000. In at least one embodiment, VIM 5002 may manage a life cycle of virtual resources with NFVI 5004 (e.g., creation, maintenance, and tear down of virtual machines (VMs) associated with one or more physical resources), track VM instances, track performance, fault and security of VM instances and associated physical resources, and expose VM instances and associated physical resources to other management systems.

In at least one embodiment, VNFM 5006 may manage VNF 5008. In at least one embodiment, VNF 5008 may be used to execute EPC components/functions. In at least one embodiment, VNFM 5006 may manage a life cycle of VNF 5008 and track performance, fault and security of virtual aspects of VNF 5008. In at least one embodiment, EM 5010 may track performance, fault and security of functional aspects of VNF 5008. In at least one embodiment, tracking data from VNFM 5006 and EM 5010 may comprise, for example, performance measurement (PM) data used by VIM 5002 or NFVI 5004. In at least one embodiment, both VNFM 5006 and EM 5010 can scale up/down a quantity of VNFs of system 5000.

In at least one embodiment, NFVO 5012 may coordinate, authorize, release and engage resources of NFVI 5004 in order to provide a requested service (e.g., to execute an EPC function, component, or slice). In at least one embodiment, NM 5014 may provide a package of end-user functions with responsibility for a management of a network, which may include network elements with VNFs, non-virtualized network functions, or both (management of the VNFs may occur via the EM 5010).

In at least one embodiment, at least one component shown or described with respect to FIG. 50 is utilized to implement techniques and/or functions described in connection with FIGS. 1-10. In at least one embodiment, at least one component of system 5000 is used to perform channel estimation, coherent combining, and/or signal detection for one or more signals that do not have a corresponding reference signal. In at least one embodiment, at least one component of system 5000 performs at least one aspect described with respect to preprocessor 128, channel estimator 126, coherent combiner 130, and/or signal detector 124 of FIG. 1, preprocessor 216 and/or channel estimator 202 of FIG. 2, preprocessing 502 and/or DNN 512 of FIG. 5, preprocessing 702 and/or DNN 714 of FIG. 7, technique 900 of FIG. 9, and/or technique 1000 of FIG. 10.

At least one embodiment can be described in view of at least one of the following clauses:

1. A processor, comprising:
one or more circuits to perform channel estimation corresponding to one or more wireless signals without using a reference signal.

2. The processor of clause 1, wherein the one or more circuits are to perform channel estimation without the reference signal based, at least in part, on multiple different possibilities of information encoded by the one or more wireless signals.

3. The processor of any one of clauses 1-2, wherein the one or more circuits are to perform coherent combination corresponding to a first wireless signal of the one or more wireless signals received by multiple antennas based, at least in part, on the channel estimation.

4. The processor of any one of clauses 1-3, wherein the one or more circuits are to perform coherent combination corresponding to a first wireless signal of the one or more wireless signals received by multiple antennas based, at least in part, on the channel estimation, and the one or more circuits are to identify a cyclic shift of a base sequence based, at least in part, on the coherent combination.

5. The processor of any one of clauses 1-4, wherein the one or more circuits are to perform channel estimation based, at least in part, on one or more neural networks.

6. The processor of any one of clauses 1-5, wherein the one or more circuits are to identify a cyclic shift value of a received first wireless signal of the one or more wireless signals transmitted by a user equipment device based, at least in part, on a base sequence corresponding to the user equipment device.

7. The processor of any one of clauses 1-6, wherein the one or more circuits are to perform coherent combination corresponding to a first wireless signal received by multiple antennas based, at least in part, on the channel estimation, are to identify a cyclic shift of a base sequence based, at least in part, on the coherent combination, and are to identify one or more values based, at least in part, on the cyclic shift.

8. The processor of any one of clauses 1-7, wherein the one or more circuits are to identify information corresponding to a physical uplink control channel (PUCCH) format zero signal or a physical random access channel (PRACH) signal received from a user equipment device based, at least in part, on the channel estimation.

9. A system, comprising:
one or more processors to perform channel estimation corresponding to one or more wireless signals without using a reference signal to generate one or more estimated channel values; and
one or more memories to store the one or more estimated channel values.

10. The system of clause 9, wherein the one or more processors are to perform channel estimation without using the reference signal based, at least in part, on multiple different possibilities of information encoded by the one or more wireless signals.

11. The system of any one of clauses 9-10, wherein the one or more processors are to perform coherent combination corresponding to a first wireless signal of the one or more wireless signals received by multiple antennas based, at least in part, on the channel estimation.

12. The system of any one of clauses 9-11, wherein the one or more processors are to perform channel estimation based, at least in part, on one or more neural networks.

13. The system of any one of clauses 9-12, wherein the one or more processors are to identify a cyclic shift value of a received first wireless signal of the one or more wireless signals based, at least in part, on a base sequence and the channel estimation.

14. The system of any one of clauses 9-13, wherein the one or more processors are to perform coherent combination corresponding to a first wireless signal of the one or more wireless signals received by multiple antennas based, at least in part, on the channel estimation and one or more of maximum ratio combining, zero-forcing, and minimum mean square error detection.

15. The system of any one of clauses 9-14, wherein the one or more processors are to identify uplink control information corresponding to a received first wireless signal of the one or more wireless signals transmitted by a user equipment device based, at least in part, on the channel estimation.

16. A machine-readable medium having stored thereon a set of instructions, which if performed by one or more processors, cause the one or more processors to at least:

perform channel estimation corresponding to one or more wireless signals without using a reference signal.

17. The machine-readable medium of clause 16, wherein the instructions, which if performed by the one or more processors, cause the one or more processors to perform channel estimation without the reference signal based, at least in art, on multiple different possibilities of information encoded by the one or more wireless signals.

18. The machine-readable medium of any one of clauses 16-17, wherein the instructions, which if performed by the one or more processors, cause the one or more processors to perform coherent combination corresponding to a first wireless signal of the one or more wireless signals received by multiple antennas based, at least in part, on the channel estimation.

19. The machine-readable medium of any one of clauses 16-18, wherein the instructions, which if performed by the one or more processors, cause the one or more processors to perform channel estimation based, at least in part, on one or more of performing one or more least square calculations and performing one or more minimum mean square error calculations.

20. The machine-readable medium of any one of clauses 16-19, wherein the instructions, which if performed by the one or more processors, cause the one or more processors to identify a cyclic shift value of a received first wireless signal of the one or more wireless signals based, at least in part, on the channel estimation.

21. The machine-readable medium of any one of clauses 16-20, wherein the instructions, which if performed by the one or more processors, cause the one or more processors to perform coherent combination based, at least in part, on the channel estimation, identify a cyclic shift value based, at least in part on the coherent combination, and identify one or more uplink control information values based, at least in part, on the cyclic shift value.

22. The machine-readable medium of any one of clauses 16-21, wherein the instructions, which if performed by the one or more processors, cause the one or more processors to identify one or more information values corresponding to a received first wireless signal of the one or more wireless signals transmitted by a user equipment device based, at least in part, on the channel estimation and an information type value.

23. A method, comprising;

performing channel estimation corresponding to one or more wireless signals without using a reference signal.

24. The method of clause 23, wherein performing channel estimation without the reference signal is based, at least in part, on multiple different possibilities of information encoded by the one or more wireless signals.

25. The method of any one of clauses 23-24, wherein the method further includes performing coherent combination corresponding to a first wireless signal of the one or more wireless signals received by multiple antennas based, at least in part, on the channel estimation.

26. The method of any one of clauses 23-25, wherein performing channel estimation is based, at least in part, on one or more neural networks and the method further includes performing coherent combination corresponding to a first wireless signal of the one or more wireless signals received by multiple antennas based, at least in part, on the channel estimation, and performing signal detection based, at least in part, on the coherent combination.

27. The method of any one of clauses 23-26, wherein the method further includes identifying a cyclic shift value based, at least in part, on the channel estimation.

28. The method of any one of clauses 23-27, wherein the method further includes performing coherent combination based, at least in part, on the channel estimation, and identifying a cyclic shift value based, at least in part, on the coherent combination.

29. The method of any one of clauses 23-28, wherein performing channel estimation is based, at least in part, on using one or more neural networks.

30. A wireless radio network base station, comprising:

one or more circuits to perform channel estimation corresponding to one or more wireless signals received from one or more user equipment devices without using a reference signal.

31. The wireless radio network base station of clause 30, wherein the one or more circuits are to perform channel estimation without the reference signal based, at least in part, on multiple different possibilities of information encoded by the one or more wireless signals.

32. The wireless radio network base station of any one of clauses 30-31, wherein the one or more circuits are to perform coherent combination corresponding to a first wireless signal of the one or more wireless signals received by multiple antennas based, at least in part, on the channel estimation.

33. The wireless radio network base station of any one of clauses 30-32, wherein the one or more circuits are to perform coherent combination based, at least in part, on the channel estimation, identify a cyclic shift value based, at least in part, on the coherent combination, and identify one or more fifth generation (5G) new radio (NR) uplink control information values based, at least in part, on the cyclic shift value.

34. The wireless radio network base station of any one of clauses 30-33, wherein the one or more circuits are to perform channel estimation based, at least in part, on a base sequence and a plurality of possible cyclic shift values.

35. The wireless radio network base station of any one of clauses 30-34, wherein the wireless radio network base station is a gNodeB (gNB).

36. The wireless radio network base station of claim 30, wherein the one or more circuits are part of one or more of a graphics processing unit, an application specific integrated circuit, or a field programmable gate array.

37. A processor, comprising:

one or more circuits to cause channel estimation of one or more radio signals without a corresponding reference signal to be performed based, at least in part, on a plurality of possible values of the one or more radio signals.

38. The processor of clause 37, wherein the one or more circuits are to use one or more neural networks to decode a first radio signal of the one or more radio signals based, at least in part, on multiple different possibilities of information encoded by the first radio signal.

39. The processor of any one of clauses 37-38, wherein the one or more circuits are to use one or more neural networks to identify a cyclic shift value of a received first radio signal of the one or more radio signals based, at least in part on the plurality of possible values.

40. The processor of any one of clauses 37-39, wherein the one or more circuits are to use one or more neural networks to identify whether a user equipment device is in a discontinuous transmission status based, at least in part, on the plurality of possible values.

41. The processor of any one of clauses 37-40, wherein the one or more circuits are to calculate a plurality of inner product values based, at least in part, on a received first radio signal of the one or more radio signals and the plurality of possible values, the one or more circuits are to calculate a plurality of correlation values based, at least in part, on the plurality of inner product values, and are to use one or more neural networks to identify a cyclic shift value of the received first radio signal based, at least in part, on the plurality of inner product values and the plurality of correlation values.

42. The processor of any one of clauses 37-41, wherein the one or more circuits are to perform coherent combination corresponding to a first radio signal of the one or more radio signals received by multiple antennas based, at least in part, on the channel estimation, and are to use one or more neural networks to decode the first radio signal of the one or more radio signals based, at least in part, on the coherent combination.

43. The processor of any one of clauses 37-42, wherein the one or more circuits are to cause channel estimation to be performed using a first one or more neural networks, and the one or more circuits are to cause signal detection to be performed using a second one or more neural networks based, at least in part, on the channel estimation.

44. The processor of any one of clauses 37-43, wherein the one or more circuits are to use one or more neural networks to identify a cyclic shift value of a received first radio signal of the one or more radio signals based, at least in part, on the plurality of possible values, and the one or more circuits are to identify uplink control information based, at least in part, on the cyclic shift value and an uplink control information type value.

45. A system, comprising:
one or more processors to cause channel estimation of one or more radio signals without a corresponding reference signal to be performed based, at least in part, on a plurality of possible values of the one or more radio signals; and
one or more memories to store the plurality of possible values.

46. The system of clause 45, wherein the one or more processors are to use one or more neural networks to decode a first radio signal of the one or more radio signals based, at least in part, on multiple different possibilities of information encoded by the first radio signal.

47. The system of any one of clauses 45-46, wherein the one or more processors are to use one or more neural networks to identify a cyclic shift value of a received first radio signal of the one or more radio signals based, at least in part, on the plurality of possible values.

48. The system of any one of clauses 45-47, wherein the one or more processors are to use one or more neural networks to identify a cyclic shift value of a received first radio signal of the one or more radio signals transmitted by a user equipment device based, at least in part, on the plurality of possible values.

49. The system of any one of clauses 45-48, wherein the one or more processors are to use one or more neural networks to identify whether a user equipment device is in a discontinuous transmission status and identify a cyclic shift value of a received first radio signal of the one or more radio signals transmitted by the user equipment device if it is not in a discontinuous transmission status.

50. The system of any one of clauses 45-49, wherein the one or more processors are to cause channel estimation to be performed using a first one or more neural networks, and the one or more processors are to identify a cyclic shift value using a second one or more neural networks based, at least in part, on the channel estimation.

51. A machine-readable medium having stored thereon a set of instructions, which if performed by one or more processors, cause the one or more processors to at least:
cause channel estimation of one or more radio signals without a corresponding reference signal to be performed based, at least in part, on a plurality of possible values of the one or more radio signals.

52. The machine-readable medium of clause 51, wherein the instructions, which if performed by the one or more processors, are to cause the one or more processors to use one or more neural networks to decode a first radio signal of the one or more radio signals based, at least in part, on multiple different possibilities of information encoded by the first radio signal.

53. The machine-readable medium of any one of clauses 51-52, wherein the instructions, which if performed by the one or more processors, are to cause the one or more processors to use one or more neural networks to identify a cyclic shift value corresponding to a received first radio signal of the one or more radio signals based, at least in part, on the plurality of possible values.

54. The machine-readable medium of any one of clauses 51-53, wherein the instructions, which if performed by the one or more processors, are to cause the one or more processors to perform coherent combination based, at least in part, on the channel estimation, and to use one or more neural networks to perform signal detection based, at least in part, on the coherent combination.

55. The machine-readable medium of any one of clauses 51-54, wherein the instructions, which if performed by the one or more processors, are to cause the one or more processors to use one or more neural networks to identify a cyclic shift value of a received first radio signal of the one or more radio signals based, at least in part, on the plurality of possible values, and to identify uplink control information based, at least in part, on the cyclic shift value.

56. The machine-readable medium of any one of clauses 51-55, wherein the instructions, which if performed by the one or more processors, are to cause the one or more processors to use one or more neural networks to perform signal detection corresponding to a first radio signal of the one or more radio signals received at a base station from a user equipment device based, at least in part, on the channel estimation.

57. A method, comprising;
performing channel estimation of one or more radio signals without a corresponding reference signal based, at least in part, on a plurality of possible values of the one or more radio signals.

58. The method of clause 57, wherein the method includes using one or more neural networks to decode a first radio signal of the one or more radio signals based, at least in part, on multiple different possibilities of information encoded by the first radio signal.

59. The method of any one of clauses 57-58, wherein the method includes using one or more neural networks to identify a cyclic shift value corresponding to a received first radio signal of the one or more radio signals based, at least in part, on the channel estimation.

60. The method of any one of clauses 57-59, wherein the method further includes using one or more neural networks to identify a cyclic shift value corresponding to a received first radio signal of the one or more radio signals from a user equipment device and identifying uplink control information based, at least in part, on the cyclic shift value.

61. The method of any one of clauses 57-60, wherein the method further includes performing coherent combination based, at least in part, on the channel estimation, and using one or more neural networks to identify a cyclic shift value based, at least in part, on the coherent combination.

62. The method of any one of clauses 61, wherein performing channel estimation is based, at least in part, on a first one or more neural networks, and the method further includes performing signal detection based, at least in part, on a second one or more neural networks.

63. A wireless radio network base station, comprising:
    one or more circuits to perform channel estimation of one or more radio signals received from one or more user equipment devices without a corresponding reference signal based, at least in part, on a plurality of possible values of the one or more radio signals.

64. The wireless radio network base station of clause 63, wherein the one or more radio signals are one or more of physical uplink control channel (PUCCH) signals and physical random access channel (PRACH) signals.

65. The wireless radio network base station of any one of clauses 63-64, wherein the one or more circuits are to identify a cyclic shift value of a received first radio signal of the one or more radio signals.

66. The wireless radio network base station of any one of clauses 63-65, wherein the one or more circuits are to use one or more neural networks to identify whether a user equipment device is in a discontinuous transmission status based, at least in part, on the plurality of possible values.

67. The wireless radio network base station of any one of clauses 63-66, wherein the one or more circuits are part of one or more of a graphics processing unit, an application specific integrated circuit, or a field programmable gate array.

68. The wireless radio network base station of any one of clauses 63-67, wherein the wireless radio network base station is a gNodeB (gNB).

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In the scope of this application, the term arithmetic logic unit, or ALU, is used to refer to any computational logic circuit that processes operands to produce a result. For example, in the present document, the term ALU can refer to a floating point unit, a DSP, a tensor core, a shader core, a coprocessor, or a CPU.

In present document, references may be made to obtaining, acquiring, receiving, or inputting analog or digital data into a subsystem, computer system, or computer-implemented machine. A process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. One or more processors, comprising circuitry to:
generate one or more Fifth Generation (5G) channel estimation values based, at least in part, on varying information encoded into one or more corresponding 5G signals by at least performing coherent signal combination without a reference signal.

2. The one or more processors of claim 1, wherein the varying information includes multiple different possibilities of information encoded by the one or more corresponding 5G signals.

3. The one or more processors of claim 1, wherein the circuitry is to further perform the coherent signal combination corresponding to a wireless signal of the one or more corresponding 5G signals received by multiple antennas based, at least in part, on the 5G channel estimation values.

4. The one or more processors of claim 1, wherein the circuitry is to;
further perform the coherent combination corresponding to a wireless signal of the one or more corresponding 5G signals received by multiple antennas based, at least in part, on the 5G channel estimation values; and
identify a cyclic shift of a base sequence based, at least in part, on the coherent combination.

5. The one or more processors of claim 1, wherein the circuitry is to generate the 5G channel estimation values based, at least in part, on one or more neural networks.

6. The one or more processors of claim 1, wherein the circuitry is to identify a cyclic shift value of a received wireless signal of the one or more corresponding 5G signals transmitted by a user equipment device based, at least in part, on a base sequence corresponding to the user equipment device.

7. The one or more processors of claim 1, wherein the circuitry is to:
further perform the coherent combination corresponding to a wireless signal received by multiple antennas based, at least in part, on the 5G channel estimation values;
identify a cyclic shift of a base sequence based, at least in part, on the coherent combination; and
identify one or more cyclic shift values based, at least in part, on the cyclic shift.

8. The one or more processors of claim 1, wherein the circuitry is to identify information corresponding to a physical uplink control channel (PUCCH) format zero signal or a physical random access channel (PRACH) signal received from a user equipment device based, at least in part, on the 5G channel estimation values.

9. A system, comprising:
one or more processors to generate one or more Fifth Generation (5G) channel estimation values based, at least in part, on varying information encoded into one or more corresponding 5G signals by at least performing coherent signal combination without a reference signal; and
one or more memories to store the one or more 5G channel estimation values.

10. The system of claim 9, wherein the varying information includes multiple different possibilities of information encoded by the one or more corresponding 5G signals.

11. The system of claim 9, wherein the one or more processors are to perform the coherent combination corresponding to a wireless signal of the one or more corresponding 5G signals received by multiple antennas based, at least in part, on the 5G channel estimation values.

12. The system of claim 9, wherein the one or more processors are to generate the 5G channel estimation values based, at least in part, on one or more neural networks.

13. The system of claim 9, wherein the one or more processors are to identify a cyclic shift value of a received wireless signal of the one or more corresponding 5G signals based, at least in part, on a base sequence and the 5G channel estimation values.

14. The system of claim 9, wherein the one or more processors are to perform the coherent combination corresponding to a wireless signal of the one or more corresponding 5G signals received by multiple antennas based, at least in part, on the 5G channel estimation values and one or more of:
maximum ratio combining (MRC),
zero-forcing (ZF), or
minimum mean square error (MMSE) detection.

15. The system of claim 9, wherein the one or more processors are to identify uplink control information corresponding to a received wireless signal of the one or more corresponding 5G signals transmitted by a user equipment device based, at least in part, on the 5G channel estimation values.

16. A non-transitory machine-readable medium having stored thereon a set of instructions, which if performed by one or more processors, cause the one or more processors to at least:
generate one or more Fifth Generation (5G) channel estimation values based, at least in part, on varying information encoded into one or more corresponding 5G signals by at least performing coherent signal combination without a reference signal.

17. The non-transitory machine-readable medium of claim 16, wherein the instructions, which if performed by the one or more processors, cause the one or more processors to identify a cyclic shift value of a physical uplink control channel (PUCCH) format 0 signal based, at least in part, on the channel estimation values.

18. The non-transitory machine-readable medium of claim 16, wherein the instructions, which if performed by the one or more processors, cause the one or more processors to perform the coherent combination corresponding to a wireless signal of the one or more corresponding 5G signals received by multiple antennas based, at least in part, on the 5G channel estimation values.

19. The non-transitory machine-readable medium of claim 16, wherein the instructions, which if performed by the one or more processors, cause the one or more processors to generate the 5G channel estimation values based, at least in part, on one or more of performing:
one or more least square calculations, or
one or more minimum mean square error calculations.

20. The non-transitory machine-readable medium of claim 16, wherein the instructions, which if performed by the one or more processors, cause the one or more processors to identify a cyclic shift value of a received wireless signal of the one or more corresponding 5G signals based, at least in part, on the 5G channel estimation values.

21. The non-transitory machine-readable medium of claim 16, wherein the instructions, which if performed by the one or more processors, cause the one or more processors to:

further perform the coherent combination based, at least in part, on the 5G channel estimation values;

identify a cyclic shift value based, at least in part on the coherent combination; and identify one or more uplink control information values based, at least in part, on the cyclic shift value.

22. The non-transitory machine-readable medium of claim 16, wherein the instructions, which if performed by the one or more processors, cause the one or more processors to identify one or more information values corresponding to a received wireless signal of the one or more corresponding 5G signals transmitted by a user equipment device based, at least in part, on the 5G channel estimation values and an information type value.

23. A method, comprising:

generating one or more Fifth Generation (5G) channel estimation values based, at least in part, on varying information encoded into one or more corresponding 5G signals by at least performing coherent signal combination without a reference signal.

24. The method of claim 23, wherein the varying information includes multiple different possibilities of information encoded by the one or more corresponding 5G signals.

25. The method of claim 23, wherein the performing the coherent combination corresponding to a wireless signal of the one or more corresponding 5G signals received by multiple antennas based, at least in part, on the 5G channel estimation values.

26. The method of claim 23, wherein:

generating the 5G channel estimation values is based, at least in part, on one or more neural networks; and the method further includes:

further performing the coherent combination corresponding to a first wireless signal of the one or more corresponding 5G signals received by multiple antennas based, at least in part, on the 5G channel estimation values; and performing signal detection based, at least in part, on the coherent combination.

27. The method of claim 23, wherein the method further includes identifying a cyclic shift value based, at least in part, on the 5G channel estimation values.

28. The method of claim 23, wherein the method further includes:

further performing the coherent combination based, at least in part, on the 5G channel estimation values; and identifying a cyclic shift value based, at least in part, on the coherent combination.

29. The method of claim 23, wherein generating the 5G channel estimation values is based, at least in part, on using one or more neural networks.

30. A wireless radio network base station, comprising:

circuitry to generate one or more Fifth Generation (5G) channel estimation values concurrently by at least varying information usable to decode one or more corresponding 5G signals received from one or more user equipment devices by at least performing coherent signal combining without a reference signal.

31. The wireless radio network base station of claim 30, wherein the circuitry is to further perform the coherent signal combining based, at least in part, on a wireless signal of the one or more corresponding 5G signals received by multiple antennas based, at least in part, on the 5G channel estimation values.

32. The wireless radio network base station of claim 30, wherein the circuitry is to:

further perform the coherent signal combining based, at least in part, on the 5G channel estimation values;

identify a cyclic shift value based, at least in part, on the coherent signal combining; and identify one or more fifth generation (5G) new radio (NR) uplink control information values based, at least in part, on the cyclic shift value.

33. The wireless radio network base station of claim 30, wherein the circuitry is to generate the 5G channel estimation values based, at least in part, on a base sequence and a plurality of possible cyclic shift values.

34. The wireless radio network base station of claim 30, wherein the wireless radio network base station is a gNodeB (gNB).

35. The wireless radio network base station of claim 30, wherein the circuitry is part of one or more of a graphics processing unit, an application specific integrated circuit, or a field programmable gate array.

36. The wireless radio network base station of claim 30, wherein at least some of the one or more 5G channel estimation values are generated in parallel using one or more graphics processing units (GPUs).

* * * * *